US012603766B2

(12) United States Patent
Yeomans et al.

(10) Patent No.: US 12,603,766 B2
(45) Date of Patent: Apr. 14, 2026

(54) QKD SWITCHING SYSTEM AND PROTOCOLS

(71) Applicant: ARQIT LIMITED, London (GB)

(72) Inventors: Andrew Yeomans, Hertfordshire (GB); Daryl Burn, Gloucestershire (GB); David Williams, Surrey (GB)

(73) Assignee: Arqit Limited, London (GB)

( * ) Notice: Subject to any disclaimer, the term of this patent is extended or adjusted under 35 U.S.C. 154(b) by 210 days.

(21) Appl. No.: 18/274,632

(22) PCT Filed: Jan. 28, 2022

(86) PCT No.: PCT/GB2022/050234
§ 371 (c)(1),
(2) Date: Jul. 27, 2023

(87) PCT Pub. No.: WO2022/162382
PCT Pub. Date: Aug. 4, 2022

(65) Prior Publication Data
US 2024/0106637 A1 Mar. 28, 2024

(30) Foreign Application Priority Data

Jan. 29, 2021 (GB) ...................................... 2101310
May 14, 2021 (GB) ...................................... 2106977

(51) Int. Cl.
*H04L 9/08* (2006.01)
*H04L 45/42* (2022.01)
(52) U.S. Cl.
CPC .......... *H04L 9/0855* (2013.01); *H04L 9/0858* (2013.01); *H04L 45/42* (2013.01)
(58) Field of Classification Search
CPC ..................... H04L 9/0852–0858; H04L 45/42
See application file for complete search history.

(56) References Cited

U.S. PATENT DOCUMENTS 7,392,378 B1 6/2008 Elliott
7,706,535 B1 4/2010 Pearson
(Continued)

FOREIGN PATENT DOCUMENTS

EP 1848142 10/2007

OTHER PUBLICATIONS

R. Wang et al., "End-to-end Quantum Secured Inter-Domain 5G Service Orchestration Over Synamically Switched Flex-Grid Optical Networks Enabled by a q-ROADM", Journal of Lightwave Technology, IEEE, USA, vol. 38, No. 1, Jan. 1, 2020, pp. 139-149, XP011763706, ISSN: 0733-8724, DOI: 10.1109/JLT.2019.2949864 [retrieved on Dec. 31, 2019] abstract, paragraph [0001]-paragraph [0006].

(Continued)

*Primary Examiner* — Madhuri R Herzog
(74) *Attorney, Agent, or Firm* — Dentons US LLP

(57) ABSTRACT

A quantum key distributed (QKD) apparatus for linking endpoint devices in a network, which includes: QKD links each including a quantum channel and a classical channel, wherein each endpoint has a QKD link; quantum transmitters to transmit quantum transmissions over a quantum channel of one of the QKD links; classical transceivers to transmit classical data over a classical channel of one of the QKD links and to receive classical data over the classical channel of said QKD link; and a controller connected to the quantum transmitters and the classical transceivers to route data generated for quantum transmission to an endpoint over a quantum channel of the QKD link of the endpoint; route classical data for classical transmission to an endpoint via a classical transceiver over a classical channel of the QKD link of the endpoint; and route classical data over the classical channel of the QKD link of an endpoint.

20 Claims, 21 Drawing Sheets

(56)                    References Cited

U.S. PATENT DOCUMENTS

| | | | | |
|---|---|---|---|---|
| 8,041,039 | B2 * | 10/2011 | Tajima | H04L 9/0855 |
| | | | | 380/279 |
| 8,650,401 | B2 | 2/2014 | Wiseman | |
| 8,654,979 | B2 | 2/2014 | Hicks | |
| 8,755,525 | B2 | 6/2014 | Wiseman | |
| 11,251,947 | B1 * | 2/2022 | Wang | H04L 9/0891 |
| 11,616,645 | B1 | 3/2023 | Wang | |
| 2004/0184603 | A1 | 9/2004 | Pearson | |
| 2007/0014415 | A1 * | 1/2007 | Harrison | H04L 9/0858 |
| | | | | 380/263 |
| 2010/0293380 | A1 * | 11/2010 | Wiseman | H04L 9/0852 |
| | | | | 713/169 |
| 2011/0213979 | A1 | 9/2011 | Wiseman | |
| 2011/0228937 | A1 | 9/2011 | Wiseman | |
| 2011/0231665 | A1 | 9/2011 | Wiseman | |
| 2012/0002968 | A1 * | 1/2012 | Luo | H04L 9/0852 |
| | | | | 398/140 |
| 2012/0177200 | A1 | 7/2012 | Harrison | |
| 2012/0177201 | A1 | 7/2012 | Ayling | |
| 2016/0006519 | A1 | 1/2016 | Lail | |
| 2016/0218867 | A1 | 7/2016 | Nordholt | |
| 2016/0233964 | A1 | 8/2016 | Frohlich | |
| 2016/0234018 | A1 | 8/2016 | Frohlich | |
| 2016/0248586 | A1 | 8/2016 | Hughes | |
| 2020/0389299 | A1 | 12/2020 | White | |
| 2021/0091935 | A1 | 3/2021 | Bush | |
| 2021/0176055 | A1 * | 6/2021 | Rahman | H04L 9/0855 |
| 2022/0407688 | A1 * | 12/2022 | Childe | H04B 10/118 |

OTHER PUBLICATIONS

Jing Wang et al., "A Guide to Global Quantum Key Distribution Networks", Arxiv.Org, Cornell University Library, 201 Olin Library Cornell University Ithaca, NY 14853, Dec. 28, 2020, XP081847709, p. 1-p. 17.

Imran Khan et al., "Satellite-Based QKD", Optics & Photonics New, Jan. 1, 2018, p. 26-p. 33, XP055876505, Retrieved from the Internet: URL:https://www.optica-opn.rg/opn/media/Images/PDF/2018/0218/26-33_OPN_02_18.PDF?EXT=.pdf [retrieved on Jan. 5, 2022].

Facultad De Informatica: "ISG QKD 017 NW architectures", ETSI Draft; QKD (20) 029025, European Telecommunications Standards Institute (ETSI), 650, Route Des Lucioles; F-06921 Sophia-Antipolis; France, vol. ISG QKD Quantum Key Distribution, No. 0.8, Dec. 13, 2020, pp. 1-48, XP014388658, Retrieved from the Internet: URL:ftp://docbox.etsi.org/ISG/QKD/05-Contributions/2020/QKD(20) 029025_ISG_QKD_017_NW_architectures.zipQKD-017NwkArchv008.docx [retrieved on Dec. 13, 2020] paragraph [0004]-paragraph [0006].

Philip Chan et al., "Quantum Key Distribution", Arxiv.Org, Cornell University Library, 201 Olin Library Cornell University Ithaca, NY 14853, Nov. 18, 2011, XP080540422, paragraph [0006].

Yoshimichi Tanizawa, et al., "A Routing Method Designed for a Quantum Key Distribution Network," 2016 Eighth International Conference on Ubiquitous and Future Networks (ICUFN), Jul. 2016, Vienna, Austria, INSPEC accession No. 16227543.

Search Report GB Application No. 2106977.8 dated Jun. 27, 2022.

Search Report GB Application No. 2101310.7 dated Jun. 27, 2022.

Francesco Matera, "Quantum Key Distribution in Optical Networks," 2020, IEEE, pp. 1-4, Year 2020.

Tang et al., "Quantum-Safe Metro Network with Low-Latency Reconfigurable Quantum Key Distribution," Nov. 15, 2018, Journal of Lightwave Technology, vol. 36, No. 22, pp. 5230-5236, Year 2018.

* cited by examiner

*190*

*195*

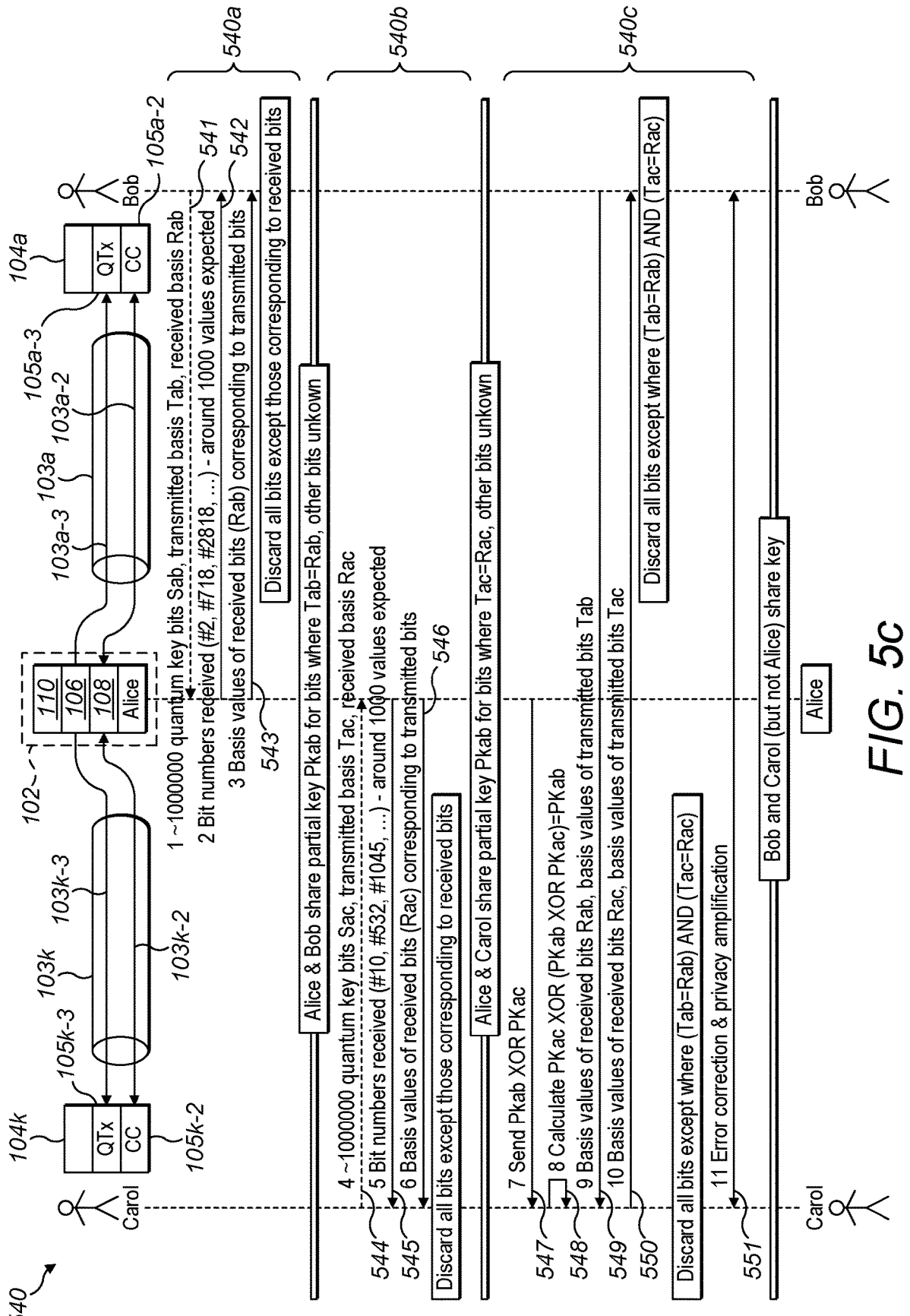

1 ~1000000 quantum key bits Sab, transmitted basis Tab, received basis Rab
2 Bit numbers received (#2, #718, #2818, …) - around 1000 values expected
3 Basis values of received bits (Rab) corresponding to transmitted bits Alice & Bob share partial key Pkab for bits where Tab=Rab, other bits unknown Discard all bits except those corresponding to received bits 4 ~1000000 quantum key bits Sac, transmitted basis Tac, received basis Rac
5 Bit numbers received (#10, #532, #1045, …) - around 1000 values expected
6 Basis values of received bits (Rac) corresponding to transmitted bits Alice & Carol share partial key Pkab for bits where Tac=Rac, other bits unkown Discard all bits except those corresponding to received bits 7 Send Pkab XOR PKac
8 Calculate PKac XOR (PKab XOR PKac)=PKab
9 Basis values of received bits Rab, basis values of transmitted bits Tab
10 Basis values of received bits Rac, basis values of transmitted bits Tac Discard all bits except where (Tab=Rab) AND (Tac=Rac)

Discard all bits except where (Tab=Rab) AND (Tac=Rac)

11 Error correction & privacy amplification

Bob and Carol (but not Alice) share key

FIG. 5c

QKD SWITCHING SYSTEM AND PROTOCOLS

This application is the National Stage filing under 35 U.S.C. 371 of International Application No. PCT/GB2022/050234, filed Jan. 28, 2022, claims the benefit of GB Application Nos. 2101310.7, filed Jan. 29, 2021 and 2106977.8, filed May 14, 2021, the contents of which are all hereby incorporated by reference herein in their entirety.

CLAIM OF PRIORITY AND INCORPORATION BY REFERENCE

The present application claims the benefit under of U.K. patent application No. 2101310.7 entitled "QKD SWITCHING SYSTEM" and filed on 29 Jan. 2021, the disclosure of which is incorporated herein by reference in its entirety.

TECHNICAL FIELD

The present application relates to a system, apparatus and method for secure communications using a quantum key distribution switching apparatus, protocols and/or applications thereto.

BACKGROUND

Following the arrival of large-scale quantum computers, classical (e.g. factorisation and discrete-log based) key exchange methods for key agreement will be vulnerable and unable to provide security. Quantum key distribution (QKD) is a secure communication method which implements a cryptographic QKD protocol involving components of quantum mechanics for distributing cryptographic keys. It enables two parties with corresponding end-point devices to produce a shared random secret key or cryptographic key that is typically known only to them, which can then be used to encrypt and decrypt messages in communications between their endpoint devices. Although post-quantum algorithms offer an alternative to QKD, they suffer from the possibility of yet-to-be-discovered mathematical attacks on their foundations. QKD offers unconditionally-secure agreement of keys between two endpoint devices of two parties that possess an initial amount of shared secret material.

QKD has developed into a technology that allows cryptographic keys (or other secret material) to be distributed in a provably secure manner between two end-points, relying on proofs from quantum physics to ensure that data sent over a quantum-encoded link has not been intercepted. There are a number of challenges to expand QKD to multiple end-points. Current designs for a QKD network usually fall into three architectural patterns such as: 1) a first QKD architecture may be based on a mesh of terrestrial QKD links, connected together with trusted nodes acting as repeaters, with some form of routing between the trusted nodes. There are technical limitations on the locations of nodes, as current terrestrial QKD technologies have a distance limitation; 2) a second QKD architecture may be based on a mesh of terrestrial QKD links, where the quantum signals are switched between end-points. Prior art describes this being performed with optical switches, or by using beam-splitters to randomly route the quantum signals across the network. As well as the distance limitations, it is difficult to scale this type of switched network to thousands of end-points; or 3) satellite QKD technology has potentially global coverage without the need for any intermediate trusted nodes. However the complexity of the QKD transmitter/receiver technology and cost of end-point satellite QKD links is relatively high and is simply not affordable for mass-market deployment or deployment to scale.

For example, the Bennett and Brassard 1984 (BB84) QKD protocol is a well-known QKD protocol using photon polarisation bases or time-bin encoding or other modulation techniques to transmit the information. When using the BB84 QKD protocol over optical fibre links, time-bin encoding or any other suitable modulation technique may be better suited for optical fibre links than photon polarisation, although this may still be used. Although the following example implementation of a BB84 QKD protocol is described with reference to using photon polarisation over an optical free-space channel, this is byway of example only, the skilled person would appreciate that the BB84 QKD protocol may be designed to use other modulation techniques depending on the type of optical channel such as, without limitation, for example time-bin encoding and/or any other suitable modulation technique for the type of optical channel. All that is required is that the modulation technique is used to form a set of bases in which each basis in the set of bases is orthogonal and/or unique or distinguishable. In this example, when using photon polarisation, the BB84 QKD protocol may be implemented using a set of bases including least two pairs of conjugate photon polarisation bases (e.g. a set of bases including, without limitation, for example a rectilinear photon basis (e.g. vertical (0°) and horizontal (90°) polarisations) and diagonal photon basis (e.g. 450 and 1350 polarisations) or the circular basis of left- and right-handedness etc.) In the BB84 protocol, QKD is performed between a sender endpoint device or apparatus (e.g. typically referred to as Alice) and a receiver endpoint device (e.g. typically referred to as Bob or Carol). The sender endpoint device or apparatus (also referred to herein as an intermediary or linking device) and receiver endpoint device are connected by a quantum communication channel which allows quantum information (e.g. quantum states) to be transmitted. The quantum channel may be, without limitation, for example, an optical fibre or optical free space. Furthermore, the sender device and receiver device also communicate over a non-quantum channel or public classical channel, without limitation, for example a fibre optic channel, telecommunications channel, radio channel, broadcast radio or the internet and/or any other wireless or wired communications channel and the like.

Sheng-Kai Liao, et. al. "*Satellite-to-ground quantum key distribution*", *Nature* volume 549, pages 43-47, 7 Sep. 2017, describes satellite-based QKD system using the BB84 protocol for distributing keys, where a satellite free-space optical quantum channel is produced using a 300-mm aperture Cassegrain telescope, which sends a light beam from a Micius satellite (e.g. Alice) to an optical ground receiving (OGR) station (e.g. Bob), which, without limitation, for example uses a Ritchey Chretien telescope for receiving the QKD photons over the satellite free-space optical quantum channel. For multiple endpoint device communications between two receiving endpoint devices, the sender endpoint device may arrange a BB84 QKD key for both the two endpoint devices to enable them to communicate with each other. Not only is such an SQKD system complex and costly, as both endpoint devices requires an OGR and associated optical receiving telescopes and the like, but the sender endpoint device also has access to the QKD key information, so needs to be a highly secure and trusted device. For satellite QKD, this may be achievable, however, for terrestrial QKD, it may not be possible to be able to fully trust a send endpoint device used for negotiating a QKD keys for secure communications between said two receiver endpoint devices.

There is a desire for a more improved terrestrial QKD communications system that enables a QKD network to be created between multiple endpoint devices and massively scales in a secure manner for use, without limitation, for example as a "last-mile" solution to connect offices and homes into a QKD network whilst keeping connection costs relatively low. There is a further desire for a terrestrial QKD communications system in which sender endpoint devices or apparatus (also referred to herein as intermediary or linking devices) may be assigned various levels of trust depending on where they are deployed from, without limitation, for example: a) trusted when deployed within a private exchange or trusted/secure environment that is inaccessible to unauthorised personnel; to b) limited level of trust or even untrusted when deployed in more accessible environments such as, without limitation, for example shops, and/or roadside cabinets and the like. There is a further desire to minimise the amount of equipment and/or optical fibre or communication medium material necessary for reducing bandwidth and/or cost, which leads to further scalability and/or security of such systems. Furthermore, there is also a desire for a more improved airborne, spaceborne and/or satellite based QKD communications system that enables a QKD network to be created between multiple endpoint devices via one or more satellites and massively scales in a secure manner. There is a further desire for an airborne, spaceborne and/or satellite based QKD communications system in which sender/intermediary devices and/or endpoint devices or apparatus (also referred to herein as intermediary or linking devices) may be assigned various levels of trust depending on where they are deployed, without limitation, for example: a) trusted when deployed within an untrusted airborne, spaceborne or satellite based system that is considered a trusted/secure environment that is inaccessible to unauthorised personnel accessing such systems; to b) limited level of trust or even untrusted when deployed in more accessible airborne, spaceborne and/or satellite based environments such as, without limitation, for example third-party aircraft, airborne vehicles, space vehicles and/or satellites, and/or other public spaces thereto and the like.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) of providing QKD communication links (or QKD links) to form a QKD communication network with a plurality of endpoints and for controlling data flow over the QKD communication links to one or more of the plurality of endpoints for use between multiple endpoints. A QKD linking apparatus acts as a hub and provides or assigns a QKD link to each endpoint of the plurality of endpoints and is configured control/switch/route data flowing via the QKD links to/from the endpoints to allow any endpoint to exchange quantum-encoded signals and classical signals with the QKD linking apparatus and/or any other endpoint via their quantum and classical channels of their corresponding QKD link. The QKD linking apparatus and one or more of the plurality of endpoints may perform any QKD protocol for securely exchanging keys via the quantum and classical channels provided by the corresponding QKD links of said one or more endpoints. Each QKD link may include a communications channel including at least a quantum channel and a classical channel that may share the same communication medium. One or more QKD links may share the same communication medium as one or more other QKD links. Two or more QKD links may also be configured to share the same communication medium. The QKD linking apparatus may include a controller configured to perform any QKD protocol for exchanging keys between endpoints and switch/route quantum and classical data flows in the appropriate sequence, depending on the QKD protocol being implemented, between the QKD linking apparatus and/or one or more endpoints via the quantum and classical channels of the QKD links of each of the endpoints. Thereafter, the controller may be configured to enable data flow between endpoints via the classical channels of the QKD links of the endpoints that allows secure communications between the endpoints.

In a first aspect, the present disclosure provides a quantum key distributed, QKD, linking apparatus for use with at least two endpoint devices for linking said endpoint devices in a QKD network, the QKD linking apparatus comprising: a plurality of QKD links, each QKD link having a communication medium comprising a quantum channel and a classical channel, wherein each endpoint is assigned a QKD link connecting said each endpoint to the QKD linking apparatus; a quantum communication component comprising a plurality of quantum transmitters, each quantum transmitter configured for transmitting quantum transmissions over a quantum channel of one of the QKD links; a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum communication component and the classical transceiver component, the controller configured to: route or switch data generated for quantum transmission to an endpoint via a quantum transmitter assigned to the endpoint over a quantum channel of the QKD link of the endpoint; route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required.

As an option, the QKD linking apparatus according to the first aspect, wherein each QKD link has a dedicated quantum transmitter from the quantum communication component and a dedicated classical transceiver from the classical transceiver component for use over the quantum channel and classical channel of the QKD link.

As another option, the QKD linking apparatus according to the first aspect, wherein the quantum communication component further comprising a plurality of quantum receivers, each quantum receiver configured for receiving quantum transmissions over a quantum channel of one of the QKD links, wherein one or more of the QKD links has a dedicated quantum receiver from the quantum communication component and a dedicated classical transceiver from the classical transceiver component for use over the quantum channel and classical channel of the QKD link, wherein the controller is further configured to route or switch data received by a quantum receiver from a quantum transmission over the quantum channel of the QKD link of an endpoint device assigned to the quantum receiver.

In a second aspect, the present disclosure provides a quantum key distributed, QKD, linking apparatus for use with at least two endpoint devices for linking said endpoint devices in a QKD network, the QKD linking apparatus comprising: a plurality of QKD links, each QKD link having a communication medium comprising a quantum channel and a classical channel, wherein each endpoint is assigned a QKD link connecting said each endpoint to the QKD linking apparatus; a quantum communication component comprising a plurality of quantum receivers, each quantum receiver configured for receiving quantum transmissions over a quantum channel of one of the QKD links; a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum communication component and the classical transceiver component, the controller configured to: route or switch data received in a quantum transmission from an endpoint via a quantum receiver assigned to the endpoint over a quantum channel of the QKD link of the endpoint; route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required.

As an option, the QKD linking apparatus according to the second aspect, wherein each QKD link has a dedicated quantum receiver from the quantum communication component and a dedicated classical transceiver from the classical transceiver component for use over the quantum channel and classical channel of the QKD link.

As an option, the QKD linking apparatus according to the second aspect, wherein the quantum communication component further comprising a plurality of quantum transmitters, each quantum transmitter configured for transmitting quantum transmissions over a quantum channel of one of the QKD links, wherein one or more of the QKD links has a dedicated quantum transmitter from the quantum communication component and a dedicated classical transceiver from the classical transceiver component for use over the quantum channel and classical channel of the QKD link, wherein the controller is further configured to route or switch data generated for quantum transmission to an endpoint device by the quantum transmitter over the quantum channel of the QKD link of the endpoint device assigned to the quantum transmitter.

As another option, the QKD linking apparatus according to the first and/or second aspects, the QKD linking apparatus further comprising a controller component configured for controlling the quantum communication component for implementing one or more QKD protocols between the QKD linking apparatus and two or more of the endpoint devices, wherein: the controller component is configured to: assign, depending on the one or more QKD protocols, an available quantum transmitter or quantum receiver to an endpoint device for use over the QKD link of the endpoint device; and when implementing one of the QKD protocols between two or more endpoint devices, at least one of the endpoint devices with an assigned quantum transmitter, direct the quantum communication component to route or switch quantum transmissions for the at least one endpoint device to the quantum transmitter assigned to said at least one endpoint device for transmitting said quantum transmissions over the quantum channel of the QKD link of the endpoint device; when implementing one of the QKD protocols between two or more endpoint devices, at least one of the endpoint devices with an assigned quantum receiver, direct the quantum communication component to route or switch quantum transmissions received by the quantum receiver from the at least one endpoint device over the quantum channel of the QKD link of the endpoint device.

As a further option, the QKD linking apparatus according to the first and/or second aspects, the QKD linking apparatus further comprising a controller component configured for controlling the classical transmission and routing component for implementing one or more QKD protocols between the QKD linking apparatus and two or more of the endpoint devices, wherein: the controller component is configured to: assign an available classical transceiver to an endpoint device for use over the QKD link of the endpoint device; when implementing one of the QKD protocols between two or more endpoint devices each with an assigned classical transceiver, direct the classical transmission and routing component to route or switch classical data for an endpoint device of the two or more endpoint devices to the classical transceiver assigned to said endpoint device to the classical channel of the QKD link of the endpoint device.

As another option, the QKD linking apparatus according to the first and/or second aspects, wherein, when one of the QKD protocols being performed between the QKD linking apparatus and at least two of the endpoint devices is complete, the controller is further configured to direct the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

As an option, the QKD linking apparatus according to the first and/or second aspects, wherein the quantum transmitters are optical quantum transmitters and the classical transceivers are optical classical transceivers.

As another option, the QKD linking apparatus according to the first and/or second aspects, wherein the communication medium of one or more QKD links comprises at least one from the group of: any type of communication medium or media capable of being configured to form a quantum channel for transmission of quantum information and/or capable of being configured to form one or more classical communication channels for transmission of non-quantum or classical communications; capable of propagating an electromagnetic signal with wavelengths in the visible and/or non-visible electromagnetic spectrum; capable of propagating an electromagnetic signal with wavelengths in the visible light spectrum; capable of propagating an electromagnetic signal with wavelengths in the near-infra-red light spectrum; capable of propagating an electromagnetic signal with wavelengths in the infra-red spectrum; capable of propagating an electromagnetic signal with wavelengths in the microwave spectrum; capable of propagating an electromagnetic signal with wavelengths in the Terahertz wavelength spectrum; any other suitable electromagnetic wavelength for use in at least quantum communications and/or non-quantum communications; an optical communication medium capable of propagating electromagnetic signals with wavelengths in at least one from the group of: the visible light spectrum, the near-infrared light spectrum, the infra-red and the like; optical free-space; an optical cable; multi-mode optical fibre; single-mode optical fibre; one or more optical fibres; an optical fibre capable of propagating light in the wavelengths of at least one of the visible light spectrum and/or near-infra red light spectrum and the like.

Optionally, the QKD linking apparatus according to the first and/or second aspects, wherein the communication medium of each of the QKD links comprises at least one optical fibre.

As an option, the QKD linking apparatus according to the first and/or second aspects, wherein the communication medium of at least one of the QKD links has a single optical fibre that is shared by the quantum and classical channels of said at least one QKD link.

As a further option, the QKD linking apparatus according to the first and/or second aspects, wherein the quantum transmitter assigned to the endpoint of the QKD link and the classical transceiver assigned to the endpoint of the QKD link are coupled to the quantum channel and classical channel of the single optical fibre of the QKD link via a QKD link coupling arrangement.

Optionally, the QKD linking apparatus according to the first and/or second aspects, wherein the QKD link coupling arrangement comprises one or more from the group of: one or more optical splitter/combiner device(s) or one or more optical multiplexor/demultiplexor device(s).

As another option, the QKD linking apparatus according to the first and/or second aspects, wherein the communication medium, shared by the quantum and classical channels, of at least one of the QKD links comprises a first optical fibre for the quantum channel and a second optical fibre for the classical channel.

As an option, the QKD linking apparatus according to the first and/or second aspects, wherein the communication medium, shared by the quantum and classical channels, of at least one of the QKD links comprises a first optical fibre for the quantum channel, a second and third optical fibres for the classical channel.

As another option, the QKD linking apparatus according to the first and/or second aspects, further comprising a plurality of homes or offices, each home or office associated with an endpoint device and corresponding QKD link, said QKD link connected between said endpoint device and said quantum communication component and said classical transmission routing component.

As a further option, the QKD linking apparatus according to the first and/or second aspects, further comprising a road-side cabinet housing the QKD linking apparatus with a backhaul QKD link of the QKD links connected to an exchange.

Optionally, the QKD linking apparatus according to the first and/or second aspects, wherein the QKD linking apparatus comprises a first QKD linking component comprising the quantum communication component and controller, and a second QKD linking component comprising the classical transceiver routing component, wherein the first QKD linking component is located in a secure facility and the second QKD linking component is located in a public facility.

As an option, the QKD linking apparatus according to the first and/or second aspects, wherein the secure facility is an exchange and the public facility is a roadside cabinet.

As an option, the QKD linking apparatus according to the first and/or second aspects, wherein the QKD linking apparatus comprises a first QKD linking component comprising the quantum communication component and controller, and a second QKD linking component comprising the classical transceiver routing component, wherein the first QKD linking component is housed in a secure tamper-proof enclosure and the first and second QKD linking components are located in a public facility or roadside cabinet.

Optionally, the QKD linking apparatus according to the first and/or second aspects, further comprising a radio access network comprising a centralised unit and a plurality of radio masts/radio units configured to service a plurality of mobile units, said centralised unit and each radio mast/radio unit associated with an endpoint device and corresponding QKD link, said QKD link connected between said endpoint device and said quantum communication component and said classical transmission routing component, wherein the QKD linking apparatus is located in a distributed unit of the radio access network.

As a further option, the QKD linking apparatus according to the first and/or second aspects, wherein the radio access network is based on at least one or more radio access network standards of 3G, 4G, 5G, 6G and/or beyond type standards and/or equivalent radio network/telecommunication standards.

As an option, the QKD linking apparatus according to the first and/or second aspects, wherein the radio access network is a 5G radio access network.

As another option, the QKD linking apparatus according to the first and/or second aspects, wherein the radio access network is configured to using the QKD linking apparatus and appropriate QKD protocols for exchanging QKD keys, group keys and the like between the nodes, entities, network nodes/entities, components of the centralised unit, distributed unit and/or radio masts/radio units for forming part of a QKD network and/or thus enable quantum-safe or secure communications therebetween.

Optionally, the QKD linking apparatus according to the first and/or second aspects, further comprising a satellite and a plurality of endpoint devices and corresponding QKD links, said each QKD link connected between said each endpoint device and said quantum communication component and said classical transmission routing component, wherein the QKD linking apparatus is located in the satellite.

As an option, the QKD linking apparatus according to the first and/or second aspects, wherein each of said QKD links comprises a optical free-space channel for the quantum channel and a satellite communication channel for the classical channel.

Optionally, the QKD linking apparatus according to the first and/or second aspects, wherein each of the plurality of endpoint devices comprises an optical telescope and/or optical transceiver.

As an option, the QKD linking apparatus according to the first and/or second aspects, wherein the satellite is configured to using the QKD linking apparatus and appropriate QKD protocols for exchanging QKD keys, group keys and the like between the endpoint devices and/or other endpoint devices along the orbital path of the satellite for forming at least part of a QKD network and/or thus enable quantum-safe or secure communications therebetween.

As another option, the QKD linking apparatus according to the first and/or second aspects, further comprising an ground station endpoint device with the QKD linking apparatus located therein, the ground station endpoint device comprising one or more optical transmitters and/or optical receiver telescopes, the ground station endpoint device configured to service a plurality of satellites and/or other endpoint devices over corresponding QKD links assigned thereto, said each QKD link connected between said each satellite or endpoint device and said quantum communication component and said classical transmission routing component of the QKD linking apparatus of the ground station endpoint device.

As a further option, the QKD linking apparatus according to the first and/or second aspects, wherein each of the plurality of satellites comprises an optical telescope and/or optical transceiver and a satellite transceiver for use over their corresponding QKD link.

Optionally, the QKD linking apparatus according to the first and/or second aspects, wherein the other endpoint devices connect with the QKD linking apparatus over optical fibre connection and the like.

As another option, the QKD linking apparatus according to the first and/or second aspects, wherein the ground station endpoint device is configured to using the QKD linking apparatus and appropriate QKD protocols for exchanging QKD keys, group keys and the like between the satellites and/or other endpoint devices for forming part of a QKD network and/or thus enable quantum-safe or secure communications therebetween.

As yet a further option, the QKD linking apparatus according to the first and/or second aspects, wherein the QKD linking apparatus is an untrusted node and the QKD protocols performed by said QKD linking apparatus and said two or more endpoint devices are configured to ensure the QKD linking apparatus cannot derive the resulting QKD keys or keys exchanged output from the QKD protocols and used for securing communications between the two or more endpoint devices.

As an option, the QKD linking apparatus according to the first and/or second aspects, wherein the QKD protocol(s) may include one or more from the group of: a QKD protocol from the Bennett and Brassard 1984, BB84, family of QKD protocols; the BB84 QKD protocol; modified versions of the BB84 protocol configured to ensure the QKD linking apparatus is unable to derive the resulting exchanged QKD keys between the endpoint devices; the Bennet 1992, B92, QKD protocol; the Six-State Protocol, SSP, QKD protocol; the Scarani Acin Ribordy Gisin 2004, SARG04, QKD protocol; the Doherty Parrilo Spedalieri 2002, DPS02, QKD protocol; the differential phase shift, DPS, QKD protocol; the Eckert 1991, E91, QKD protocol; the coherent one-way, COW, QKD protocol; the Khan Murphy Beige 2009, KMB09, QKD protocol; the Esteban Serna 2009, S09, QKD protocol; the Serna 2013, S13, QKD protocol; the A Abushgra K Elleithy 2015, AK15, QKD protocol; any one or more other entanglement based QKD protocols; any one or more future QKD protocols; and any other suitable QKD protocol for exchanging QKD keys between endpoint devices using quantum transmissions and classical transmissions.

Optionally, the QKD linking apparatus according to the first and/or second aspects, wherein the quantum transmissions to each endpoint device of two or more endpoint devices performing a QKD protocol for exchanging a QKD key therebetween may be performed simultaneously each quantum transmission using a different quantum transmitter assigned to said each endpoint device.

As a further option, the QKD linking apparatus according to the first and/or second aspects, wherein the quantum transmissions to each endpoint device of two or more endpoint devices performing a QKD protocol for exchanging a QKD key therebetween may be performed sequentially using a different quantum transmitter assigned to said each endpoint device, wherein the controller directs the quantum communication component to route or switch the next quantum transmission for an endpoint device to the corresponding quantum transmitter assigned to said endpoint device for transmission over the quantum channel of the QKD link of said endpoint device when the previous or current quantum transmission for another endpoint device has completed.

As yet a further option, the QKD linking apparatus according to the first and/or second aspects, wherein the quantum communication component includes a plurality of quantum receivers coupled to the quantum channel of corresponding QKD links of endpoint devices, wherein quantum transmissions received from each endpoint device of two or more endpoint devices performing a QKD protocol for exchanging a QKD key therebetween may be performed simultaneously, each reception of a quantum transmission using a different quantum receiver assigned to said each endpoint device.

As another option, the QKD linking apparatus according to the first and/or second aspects, wherein the quantum communication component includes a plurality of quantum receivers coupled to the quantum channel of corresponding QKD links of endpoint devices, and wherein the quantum transmissions from each endpoint device of two or more endpoint devices performing a QKD protocol for exchanging a QKD key therebetween may be performed sequentially using a different quantum receiver assigned to said each endpoint device, wherein the controller directs the quantum communication component to route or switch the next expected quantum transmission from an endpoint device to the corresponding quantum receiver assigned to said endpoint device for reception of the quantum transmission over the quantum channel of the QKD link from said endpoint device when the previous or current quantum transmission from another endpoint device has completed.

Optionally, the QKD linking apparatus according to the first and/or second aspects, further comprising a random number generator for generating random quantum bits or keys for quantum transmission.

Optionally, the QKD linking apparatus according to the first and/or second aspects, wherein the QKD linking apparatus further deletes a generated random set of quantum bits or key once it has been transmitted to an endpoint device using quantum transmissions.

As another option, the QKD linking apparatus according to the first and/or second aspects, wherein each quantum transmitter of the quantum communication component further comprises a faint pulse source, FPS, unit with optical switches for generating the photons in an integrated package with a plurality of matched laser diodes for coupling to the optical fibre of a QKD link.

As another option, the QKD linking apparatus according to the first and/or second aspects, further comprising a random number generator, wherein the controller performs a QKD protocol between a first endpoint device and a second endpoint device, the controller further configured to: route or switch a first set of random bits or keys output from the random number generator for quantum transmission to the first endpoint device over a quantum channel of the QKD link of the first endpoint device via a quantum transmitter assigned to the first endpoint device, wherein the first endpoint device uses a first quantum receiving basis for receiving the quantum transmission of the first set of random bits or keys; route or switch an indication of the first set of random bits or keys validly received by the first endpoint device received over the classical channel of the QKD link of the first endpoint device by a classical transceiver assigned to the first endpoint device; route or switch data representative of the first quantum transmission basis used for transmitting the first set of random bits or keys over a classical channel of the QKD link of the first endpoint device via the classical transceiver assigned to the first endpoint device; determine a first intermediate set of symbols associated with the QKD linking apparatus based on discarding those first set of random bits or keys that do not correspond to the received indication of the first set of random bits or keys validly received by the first endpoint device; route or switch a second set of random bits or keys output from the random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys; route or switch an indication of the second set of random bits or keys validly received by the second endpoint device received from the second endpoint device over the classical channel of the QKD link of the second endpoint device via a classical transceiver assigned to the second endpoint device; route or switch data representative of the second quantum transmission basis used for transmitting the second set of random bits or keys for classical transmission over a classical channel of the QKD link of the second endpoint device via the classical transceiver assigned to the second endpoint device; determine a second set of intermediate symbols associated with the QKD linking apparatus based on discarding those second set of random bits or keys that do not correspond to the received indication of the second set of random bits or keys validly received by the second endpoint device; generate an encrypted first intermediate set of symbols using the second intermediate set of symbols; route or switch the encrypted first intermediate set of symbols over the classical channel of the QKD link of the second endpoint via the classical transceiver assigned to the second endpoint device, wherein the second endpoint device decrypts the first intermediate set of symbols associated with the QKD linking apparatus based on deriving the second intermediate set of symbols associated with the QKD linking apparatus from the received second quantum transmission basis and the second quantum receiving basis; route or switch data representative of the first quantum transmission basis and the first quantum receiving basis received from the first endpoint device for classical transmission over a classical channel of the QKD link of the second endpoint device via the classical transceiver assigned to the second endpoint device; route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols associated with the QKD linking apparatus except those bits where the first transmission basis equals the first receiving basis and the second transmission basis equals the second receiving basis; route or switch data representative of error correction and/or privacy amplification in relation to the first and second shared keys over the classical channels of the QKD links of the first and second endpoint devices, wherein the first and second devices determine a final shared key based on the first and second shared keys.

As an option, the QKD linking apparatus according to the first and/or second aspects, further comprising a random number generator, wherein the controller performs a QKD protocol between a first endpoint device and a second endpoint device, the controller further configured to: route or switch a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys; route or switch an indication of the first set of random bits or keys validly received by the quantum receiver to the first endpoint device over the classical channel of the QKD link of the first endpoint device by a classical transceiver assigned to the first endpoint device; route or switch data representative of the first quantum receiving basis used for receiving the first set of random bits or keys to the first endpoint device over a classical channel of the QKD link of the first endpoint device via the classical transceiver assigned to the first endpoint device; determine a first intermediate set of symbols associated with the QKD linking apparatus based on discarding those first set of random bits or keys that were not validly received by the quantum receiver assigned to the first endpoint device; route or switch a second set of random bits or keys received by a quantum receiver assigned to the second endpoint device from quantum transmissions from the second endpoint device over a quantum channel of the QKD link of the second endpoint device, wherein the quantum receiver uses a second quantum receiving basis for receiving the quantum transmission of the second set of random bits or keys and the second endpoint device uses a second quantum transmission basis for transmitting the quantum transmission of the second set of random bits or keys; route or switch an indication of the second set of random bits or keys validly received by the quantum receiver to the second endpoint device over the classical channel of the QKD link of the second endpoint device by a classical transceiver assigned to the second endpoint device; route or switch data representative of the second quantum receiving basis used for receiving the second set of random bits or keys to the second endpoint device over a classical channel of the QKD link of the second endpoint device via the classical transceiver assigned to the second endpoint device; determine a second intermediate set of symbols associated with the QKD linking apparatus based on discarding those second set of random bits or keys that were not validly received by the quantum receiver assigned to the second endpoint device; generate an encrypted first intermediate set of symbols using the second intermediate set of symbols; route or switch the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis; route or switch data representative of the first quantum transmission basis and the first quantum receiving basis received from the first endpoint device for classical transmission over a classical channel of the QKD link of the second endpoint device via the classical transceiver assigned to the second endpoint device; route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; route or switch data representative of error correction and/or privacy amplification in relation to the first and second shared keys over the classical channels of the QKD links of the first and second endpoint devices, wherein the first and second devices determine a final shared key based on the first and second shared keys.

As a further option, the QKD linking apparatus according to the first and/or second aspects, further comprising a random number generator, wherein the controller performs a QKD protocol between a first endpoint device and a second endpoint device, the controller further configured to: route or switch a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys; route or switch an indication of the first set of random bits or keys validly received by the quantum receiver to the first endpoint device over the classical channel of the QKD link of the first endpoint device by a classical transceiver assigned to the first endpoint device; route or switch data representative of the first quantum receiving basis used for receiving the first set of random bits or keys to the first endpoint device over a classical channel of the QKD link of the first endpoint device via the classical transceiver assigned to the first endpoint device; determine a first intermediate set of symbols associated with the QKD linking apparatus based on discarding those first set of random bits or keys that were not validly received by the quantum receiver assigned to the first endpoint device; route or switch a second set of random bits or keys output from a random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys; route or switch an indication of the second set of random bits or keys validly received by the second endpoint device received from the second endpoint device over the classical channel of the QKD link of the second endpoint via a classical transceiver assigned to the second endpoint device; route or switch data representative of the second quantum transmission basis used for transmitting the second set of random bits or keys for classical transmission over a classical channel of the QKD link of the second endpoint device via the classical transceiver assigned to the second endpoint device; determine a second intermediate set of symbols associated with the QKD linking apparatus based on discarding those second set of random bits or keys that do not correspond to the received indication of the second set of random bits or keys validly received by the second endpoint device; generate an encrypted first intermediate set of symbols using the second intermediate set of symbols; route or switch the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis; route or switch data representative of the first quantum transmission basis and the first quantum receiving basis received from the first endpoint device for classical transmission over a classical channel of the QKD link of the second endpoint device via the classical transceiver assigned to the second endpoint device; route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; route or switch data representative of error correction and/or privacy amplification in relation to the first and second shared keys over the classical channels of the QKD links of the first and second endpoint devices, wherein the first and second devices determine a final shared key based on the first and second shared keys.

In a third aspect, the present disclosure provides a computer-implemented method for controlling a quantum key distributed, QKD, linking apparatus for use in linking at least two endpoint devices in a QKD network, the QKD linking apparatus comprising: a plurality of QKD links, each QKD link having a communication medium comprising a quantum channel and a classical channel, wherein each endpoint is assigned a QKD link connecting said each endpoint to the QKD linking apparatus; a quantum communication component comprising a plurality of quantum transmitters, each quantum transmitter configured for transmitting quantum transmissions over a quantum channel of one of the QKD links; a classical transceiver component comprising a plurality of classical transceivers, each classical transceiver configured for transmitting classical data over a classical channel of one of the QKD links and configured for receiving classical data over the classical channel of said one of the QKD links; and wherein the method further comprising: routing or switching data generated for quantum transmission to an endpoint via a quantum transmitter assigned to the endpoint over a quantum channel of the QKD link of the endpoint; routing or switching classical data for classical transmission to an endpoint via a classical transceiver assigned to the endpoint over a classical channel of the QKD link of the endpoint; and routing or switching classical data received by a classical transceiver over the classical channel of the QKD link of an endpoint as required.

As an option, the computer-implemented method according to the third aspect, further comprising: assigning an available quantum transmitter to an endpoint device for use over the QKD link of the endpoint device; and when implementing one of the QKD protocols between two or more endpoint devices each with an assigned quantum transmitters, directing the quantum communication component to route or switch quantum transmissions for an endpoint device of the two or more endpoint devices to the quantum transmitter assigned to said endpoint device for transmitting said quantum transmissions over the quantum channel of the QKD link of the endpoint device.

As a further option, the computer-implemented method according to the third aspect, further comprising assigning an available classical transceiver to an endpoint device for use over the QKD link of the endpoint device; when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

As another option, the computer-implemented method according to the third aspect, when one of the QKD protocols are being performed between the QKD linking apparatus and at least two of the endpoint devices is complete, the method further comprising, for the two or more endpoint devices, directing the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the two or more endpoint devices.

As an option, the computer-implemented method according to the third aspect, further comprising one or more method steps performed by the QKD linking apparatus according to any of the steps and/or features of the first and/or second aspects.

As another option, the computer-implemented method according to the third aspect, further comprising performing a QKD protocol between a first endpoint device and a second endpoint device, the method further comprising: routing or switching a first set of random bits or keys output from a random number generator for quantum transmission to the first endpoint device over a quantum channel of the QKD link of the first endpoint device via a quantum transmitter assigned to the first endpoint device, wherein the first endpoint device uses a first quantum receiving basis for receiving the quantum transmission of the first set of random bits or keys; routing or switching an indication of the first set of random bits or keys validly received by the first endpoint device received over the classical channel of the QKD link of the first endpoint device by a classical transceiver assigned to the first endpoint device; routing or switching data representative of the first quantum transmission basis used for transmitting the first set of random bits or keys over a classical channel of the QKD link of the first endpoint device via the classical transceiver assigned to the first endpoint device; determining a first intermediate set of symbols associated with the QKD linking apparatus based on discarding those first set of random bits or keys that do not correspond to the received indication of the first set of random bits or keys validly received by the first endpoint device; routing or switching a second set of random bits or keys output from the random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys; routing or switching an indication of the second set of random bits or keys validly received by the second endpoint device received from the second endpoint device over the classical channel of the QKD link of the second endpoint via a classical transceiver assigned to the second endpoint device; routing or switching data representative of the second quantum transmission basis used for transmitting the second set of random bits or keys for classical transmission over a classical channel of the QKD link of the second endpoint device via the classical transceiver assigned to the second endpoint device; determining a second intermediate set of symbols associated with the QKD linking apparatus based on discarding those second set of random bits or keys that do not correspond to the received indication of the second set of random bits or keys validly received by the second endpoint device; generating an encrypted first intermediate set of symbols using the second intermediate set of symbols; routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis; routing or switching data representative of the first quantum transmission basis and the first quantum receiving basis received from the first endpoint device for classical transmission over a classical channel of the QKD link of the second endpoint device via the classical transceiver assigned to the second endpoint device; routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; routing or switching data representative of error correction and/or privacy amplification in relation to the first and second shared keys over the classical channels of the QKD links of the first and second endpoint devices, wherein the first and second devices determine a final shared key based on the first and second shared keys.

As a further option, the computer-implemented method according to the third aspect, further comprising performing a QKD protocol between a first endpoint device and a second endpoint device, the method further comprising: routing or switching a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys; routing or switching an indication of the first set of random bits or keys validly received by the quantum receiver to the first endpoint device over the classical channel of the QKD link of the first endpoint device by a classical transceiver assigned to the first endpoint device; routing or switching data representative of the first quantum receiving basis used for receiving the first set of random bits or keys to the first endpoint device over a classical channel of the QKD link of the first endpoint device via the classical transceiver assigned to the first endpoint device; determining a first intermediate set of symbols associated with the QKD linking apparatus based on discarding those first set of random bits or keys that were not validly received by the quantum receiver assigned to the first endpoint device; routing or switching a second set of random bits or keys received by a quantum receiver assigned to the second endpoint device from quantum transmissions from the second endpoint device over a quantum channel of the QKD link of the second endpoint device, wherein the quantum receiver uses a second quantum receiving basis for receiving the quantum transmission of the second set of random bits or keys and the second endpoint device uses a second quantum transmission basis for transmitting the quantum transmission of the second set of random bits or keys; routing or switching an indication of the second set of random bits or keys validly received by the quantum receiver to the second endpoint device over the classical channel of the QKD link of the second endpoint device by a classical transceiver assigned to the second endpoint device; routing or switching data representative of the second quantum receiving basis used for receiving the second set of random bits or keys to the second endpoint device over a classical channel of the QKD link of the second endpoint device via the classical transceiver assigned to the second endpoint device; determining a second intermediate set of symbols associated with the QKD linking apparatus based on discarding those second set of random bits or keys that were not validly received by the quantum receiver assigned to the second endpoint device; generating an encrypted first intermediate set of symbols using the second intermediate set of symbols; routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis; routing or switching data representative of the first quantum transmission basis and the first quantum receiving basis received from the first endpoint device for classical transmission over a classical channel of the QKD link of the second endpoint device via the classical transceiver assigned to the second endpoint device; routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; routing or switching representative of error correction and/or privacy amplification in relation to the first and second shared keys over the classical channels of the QKD links of the first and second endpoint devices, wherein the first and second devices determine a final shared key based on the first and second shared keys.

As another option, the computer-implemented method according to the third aspect, further comprising performing a QKD protocol between a first endpoint device and a second endpoint device, the method further comprising: routing or switching a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys; routing or switching an indication of the first set of random bits or keys validly received by the quantum receiver to the first endpoint device over the classical channel of the QKD link of the first endpoint device by a classical transceiver assigned to the first endpoint device; routing or switching data representative of the first quantum receiving basis used for receiving the first set of random bits or keys to the first endpoint device over a classical channel of the QKD link of the first endpoint device via the classical transceiver assigned to the first endpoint device; determining a first intermediate set of symbols associated with the QKD linking apparatus based on discarding those first set of random bits or keys that were not validly received by the quantum receiver assigned to the first endpoint device; routing or switching a second set of random bits or keys output from a random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys; routing or switching an indication of the second set of random bits or keys validly received by the second endpoint device received from the second endpoint device over the classical channel of the QKD link of the second endpoint via a classical transceiver assigned to the second endpoint device; routing or switching data representative of the second quantum transmission basis used for transmitting the second set of random bits or keys for classical transmission over a classical channel of the QKD link of the second endpoint device via the classical transceiver assigned to the second endpoint device; determining a second intermediate set of symbols associated with the QKD linking apparatus based on discarding those second set of random bits or keys that do not correspond to the received indication of the second set of random bits or keys validly received by the second endpoint device; generating an encrypted first intermediate set of symbols using the second intermediate set of symbols; routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis; routing or switching data representative of the first quantum transmission basis and the first quantum receiving basis received from the first endpoint device for classical transmission over a classical channel of the QKD link of the second endpoint device via the classical transceiver assigned to the second endpoint device; routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; routing or switching data representative of error correction and/or privacy amplification in relation to the first and second shared keys over the classical channels of the QKD links of the first and second endpoint devices, wherein the first and second devices determine a final shared key based on the first and second shared keys.

In a fourth aspect, the present disclosure provides a computer-implemented method for performing a QKD protocol between a first endpoint device and a second endpoint device via a QKD linking apparatus according to or as configured according to any of the first, second and/or third aspects, the method further comprising: sending, from the QKD linking apparatus to the first endpoint device, a first set of random bits or keys output from a random number generator for quantum transmission to the first endpoint device over a quantum channel of the QKD link of the first endpoint device, wherein the first endpoint device uses a first quantum receiving basis for receiving the quantum transmission of the first set of random bits or keys; receiving, from the first endpoint device, an indication of the first set of random bits or keys validly received by the first endpoint device over a classical channel of the QKD link of the first endpoint device; sending, from the QKD linking apparatus to the first endpoint device, data representative of the first quantum transmission basis used for transmitting the first set of random bits or keys over a classical channel of the QKD link of the first endpoint device; determining a first intermediate set of symbols associated with the QKD linking apparatus based on discarding those first set of random bits or keys that do not correspond to the received indication of the first set of random bits or keys validly received by the first endpoint device; sending, from the QKD linking apparatus to the second endpoint device, a second set of random bits or keys output from the random number generator for quantum transmission to the second endpoint device over a quantum channel of the QKD link of the second endpoint device, wherein the second endpoint device uses a second quantum receiving basis for receiving the quantum transmission of the second set of random bits or keys; receiving, from the second endpoint device, an indication of the second set of random bits or keys validly received by the second endpoint device over the classical channel of the QKD link of the second endpoint; sending, to the second endpoint device, data representative of the second quantum transmission basis used for transmitting the second set of random bits or keys over a classical channel of the QKD link of the second endpoint device via the classical transceiver assigned to the second endpoint device; determining a second intermediate set of symbols associated with the QKD linking apparatus based on discarding those second set of random bits or keys that do not correspond to the received indication of the second set of random bits or keys validly received by the second endpoint device; generating an encrypted first intermediate set of symbols using the second intermediate set of symbols; sending, to the second endpoint device, the encrypted first intermediate set of symbols over the classical channel of the QKD link of the second endpoint, wherein the second endpoint device decrypts the encrypted first intermediate set of symbols based on deriving the second intermediate set of symbols associated with the QKD linking apparatus from the received second quantum transmission basis and the second quantum receiving basis; receiving, from the first endpoint device, data representative of the first quantum transmission basis and the first quantum receiving basis over the classical channel of the QKD link of the first endpoint device; sending, to the second endpoint device, data representative of the first quantum transmission basis and the first quantum receiving basis over the classical channel of the QKD link of the second endpoint device; receiving, from the second endpoint device, data representative of the second quantum transmission basis and the second quantum receiving basis over the classical channel of the QKD link of the second endpoint device; sending, to the first endpoint device, data representative of the second quantum transmission basis and the second quantum receiving basis over the classical channel of the QKD link of the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; sending, between the first and second endpoint devices, data representative of error correction and/or privacy amplification in relation to the first and second shared keys over the classical channels of the QKD links of the first and second endpoint devices, wherein the first and second devices determine a final shared key based on the error correction and/or privacy amplification in relation to the first and second shared keys.

In a fifth aspect, the present disclosure provides a computer-implemented method for performing a QKD protocol between a first endpoint device and a second endpoint device via a QKD linking apparatus according to or as configured according to any of the first, second and/or third aspects, the method further comprising: receiving, from the first endpoint device, a first set of random bits or keys from quantum transmissions of the first endpoint device over a quantum channel of the QKD link of the first endpoint device, wherein a first quantum receiving basis is used for receiving the quantum transmission of the first set of random bits or keys and the first endpoint device uses a first quantum transmission basis for transmitting the quantum transmission of the first set of random bits or keys; sending, to the first endpoint device, an indication of the first set of random bits or keys validly received over the classical channel of the QKD link of the first endpoint device; sending, to the first endpoint device, data representative of the first quantum receiving basis used for receiving the first set of random bits or keys over a classical channel of the QKD link of the first endpoint device; determining a first intermediate set of symbols associated with the QKD linking apparatus based on discarding those first set of random bits or keys that were not validly received by the quantum receiver assigned to the first endpoint device; receiving, from the second endpoint device, a second set of random bits or keys from quantum transmission of the second endpoint device over a quantum channel of the QKD link of the second endpoint device, wherein a second quantum receiving basis is used for receiving the quantum transmission of the second set of random bits or keys and the second endpoint device uses a second quantum transmission basis for transmitting the quantum transmission of the second set of random bits or keys; sending, to the second endpoint device, an indication of the second set of random bits or keys validly received over the classical channel of the QKD link of the second endpoint device; sending, to the second endpoint device, data representative of the second quantum receiving basis used for receiving the second set of random bits or keys over a classical channel of the QKD link of the second endpoint device; determining a second intermediate set of symbols associated with the QKD linking apparatus based on discarding those second set of random bits or keys that were not validly received by the quantum receiver assigned to the second endpoint device; generating an encrypted first intermediate set of symbols using the second intermediate set of symbols; sending, to the second endpoint device, the encrypted first intermediate set of symbols over the classical channel of the QKD link of the second endpoint, wherein the second endpoint device decrypts the encrypted first intermediate set of symbols based on deriving the second intermediate set of symbols associated with the QKD linking apparatus from the received second quantum transmission basis and the second quantum receiving basis; receiving, from the first endpoint device, data representative of the first quantum transmission basis and the first quantum receiving basis over the classical channel of the QKD link of the first endpoint device; sending, to the second endpoint device, data representative of the first quantum transmission basis and the first quantum receiving basis over the classical channel of the QKD link of the second endpoint device; receiving, from the second endpoint device, data representative of the second quantum transmission basis and the second quantum receiving basis over the classical channel of the QKD link of the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; sending, between the first and second endpoint devices, data representative of error correction and/or privacy amplification in relation to the first and second shared keys over the classical channels of the QKD links of the first and second endpoint devices, wherein the first and second devices determine a final shared key based on the error correction and/or privacy amplification in relation to the first and second shared keys.

In a sixth aspect, the present disclosure provides a computer-implemented method for performing a QKD protocol between a first endpoint device and a second endpoint device via a QKD linking apparatus according to or as configured according to any of the first, second and/or third aspects, the method further comprising: receiving, from the first endpoint device, a first set of random bits or keys from quantum transmissions of the first endpoint device over a quantum channel of the QKD link of the first endpoint device, wherein a first quantum receiving basis is used for receiving the quantum transmission of the first set of random bits or keys and the first endpoint device uses a first quantum transmission basis for transmitting the quantum transmission of the first set of random bits or keys; sending, to the first endpoint device, an indication of the first set of random bits or keys validly received over the classical channel of the QKD link of the first endpoint device; sending, to the first endpoint device, data representative of the first quantum receiving basis used for receiving the first set of random bits or keys over a classical channel of the QKD link of the first endpoint device; determining a first intermediate set of symbols associated with the QKD linking apparatus based on discarding those first set of random bits or keys that were not validly received by the quantum receiver assigned to the first endpoint device; sending, from the QKD linking apparatus to the second endpoint device, a second set of random bits or keys output from the random number generator for quantum transmission to the second endpoint device over a quantum channel of the QKD link of the second endpoint device, wherein the second endpoint device uses a second quantum receiving basis for receiving the quantum transmission of the second set of random bits or keys; receiving, from the second endpoint device, an indication of the second set of random bits or keys validly received by the second endpoint device over the classical channel of the QKD link of the second endpoint; sending, to the second endpoint device, data representative of the second quantum transmission basis used for transmitting the second set of random bits or keys over a classical channel of the QKD link of the second endpoint device via the classical transceiver assigned to the second endpoint device; determining a second intermediate set of symbols associated with the QKD linking apparatus based on discarding those second set of random bits or keys that do not correspond to the received indication of the second set of random bits or keys validly received by the second endpoint device; generating an encrypted first partial key using the second partial key; sending, to the second endpoint device, the encrypted first partial key over the classical channel of the QKD link of the second endpoint, wherein the second endpoint device decrypts the encrypted first intermediate set of symbols based on deriving the second intermediate set of symbols associated with the QKD linking apparatus from the received second quantum transmission basis and the second quantum receiving basis; receiving, from the first endpoint device, data representative of the first quantum transmission basis and the first quantum receiving basis over the classical channel of the QKD link of the first endpoint device; sending, to the second endpoint device, data representative of the first quantum transmission basis and the first quantum receiving basis over the classical channel of the QKD link of the second endpoint device; receiving, from the second endpoint device, data representative of the second quantum transmission basis and the second quantum receiving basis over the classical channel of the QKD link of the second endpoint device; sending, to the first endpoint device, data representative of the second quantum transmission basis and the second quantum receiving basis over the classical channel of the QKD link of the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis; sending, between the first and second endpoint devices, data representative of error correction and/or privacy amplification in relation to the first and second shared keys over the classical channels of the QKD links of the first and second endpoint devices, wherein the first and second devices determine a final shared key based on the error correction and/or privacy amplification in relation to the first and second shared keys.

In a seventh aspect, there is provided a system comprising: an QKD linking apparatus according to or as configured according to any of the first, second, third, fourth, fifth and/or sixth aspects; and a plurality of endpoint devices, each endpoint device coupled to the QKD linking apparatus via a QKD link; wherein the QKD linking apparatus is configured to link two or more of the endpoint devices into a QKD network.

In an eighth aspect, there is provided a computer-readable medium comprising computer code or instructions stored thereon, which when executed on a processor, causes the processor to perform the computer implemented method and/or any method steps and the like as described according to any of the first, second, third, fourth, fifth, sixth and/or seventh aspects.

In an ninth aspect, there is provided a system as herein described with reference to the accompanying drawings.

In an tenth aspect, there is provided a method as herein described with reference to the accompanying drawings.

In an eleventh aspect, there is provided a quantum key distribution linking apparatus as herein described with reference to the accompanying drawings.

In an twelfth aspect, there is provided an endpoint device as herein described with reference to the accompanying drawings.

In an thirteenth aspect, there is provided a computer program product as herein described with reference to the accompanying drawings.

The methods and/or process(es) described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 5*c* is a flow diagram illustrating a further example QKD protocol for use with QKD linking apparatus of QKD switching system of any of FIGS. 1*a* to 4*c* according to some embodiments of the invention;

Figure 1A:
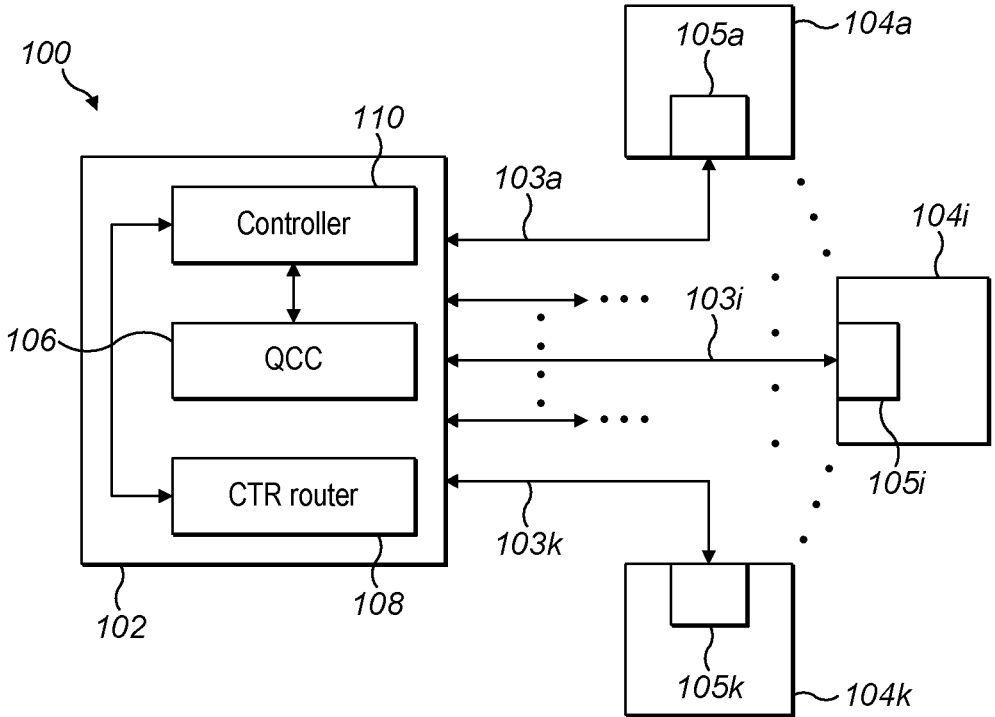
FIG. 1a is a schematic diagram illustrating an example QKD switching system according to some embodiments of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present invention provides a quantum key distributed (QKD) linking apparatus for providing QKD communication links (or QKD links) and controlling data flow over the QKD communication links to a plurality of endpoints for use in creating a QKD communication network (or quantum network/cloud) between multiple endpoints. The QKD linking apparatus provides a QKD link to each endpoint of the plurality of endpoints and is configured to allow any endpoint to exchange quantum-encoded signals with any other endpoint via their corresponding QKD link. Each QKD link may include a communications channel include at least a quantum channel and a classical channel that may share the same communication medium. Two or more QKD links may also be configured to share the same communication medium. Thus, many thousands of endpoints may be supported, and the connection cost may be kept relatively low by selecting an appropriate communication medium/media or a communication medium commonly used by these endpoints (e.g. optical fibre links) that may be configured to form each QKD link to each endpoint. For example, the communication medium/media may be based on one or more optical fibres that may be configured for forming each of the QKD links and/or any other suitable communication medium/media that may be rolled out and used by said endpoints in future.

The QKD linking apparatus is also configured to implement one or more QKD protocols for securely exchanging keys in a quantum-secure fashion (e.g. QKD keys) between endpoints via their corresponding QKD links. Given each QKD link has a quantum channel and classical channel and the QKD linking apparatus is used to implement one or more QKD protocols for securely exchanging keys, depending on the QKD protocol (e.g. one or more protocols from the BB84 family of QKD protocols), only limited trust is required from the endpoint devices and QKD linking apparatus, which makes it feasible to deploy this technology in roadside cabinets (with limited physical protection) as well as in switching centres and/or telecommunications exchanges. Thus, thousands of endpoints may be supported with quantum-secure communications at relatively lost cost. As an option, it may also be unnecessary to provide individual communication channels/mediums (e.g. optical fibres or wireless optical links) from endpoints to a central location, rather each communication channel/medium (e.g. optical fibre or optical link) from endpoints may be shared and/or run to a roadside cabinet, which allows costs to be reduced and bandwidth to be shared. This may therefore be deployed as a "last-mile" solution, to connect endpoints of, without limitation, for example offices and homes into a QKD network (or quantum-safe or quantum cloud network).

There may be a plurality of QKD protocol(s) that may be used by the QKD linking apparatus and corresponding endpoint devices that make use of the corresponding QKD links. Although the BB84 protocol, modifications thereof and/or variants thereto are described herein, this is by way of example only and the invention is not so limited, it is to be appreciated by the skilled person in the art that the QKD linking apparatus and corresponding endpoint devices may be configured to use one or more QKD protocols for exchanging a key such as QKD protocols based on, without limitation, for example a QKD protocol from the Bennett and Brassard 1984 (BB84) family of QKD protocols; the BB84 protocol; a modified BB84 protocol as herein described; modified versions of the BB84 protocol configured to ensure the QKD linking apparatus is unable to derive the resulting exchanged QKD keys between the endpoint devices; the Bennet 1992 (B92) QKD protocol; the Six-State Protocol (SSP) QKD protocol; the Scarani Acin Ribordy Gisin 2004 (SARG04) QKD protocol; the Doherty Parrilo Spedalieri 2002 (DPS02) QKD protocol; the differential phase shift (DPS) QKD protocol; the Eckert 1991 (E91) QKD protocol; the coherent one-way (COW) QKD protocol; the Khan Murphy Beige 2009 (KMB09) QKD protocol; the Esteban Serna 2009 (S09) QKD protocol; the Serna 2013 (S13) QKD protocol; the A Abushgra K Elleithy 2015 (AK15) QKD protocol; any one or more other entanglement based QKD protocols; any one or more future QKD protocols; any other QKD protocol capable of making use of a quantum channel and non-quantum channel of each of the QKD links 103a-103k/203a-203k; any other quantum key exchange protocol used to establish and/or exchange a shared key between at least two or more endpoint devices 104a-104k/204a-204k and/or at least one endpoint device 104a/204a and a third party, an intermediary or cloud service and the like; any QKD protocol in which the exchanged key may be based on quantum key distributed keys and/or may be a quantum-safe or quantum secure key due to the QKD protocol being a quantum-secure key establishment protocol establishes a QKD shared key between the endpoint devices 104a-104k/204a-204k and the like; combinations thereof, modifications thereto and the like and/or as the application demands.

A quantum communication channel may comprise or represent a communication channel capable of transmitting and/or receiving at least quantum information over a communication medium. Quantum information may include information encoded in one or more quantum states of a quantum system, where a quantum state may be a superposition of other quantum states. Examples of a quantum communication channel or quantum channel that may be used according to the invention may include or be based on, without limitation, for example on one or more types of quantum communication channels associated with the group of: optical quantum communications; free-space optical quantum communications; optical fibre quantum communications; optical fibre communications; free-space optical communications; optical laser quantum communications; communications using electromagnetic waves such as, without limitation, for example radio, microwave, near-infra red, infra-red, gigahertz, terahertz and/or any other type of electromagnetic wave communications; communications based on electron spin and the like; any other type of quantum communications for transmitting and receiving data over a quantum communication channel between devices. It is noted that the communication medium of one or more types of quantum communication channel(s) may also be capable of transmitting and/or receiving non-quantum or classical information.

A standard, classical or non-quantum communication channel(s) may comprise or represent any communication channel between two devices or apparatus that at least is capable of transmitting and/or receiving classical or non-quantum information over a communication medium. Classical of non-quantum information may include information encoded as a non-quantum state. Examples of standard, classical and/or non-quantum communication channels according to the invention may include or be based on, without limitation, for example on one or more types of communication channels from the group of: any one or more physical communication channel(s); optical communication channel; free-space optical communication channel; wireless communication channel; wired communication channel; radio communication channel; microwave communication channel; satellite communication channel; terrestrial communication channel; optical fibre communication channel; optical laser communication channel; telecommunications channels; 2G, 3G, 4G, 5G, and/or 6G and beyond telecommunications standards channels; logical channels such as, without limitation, for example Internet Protocol (IP) channels; any other type of logical channel being provided over any standard, classical or non-quantum physical communication channel; one or more other physical communications or carriers of data such as, without limitation, for example avian carriers, paper, sealed briefcases, courier or other delivery service and the like; any other type of one or more optical, wireless and/or wired communication channel(s) for transmitting data between devices; and/or two or more optical, wireless and/or wired communication channel(s) that form a composite communication channel for transmitting data between devices; and/or any combination of two or more standard, classical or non-quantum communication channel(s) that form a composite communication channel for transmitting and/or carrying data between devices; combinations thereof, modifications thereto, and/or as described herein and the like and/or as the application demands. It is noted that the communication medium of one or more types of standard, classical or non-quantum communication channel(s) may be capable of also transmitting and/or receiving quantum information.

A key or cryptography key may comprise or represent a symbol string and/or a plurality of symbols, where there may be j bit(s) per symbol, thus the symbol set is represented by $M=2^j$ different symbols, where $j \geq 1$. The symbols of the key may be randomly generated by a random symbol or number generator and may be of a fixed length of L symbols depending on the application and the like. A quantum key distributed (QKD) key may comprise or represent a key that has been distributed or exchanged between one apparatus or device and another apparatus or device based on a QKD protocol/quantum key exchange protocol (e.g. BB84 family of QKD protocols and the like and/or as herein described) using at least a quantum communication channel, or at least a quantum communication channel and one or more non-quantum or classical communication channels.

Each of the keys, QKD keys, cryptographic keys, precursor keys, meeting keys, intermediate keys and the like may comprise or represent symbol strings or sets of symbol strings (e.g. n bit(s) per symbol are represented by $M=2^n$ different symbols, where $n \geq 1$). Processing of the symbol strings may include combining of sets of symbol strings, e.g. a first symbol string may be combined with a second symbol string based on, without limitation, for example one-time-pad encryption/decryption, masking, exclusive OR (XOR) operations on bits when symbols are converted to bits, or extended XOR operations on symbols or obfuscated set of the symbol strings. For example, a key may be combined with another key using an XOR operation and/or extended XOR operation on the bits and/or symbols, respectively, of the key and the other key.

That is, combining a first key (or first set of symbols or first symbol string) with a second key (or second set of symbols or a second symbol string) may be performed using, without limitation, for example: exclusive or (XOR) operations on corresponding symbols of the first and second keys (e.g. converting the symbols of the first and second keys into bit strings and performing bitwise XOR); bitwise XOR operations when the symbols of the first and second keys are bit symbols; extended XOR operations on the corresponding symbols of the first and second keys (e.g. using a mathematically defined extended set of "symbol XOR" operations on symbols that preserve the mathematical properties of bitwise XOR operations); one-time-pad encryption of the set of symbols of the first key and the set of symbols of the second key; and/or any other trapdoor or encryption operation on the set of symbols of the first key and set of symbols of the second key and the like.

A user, endpoint or party device may comprise or represent any device or apparatus under control of a user or party that includes communication components/systems or communication capabilities configured to at least receive data over a quantum communication channel and/or establish one or more non-quantum, standard or classical communication channels with other user, endpoint or party devices, and/or the QKD linking apparatus under control of at least one other user or party for implementing, without limitation, for example quantum key exchange, a QKD protocol, QKD group sharing schemes, and/or secure communications with one or more other party devices or endpoints using a QKD key and the like according to the invention. Examples of a user, endpoint and/or party device according to the invention may include, without limitation, for example a user device, mobile device, smart phone, personal computer, laptop, portable computing device, any communication device, computing device or server and the like; a satellite ground receiving station; satellite optical ground receiving (OGR) station and/or apparatus/components thereof; optical ground receiving (OGR) station and/or apparatus/components thereof; telecommunication apparatus, network apparatus, network nodes, routers; 2G, 3G, 4G, 5G, and/or 6G and beyond telecommunications nodes, masts, radio access network nodes and/or any other network entities and the like; and/or any communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s) and the like.

A QKD linking party apparatus or device may further comprise or represent any device or apparatus, component or system that is adapted to, configured to, includes the capability of: establishing one or more quantum communication channels with one or more other party devices and/or transmitting data over the quantum communication channel with the one or more other party devices and, also, establish one or more non-quantum, standard or classical communication channels with said one or more other party devices for transmitting/receiving data to/from said one or more other party devices for, without limitation, for example implementing or facilitating QKD key exchange/negotiation using a QKD protocol for use in secure communications between said at least two party devices according to the invention. Examples of an QKD linking party apparatus or device as described herein and/or according to the invention may include, without limitation, for example an exchange, a local exchange within a roadside cabinet, aircraft apparatus/components thereof, airborne apparatus/components thereof, spaceborne apparatus/components thereof, a satellite or apparatus/components thereof, a ground station or apparatus/components there, a satellite based communications apparatus or device/components thereof, a ground station or apparatus/components thereof, a relay station, repeater, telecommunication apparatus, network apparatus, network nodes, routers, and/or any apparatus, communication device, computing device or server and the like with a communication interface configured for and/or including functionality of, without limitation, for example a non-quantum, standard or classical communication interface for communicating over non-quantum, standard or classical communication channel(s); and a quantum communication interface for communicating over quantum channel(s) and the like.

A QKD link between an endpoint or party device and the QKD linking apparatus may comprise or represent a communication medium or media including a classical or non-quantum communications channel and a quantum communications channel. The configuration of a QKD link and hence the quantum and classical communications channels of the QKD link may depend on the types of QKD protocol(s) or key exchange protocols that may be implemented and performed between the QKD linking apparatus and one or more endpoint devices. For example, a QKD link may include, by way of example only but is not limited to, a bi-directional classical communications channel for transmitting data between the QKD link apparatus and the endpoint and at least a unidirectional quantum communication channel for quantum transmissions from the QKD link apparatus to the endpoint and/or vice versa. This configuration of a QKD link may be suitable for QKD protocols (e.g. BB84 family of QKD protocols and the like) in which the endpoint device or one of the endpoint devices is configured to receive quantum information over a quantum channel from the QKD linking apparatus, where the endpoint device(s) are configured to perform bidirectional classical communications over one or more classical channel(s) of their QKD links.

Alternatively or additionally, as an option, a QKD link may be configured to include, by way of example only but is not limited to, a bi-directional classical communications channel for transmitting data between the QKD link apparatus and the endpoint and at least a bidirectional quantum communication channel for quantum transmissions between the link apparatus and the endpoint. This configuration of a QKD link may be suitable for QKD protocols (e.g. BB84 family of QKD protocols and the like) in which the endpoint device or one of the endpoint devices is configured to transmit quantum information over a quantum channel to the QKD linking apparatus, and where the endpoint device(s) are configured to perform bidirectional classical communications over one or more classical channel(s) of their QKD links.

Alternatively or additionally, there may be a mixture of QKD links supported by the QKD linking apparatus, where a QKD link for a first endpoint device only supports a unidirectional quantum channel used by QKD linking apparatus to transmit quantum information to the first endpoint device, and where a QKD link for a second endpoint device supports a unidirectional quantum channel used by the second endpoint device to transmit quantum information to the QKD linking apparatus, where both QKD links have bidirectional classical communication channels and the like. Thus, a QKD protocol that uses these types of QKD links may be implemented, where the QKD linking apparatus is configured to have a quantum receiver for receiving quantum information from the first endpoint device and a quantum transmitter for transmitting quantum information to the second endpoint and the like.

Alternatively or additionally, as another option, a QKD link for an endpoint device may include, by way of example only but is not limited to, a bi-directional classical communications channel for transmitting data between the QKD link apparatus and the endpoint and at least a bidirectional quantum communication channel for communicating quantum transmissions between the endpoint device to the QKD linking apparatus. This configuration of a QKD link may be suitable top enable the endpoint device to implement or perform a range of QKD protocols (e.g. BB84 family of QKD protocols and the like or QKD protocols requiring endpoint devices to transmit and/or receive quantum information) with the QKD linking apparatus and any other compatible endpoint device with suitable QKD link and the like to QKD linking apparatus. Alternatively or additionally, as an option, the QKD link may include, byway of example only but is not limited to, two or more classical communications channels for transmitting data between the link apparatus and the endpoint and a quantum communication channel for quantum transmissions from the link apparatus to the endpoint.

The communication medium used by one QKD link for an endpoint or shared by two or more QKD links may be any type of communication medium or media capable of being configured to form a quantum channel for transmission of quantum information and/or capable of being configured to form one or more classical communication channels for transmission of non-quantum or classical communications. Alternatively of additionally, different communication mediums may be used for the quantum channel and/or classical channel(s) of each QKD link and the like and/or as the application demands. For example, the communication medium may be configured to, without limitation, propagate an electromagnetic signal with wavelengths in the visible and/or non-visible electromagnetic spectrum such as, without limitation, visible light, near-infra-red light, infra-red light, microwave, satellite communication wavelengths and/or Terahertz wavelengths and/or any other suitable electromagnetic wavelength for use in at least quantum communications and/or non-quantum communications. Although the communication medium for non-quantum or classical channels may be implemented in the same communication medium as the quantum channel, the communication medium for non-quantum channel may be implemented based on, without limitation, for example wired and/or wireless non-quantum technologies, and/or as herein described and the like. The communication medium may be, without limitation, for example free-space and/or any type of waveguide for propagating an electromagnetic signal and the like. For simplicity and by way of example only, the communication medium may be an optical communication medium capable of propagating electromagnetic signals with wavelengths in at least one from the group of: the visible light spectrum, the near-infrared light spectrum, the infra-red light and the like. For simplicity, such an optical communication medium may include, without limitation, for example optical free-space; an optical cable; multi-mode optical fibre; single-mode optical fibre; one or more optical fibres; optical free space; combinations thereof; modifications thereto; as herein described; and the like and/or as the application demands. For example, the optical communication medium may be an optical fibre capable of propagating light in the wavelengths of at least one of the visible light spectrum and/or near-infra red light spectrum and the like. Alternatively or additionally, the communication medium may be, without limitation, for example free-space and/or any type of waveguide for propagating an electromagnetic signal and the like. For simplicity and byway of example only, the communication medium may be a free-space aircraft, free-space spaceborne, and/or free-space satellite based optical communication medium capable of propagating electromagnetic signals with wavelengths in at least one from the group of: visible and/or non-visible electromagnetic spectrum such as, without limitation, visible light, near-infra-red light, infra-red light, microwave, satellite communications, satellite communication wavelengths, satellite optical communication wavelengths, and/or Terahertz wavelengths and/or any other suitable electromagnetic wavelength for use in at least quantum communications and/or non-quantum communications and the like. For simplicity, such an optical communication medium may include, without limitation, for example optical free-space and/or any other suitable optical communications medium; combinations thereof; modifications thereto; as herein described; and the like and/or as the application demands.

For example, the QKD link may be configured to use a communication medium, without limitation, for example an optical communication medium that is configured to use one or more optical fibres configured to carry data over the different channels of the QKD link using, without limitation, for example wavelength division multiplexing (WDM) or dense wavelength division multiplexing (DWDM) and the like. The communication medium of a QKD link may be configured to share the quantum channel and non-quantum channels. For example, the communication medium of a QKD link may use a single optical fibre that uses WDM/DWDM to separate the quantum channel and non-quantum or classical channels. Furthermore, the quantum channel may be a bundle of WDM/DWDM channels in which the quantum transmitter for the quantum channel may have number of $N=2^M$ differently polarised lasers (e.g. M>1, for some QKD protocols N=4) for transmitting quantum information, where each laser uses a different wavelength of light over the quantum channel based on WDM/DWDM. Similarly, the bidirectional classical channel may also use WDM/DWDM. For example, the communication medium of a QKD link for an endpoint may use a single optical fibre that uses WDM/DWDM to separate the quantum channel and non-quantum or classical channels.

Alternatively or additionally, as another option, a communication medium may be configured to be shared by two or more QKD links and channel separation techniques used to separate the QKD links, i.e. ensure separation of the corresponding quantum channel(s) and non-quantum/classical channel(s) of each of the QKD links. For example, two or more QKD links may share the same optical communication medium such as for example, the same optical fibre or optical free space. In this case, when sharing the same optical fibre, then WDM/DWDM may be used to separate each quantum channel of each of the two or more QKD links. For example, each of the two or more QKD links may use a quantum transmitter for transmitting quantum information over their respective quantum channel. Thus, when using WDM/DWDM, each quantum transmitter is configured to use a different wavelength to ensure channel separation of each of the quantum channels of the QKD links over the same fibre or the single fibre. Similarly, when sharing the same optical fibre, then WDM/DWDM may also be used to separate each of the non-quantum channel(s)/classical channel(s) of each of the two or more QKD links.

Alternatively or additionally, as a further option, the topology of the QKD links may be formed using any combination of the different quantum and classical channels over any number of optical fibres, which may be shared or separated depending on how the optical fibres are laid in the local loop and also how these are connected and/or laid to each of the premises/end users and the like, with the WDM/DWDM multiplexors passively splitting or combining the quantum/classical signals. Furthermore, type of sharing and/or WDM/DWDM techniques used may be based on what type of QKD protocols are used and whether these use time-bins and/or phase adds more options.

Alternatively or additionally, as an option, in another example, a QKD link may use a single optical fibre for each channel of the QKD link, where a first optical fibre is used for the quantum channel, a second optical fibre is used for a bidirectional classical or non-quantum channel and the like. The second optical fibre may use WDM/DWDM to separate the transmission paths between linking apparatus and endpoint of the bidirectional classical or non-quantum channels. Additionally or alternatively, as an option, a single optical fibre may be used on transmit and receive paths of the bidirectional classical or non-quantum channel, so the second optical fibre of the QKD link may be used as a unidirectional classical or non-quantum channel and a third optical fibre may be used as another unidirectional classical or non-quantum channel to ensure bidirectional communications over the classical non-quantum channel(s) between the QKD linking apparatus and an endpoint device assigned/allocated to the QKD link.

Although communication mediums such as optical fibre are described herein for terrestrial based systems according to the invention, this is by way of example only and the invention is not so limited, it is to be appreciated by the skilled person that any type of communications medium that is suitable for performing quantum and/or non-quantum communications may be used such as, without limitation, for example in an aircraft, spaceborne, or satellite based system according to the invention the communications medium of a QKD link that is used may be configured based on using a free-space optical channel for the quantum channel and an aircraft radio, spaceborne based wireless communications, or satellite microwave communications channel (or any other wavelength satellite communications channel) for the non-quantum communications channel and the like; combinations thereof; modifications thereto; as herein described and/or as the application demands.

FIG. 1a is a schematic diagram illustrating an example QKD switching system 100 including a QKD linking apparatus 102 configured for enabling secure communications between two or more endpoint devices (or parties) 104a-104k using QKD protocols and the like. The QKD system 100 includes the QKD linking apparatus 102 and a plurality of endpoint devices (or party devices) 104a-104k that are each connected to the QKD linking apparatus 102 over an assigned or allocated QKD link of the plurality of QKD links 103a-103k. That is, each endpoint device 104a of the plurality of endpoint devices 104a-104k is connected to the QKD linking apparatus 102 by a corresponding QKD link 103a of the plurality of QKD links 103a-103k. The QKD link apparatus 102 may have a mapping of which QKD link of the plurality of QKD links 103a-103k is assigned to each endpoint device of the plurality of endpoint devices 104a-104k. The QKD switching system 100 may be based on a hub-and-spoke model that is configured to connect the QKD linking apparatus 102 (e.g. a central linking party) to multiple endpoint devices 104a-104k controlled by corresponding endpoint parties through the corresponding multiple QKD links 103a-103k.

Each QKD link 103a of the plurality of QKD links 103a-103k is configured to perform conventional or classical communications and also quantum communications over the same communication medium. The communication medium for a QKD link 103a is configured to include a classical communications channel and a quantum communications channel. Thus, each QKD link 103a may shares the same communication medium (e.g. optical communications, optical-free space and/or radio satellite communications, one or more optical fibres) with conventional or classical communications and quantum communications (e.g. optical communications, optical-free space and/or radio satellite communications, one or more optical fibres). In a preferred embodiment, each QKD link of the plurality of QKD links 103a-103k are configured to be shared with conventional or classical optical communications.

The quantum channel of each QKD link 103a includes a QKD communications channel that may be configured to use non-entangled QKD in which the QKD communications channel includes, without limitation, for example at least a bi-directional classical communications channel (C-channel) and at least a unidirectional quantum communication channel (a Q-channel). Non-entangled QKD uses techniques other than quantum entanglement such as, without limitation for example quantum super-positioning techniques for transmitting and/or receiving quantum information as quantum states over a quantum channel. As an option, the communication medium of each QKD link is the same and is shared by the Q-channel and C-channel. For example, the communication medium of each QKD link may include at least one optical fibre in which the Q-channel and C-channel of the QKD link carry corresponding quantum and classical optical communications signals over the at least one optical fibre. For example, the QKD link may be a single optical fibre in which the Q-channel and C-channel are shared on the same optical fibre. In another example, for added convenience or reliability, the QKD link may be at least two optical fibres, where a first optical fibre of the QKD link is used as the Q-channel and the second optical fibre of the QKD link is used as the C-channel of the QKD link. In a further example, the QKD link may be at least three optical fibres, where a first optical fibre of the QKD link is used as the Q-channel with a bidirectional C-channel being formed with a second and third optical fibre, in which each second and third optical fibres are used to provide a unidirectional C-channel in opposite directions.

In aircraft, spaceborne, and/or satellite applications, the communication medium of each QKD link may include optical free-space for the Q-channel and suitable radio and/or wireless communications for the C-channel of the QKD link for carrying corresponding quantum and classical communications signals. For example, for satellite applications, the QKD link may include a free-space optical channel for the Q-channel and a conventional satellite communications link (e.g. satellite radio/wireless communications) for the C-channel. In another example, for airborne/aircraft applications, the QKD link may include a free-space optical channel for the Q-channel and a conventional wireless communications link for the C-channel. In another example, the QKD link may be at least two optical free-space channels in which a first optical free-space channel of the QKD link is used as the Q-channel and a second optical free-space channel of the QKD link is used as the C-channel of the QKD link. In a further example, the QKD link may be at least two optical free-space channels, where a first optical free-space channel of the QKD link is used as a unidirectional Q-channel for quantum transmissions from satellite/aircraft and/or spaceborne apparatus and the endpoint device assigned the QKD link, a second optical free-space channel of the QKD link is used as another uni-directional Q-channel for quantum transmissions from endpoint device to a satellite/aircraft and/or spaceborne apparatus, and a bidirectional or at least two C-channel(s) being formed with a conventional wireless/radio/satellite communications channel(s) for classical communications between endpoint device to a satellite/aircraft and/or spaceborne apparatus and the like.

Although non-entangled QKD has been described, this is for simplicity and by way of example only and the invention may not be so limited, it is to be appreciated by the skilled person that other types of QKD may be applicable such as, without limitation, for example entangled QKD, which may require further modifications to the Q-TX(s) in which each Q-TX may require two output channels and the endpoints may each be further modified to require two quantum receivers. Alternatively, the quantum channel of a QKD link may be reversed and/or bidirectional in which non-entangled QKD and entangled QKD may be employed by the quantum transmitters or Q-TX(s) and/or quantum receivers used at either the QKD linking apparatus and/or at the endpoint device and the like depending on the QKD protocol that is to be implemented, as described herein and/or as the application demands.

As described, the QKD linking apparatus 102 includes a quantum communication component (QCC) 106, a classical transceiver router component (CTRC) 108, and a QKD linking controller 112. The quantum communication component (QCC) 106 is communicatively coupled to the Q-channels of each of the QKD links 103a-103k. The classical transceiver router component (CTRC) 108 is also communicatively coupled to each of the bidirectional classical or non-quantum channel(s) (C-channel(s)) corresponding to each of the QKD links. The QCC 106 is configured to ensure that quantum information associated with an endpoint 104a of the plurality of endpoints 104a-104k is transmitted over the Q-channel of the QKD link 103a for that endpoint 104a. The QCC 106 may have a plurality of quantum transmitters, each quantum transmitter assigned to a different one of the QKD links 103a-103k, where said each quantum transmitter is coupled to the Q-channel of the corresponding QKD link 103a. For example, the Q-channel of a QKD link 103a may be implemented using an optical fibre an optical fibre coupled at one end to a quantum transmitter in the QCC 106 and coupled at the other end to a quantum receiver in the endpoint device 104a. For example, the Q-channel of a QKD link 103a may be implemented using an optical free-space channel (e.g. for a satellite QKD system or a terrestrial based QKD system requiring optical free space channels/links) coupled at one end to a quantum transmitter in the QCC 106 and coupled at the other end to a quantum receiver in the endpoint device 104a. The QCC 106 may also have a plurality of quantum receivers, each quantum receiver assigned to a different one of the QKD links 103a-103k, where said each quantum receiver is coupled to the Q-channel of the corresponding QKD link 103a. For example, the Q-channel of a QKD link 103a may be implemented using an optical fibre an optical fibre coupled at one end to a quantum receiver in the QCC 106 and coupled at the other end to a quantum transmitter in the endpoint device 104a. For example, the Q-channel of a QKD link 103a may be implemented using an optical free-space channel (e.g. for a satellite QKD system or a terrestrial based QKD system requiring optical free space channels/links) coupled at one end to a quantum receiver in the QCC 106 and coupled at the other end to a quantum transmitter in the endpoint device 104a.

The classical transceiver router component (CTRC) 108 is also communicatively coupled to each of the bidirectional classical or non-quantum channel(s) (C-channel(s)) corresponding to each of the QKD links. For example, the CTRC 108 may have a plurality of classical transceivers, each classical transceiver is assigned to a different one of the QKD links 103a-103k, where said each classical transceiver is coupled to a bidirectional C-channel of the corresponding QKD link 103a. For example, each bidirectional C-channel of a QKD link 103a may be implemented using, without limitation, for example an optical fibre coupled at one end to a classical optical transceiver of the CTRC 108 and coupled at the other end to a classical optical transceiver of the endpoint device. In another example, each bidirectional C-channel of a QKD link 103a may be implemented using, without limitation, for example an wireless communications channel (e.g. aircraft radio and/or wireless communications, spaceborne radio and/or wireless communications, or satellite communications) coupled at one end to a classical wireless communications transceiver of the CTRC 108 and coupled at the other end to a classical wireless communications transceiver of the endpoint device. The controller 110 of the QKD linking apparatus 102 is coupled to the QCC 106 and CTRC 108 for controlling/directing and/or sharing the resources of the QCC 106 and/or CTRC 108 for ensuring the secure flow, transmission and/or routing of information over the required Q-channels and C-channels of each QKD link connecting the QKD linking apparatus to the corresponding endpoint devices accordingly.

In addition, each of the endpoint devices 104a-104k are communicatively coupled to the QCC 106 and CTRC 108 via corresponding QKD links 103a-103k. For example, when the QKD links use optical fibres, this may be via direct optical fibres and/or using optical multiplexor/demultiplexor(s) at the QCC 106 and CTRC 108 and/or endpoints 104a-104k. For example, when the QKD links use optical-free space and/or wireless communications links, this may be via direct optical-free space transmitters/receivers and/or wireless communications transmitters/receivers and/or using various suitable multiplexor/demultiplexor(s) at the QCC 106 and CTRC 108 and/or endpoints 104a-104k. The controller 110 communicates with the QCC 106 to select the appropriate Q-channel of a QKD link 103a connecting the corresponding endpoint device 104a for transmitting quantum information associated with the endpoint device 104a over said Q-channel. Similarly, the controller 110 communicates with the CTRC 108 to perform various operations such as, without limitation, for example: a) selecting the appropriate C-channel of a QKD link 103a connecting the corresponding endpoint device 104a for transmitting classical information associated with the endpoint device 104a over the C-channel; b) selecting the appropriate C-channel of a QKD link 103a connecting the corresponding endpoint device 104a for transmitting classical information from the QKD linking apparatus to the associated endpoint device 104a; c) receiving a classical data transmission addressed to the QKD linking apparatus 102 on a C-channel of a QKD link 103a connected to an endpoint device 104a; d) receiving a classical data transmission on a C-channel over a QKD link 103a connected to an endpoint device 104a, where the classical data transmission is addressed to or meant for one or more other endpoint devices 104b-104c, and selecting the appropriate C-channel(s) of one or more other QKD links 103b-103c associated with the one or more other endpoint devices 104b-104c for routing said received classical data transmission over the selected C-channels of the other QKD links 103b-103c to said other endpoint devices 104b-104c, and vice versa. The controller 112 may be further configured to control the QCC 106 and CTRC 108 for enabling two or more of the endpoint devices 104a-104k to perform a QKD protocol for exchanging keys in a quantum-safe or quantum-secure manner and the like in which the QKD linking apparatus 102 may be the intermediary party in the QKD protocol. In addition, after key exchange between the two or more endpoint devices, the controller 112 is further configured to control the QCC 106 and CTRC 108 for providing the necessary routing over the C-channels of the corresponding QKD links that enable the two or more of the endpoint devices 104a-104k to securely communicate over their corresponding C-channel(s), where each C-channel is encrypted or secured by the exchanged key(s).

For example, during key exchange between two or more endpoint devices, the controller 110 is configured to perform a QKD key exchange protocol and selects/routes quantum information over the Q-channel and/or classical information over the C-channel(s) of each QKD link connected to each of the two or more endpoint devices at the appropriate times during the QKD key exchange protocol to ensure keys are securely exchanged between the two or more endpoint devices. In particular, depending on the QKD key exchange protocol that is to be implemented by the QKD linking apparatus and/or the endpoint devices, the QKD key exchange protocol may be configured to ensure that the QKD linking apparatus is unable to derive the keys agreed between the two or more endpoint devices. Thus, the endpoint devices 104a-104k are able to form a quantum-secure network with each other for secure communications therebetween using the QKD linking apparatus to route the encrypted classical information over the C-channel of each of the corresponding QKD links 103a-103k connected to each of the endpoint devices 104a-104k.

In another example, for a group of two or more endpoint devices 104a-104k, the controller 110 may be further configured to perform steps during the QKD protocol for exchanging keys such as, without limitation, for example generating a different QKD key for each of the endpoint devices 104a-104k. This may be performed by the QCC 106 which may include one or more random number generators capable of generating QKD keys, and/or retrieving a QKD key from a set of QKD keys securely stored therein. During generation of each QKD key for each of the endpoint devices 104a-104k or when each QKD key is retrieved for each of the endpoint devices 104a-104k, the controller 110 may be configured to direct the QCC 106 to select the required QKD link 103a of each endpoint device 104a and transmit the QKD key for use by that endpoint device 104a as a quantum transmission over the corresponding Q-channel of the selected QKD link 103a to that required endpoint device 104a. Thus, at certain points during performance of the QKD protocol, the controller 110 selects the appropriate Q-channel of a QKD link 103a to transmit the corresponding generated QKD key to the required endpoint device 104a, which is received by the required endpoint device 104a during performance of the QKD protocol. Thus, the QKD linking apparatus 102 (e.g. central linking party) may transmit, according to the QKD protocol, corresponding randomly generated QKD keys over each Q-channel to corresponding endpoint devices.

In operation, a QKD switching process may be performed by the QKD controller 110 of the QKD linking apparatus 102. The QKD switching process may be configured to perform, without limitation, for example: a) routing generated random keys or retrieved QKD keys from QKD key storage and the like to the correct endpoint device during performance of a QKD protocol between two or more endpoint devices 104a-104k, where the QKD protocol is configured for exchanging, without limitation, for example QKD keys and/or group QKD keys between said two or more endpoints 104a-104k; b) routing received QKD keys, which may be generated random keys or retrieved QKD keys from QKD key storage at the endpoint device and the like, transmitted from the corresponding endpoint device during performance of a QKD protocol between two or more endpoint devices 104a-104k, where the QKD protocol is configured for exchanging, without limitation, for example QKD keys and/or group QKD keys between said two or more endpoints 104a-104k; c) when required, during performance of the QKD protocol, switching, selecting, routing and/or connecting the appropriate Q-channel(s) of one or more QKD links 103a-103k connected to corresponding endpoint devices 104a-104k to ensure each of the endpoint devices 104a-104k receives their required quantum transmissions during performance of the QKD protocol; d) switching, selecting, routing and/or connecting the appropriate C-channel(s) of one or more QKD links 103a-103k connected to corresponding endpoint devices 104a-104k to ensure each of the endpoint devices 104a-104k receives their required classical transmissions over their C-channel during performance of the QKD protocol; and/or e) for routing communications between the C-channels of each of the QKD links 103a-103k of said two or more endpoints 104a-104k when required during the performance of the QKD protocol(s) and/or thereafter for routing the corresponding C-channels of said QKD links 103a-103k to enable the at least two endpoints 104a-104k to securely communicate with each other using, without limitation, for example the corresponding exchanged QKD keys and/or group QKD keys and the like as a result of performing said QKD protocol(s) therebetween.

The QKD switching system 100 with QKD linking apparatus 102 provides a means of creating a QKD network between multiple end-points 104a-104k, allowing any end-point to exchange quantum-encoded signals with any other end-point. Many thousands of end-points may be supported, and the connection cost is relatively low and may use optical fibre, optical free-space, and/or wireless communication technologies and the like and/or as the application demands. Depending on the QKD protocol(s) used and implemented, only limited trust is required from the endpoint devices 104-104k and/or QKD linking apparatus 102, which makes it feasible to deploy the QKD linking apparatus 102 and associated technology in public areas and/or areas outside the control of the endpoint devices and/or control of the operator of the QKD linking apparatus (e.g. aircraft, satellites, telecommunications cabinets and/or cell sites, roadside cabinets (with limited physical protection) as well as in switching centres and/or exchanges). For situations where optical fibre is used in the QKD links, it is also unnecessary to provide individual optical fibres from end-points 104a-104k directly to a central location such as an exchange, rather it can be a "last mile" solution where fibre is rolled out from a roadside cabinet, cell site, and/or mini-exchange to individual endpoints allowing costs to be reduced and bandwidth to be shared and the like. The roadside cabinet and/or mini-exchange may be connected to the central exchange via optical fibre and use WDM/DWDM to carry communications from/to the endpoint devices and the like.

In further example applications, the QKD linking apparatus 102 (e.g. central linking party) may be configured to match pairs of keys, then use the key for one end party to encrypt the key for a second end party, and send that encrypted key to the second end party, who will in turn decrypt it to obtain a copy of the first party's key. This therefore results in a shared key. Note other algorithms for key matching may be implemented, such as sending part keys to each party. In a preferred implementation, a QKD protocol such as, without limitation, for example BB84-style protocol from the BB84 protocol family such as, without limitation, the conventional BB84 protocol and/or a modified versions thereof such as a modified BB84 protocol as described in GB Patent Application No. 1916311.2 entitled "Quantum Key Distribution Protocol" filed on 8 Nov. 2019 and incorporated herein by reference, and/or any other type of QKD protocol as the application demands may be used to exchange and/or transmit the quantum encoded keys and to link the pairs of keys using the Q-channels and/or C-channels of the QKD links 103a-103k connected with the corresponding endpoint devices 104a-104k. For example, the modified version of the BB84 protocol may be configured such that the intermediary device/sender device, which may be the QKD linking apparatus 102 or any other apparatus/endpoint device with quantum transmission capabilities, and the like does not have knowledge of the final agreed key between receiver/endpoint devices. This means that the QKD linking apparatus 102 (which may be used as intermediary device or sender device as described with reference to BB84) and corresponding central linking party will not have any knowledge of the final agreed key, thereby reducing the level of trust in that the QKD linking apparatus 102 and the central party may require by the parties controlling the endpoint devices 104a-104k.

There may be a plurality of QKD protocol(s) that may be used by the QKD linking apparatus 102/202 and endpoint devices 104a-104k/204a-204k that make use of the corresponding QKD links, the QKD protocols may be based on, without limitation, for example a QKD protocol from the Bennett and Brassard 1984 (BB84) family of QKD protocols; the BB84 protocol; a modified BB84 protocol as herein described; modified versions of the BB84 protocol configured to ensure the QKD linking apparatus is unable to derive the resulting exchanged QKD keys between the endpoint devices; the Bennet 1992 (B92) QKD protocol; the Six-State Protocol (SSP) QKD protocol; the Scarani Acin Ribordy Gisin 2004 (SARG04) QKD protocol; the Doherty Parrilo Spedalieri 2002 (DPS02) QKD protocol; the differential phase shift (DPS) QKD protocol; the Eckert 1991 (E91) QKD protocol; the coherent one-way (COW) QKD protocol; the Khan Murphy Beige 2009 (KMB09) QKD protocol; the Esteban Serna 2009 (S09) QKD protocol; the Serna 2013 (S13) QKD protocol; the A Abushgra K Elleithy 2015 (AK15) QKD protocol; any one or more other entanglement based QKD protocols; any one or more future QKD protocols; any other QKD protocol capable of making use of a quantum channel and non-quantum channel of each of the QKD links 103a-103k/203a-203k; any other quantum key exchange protocol used to establish and/or exchange a shared key between at least two or more endpoint devices 104a-104k/204a-204k and/or at least one endpoint device 104a/204a and a third party, an intermediary or cloud service and the like; any QKD protocol in which the exchanged key may be based on quantum key distributed keys and/or may be a quantum-safe or quantum secure key due to the QKD protocol being a quantum-secure key establishment protocol establishes a QKD shared key between the endpoint devices 104a-104k/204a-204k and the like; combinations thereof, modifications thereto and the like and/or as the application demands.

The QKD switching system 100 may therefore be deployed, without limitation, for example as a "last-mile" solution, to connect offices and homes into a QKD network. In preferred embodiments, the communication medium of each QKD link 103a is the same and is shared by the Q-channel and C-channel of the QKD link. For example, the communication medium of each QKD link 103a may include at least one optical fibre in which the Q-channel and C-channel of the QKD link carry corresponding quantum and classical optical communications signals over the at least one optical fibre. For example, the QKD link 103a may be a single optical fibre in which the Q-channel and C-channel are shared on the same optical fibre. In another example, for added security, the QKD link 103a may be at least two optical fibres, where a first optical fibre of the QKD link is used as the Q-channel and the second optical fibre of the QKD link 103a is used as the C-channel of the QKD link 103a.

Although each of the QKD links 103a-103k of FIG. 1a has been described as having a communication medium based on an optical communication medium such as an optical fibre and the like, this is for simplicity and byway of example only and the invention is not so limited, it is to be appreciated by the skilled person that one or more of the QKD links 103a-103k may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QCC component 106 of QKD linking apparatus 102 of FIG. 1a has been described as including a plurality of quantum transmitters for enabling quantum transmission over a quantum channel of a QKD link 103a of an endpoint device 104a, the QCC component 106 may be further modified to include one or more quantum receivers in which one or more of the QKD links 103a-103k may each be configured to include a unidirectional or bidirectional quantum channel that couples with said one or more quantum receivers for receiving quantum transmissions from the endpoint to the QKD linking apparatus 102. As previously described, this will enable additional QKD protocols requiring an endpoint to transmit quantum information to the QKD linking apparatus to be implemented by the QKD linking apparatus and corresponding endpoint(s), where each endpoint 104a may include a quantum transmitter for transmitting quantum information over a quantum channel of the QKD link 103a to the QKD linking apparatus during operation of said additional QKD protocol and the like, and/or as the application demands.

Figure 1B:
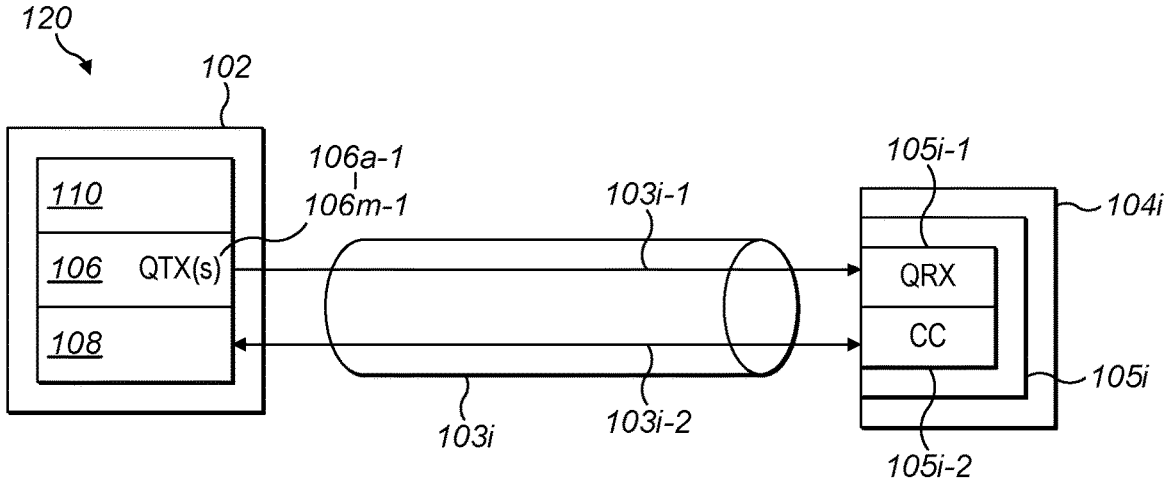
FIG. 1b is a schematic diagram illustrating example QKD links for use with the QKD switching system of FIG. 1a according to some embodiments of the invention.
Figure 1B:
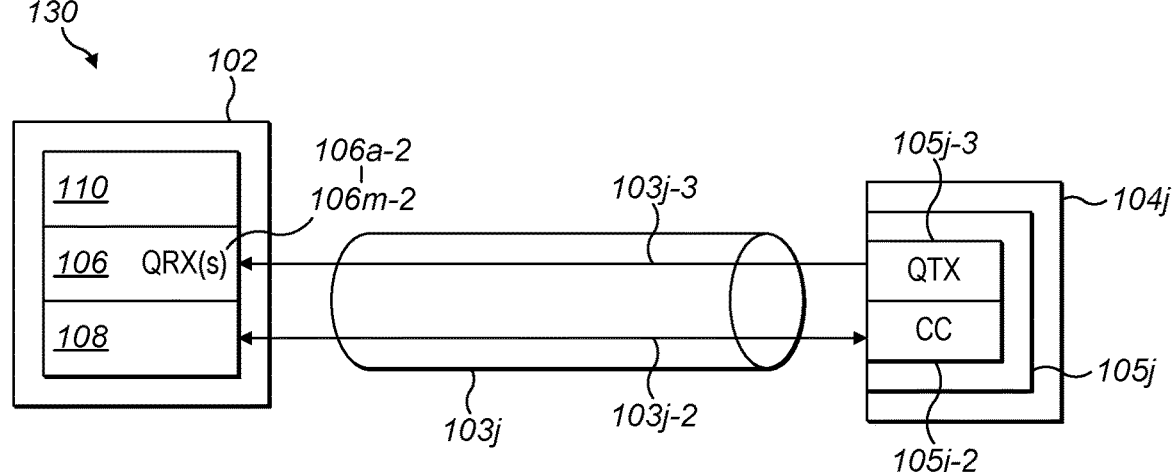
Figure 1B:
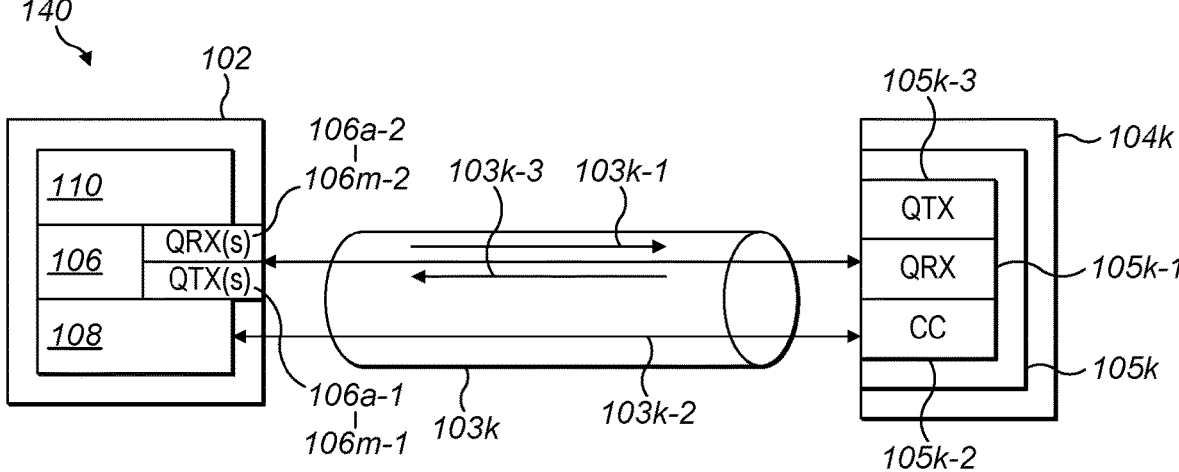

FIG. 1b is a schematic diagram illustrating example QKD systems 120, 130 and 140 with different types of QKD links 103i, 103j and/or 103k for use with the QKD linking apparatus 102 and corresponding endpoint devices 104i, 104j, and/or 104k, respectively, as described, by way of example only but not limited to, with reference to FIG. 1a according to some embodiments of the invention. For simplicity, the reference numerals of FIG. 1a are re-used for similar or the same components/features for illustrating components/features of the QKD links and QKD linking apparatus and the like of FIG. 1a.

In the QKD linking system 120, the QKD linking apparatus 102 includes a controller 110, a quantum communication component (QCC) 106 and a classical transmission routing component (CTRC) 108 as described with reference to FIG. 1a. In particular, in this example, the QCC 106 includes at least a plurality of quantum transmitter(s) (Q-TX(s)) 106a-1 to 106m-1, the CTRX includes at least a plurality of classical transceiver(s) (CTRX(s)) 108a-108m, and the endpoint device 104i includes a quantum receiver (Q-RX) 105i-1 and a classical transceiver (CC) 105i-2. A QKD link 103i may be assigned by the controller 110 to an endpoint device 104a, where the controller 110 assigns or allocates one of the Q-TX(s) 106a-1 of the plurality of Q-TX(s) 106a-1 to 106m-1 of the QCC 106 for use in quantum transmissions over a quantum channel (Q-channel) 103i-1 of the QKD link 103i, and the controller 110 assigns or allocates one of the CTRX(s) 108a of the plurality of CTRX(s) 108a-108m for use in classical transmissions over a classical channel (C-channel) 103i-2 of the QKD link 103i.

The endpoint device 104*i* includes a quantum receiver (Q-RX) 105*i*-1 and a classical transceiver (CC) 105*i*-2 for coupling to the Q-channel and the C-channel of the QKD link 103*i* assigned to the endpoint device 104*i*. In this example, the QKD link 103*i* is illustrated to include a uni-directional quantum channel 103*i*-1 (Q-channel) and a bi-directional classical channel (C-channel) in which the QKD link 103*i* is assigned by the controller 110 to an endpoint device 104*i*. The QKD link 103*i*, which is assigned by the controller 110 to the endpoint device 104*i*, once established includes a uni-directional quantum channel 103*i*-1 (Q-channel) for transmitting, during performance of a QKD protocol or for any other reason, quantum information from a quantum transmitter (Q-TX) 106*a*-1 of the QCC 106 over the Q-channel 103*i*-1 to the endpoint device 104*i*, where the quantum transmission is received by the Q-RX 105*i*-1 of the endpoint device 104*i*. The QKD link 103*i* also includes a bi-directional classical channel 103*a*-2 for transmission of classical information between a CTRX 108*a* of the CTRC component 108 that is assigned to the endpoint device 104*i* and the CC 105*i*-2 of the endpoint device 104*i*. Thus the QKD link 103*i* may be used by the QKD linking apparatus 102 and endpoint device 104*i* for performing a QKD protocol and the like and/or for secure communications and the like.

In the QKD linking system 130, the QKD linking apparatus 102 includes controller 110, QCC 106 and CTRC 108 as described with reference to FIG. 1*a*. In particular, in this example, the QCC 106 includes at least a plurality of quantum receivers(s) (Q-RX(s)) 106*a*-2 to 106*m*-2, the CTRC 108 includes at least a plurality of classical transceiver(s) (CTRX(s)) 108*a*-108*m*, and the endpoint device 104*i* includes a quantum transmitter (Q-TX) 105*i*-3 and a classical transceiver (CC) 105*i*-2 for coupling to a QKD link 103*j* assigned thereto. The QKD link 103*j* may be assigned by the controller 110 to an endpoint device 104*a*, where the controller 110 assigns or allocates one of the Q-RX(s) 106*a*-2 of the plurality of Q-RX(s) 106*a*-2 to 106*m*-2 of the QCC 106 for use in receiving quantum transmissions transmitted by the Q-TX 105*j*-3 of the endpoint device 104*j* over a quantum channel (Q-channel) 103*j*-1 of the QKD link 103*j*, and the controller 110 assigns or allocates one of the CTRX(s) 108*a* of the plurality of CTRX(s) 108*a*-108*m* for use in classical transmissions over a classical channel (C-channel) 103*j*-2 of the QKD link 103*i* between the QKD linking apparatus 102 and the endpoint device 104*j*. As described, the endpoint device 104*i* includes a quantum transmitter (Q-TX) 105*j*-3 and a classical transceiver (CC) 105*j*-2 for coupling to the Q-channel 103*j*-3 and the C-channel 103*j*-2 of the QKD link 103*j* assigned to the endpoint device 104*j*. In this example, the QKD link 103*j* is illustrated to include a uni-directional quantum channel 103*j*-3 (Q-channel) and a bi-directional classical channel 103*j*-2 (C-channel) in which the QKD link 103*j* is assigned by the controller 110 to an endpoint device 104*j*. The QKD link 103*j*, which is assigned by the controller 110 to the endpoint device 104*j*, once established includes a uni-directional quantum channel 103*j*-3 (Q-channel) for transmitting, during performance of a QKD protocol or for any other reason, quantum information from the Q-TX 105*j*-3 of the endpoint device 104*j* over the Q-channel 103*j*-3 to the Q-RX 106*a*-2 of the QCC 106 assigned to the QKD link 103*j* and endpoint device 104*j*, where the quantum transmission is received by the Q-RX 106*a*-2 of the QCC 106 of QKD linking apparatus 102. The QKD link 103*j* also includes a bi-directional classical channel 103*j*-2 for transmission of classical information between a CTRX 108*a* of the CTRC component 108 that is assigned to the endpoint device 104*j* and the CC 105*j*-2 of the endpoint device 104*j*. Thus the QKD link 103*j* may be used by the QKD linking apparatus 102 and endpoint device 104*j* for performing a QKD protocol and the like and/or for secure communications and the like.

In the QKD linking system 140, the QKD linking apparatus 102 includes controller 110, QCC 106 and CTRC 108 as described with reference to FIG. 1*a*. In particular, in this example, the QCC 106 includes a plurality of quantum transmitter(s) (Q-TX(s)) 106*a*-1 to 106*m*-1 and a plurality of quantum receivers(s) (Q-RX(s)) 106*a*-2 to 106*m*-2, the CTRC 108 includes at least a plurality of classical transceiver(s) (CTRX(s)) 108*a*-108*m*, and the endpoint device 104*k* includes a quantum transmitter (Q-TX) 105*k*-3 and a quantum receiver (Q-RX) 105*k*-1 and a classical transceiver (CC) 105*k*-2 for coupling to a QKD link 103*k* assigned thereto. The QKD link 103*k* may be assigned by the controller 110 to the endpoint device 104*k*, where the controller 110 assigns or allocates one of the Q-TX(s) 106*k*-1 of the plurality of Q-TX(s) 106*a*-1 to 106*m*-1 and one of the Q-RX(s) 106*k*-2 of the plurality of Q-RX(s) 106*a*-2 to 106*m*-2 of the QCC 106 for use in transmitting and receiving quantum transmissions, respectively, to and/or from the endpoint device 104*k* over a quantum channel (Q-channel) 103*k*-1 and 103*k*-3 of the QKD link 103*k*. The controller 110 also assigns or allocates one of the CTRX(s) 108*k* of the plurality of CTRX(s) 108*a*-108*m* for use in classical transmissions over a classical channel (C-channel) 103*k*-2 of the QKD link 103*k* between the QKD linking apparatus 102 and the endpoint device 104*k*. As described, the endpoint device 104*k* includes a quantum transmitter (Q-TX) 105*k*-3, a quantum receiver (Q-RX) 105*k*-1 and a classical transceiver (CC) 105*k*-2 for coupling to the Q-channels 103*k*-3, 103*k*-1, and the C-channel 103*j*-2, respectively, of the QKD link 103*k* assigned to the endpoint device 104*k*. In this example, the QKD link 103*k* is illustrated to include a bi-directional quantum channel, which may be made up of two uni directional quantum channels 103*k*-1 and 103*k*-3, (Q-channel) and a bi-directional classical channel 103*k*-2 (C-channel) in which the QKD link 103*k* is assigned by the controller 110 to an endpoint device 104*k*. The QKD link 103*k*, which is assigned by the controller 110 to the endpoint device 104*k*, once established includes a bi-directional quantum channel 103*j*-1 and/or 103*j*-3 (Q-channel(s)) for transmitting and/or receiving, during performance of a QKD protocol or for any other reason, quantum information from the Q-TX/Q-RX 106*k*-1/106*k*-2 or Q-RX/Q-TX 105*k*-1/105*j*-3 of the endpoint device 104*k* over the Q-channels 103*k*-1/103*k*-3 of the QKD link 103*j*. The QKD link 103*k* also includes a bi-directional classical channel 103*k*-2 for transmission of classical information between a CTRX 108*k* of the CTRC component 108 that is assigned to the endpoint device 104*k* and the CC 105*k*-2 of the endpoint device 104*k*. Thus the QKD link 103*k* may be used by the QKD linking apparatus 102 and endpoint device 104*k* for performing a QKD protocol and the like and/or for secure communications and the like.

Figure 1C:
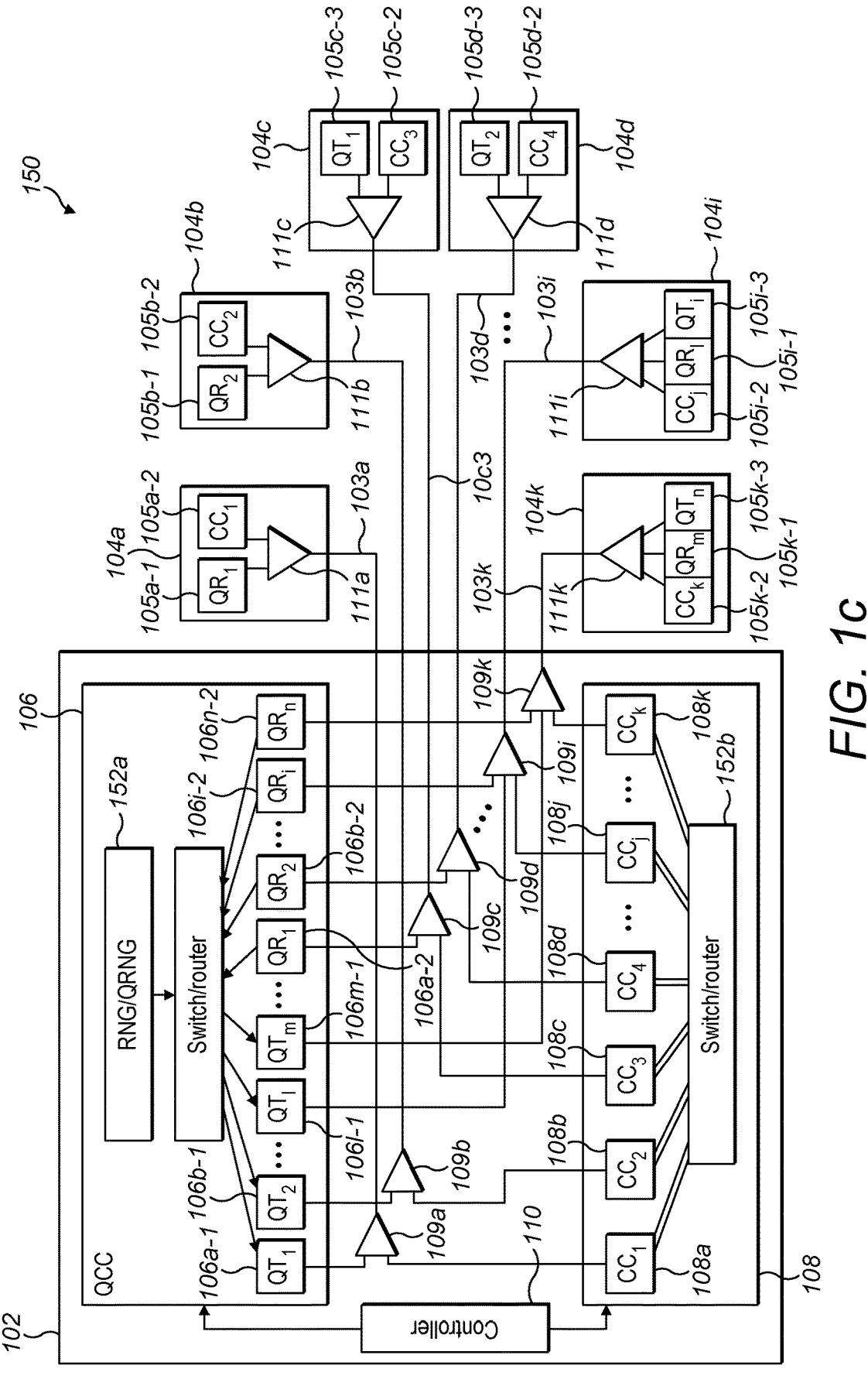
FIG. 1c is a schematic diagram illustrating another example QKD switching system according to some embodiments of the invention.

FIG. 1*c* is a schematic diagram illustrating another example QKD switching system 150 with QKD linking apparatus 102 according to the invention. For simplicity, reference numerals used in FIGS. 1*a* to 1*b* are reused for the same or similar components when describing FIG. 1*c*. The QKD switching system 150 is based on the QKD switching system 100 as described with reference to FIG. 1*a* but has been modified to further illustrate an example of coupling different types QKD links 103*a*-103*k* from the QCC 106 and CTRC 108 of the QKD linking apparatus 102 to each corresponding endpoint 104a-104k. The QKD linking apparatus 102 has been further modified by including optical multiplexor/demultiplexors 109a-109k that each optically couple the QCC 106 and CTRC 108 to the corresponding Q-channel and C-channel(s) of each of the QKD links 103a-103k of each of the corresponding endpoints 104a-104k. Each QKD link 103a of the plurality of QKD links 103a-103k is assigned/allocated and mapped by the controller 110 to a single but different endpoint 104a of the plurality of endpoint devices 104a-104k. That is, there is a one-to-one mapping of each of the QKD links 103a-103k to a different endpoint of the plurality of endpoints 104a-104k.

The QCC 106 is modified to include a plurality of quantum transmitters (Q-TX(s)) 106a-1 to 106m-1, depending on the types of QKD links 103a-103k, each quantum transmitter of the plurality of quantum transmitters (Q-TX(s)) 106a-1 to 106m-1 may be assigned and coupled to a different corresponding one of the QKD links 103a-103k via a selected one of the plurality of the optical multiplexors 109a-109k. The QCC 106 is further modified to include a plurality of quantum receivers 106a-2 to 106m-2, depending on the types of QKD links 103a-103k, each quantum receiver of the plurality of quantum receivers (Q-RX(s)) 106a-2 to 106m-2 may be assigned and coupled to a different corresponding one of the QKD links 103a-103k via a selected one of the plurality of the optical multiplexors 109a-109k. The CTRC 108 also includes a plurality of classical communication transceivers (CTXR(s)) 108a-108k, in which each of the CTXR(s) 108a-108k are communicatively coupled to a corresponding one of the optical multiplexors 109a-109k. In this example, the communication medium of each QKD link 103a is an optical communication medium such as an optical fibre (or multiple optical fibres) and the coupling of the optical fibre of each QKD link 103a to the QCC 106 and CTRC 108 of the QKD linking apparatus 102 is implemented using one of the corresponding one of the optical multiplexor/demultiplexors 109a-109k each of which allows multiple communications channels such as the C-channel(s) and Q-channel of the QKD link 103a to share the same optical fibre. Similarly, each endpoint device 104a of the plurality of endpoint devices 104a-104k includes either: a) a quantum receiver (Q-RX) 105a-1; b) a quantum transmitter (Q-TX) 105i-3; or c) both a quantum receiver (Q-RX) 105k-1 and a quantum transmitter (Q-TX) 105k-3; along with a classical transceiver (CTXR) 105a-2, which are coupled to a corresponding optical multiplexor/demultiplexor 111a, 111i or 111k and the like.

Thus, in this example, the optical fibre of the QKD link 103a associated with endpoint device 104a is optically coupled at one end to the optical multiplexor/demultiplexor 109a of the QKD linking apparatus 102 and optically coupled at the other end to the optical multiplexor/demultiplexor 111a of the endpoint device 104a. The Q-TX 106a of the QCC 106 is selected and allocated/assigned by the controller 110 to the QKD link 103a, which is assigned to endpoint device 104a. Thus, the Q-TX 106a of the QCC 106 and Q-RX 105a-1 of the endpoint device 104a are used to form the Q-channel over the optical fibre of the QKD link 103a for communicating quantum information from the QKD linking apparatus 102 to the endpoint device 104a. As well, the CTXR 108a of the CTRC 108 is selected and assigned/allocated to the QKD link 103a. Thus, the CTXR 108a of the CTRC 108 and CTXR 105a-2 of the endpoint device 104a are used to form the bidirectional C-channel over the optical fibre of the QKD link 103a. For each QKD link 103a of the plurality of QKD links 103a-103k, the Q-channel and bidirectional C-channel(s) may be separated using WDM/DWDM techniques and/or hardware and the like.

In this example, there are several different types of QKD links 103a-103k that are similar to the QKD links of FIG. 1b. For the QKD links 103a and 103b, these QKD links 103a and 103b assigned to endpoint devices 104a and 104b, respectively. Thus, each QKD link 103a and 103b is assigned/allocated a corresponding Q-TX 106a-1 and 106b-1 from the plurality of Q-TXs 106a-1 to 106m-1 of the QCC 106. As well, each of these QKD links 103a and 103b is also allocated/assigned a CTXR 108a and 108b, respectively. Each of the QKD links 103a and 103b may be each implemented using a separate optical fibre. In this example, the optical fibre of the QKD link 103a associated with endpoint device 104a is optically coupled at one end to an optical multiplexor/demultiplexor 109a, which is also connected to the Q-TX 106a-1 and CTXR 108a allocated to endpoint device 104a. The optical fibre of the QKD link 103a is also optically coupled at the other end to the endpoint device's optical multiplexor/demultiplexor 111a, which is connected to the Q-RX 105a-1 and CTXR 105a-2 of the endpoint device 104a. The Q-TX 106a-1 of the QCC 106 and Q-RX 105a-1 of the endpoint device 104a form the Q-channel over the optical fibre of the QKD link 103a for communicating, when required, quantum information associated with the endpoint device 104a. As well, the CTXR 108a of the CTRC 108 and CTXR 105a-2 of the endpoint device 104a form the bidirectional C-channel over the optical fibre of the QKD link 103a. As well, the optical fibre of the QKD link 103b associated with endpoint device 104b is optically coupled at one end to the optical multiplexor/demultiplexor 109b of the QKD linking apparatus 102, which is connected to the Q-TX 106b-1 and CTXR 108b allocated to endpoint device 104b. The optical fibre of the QKD link 103b is also optically coupled at the other end to the optical multiplexor/demultiplexor 111b of the endpoint device 104b, which is connected to the Q-RX 105b-1 and CTXR 105b-2 of the endpoint device 104b. The Q-TX 106b of the QCC 106 and Q-RX 105b-1 of the endpoint device 104b form the Q-channel over the optical fibre of the QKD link 103b for communicating quantum information associated with the endpoint device 104b. As well, the CTXR 108b of the CTRC 108 and CTXR 105b-2 of the endpoint device 104b form the bidirectional C-channel over the optical fibre of the QKD link 103b.

For the QKD links 103c and 103d, these QKD links 103c and 103d are assigned to endpoint devices 104c and 104d, respectively. Thus, each QKD link 103c and 103d is assigned/allocated a corresponding Q-RX 106a-2 and 106b-2 from the plurality of Q-RXs 106a-2 to 106n-2 of the QCC 106. As well, each of these QKD links 103c and 103d is also allocated/assigned a CTXR 108c and 108d, respectively. Each of the QKD links 103c and 103d may be each implemented using a separate optical fibre. In this example, the optical fibre of the QKD link 103c associated with endpoint device 104c is optically coupled at one end to an optical multiplexor/demultiplexor 109c, which is also connected to the Q-RX 106a-2 and CTXR 108c allocated to endpoint device 104c. The optical fibre of the QKD link 103c is also optically coupled at the other end to the endpoint device's optical multiplexor/demultiplexor 111c, which is connected to the Q-TX 105c-3 and CTXR 105c-2 of the endpoint device 104c. The Q-RX 106a-2 of the QCC 106 and Q-TX 105c-3 of the endpoint device 104c form the Q-channel over the optical fibre of the QKD link 103c for communicating, when required, quantum information transmitted from the endpoint device 104c using Q-TX 105c-3 to the QCC 106 of the QKD linking apparatus 102. As well, the CTXR 108c of the CTRC 108 and CTXR 105c-2 of the endpoint device 104c form the bidirectional C-channel over the optical fibre of the QKD link 103c. As well, the optical fibre of the QKD link 103d associated with endpoint device 104d is optically coupled at one end to the optical multiplexor/demultiplexor 109d of the QKD linking apparatus 102, which is connected to the Q-RX 106b-2 and CTXR 108d assigned/allocated to endpoint device 104d. The optical fibre of the QKD link 103d is also optically coupled at the other end to the optical multiplexor/demultiplexor 111d of the endpoint device 104d, which is connected to the Q-TX 105d-3 and CTXR 105d-2 of the endpoint device 104d. The Q-RX 106b-2 of the QCC 106 and Q-TX 105d-3 of the endpoint device 104d form the Q-channel over the optical fibre of the QKD link 103d for communicating quantum information associated with the endpoint device 104d from the Q-TX 105d-3 of the endpoint device 104d. As well, the CTXR 108d of the CTRC 108 and CTXR 105d-2 of the endpoint device 104d form the bidirectional C-channel over the optical fibre of the QKD link 103d.

For the QKD links 103i and 103k, these QKD links 103i and 103k are assigned to endpoint devices 104i and 104k, respectively. Thus, each QKD link 103i and 103k is assigned/allocated a corresponding Q-RX 106i-2 and 106n-2 from the plurality of Q-RXs 106a-2 to 106n-2 of the QCC 106. As well, each QKD link 103i and 103k is assigned/allocated a corresponding Q-TX 106l-1 and 106m-1 from the plurality of Q-TXs 106a-1 to 106m-1 of the QCC 106. As well, each of these QKD links 103i and 103k is also allocated/assigned a CTXR 108i and 108k, respectively. Each of the QKD links 103i and 103k may be each implemented using a separate optical fibre. In this example, the optical fibre of the QKD link 103i associated with endpoint device 104i is optically coupled at one end to an optical multiplexor/demultiplexor 109i, which is also connected to the Q-RX 106i-2 and CTXR 108i allocated to endpoint device 104i. The optical fibre of the QKD link 103i is also optically coupled at the other end to the endpoint device's optical multiplexor/demultiplexor 111i, which is connected to the Q-TX 105i-3, Q-RX 105i-1 and CTXR 105i-2 of the endpoint device 104i. In this example, the Q-channel of the QKD link 103i is a bidirectional Q-channel, where the Q-RX 106i-2 of the QCC 106 and Q-TX 105i-3 of the endpoint device 104i form a first unidirectional Q-channel over the optical fibre of the QKD link 103i for communicating, when required, quantum information transmitted from the endpoint device 104i using Q-TX 105i-3 to the QCC 106 of the QKD linking apparatus 102, and the Q-RX 105i-1 of the endpoint device 104i and the Q-TX 106l-1 of the QCC 106 form a second uni-directional Q-channel over the optical fibre of the QKD link 103i for communicating, when required, quantum information transmitted from the QCC 106 using Q-TX 106l-1 to Q-RX 105i-1 of the endpoint device 104i. As well, the CTXR 108i of the CTRC 108 and CTXR 105i-2 of the endpoint device 104i form the bidirectional C-channel over the optical fibre of the QKD link 103i. As well, the optical fibre of the QKD link 103k associated with endpoint device 104k is optically coupled at one end to the optical multiplexor/demultiplexor 109k of the QKD linking apparatus 102, which is connected to the Q-TX 106m-1, Q-RX 106n-2 and CTXR 108k assigned/allocated to endpoint device 104k. The optical fibre of the QKD link 103k is also optically coupled at the other end to the optical multiplexor/demultiplexor 111k of the endpoint device 104k, which is connected to the Q-TX 105k-3, Q-RX 105k-1 and CTXR 105k-2 of the endpoint device 104k. The QKD link 103k also has a bidirectional Q-channel, where the Q-RX 106n-2 of the QCC 106 and Q-TX 105k-3 of the endpoint device 104k form the first uni-directional Q-channel over the optical fibre of the QKD link 103k for communicating quantum information associated with the endpoint device 104k from the Q-TX 105k-3 of the endpoint device 104k to the Q-RX 106n-2 of QCC 106 of the QKD linking apparatus 102, and where the Q-TX 106m-1 of the QCC 106 and Q-RX 105k-1 of the endpoint device 104k form the second uni-directional Q-channel over the optical fibre of the QKD link 103k for communicating quantum information associated with the endpoint device 104k from the Q-TX 106m-1 of the QCC 106 of QKD linking apparatus 102 to the Q-RX 105k-1 of the endpoint device 104k. As well, the CTXR 108k of the CTRC 108 and CTXR 105k-2 of the endpoint device 104k form the bidirectional C-channel over the optical fibre of the QKD link 103k.

Each of the endpoint devices 104a-104k have been allocated a different QKD link of the plurality of QKD links 103a-103k. Once each of the endpoint devices 104a-104k is connected to the QKD linking apparatus 102 via the QKD links 103a-103k, each endpoint devices may wish to form or join a quantum network and/or perform quantum-secure communications therebetween with one or more other endpoint devices 104a-104k and the like. In order to do this, the C-channel of the QKD links 103a-103c of those two or more endpoint devices 104a-104c need to be secured with a QKD key or quantum-safe key. Thus, the controller 110 of the QKD linking apparatus 102 may be configured to perform a QKD key exchange protocol involving the two or more endpoint devices 104a-104c that wish to join and/or form a quantum network and/or securely communicate with each other and the like. The controller 110, when performing the QKD protocol, may instruct the QCC 106 to generate quantum random numbers or bits (or a QKD key) from a quantum generator 152a (or random number generator) for each of the two or more endpoint devices 104a-104c, where the quantum bits generated for each endpoint device 104a is required to be transmitted as quantum information to that endpoint device 104a. Furthermore, during performance of the QKD protocol, the controller 110 may be required to generate classical data or bits for classical transmission to and/or route any received classical transmissions from the QKD links 103a-103c of the one or more other endpoint devices 104a-104c to other endpoint devices 104a-104c, where the generated classical data or bits and/or received classical transmissions are required to be sent over the correct C-channel of the QKD link connected to the endpoint device requiring reception of these classical transmission(s).

Figure 1D:
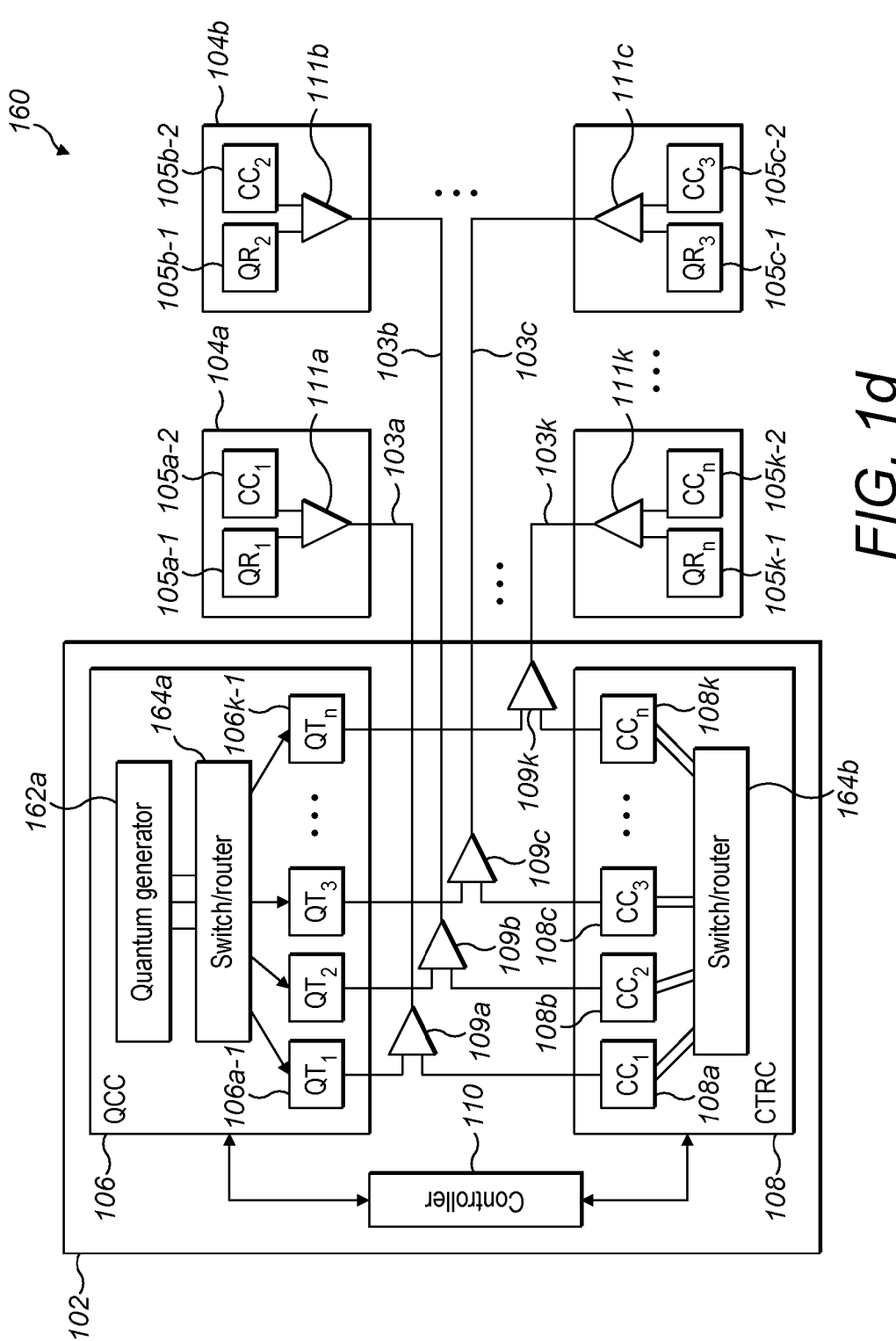
FIG. 1d is a schematic diagram illustrating a further example QKD switching system according to some embodiments of the invention.

FIG. 1d is a schematic diagram illustrating another example QKD switching system 160 with QKD linking apparatus 102 according to the invention. For simplicity, reference numerals used in FIG. 1a or 1b are reused for the same or similar components when describing FIG. 1d. The QKD switching system 160 is based on the QKD switching system 100 as described with reference to FIG. 1a but has been modified to further illustrate an example of coupling of the QKD links 103a-103k from the QCC 106 and CTRC 108 of the QKD linking apparatus 102 to each corresponding endpoint 104a-104k. The QKD linking apparatus 102 has been further modified by including optical multiplexor/demultiplexors 109a-109k that each optically couple the QCC 106 and CTRC 108 to the corresponding Q-channel and C-channel(s) of each of the QKD links 103a-103k of each of the corresponding endpoints 104a-104k. Each QKD link 103a of the plurality of QKD links 103a-103k is allocated and mapped to a single but different endpoint 104a of the plurality of endpoint devices 104a-104k. That is, there is a one-to-one mapping of each of the QKD links 103a-103k to a different endpoint of the plurality of endpoints 104a-104k.

The QCC 106 is further modified to include a plurality of quantum transmitters 106a-106k, each quantum transmitter of the plurality of quantum transmitters (Q-TX(s)) 106a-106 is coupled to a corresponding one of the optical multiplexors 109a-109k. The CTRC 108 also includes a plurality of classical communication transceivers (CTXR(s)) 108a-108k, in which each of the CTXR(s) 108a-108k are communicatively coupled to a corresponding one of the optical multiplexors 109a-109k. In this example, the communication medium of each QKD link 103a is an optical communication medium such as an optical fibre (or multiple optical fibres) and the coupling of the optical fibre of each QKD link 103a to the QCC 106 and CTRC 108 of the QKD linking apparatus 102 is implemented using one of the corresponding one of the optical multiplexor/demultiplexors 109a-109k each of which allows multiple communications channels such as the C-channel(s) and Q-channel of the QKD link 103a to share the same optical fibre. Similarly, each endpoint device 104a of the plurality of endpoint devices 104a-104k includes a quantum receiver (Q-RX) 105a-1 and a classical transceiver (CTXR) 105a-2, which are coupled to a corresponding optical multiplexor/demultiplexor 111a. Thus, the optical fibre of the QKD link 103a associated with endpoint device 104a is optically coupled at one end to the optical multiplexor/demultiplexor 109a of the QKD linking apparatus 102 and optically coupled at the other end to the optical multiplexor/demultiplexor 111a of the endpoint device 104a. The Q-TX 106a of the QCC 106 and Q-RX 105a-1 of the endpoint device 104a are used to form the Q-channel over the optical fibre of the QKD link 103a for communicating quantum information thereto. As well, the CTXR 108a of the CTRC 108 and CTXR 105a-2 of the endpoint device 104a are used to form the bidirectional C-channel over the optical fibre of the QKD link 103a. For each QKD link 103a of the plurality of QKD links 103a-103k, the Q-channel and bidirectional C-channel(s) may be separated using WDM/DWDM techniques and/or hardware.

In this example, several QKD links 103a-103k are illustrated whereby each endpoint device 104a, 104b, 104c and so on to endpoint device 104k are each allocated a Q-TX 106a, 106b, 106c and so on to Q-TX 106k of the QCC 106. Furthermore, each endpoint device 104a, 104b, 104c and so on to endpoint device 104k are each allocated a CTXR 108a, 108b, 108c, and so on to CTXR 106k. Each of the QKD links 103a, 103b, 103c and so on to 103k are each implemented using a separate optical fibre. In this example, the optical fibre of the QKD link 103a associated with endpoint device 104a is optically coupled at one end to an optical multiplexor/demultiplexor 109a, which is also connected to the Q-TX 106a and CTXR 108a allocated to endpoint device 104a. The optical fibre of the QKD link 103a is also optically coupled at the other end to the endpoint device's optical multiplexor/demultiplexor 111a, which is connected to the Q-RX 105a-1 and CTXR 105a-2 of the endpoint device 104a. The Q-TX 106a of the QCC 106 and Q-RX 105a-1 of the endpoint device 104a form the Q-channel over the optical fibre of the QKD link 103a for communicating, when required, quantum information associated with the endpoint device 104a. As well, the CTXR 108a of the CTRC

108 and CTXR 105a-2 of the endpoint device 104a form the bidirectional C-channel over the optical fibre of the QKD link 103a.

In this example, the optical fibre of the QKD link 103b associated with endpoint device 104b is optically coupled at one end to the optical multiplexor/demultiplexor 109b of the QKD linking apparatus 102, which is connected to the Q-TX 106b and CTXR 108b allocated to endpoint device 104b. The optical fibre of the QKD link 103b is also optically coupled at the other end to the optical multiplexor/demultiplexor 111b of the endpoint device 104b, which is connected to the Q-RX 105b-1 and CTXR 105b-2 of the endpoint device 104b. The Q-TX 106b of the QCC 106 and Q-RX 105b-1 of the endpoint device 104b form the Q-channel over the optical fibre of the QKD link 103b for communicating quantum information associated with the endpoint device 104b. As well, the CTXR 108b of the CTRC 108 and CTXR 105b-2 of the endpoint device 104b form the bidirectional C-channel over the optical fibre of the QKD link 103b.

In this example, the optical fibre of the QKD link 103c associated with endpoint device 104c is optically coupled at one end to the optical multiplexor/demultiplexor 109c of the QKD linking apparatus 102, which is connected to the Q-TX 106c and CTXR 108c allocated to endpoint device 104c. The optical fibre of the QKD link 103c is also optically coupled at the other end to the optical multiplexor/demultiplexor 111c of the endpoint device 104c, which is connected to the Q-RX 105c-1 and CTXR 105c-2 of the endpoint device 104c. The Q-TX 106c of the QCC 106 and Q-RX 105c-1 of the endpoint device 104c form the Q-channel over the optical fibre of the QKD link 103c for communicating quantum information associated with the endpoint device 104c. As well, the CTXR 108c of the CTRC 108 and CTXR 105c-2 of the endpoint device 104c form the bidirectional C-channel over the optical fibre of the QKD link 103c.

In this example, the optical fibre of the QKD link 103k associated with endpoint device 104k is optically coupled at one end to the optical multiplexor/demultiplexor 109k of the QKD linking apparatus 102, which is connected to the Q-TX 106k and CTXR 108k allocated to endpoint device 104k. The optical fibre of the QKD link 103k is also optically coupled at the other end to the optical multiplexor/demultiplexor 111k of the endpoint device 104k, which is connected to the Q-RX 105k-1 and CTXR 105k-2 of the endpoint device 104k. The Q-TX 106k of the QCC 106 and Q-RX 105k-1 of the endpoint device 104k form the Q-channel over the optical fibre of the QKD link 103k for communicating quantum information associated with the endpoint device 104k. As well, the CTXR 108k of the CTRC 108 and CTXR 105k-2 of the endpoint device 104k form the bidirectional C-channel over the optical fibre of the QKD link 103k.

Each of the endpoint devices 104a-104k have been allocated a different QKD link of the plurality of QKD links 103a-103k. Once each of the endpoint devices 104a-104k is connected to the QKD linking apparatus 102 via the QKD links 103a-103k, each endpoint devices may wish to form or join a quantum network and/or perform quantum-secure communications therebetween with one or more other endpoint devices 104a-104k and the like. In order to do this, the C-channel of the QKD links 103a-103c of those two or more endpoint devices 104a-104c need to be secured with a QKD key or quantum-safe key. Thus, the controller 110 of the QKD linking apparatus 102 may be configured to perform a QKD key exchange protocol involving the two or more endpoint devices 104a-104c that wish to join and/or form a quantum network and/or securely communicate with each other and the like. The controller 110, when performing the QKD protocol, may instruct the QCC 106 to generate quantum random numbers or bits (or a QKD key) from a quantum generator 162a (or random number generator) for each of the two or more endpoint devices 104a-104c, where the quantum bits generated for each endpoint device 104a is required to be transmitted as quantum information to that endpoint device 104a. Furthermore, during performance of the QKD protocol, the controller 110 may be required to generate classical data or bits for classical transmission to and/or route any received classical transmissions from the QKD links 103a-103c of the one or more other endpoint devices 104a-104c to other endpoint devices 104a-104c, where the generated classical data or bits and/or received classical transmissions are required to be sent over the correct C-channel of the QKD link connected to the endpoint device requiring reception of these classical transmission(s).

In order to do this, the controller 110 may look-up the one-to-one mappings of the Q-TXs 106a-106c that has been assigned to each of the two or more endpoint devices 104a-104c and also look-up the one-to-one mappings of the CTRXs 108a-108c assigned to each of the two or more endpoint devices 104a-104c. Thus, during the QKD protocol, the controller 110 is configured to communicate the Q-TX 106a and CTRX 108a used on the QKD link 103a of endpoint device 104a to the QCC 106 so QCC 106 may select the required Q-TX 106a and/or the required CTXR 108a for use with the corresponding Q-channel and/or C-channel, respectively, of the QKD link 103a of the endpoint device 103a that required to receive the quantum transmission or classical transmission. For example, when performing the QKD protocol, the controller 110 may instruct the QCC 106 to generate quantum random numbers or bits (or a QKD key) from the quantum generator 162a (or random number generator) for each of the two or more endpoint devices 104a-104c, and so for each endpoint device 104a of the two or more endpoint devices 104a-104c the controller 110 selects the Q-TX 106a and CTXR 108a coupled to the QKD link 103a of said each endpoint device 103a and directs the quantum generator 162a to connect, using the switching/routing module 164a, to the selected Q-TX 106a coupled to the Q-channel of the QKD link 103a of said endpoint 104a and thus enable quantum transmission of the quantum bits generated for the endpoint device 104a by the quantum generator 162a as part of the QKD protocol and the like. In another example, when performing the QKD protocol, the controller 110 may be required to generate classical data for classical transmission and/or route classical data received by CTRXs 108b-108c assigned to other endpoint devices 104b and 104c that are meant for classical transmission to endpoint device 104a. The controller 110 may instruct the CTRC 108 to route the classical data and/or received classical transmissions to the required endpoint device 104 by selecting the CTXR 108a coupled to the QKD link 103a of said endpoint device 104a requiring the classical transmission(s) and, using the switching/routing module 164b, directs the classical transmissions to the selected CTRX 108a coupled to the C-channel of the QKD link 103a of said endpoint 104a and thus enable classical transmission of the classical data and/or routing of the received classical transmissions to the endpoint device 104a as part of the QKD protocol and the like. The controller 110 may perform this selection of Q-TX(s) and/or CTXR(s) for each of the endpoint devices 104a-104c that are together performing a QKD protocol for exchanging QKD keys and/or group QKD keys and the like according to the QKD protocol.

Furthermore, the controller 110 may be further configured to perform the corresponding QKD protocol steps of generating QKD keys using one or more random number generators 162a, and transmitting said generated QKD keys using quantum transmissions to each of the endpoint devices 104a-104c associated with performing the QKD protocol for secure communications therebetween. Thus, at certain points during performance of the QKD protocol, the controller 110 will select the Q-TX(s) 106a of the Q-TX(s) 106a-106k assigned to a particular endpoint 104a of the plurality of endpoints 104a-104k and direct the switching/routing module 164a to direct the quantum transmissions using the selected Q-TX 106a to the corresponding Q-channel of the QKD link 103a associated with the endpoint device 104a requiring the quantum transmissions (e.g. receiving QKD keys and the like) over the corresponding Q-channels during the QKD protocol. Thus, the QKD linking apparatus 102 (e.g. central linking party) may transmit, according to the QKD protocol, corresponding randomly generated QKD keys over each Q-channel to corresponding endpoint devices using the Q-TX(s) assigned/allocated to said endpoint devices. If the QCC 106 has two or more random number generator(s) 162a or the same quantum random bits are required to be sent to multiple endpoints 104a-104c based on steps of the QKD protocol, then the quantum transmissions to each individual device requiring the quantum random bits may be performed simultaneously using the Q-TX assigned to each individual endpoint device. Additionally or alternatively, the QKD linking apparatus 102 (e.g. central linking party) may transmit, according to the QKD protocol, corresponding randomly generated QKD keys over each Q-channel to corresponding endpoint devices in a sequential manner when it is required to transmit to multiple Q-RXs 105a-1 to 105c-1 of corresponding endpoint devices 104a-104c, where the quantum data for quantum transmission is switched to the Q-TX 106a assigned to each endpoint device 104a, using the switching/routing module 162a, for connecting to the corresponding Q-channel of the endpoint device 104a at the appropriate time. One advantage of the QKD linking apparatus 102 for performing its operations sequentially for at least two endpoint devices or a group of endpoint devices when performing a QKD protocol therebetween is that the hardware components such as, without limitation, for example the quantum generator and high-speed processing systems may be minimised as there is no need for all these hardware components to be replicated or duplicated, rather the controller 110 may enable common components such as quantum generator and high-speed processing systems to be shared over or between the QKD links of the at least two endpoint devices and/or the group of devices. This may be achieved by the controller 110 controlling the operation of the QKD protocol by directing, at the required time, the switching/routing module 164a to switch/route an incoming quantum bit stream (e.g. generated/retrieved from a component of the QCC 106 such as, without limitation, for example a shared quantum generator 162a or quantum key storage) from a previous Q-TX 106k to the required Q-TX 106a for quantum transmission of the quantum bit stream onto the correct Q-channel of the QKD link 103a connected to an endpoint device 104a requiring said incoming quantum bit stream. Subsequent incoming quantum bit streams for other endpoint devices 104b-104c may cause the controller 110 to direct the switching/routing module 164a to switch/route the subsequent incoming quantum bit stream to another Q-channel of another QKD link 103*b* of another endpoint device 104*b* of the associated at least two devices or group of devices performing the QKD protocol with said endpoint device 104*a*. Thus, common components of the QKD linking apparatus 102 may be shared over different QKD links 103*a*-103*k* by judicious control and use of the switching/routing module 122*a*. For classical transmissions over the C-channel of each QKD link 103*a*-103*c* connected to each of the two or more devices 104*a*-104*c* during performance of the QKD protocol when exchanging keys and/or thereafter for subsequent secure communications between the two or more endpoint devices 104*a*-104*c* that are secured using the exchanged keys, the controller 110 may be configured to direct the switching/routing module 164*b* of the CTRC 108 to perform, at the required times during the QKD protocol and/or in subsequent communications, packet switching to "switch/route" classical transmission messages between the different classical transmitters/receivers 105*a*-2 to 105*c*-2 of said endpoint devices 104*a*-104*c*. The QKD controller 110 may be further configured to perform, without limitation, for example switching/routing and/or connecting classical transceivers (C-TRX(s)) 108*a*-108*k* to the appropriate classical communication channels (C-channels) of the corresponding QKD links 103*a*-103*k* of two or more endpoints 104*a*-104*k* when required during performance of one or more QKD protocol(s) for routing classical communications between the C-channels of each of the QKD links 103*a*-103*c* of said two or more endpoints 104*a*-104*c* when required during the performance of the QKD protocol(s) and/or thereafter for switching/routing the corresponding C-channels of said QKD links 103*a*-103*c* to enable the at least two endpoints 104*a*-104*c* to securely communicate with each other using, without limitation, for example the corresponding exchanged keys, group keys, QKD keys and/or group QKD keys and the like based on said QKD protocol(s) performed therebetween.

The QKD switching system 160 provides a means of creating a QKD network between multiple end-points 104*a*-104*k*, allowing any end-point to exchange quantum-encoded signals with any other end-point. Many thousands of end-points may be supported, and the connection cost is relatively low. Depending on the QKD protocol(s) used and implemented, only limited trust is required from the QKD devices 104-104*k* and/or QKD linking apparatus 102, which makes it feasible to deploy the QKD linking apparatus and associated technology in roadside cabinets (with limited physical protection) as well as in switching centres and/or exchanges. It is also unnecessary to provide individual fibres from end-points 104*a*-104*k* to a central location such as an exchange, rather it can be a "last mile" solution where fibre is rolled out from a roadside cabinet and/or mini-exchange to individual endpoints allowing costs to be reduced and bandwidth to be shared and the like.

The QKD switching system 160 may therefore be deployed, without limitation, for example as a "last-mile" solution, to connect offices and homes into a QKD network. In preferred embodiments, the communication medium of each QKD link 103*a* is the same and is shared by the Q-channel and C-channel. For example, the communication medium of each QKD link 103*a* may include at least one optical fibre in which the Q-channel and C-channel of the QKD link carry corresponding quantum and classical optical communications signals over the at least one optical fibre. For example, the QKD link 103*a* may be a single optical fibre in which the Q-channel and C-channel are shared on the same optical fibre. In another example, for added security, the QKD link 103*a* may be at least two optical fibres, where a first optical fibre of the QKD link is used as the Q-channel and the second optical fibre of the QKD link 103*a* is used as the C-channel of the QKD link 103*a*.

Although each of the QKD links 103*a*-103*k* of FIG. 1*d* has been described as having a communication medium based on an optical communication medium such as an optical fibre and the like, this is for simplicity and byway of example only and the invention is not so limited, it is to be appreciated by the skilled person that one or more of the QKD links 103*a*-103*k* may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QCC component 106 of QKD linking apparatus 102 of FIG. 1*d* has been described as including a plurality of quantum transmitters or Q-TX(s) 106*a*-106*k* for enabling quantum transmission over a quantum channel of one or more QKD links 103*a*-103*k* of said endpoint devices 104*a*-104*k*, the QCC component 106 may be further modified to include one or more quantum receivers (Q-RX(s)) in which one or more of the QKD links 103*a*-103*k* may each be configured to include a unidirectional or bidirectional quantum channel that couples with said one or more Q-RX(s) for receiving quantum transmissions from the corresponding endpoint to the QKD linking apparatus 102. As previously described, this will enable additional QKD protocols requiring an endpoint to transmit quantum information to the QKD linking apparatus 102 to be implemented by the QKD linking apparatus 102 and corresponding endpoint(s), where each endpoint 104*a* may include a Q-TX for transmitting quantum information over a quantum channel of the QKD link 103*a* to the QKD linking apparatus 102 during operation of said additional QKD protocol and the like, and/or as the application demands.

Figure 1E:
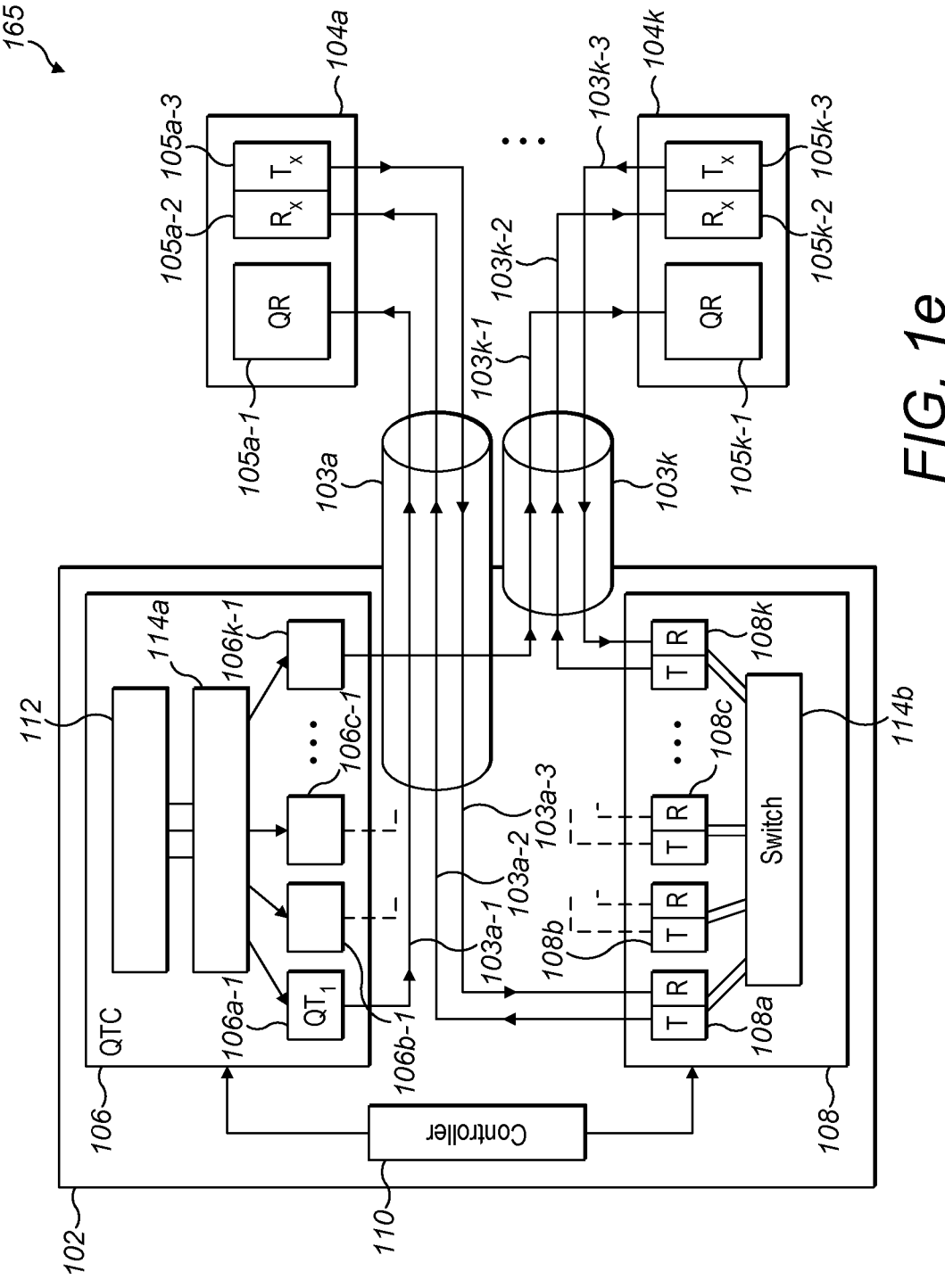
FIG. 1e is a schematic diagram illustrating of yet a further example QKD switching system according to some embodiments of the invention.

FIG. 1*e* is a schematic diagram illustrating another example QKD switching system 165 with QKD linking apparatus 102 according to the invention. For simplicity, reference numerals used in FIG. 1*a* or 1*d* are reused for the same or similar components when describing FIG. 1*e*. The QKD switching system 165 is based on the QKD switching system(s) 100, 120, 130, 140, 150, or 160 as described with reference to FIGS. 1*a*-1*d* but with further modifications in relation to coupling of the QKD links 103*a*-103*k* from the QCC 106 and CTRC 108 of the QKD linking apparatus 102 to each corresponding endpoint 104*a*-104*k*. Rather than the QKD linking apparatus 102 including optical multiplexors/demultiplexors 109*a*-109*k* and/or 111*a*-111*k* as described with reference to FIG. 1*c* or 1*d*, in which an optical fibre is used to share the Q-channel and C-channels of each QKD link, instead, each QKD link 103*a* uses two or more optical fibres that are each allocated to one of a Q-channel and one or more C-channel(s) of the QKD link 103*a*. The QCC 106 includes a plurality of Q-TX(s) 106*a*-1 to 106*k*-1, in which each of the Q-TX(s) 106*a*-1 to 106*k*-1 is assigned to corresponding ones of the plurality of endpoint devices 104*a*-104*k*. The CTRC 108 includes a plurality of CTXR(s)

108a-108k, in which each of the CTXR(s) 108a-108k is assigned to corresponding ones of the plurality of endpoint devices 104a-104k. In this example, each QKD link 103a that is assigned to each endpoint device 104a of the endpoint devices 104a-104k uses a first, second and third single optical fibre 103a-1, 103a-2 and 103a-3, respectively, for carrying quantum transmissions over a Q-channel and classical transmissions over the bidirectional C-channel (or two unidirectional C-channels). For each QKD link 103a of the plurality of QKD links 103a-103k that is assigned to each endpoint device 103a of the plurality of endpoint devices 103a-103k, the controller 110 also stores a mapping, for each of the endpoint devices 104a-104k, of which Q-TX 106a-1 and CTXR 108a is assigned to each endpoint device 104a for use in connecting to the Q-channel and C-channel(s) of the QKD link 103a. In this example, when QKD link 103a is assigned to endpoint device 103a, then the controller 110 assigns Q-TX 106a-1 and CTRX 108a to the endpoint device 103a, stores this mapping to ensure the controller 110 controls the switching/routing modules 114a and 114b to ensure quantum transmissions and/or classical transmissions addressed to the endpoint device 103a are transmitted to the endpoint device 103a over the Q-channel and/or C-channel(s) of the QKD link 103a assigned to the endpoint device 104a.

In this example, several QKD links 103a-103k are illustrated to be each assigned to a different corresponding endpoint device of the plurality of endpoint devices 104a-104k. Each endpoint device 104a-104k is assigned or allocated one different QTX 106a-1 from the plurality of Q-TX(s) 106a-1 to 106k-1 of the QCC 106, and each endpoint device 104a-104k is assigned or allocated one different CTRX 108a from the plurality of CTRX(s) 108a-108k. Each of the QKD links 103a-103k are each implemented using a several optical fibres. In this example, the QKD link 103a uses a first optical fibre 103a-1 is coupled at a first end to the Q-TX 106a-1 assigned to the endpoint device 104a and coupled at a second end to the Q-RX 105a-1 of the endpoint device 104a to form the Q-channel of the QKD link 103a. The QKD link 103a also uses a second optical fibre 103a-2 that is coupled at a first end to the transmitter of the CTRX 108a assigned to the endpoint device 104a and coupled at a second end to the classical receiver 105a-2 of the endpoint device 104a to form a unidirectional C-channel of the QKD link 103a for transmitting classical data or data packets/messages from the CTRC 108 to the endpoint device 104a. The bidirectional C-channel is formed by the QKD link 103a using a third optical fibre 103a-3 that is coupled at a first end to the classical transmitter 105a-3 of the endpoint device 104a and coupled at a second end to the classical receiver of the CTRX 108a assigned to the endpoint device 104a to form a unidirectional C-channel of the QKD link 103a for transmitting classical data or data packets/messages from the endpoint device 104a to the CTRC 108 of the QKD linking apparatus 102. The QKD link 103k assigned to endpoint device 104k uses a first optical fibre 103k-1 that is coupled at a first end to the Q-TX 106k-1 assigned to the endpoint device 104k and coupled at a second end to the Q-RX 105k-1 of the endpoint device 104k to form the Q-channel of the QKD link 103k. The QKD link 103k also uses a second optical fibre 103k-2 that is coupled at a first end to the transmitter of the CTRX 108k assigned to the endpoint device 104k and coupled at a second end to the classical receiver 105k-2 of the endpoint device 104k to form a unidirectional C-channel of the QKD link 103k for transmitting classical data or data packets/messages from the CTRC 108 to the endpoint device 104k. The bidirectional C-channel is formed by the QKD link 103k using a third optical fibre 103k-3 that is coupled at a first end to the classical transmitter 105k-3 of the endpoint device 104k and coupled at a second end to the classical receiver of the CTRX 108k assigned to the endpoint device 104k to form a unidirectional C-channel of the QKD link 103k for transmitting classical data or data packets/messages from the endpoint device 104k to the CTRC 108 of the QKD linking apparatus 102.

Each of the endpoint devices 104a-104k have been allocated a different QKD link from the plurality of QKD links 103a-103k. Once each of the endpoint devices 104a-104k is connected to the QKD linking apparatus 102 via their corresponding QKD links 103a-103k, each endpoint devices may wish to form or join a quantum network and/or perform quantum-secure communications therebetween with one or more other endpoint devices 104a-104k and the like as described with reference to FIGS. 1a to 1d and/or as described herein, modifications thereof, combinations thereto and/or as the application demands.

The QKD switching system 165 also provides a means of creating a QKD network between multiple end-points 104a-104k, allowing any end-point to exchange quantum-encoded signals with any other end-point. Many thousands of end-points may be supported, and the connection cost is relatively low. Depending on the QKD protocol(s) used and implemented, only limited trust is required from the QKD devices 104-104k and/or QKD linking apparatus 102, which makes it feasible to deploy the QKD linking apparatus and associated technology in roadside cabinets (with limited physical protection) as well as in switching centres and/or exchanges. It is also unnecessary to provide individual fibres from end-points 104a-104k to a central location such as an exchange, rather it can be a "last mile" solution where each optical fibre for an endpoint is rolled out from a roadside cabinet and/or mini-exchange to individual endpoints allowing costs to be reduced and bandwidth to be shared and the like. The QKD switching system 165 may therefore be deployed, without limitation, for example as a "last-mile" solution, to connect offices and homes into a QKD network.

Although each of the QKD links 103a-103k of FIG. 1e have been described as having a communication medium based on an optical communication medium such as one or more optical fibres and the like, this is for simplicity and by way of example only and the invention is not so limited, it is to be appreciated by the skilled person that one or more of the QKD links 103a-103k may be further modified and/or implemented using any other suitable communication medium that is capable of propagating and/or transmitting quantum information over the quantum channel of the corresponding QKD link such as, without limitation, for example propagate an electromagnetic signal with wavelengths in the visible and/or non-visible electromagnetic spectrum such as, without limitation, visible light, near-infra-red light, infra-red light, microwave and/or Terahertz wavelengths and/or any other suitable electromagnetic wavelength for use in at least quantum communications and/or non-quantum communications. Alternatively of additionally, different communication mediums may be used for the quantum channel and/or classical channel(s) of each QKD link and the like.

Although the QCC component 106 of QKD linking apparatus 102 of FIG. 1e has been described as including a plurality of quantum transmitters or Q-TX(s) 106a-1 to 106k-1 for enabling quantum transmission over a quantum channel of one or more QKD links 103a-103k of said endpoint devices 104a-104k, the QCC component 106 may be further modified to include one or more quantum receivers (Q-RX(s)) in which one or more of the QKD links 103a-103k may each be configured to include a unidirectional or bidirectional quantum channel over a fourth optical fibre optically connected to a Q-TX at the endpoint and one of the Q-RX(s) at the QKD linking apparatus 102 for receiving quantum transmissions from the corresponding endpoint over the fourth optical fibre. As previously described, this will enable additional QKD protocols requiring an endpoint to transmit quantum information over the fourth optical fibre to the QKD linking apparatus 102 to be implemented by the QKD linking apparatus 102 and corresponding endpoint(s), where each endpoint 104a includes a Q-TX for transmitting quantum information over a quantum channel of the QKD link 103a to the QKD linking apparatus 102 during operation of said additional QKD protocol and the like, and/or as the application demands.

Figure 1F:
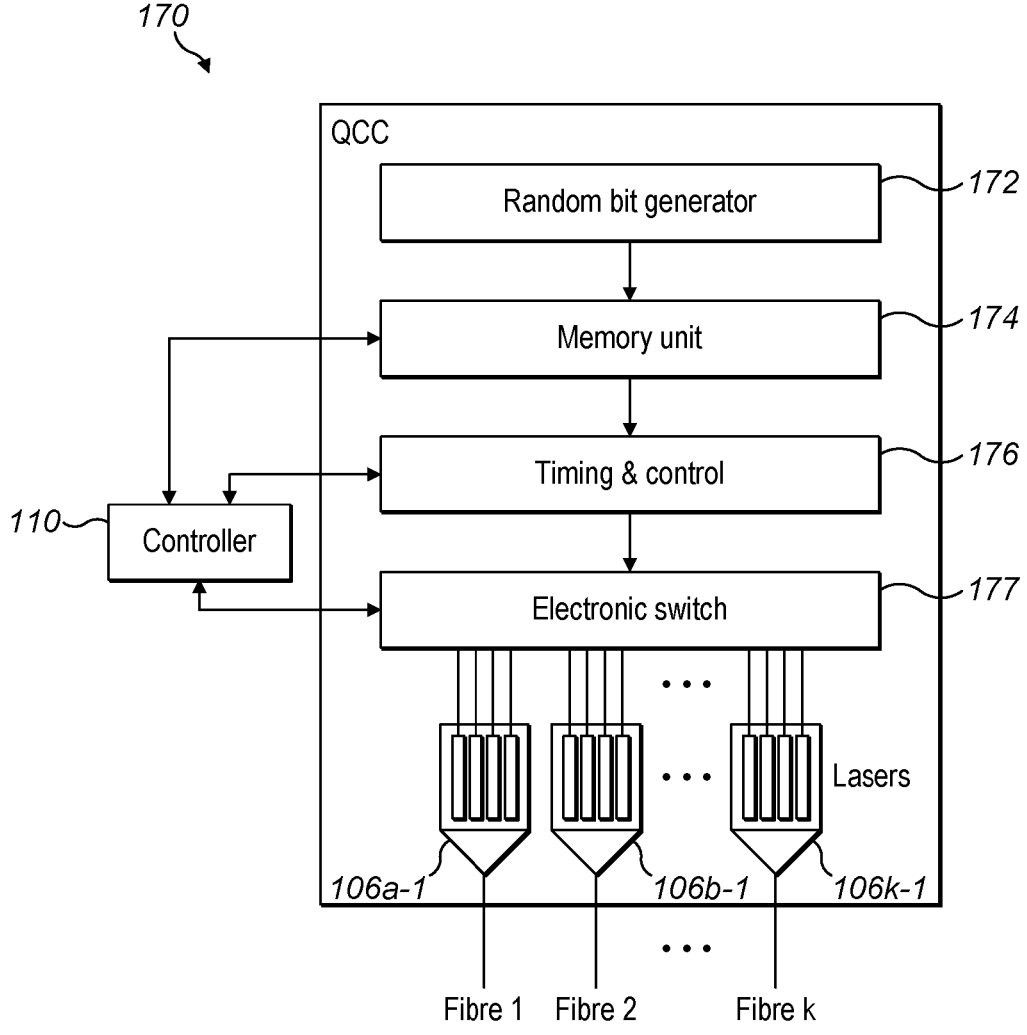
FIG. 1f is a schematic diagram illustrating an example quantum communication component for use in QKD switching system of FIGS. 1a to 1e, 1g, 1i and/or 2 to 5b according to some embodiments of the invention.

FIG. 1f is a schematic diagram illustrating an example quantum communication component (QCC) 170 for use in QKD switching systems 100, 120, 130, 140, 150, 160, and/or 165 as described with reference to FIGS. 1a to 1e, and/or as herein described, modifications thereto and/or as the application demands. The QCC 170 includes a random bit generator 172 (e.g. quantum generator, quantum or chaotic random bit generator), memory unit, 174, timing and control unit 176, an electronic switch/router 177 and a plurality of quantum transmitters (Q-TXs) 106a-1 to 106k-1. The QCC 170 may also include a controller 110 and/or be connected to a controller 110 for controlling the operation of the random bit generator 172, memory unit 174, timing unit 176 and electronic switch/router 177 based on one or more QKD protocols for exchanging keys between two or more endpoint devices. Each Q-TX 106a-1 may be connected to an endpoint device via an optical fibre that is used to form a quantum channel (Q-channel) of a QKD link assigned to the endpoint device. The Q-TX(s) 106a-1 to 106k-1 may each be coupled to an optical fibre for forming a corresponding Q-Channel of a QKD link of the plurality of QKD links. As illustrated in FIG. 1f, the random bit generator 172 is connected to the memory unit 174, the memory unit is connected to the timing and control unit 176 and the timing and control unit is connected to the electronic switch/router 177. The electronic switch/router 177 is connected to each of the plurality of Q-TX(x) 106a-1 to 106k-1 and is configured to direct or switch/route one or more quantum random bit streams, which are generated by the random bit generator 172 for use by one or more endpoint devices, to the Q-TXs 106a-1 to 106k-1 assigned to the corresponding one or more endpoint devices. In essence, random bits are generated by the random bit generator 172 (e.g. quantum or chaotic random bit generator) and temporarily stored in the memory unit 174. Under command of the controller 110, bits or random bit streams will be read out of the memory 174 and sent, via an electronic switch/router 177, to the Q-TX allocated or assigned to an endpoint device.

Each of the Q-TX(s) 106a-1 to 106k-1 include a plurality of differently polarised lasers or optical lasers for transmitting quantum information over the optical fibre of the corresponding Q-Channel. Each Q-TX may include a number of N=2 m differently polarised lasers (e.g. M>1, for some QKD protocols N=4) for transmitting quantum information, each laser is coupled to the optical fibre. In this example, N=4 lasers each having one of 4 different polarisations. For example, the lasers of a Q-TX 106a-1 may be configured to have a rectilinear photon basis (e.g. vertical (0°) and horizontal (90°) polarisations) and diagonal photon basis (e.g. 450 and 1350 polarisations). As an option, each quantum channel may be a bundle of WDM/DWDM channels in which each laser of a Q-TX 106a-1 may use a different wavelength of light over the quantum channel based on WDM/DWDM techniques. Essentially, the lasers of a Q-TX 106a-1 are configured for transmitting the quantum signals and sync pulses associated with the quantum random bit stream to the endpoint device assigned to the Q-TX 106a-1. The endpoint device receiver will receive a few of the transmitted photons, and, depending on the QKD protocol, then use the classical IP-based channel (C-channel) of the QKD link assigned to the endpoint device to talk with controller 110 in accordance with the QKD protocol. Additionally and/or alternatively, as an option, the N=4 lasers of one or more of Q-TXs 106a-1 to 106k-1 may be replaced and/or reconfigured for use with other modulation techniques for the same or different QKD protocol and/or implementation of the QKD protocol being used and the like. For example, another modulation technique may include, without limitation, for example the time-bin approach in which a Q-TX 106a-1 may be configured to use beam splitters and interferometers to transmit four possible quantum states (e.g. one or other time bin, or in-phase or anti-phase combination of both bins and the like). Although polarisation and/or time-bin modulation schemes have been described, this is for simplicity and by way of example only and the invention is not so limited, it is to be appreciated by the skilled person that each of the Q-TX(s) may be implemented using any suitable quantum modulation scheme in relation to the communication medium being used for the quantum channel(s) and the like, modifications thereof, combinations thereto and/or as the application demands.

The controller 110 of the QCC 170 may be configured to assign each of the Q-TX(s) 106a-1 to 106k-1 to corresponding ones of the plurality of endpoint devices. Each of the Q-TX(s) 106a-1 to 106k-1 are assigned to a different endpoint device. The Q-TX 106a-1 that is assigned to an endpoint device is connected to the endpoint device by an optical fibre forming the Q-channel of the QKD link assigned to the endpoint device. For each QKD link of the plurality of QKD links that is assigned to each endpoint device of the plurality of endpoint devices, the controller 110 may store a mapping, for each of the endpoint devices, of which Q-TX 106a-1 is assigned to which endpoint device 104a for use in ensuring a random quantum bit stream generated for the endpoint device is transmitted over the Q-channel of the QKD link assigned to the endpoint device. Each of the endpoint devices are allocated a different QKD link from the plurality of QKD links.

During operation, the QCC 170 and/or under the control of the controller 110 when performing one or more QKD protocol(s) for exchanging keys between two or more endpoint devices, the random bit generator 172 (or quantum generator) may be configured to generate one or more random quantum bit streams, QKD keys and the like for use in transmission over one or more quantum channel(s) (Q-channel(s)) to the corresponding endpoint devices wishing to exchange keys according to the selected QKD protocol and the like. Each of the random quantum bit streams may be stored in a secure memory unit 174 until needed. Each random quantum bit stream may be used as a QKD key or OTP key and the like, hence a set of QKD keys/OTP keys or a set of keys may be stored in the memory unit 174. The memory unit 174 may be a secure memory such as, without limitation, for example a hardware security module (HSM), trusted security component or the like. The timing and control unit 176 may configured based on one or more QKD protocols to retrieve a random quantum bit stream stored in memory unit 174 for transmission over a quantum channel to an endpoint device. The timing and control unit 176 may be controlled by the controller 110, which may indicate which endpoint devices are performing a particular QKD protocol and so ensure the timing and control unit 176 retrieves and sends these endpoint devices the same or different quantum random bit streams (or QKD keys) at the correcting time during performance of the QKD protocol with these endpoint devices. The timing and control unit 176 provides each random quantum bit stream to the electronic switch/router 177, which with the assistance of the controller 110, is configured to direct/route or switch the input or incoming random quantum bit stream associated with an endpoint device to the Q-TX 106a-1 assigned to the endpoint device. Thus, the electronic switch/router 177 is configured to select, from the plurality of Q-TX(s) 106a-1 to 106k-1, the Q-TX 106a-1 assigned to the endpoint device and that is connected to the Q-Channel of the QKD link of the endpoint device that is meant to receive the incoming or received random quantum bit stream during performance of the QKD protocol with the two or more endpoint devices.

For example, the QKD protocol may require, without limitation, for example each endpoint device of two or more endpoint devices performing the QKD protocol to receive a different random set of quantum bits. Thus, a random set of quantum bits for an endpoint device may be retrieved from the memory unit 174 and sent to the electronic switch/router 177, which selects the Q-TX 106a-1 assigned to the endpoint device and directs the incoming retrieved random set of quantum bits to the selected Q-TX 106a-1 in which the lasers are configured to transmit the quantum signals and sync pulses associated with the quantum random bit stream over the Q-channel of the QKD link of the endpoint device. The endpoint device Q-RX may receive some of the transmitted photons, and, then use a classical IP-based channel (C-channel) of the QKD link of the endpoint device to indicate to the controller 110 which photons were received and the like. The controller 110 of the QCC 106 can discard away all other data associated with the quantum transmission of the retrieved random bit stream, and send its basis in relation to those random bits successfully by the Q-RX of the endpoint device. The retrieval and quantum transmission of another random quantum bit stream is repeated with another endpoint device, where another Q-TX 106b-1 assigned to transmit the other random quantum bit stream to the Q-RX of said another endpoint device; as part of the QKD protocol, the controller 110 may then send, without limitation, for example the XOR of the successfully received bits to one or other of the end point devices and clear memory unit 174 of the random quantum bit streams that were sent to these endpoint device. Then the remainder of the QKD protocol (e.g. the BB84/modified BB84 or other protocols from the BB84 family and the like) may be performed over the classical channel(s) (C-channel) of the QKD links of these endpoint devices. At the end of the QKD protocol, each of the endpoint devices will have exchanged a key or QKD key and may use the exchange key for secure communications between the endpoint devices over the C-Channels of the QKD links assigned to each endpoint device.

Although the QCC component 170 of FIG. 1*f* has been described as including a plurality of quantum transmitters or Q-TX(s) 106a-1 to 106k-1 for enabling quantum transmission over a quantum channel of one or more QKD links of said endpoint devices, the QCC component 106 may be further modified to include one or more quantum receivers (Q-RX(s)) in which one or more of the QKD links may each be configured to include a unidirectional or bidirectional quantum channel that couples with said one or more Q-RX(s) for receiving quantum transmissions from the corresponding endpoint to the QKD linking apparatus. As previously described, this will enable additional QKD protocols requiring an endpoint to transmit quantum information to the QKD linking apparatus to be implemented by the QKD linking apparatus and corresponding endpoint(s), where each endpoint may include a Q-TX for transmitting quantum information over a quantum channel of the QKD link to the QKD linking apparatus during operation of said additional QKD protocol and the like, and/or as the application demands.

Figure 1G:
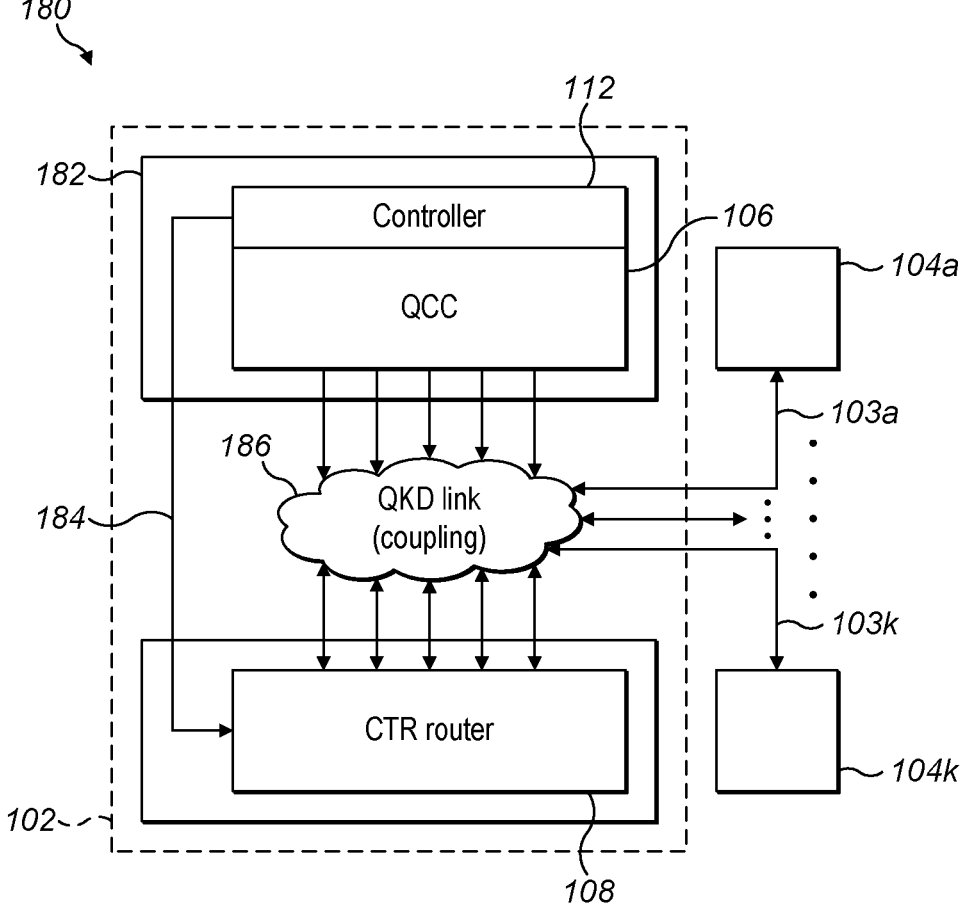
FIG. 1g is a schematic diagram illustrating another example QKD switching system according to some embodiments of the invention.

FIG. 1*g* is a schematic diagram illustrating another example QKD switching system 180 based on the QKD switching systems 100, 120, 130, 140, 150, 160 and/or 165 and/or QCC 170 as described with reference to FIGS. 1*a* to 1*f*. The QKD switching system 180 may further modify the QKD switching systems 100, 120, 130, 140, 150, 160, 165 and/or QCC 170 as described with reference to FIGS. 1*a*-1*f*. For simplicity, the reference numerals used in FIGS. 1*a*-1*f* may be reused by way of example only for similar or the same components in relation to FIG. 1*g*. The QKD switching system 180 may perform the same or similar functionality as the QKD switching systems 100, 120, 130, 140, 150, 160, 165 and/or QCC 170 as described with reference to FIGS. 1*a* to 1*f* but where the QKD linking apparatus 102 is divided into a first QKD component 182 (e.g. control and quantum communication component functionality) that is communicatively coupled to a second QKD component 184 (e.g. switching/routing and classical transmission functionality). In this example, the first QKD component 182 includes the controller 110 and the QCC 106 or 160 as described with reference to FIGS. 1*a* to 1*f*. The second QKD component includes the classical transmission and routing component 108. The first QKD component 182 and second QKD component 184 are coupled together via QKD link coupling arrangement or functionality/component 186 (e.g. multiplexor/demultiplexor arrangement 109a-109k of FIG. 1*c* or 1*d* and/or one or more optical fibres as described with reference to FIG. 1*e*, modifications thereto, combinations thereof and the like). The QKD link coupling arrangement 186 couples a Q-TX of the first QKD component 182 assigned to an endpoint device 104a and couples a CRTX of the second QKD component 184 assigned to the endpoint device 104a to the same QKD link 103a allocated/assigned to the endpoint device 104a. Thus, each of the endpoint devices 104a-104k are connected via corresponding QKD links 103a-103k to the first and second QKD components 182 and 184 via the QKD link coupling component(s)/functionality 186 of the QKD switching system 180.

The controller 110 may be configured to implement one or more QKD protocols and/or QKD switching process(es) as described with reference to FIGS. 1*a* to 1*f*. Splitting the functionality of the QKD linking apparatus 102 in this manner may enable the first QKD component 182, and as an option the corresponding quantum transmission portion of the QKD linking coupling arrangement 186, to be located in a secure facility, such as an exchange, to minimise tampering or eavesdropping of the generation and/or transmission of QKD keys and the like over the QKD links to the corresponding endpoint devices 104a-104k, whereas the second QKD component 184, and as an option the corresponding classical portion of the QKD linking coupling arrangement 186, may be located in a more public setting such as, without limitation, for example a roadside cabinet to provide "last mile" of fibre and/or other secure communication medium that may share a Q-Channel and C-Channel to form a QKD link as described herein. The QKD linking coupling arrangement 186 may further include one or more fibre links for quantum communications from the exchange over the QKD links of the endpoint devices 104a-104k, which may use WDM/DWDM techniques to ensure quantum channel separation. Alternatively and/or additionally, as an option, both the first and second QKD components 182 and 184 may be configured to be used in a more public setting, such as a roadside cabinet and the like. Partitioning the first QKD component 182 from the second QKD component 184 means that the physical casing of the first QKD component 182 may be designed in a tamper-proof/tamper-evident manner, without requiring the whole QKD linking apparatus 102 to be constructed to this degree of security. Thus, the first QKD component 182 may be included in a secure tamper proof enclosure and coupled to the second QKD component 184, which is provided in a less secure enclosure via the QKD link coupling 186. In this configuration, both the first and second QKD components 182 and 186 may be implemented in the same roadside cabinet or housed in the same QKD linking apparatus and used, as long as the first QKD component 162 is in a secure tamper proof enclosure, securely in a public setting.

Although the QKD system 180 only provides one example of splitting up or partitioning the functionality of the QKD linking apparatus 102, this is byway of example only and the invention is not so limited, it is to be appreciated by the skilled person that the functionality of the QKD linking apparatus 102 i.e. the controller 110, QCC 106, CTCR 108 and QKD link coupling arrangement 186 may be split up into different modules, components apparatus as the application demands, just so as long as they are connected together or coupled together in such a manner and perform the functionality of the QKD linking apparatus 102 as described with reference to FIGS. 1a to 1g and/or 2a to 4b, modifications thereof, combinations thereto and/or as herein described.

Although the QCC component 106 of QKD linking apparatus 102 of system 180 of FIG. 1g has been described as including a plurality of quantum transmitters or Q-TX(s) for enabling quantum transmission over the quantum channel(s) of one or more QKD links of said endpoint devices, the QCC component 106 may be further modified to include one or more quantum receivers (Q-RX(s)) in which one or more of the QKD links may each be configured to include a unidirectional or bidirectional quantum channel that couples with said one or more Q-RX(s) for receiving quantum transmissions from the corresponding endpoint to the QKD linking apparatus. As previously described, this will enable additional QKD protocols requiring an endpoint to transmit quantum information to the QKD linking apparatus to be implemented by the QKD linking apparatus and corresponding endpoint(s), where each endpoint may include a Q-TX for transmitting quantum information over a quantum channel of the QKD link to the QKD linking apparatus during operation of said additional QKD protocol and the like, and/or as the application demands.

Figure 1H:
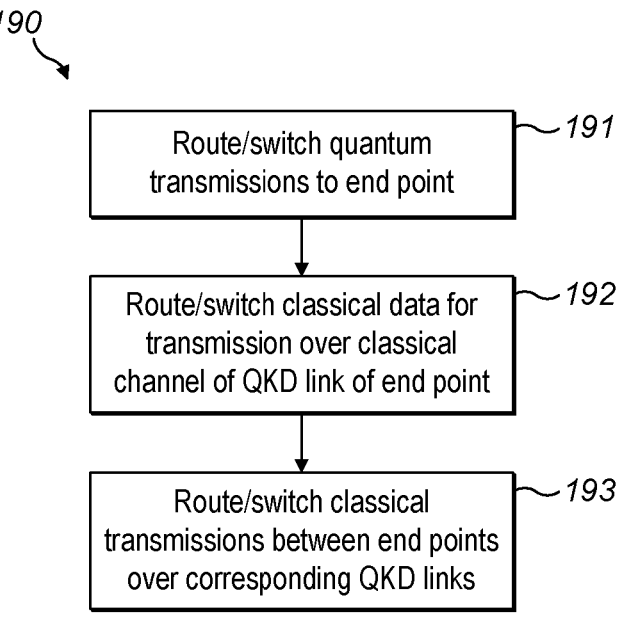
FIG. 1h is a flow diagram illustrating an example control flow for use by QKD linking apparatus of QKD switching system of any of FIGS. 1a to 1g according to some embodiments of the invention.

FIG. 1h is a flow diagram illustrating an example control process 190 for controlling a QKD linking apparatus 102 of QKD system 100, 120, 130, 140, 150, 160, 165 and/or 180 as described with reference to FIGS. 1a to 1g and/or as the application demands. The control process 190 may be used to ensure the QKD linking apparatus may link at least two endpoint devices in a QKD network. The QKD linking apparatus links a plurality of endpoint devices by coupling said endpoint devices to the QKD linking apparatus via a plurality of QKD links, each QKD link for one of the endpoint devices having a communication medium including a quantum channel and a classical channel. Each endpoint is assigned a QKD link connecting said each endpoint to the QKD linking apparatus. The QKD linking apparatus includes a quantum communication component including a plurality of quantum transmitters, each quantum transmitter configured for transmitting quantum transmissions over a quantum channel of one of the QKD links. The QKD linking apparatus includes a classical transceiver component including a plurality of classical transceivers, each classical transceiver configured for transmitting classical data over a classical channel of one of the QKD links and configured for receiving classical data over the classical channel of said one of the QKD links. Once an endpoint device is assigned a QKD link, it is assigned a quantum transmitter of the plurality of quantum transmitters and a classical transceiver of the plurality of classical transceivers and thus is coupled to the QKD linking apparatus. The QKD control process includes one or more of the following steps of:

In step 191, during operation of a QKD protocol, routing or switching data generated for quantum transmission to an endpoint via a quantum transmitter assigned to the endpoint over a quantum channel of the QKD link of the endpoint. For example, quantum transmissions are typically used when implementing one of the QKD protocols between two or more endpoint devices, where each is assigned a quantum transmitter and a corresponding QKD link. The QKD control process may further direct the quantum communication component to route or switch quantum transmissions for an endpoint device of the two or more endpoint devices to the quantum transmitter assigned to said endpoint device for transmitting said quantum transmissions over the quantum channel of the QKD link of the endpoint device.

In step 192, during operation of a QKD protocol, routing or switching classical data for classical transmission to an endpoint via a classical transceiver assigned to the endpoint over a classical channel of the QKD link of the endpoint. For example, this may be performed when implementing one of the QKD protocols when classical transmissions are performed between the endpoints and/or between endpoint and the QKD linking apparatus. Alternatively or additionally, this may be performed when the two or more endpoints have securely exchanged keys and are performing secure communications over their corresponding QKD link classical channels and/or any other channel therebetween.

In step 193, during operation of a QKD protocol and/or after operation of QKD protocol with endpoint devices securely communicating therebetween, routing or switching classical data received from an endpoint by a classical transceiver over the classical channel of the QKD link of the endpoint to another endpoint requiring an/or addressed in said classical transmission and/or as required. For example, this may be performed when implementing one of the QKD protocols when classical transmissions are performed between the endpoints. Alternatively or additionally, this may be performed when the two or more endpoints have securely exchanged keys and are performing secure communications over their corresponding QKD link classical channels and/or any other channel therebetween.

Essentially the switching or routing of steps 191-193 of control process 190 may be performed on each message required by the QKD protocol and/or subsequent secure communications protocols and the like. For example, for QKD protocols such as, without limitation, for example the BB84 family of protocols including the modified BB84 protocol as described herein, there may be messages sent between the QKD linking apparatus and each specific endpoint device including, but not limited to: Q-channel stream of photons (with some sync signals in that or in a parallel channel) over a quantum channel (Q-channel) of the QKD link of said specific endpoint device; C-channel information over a classical channel (C-channel) of the QKD link of said specific endpoint device from QKD linking apparatus to the endpoint device; and/or C-channel information from an end-point device to the QKD linking apparatus. Of course, during the QKD protocol these Q-channel streams and C-channel information will need to be sent between the QKD linking apparatus and endpoint device in the appropriate sequence as defined by the QKD protocol, but they may be interleaved with messages between QKD linking unit and any other end-point.

As described in step 193, there may also be general data messages or encrypted data messages over the C-channel of the QKD link of the endpoint device, which are performed outside of the QKD protocols or after a QKD protocol has been performed, for transmitting any other data (e.g. secure communications using keys exchanged resulting from the QKD protocol) between any pair or group of endpoint device(s) and the like. Naturally, there will be further system management/control messages for the entire QKD system.

As an option, the QKD linking apparatus may include a plurality of quantum receivers, each quantum receiver coupled to a QKD link of an endpoint device and configured for receiving quantum transmissions over a quantum channel of the QKD link from the endpoint device, where the endpoint device transmits quantum information over the Q-channel of its QKD link according to a QKD protocol. Thus, step 191 may be further modified such that, during operation of a QKD protocol requiring the endpoint device to transmit quantum information, routing or switching data received from a quantum transmission over a QKD link from an endpoint via a quantum receiver assigned to the endpoint. For example, quantum transmissions are typically used when implementing one of the QKD protocols between two or more endpoint devices, where each may be assigned a quantum transmitter and/or a quantum receiver of the QKD linking apparatus for use over the corresponding QKD link. The QKD control process may further direct the quantum communication component to route or switch received quantum transmissions from an endpoint device of the two or more endpoint devices for processing and/or further transmission and the like in accordance with the QKD protocol and the like.

Figure 1I:
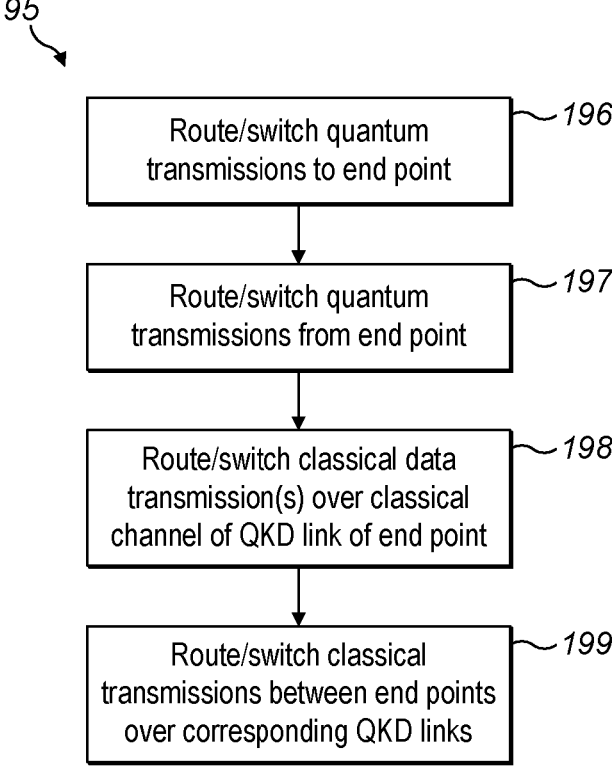
FIG. 1i is a flow diagram illustrating another example control flow for use by QKD linking apparatus of QKD switching system of any of FIGS. 1a to 1g according to some embodiments of the invention.

FIG. 1*i* is a flow diagram illustrating an example control process 195 for controlling a QKD linking apparatus 102 of QKD system 100, 120, 130, 140, 150, 160, 165 and/or 180 as described with reference to FIGS. 1*a* to 1*g* and/or as the application demands. The control process 195 may be used to ensure the QKD linking apparatus may link at least two endpoint devices in a QKD network. The QKD linking apparatus links a plurality of endpoint devices by coupling said endpoint devices to the QKD linking apparatus via a plurality of QKD links, each QKD link for one of the endpoint devices having a communication medium including a quantum channel and a classical channel. Each endpoint is assigned a QKD link connecting said each endpoint to the QKD linking apparatus. The QKD linking apparatus includes a quantum communication component including a plurality of quantum transmitters and/or a plurality of quantum receivers. Each quantum transmitter is configured for transmitting quantum transmissions over a quantum channel of one of the QKD links configured for transmitting quantum transmissions from the QKD linking apparatus to the corresponding endpoint. Each quantum receiver is configured for receiving quantum transmissions over a quantum channel of one of the QKD links configured for receiving quantum transmissions from a corresponding endpoint at the QKD linking apparatus. The QKD linking apparatus also includes a classical transceiver component including a plurality of classical transceivers, each classical transceiver configured for transmitting classical data over a classical channel of one of the QKD links and configured for receiving classical data over the classical channel of said one of the QKD links. Once an endpoint device is assigned a QKD link, it is assigned a quantum transmitter of the plurality of quantum transmitters and/or a quantum receiver of the plurality of quantum receivers, and a classical transceiver of the plurality of classical transceivers and thus is coupled to the QKD linking apparatus. The QKD control process 195 includes one or more of the following steps of:

In step 196, during operation of a QKD protocol, routing or switching data generated for quantum transmission to an endpoint with a quantum receiver via a quantum transmitter assigned to the endpoint over a quantum channel of the QKD link of the endpoint. For example, quantum transmissions are typically used when implementing one of the QKD protocols (e.g. QKD protocols/process(es) as described with reference to FIGS. 5*a* to 5*d*) between two or more endpoint devices, where each is assigned a quantum transmitter and a corresponding QKD link. The QKD control process may further direct the quantum communication component to route or switch quantum transmissions for an endpoint device of the two or more endpoint devices to the quantum transmitter assigned to said endpoint device for transmitting said quantum transmissions over the quantum channel of the QKD link of the endpoint device.

In step 197, during operation of a QKD protocol, routing or switching data generated for quantum transmission from an endpoint using a quantum transmitter at the endpoint for reception by a quantum receiver at the QKD linking apparatus that is assigned to the endpoint over a quantum channel of the QKD link of the endpoint. For example, quantum transmissions from the endpoint may be used when implementing one of the QKD protocols (e.g. QKD protocols/process(es) as described with reference to FIGS. 5*a* to 5*d*) between two or more endpoint devices, where each is assigned a quantum receiver at the QKD linking apparatus and a corresponding QKD link. The QKD control process 195 may further direct the quantum communication component to route or switch quantum transmissions from an endpoint device of the two or more endpoint devices to the quantum receiver assigned to said endpoint device for receiving said quantum transmissions over the quantum channel of the QKD link of the endpoint device.

In step 198, during operation of a QKD protocol, routing or switching classical data for classical transmission to an endpoint via a classical transceiver assigned to the endpoint over a classical channel of the QKD link of the endpoint. For example, this may be performed when implementing one of the QKD protocols (e.g. QKD protocols/process(es) as described with reference to FIGS. 5*a* to 5*d*) when classical transmissions are performed between the endpoints and/or between endpoint and the QKD linking apparatus. Alternatively or additionally, this may be performed when the two or more endpoints have securely exchanged keys and are performing secure communications over their corresponding QKD link classical channels and/or any other channel therebetween.

In step 199, during operation of a QKD protocol and/or after operation of the QKD protocol with endpoint devices securely communicating therebetween, routing or switching classical data received from an endpoint by a classical transceiver over the classical channel of the QKD link of the endpoint to another endpoint requiring an/or addressed in said classical transmission and/or as required. For example, this may be performed when implementing one of the QKD protocols when classical transmissions are performed between the endpoints. Alternatively or additionally, this may be performed when the two or more endpoints have securely exchanged keys and are performing secure communications over their corresponding QKD link classical channels and/or any other channel therebetween.

Essentially the switching or routing of steps 196-199 of control process 195 may be performed on each message required by the QKD protocol and/or subsequent secure communications protocols and the like. For example, for QKD protocols such as, without limitation, for example the BB84 family of protocols including the modified BB84 protocol as described herein, there may be messages sent between the QKD linking apparatus and each specific endpoint device including, but not limited to: Q-channel stream of photons (with some sync signals in that or in a parallel channel) over a quantum channel (Q-channel) of the QKD link of said specific endpoint device; C-channel information over a classical channel (C-channel) of the QKD link of said specific endpoint device from QKD linking apparatus to the endpoint device; and/or C-channel information from an end-point device to the QKD linking apparatus. Of course, during the QKD protocol these Q-channel streams and C-channel information will need to be sent between the QKD linking apparatus and endpoint device in the appropriate sequence as defined by the QKD protocol (e.g. QKD protocols/process(es) as described with reference to FIGS. 5a to 5d), but they may be interleaved with messages between QKD linking unit and any other end-point.

As described in step 199, there may also be general data messages or encrypted data messages over the C-channel of the QKD link of the endpoint device, which are performed outside of the QKD protocols or after a QKD protocol has been performed, for transmitting any other data (e.g. secure communications using keys exchanged resulting from the QKD protocol) between any pair or group of endpoint device(s) and the like. Naturally, there will be further system management/control messages for the entire QKD system.

As an option, the QKD linking apparatus may include a plurality of quantum receivers, each quantum receiver coupled to a QKD link of an endpoint device and configured for receiving quantum transmissions over a quantum channel of the QKD link from the endpoint device, where the endpoint device transmits quantum information over the Q-channel of its QKD link according to a QKD protocol. Thus, step 197 may be further modified such that, during operation of a QKD protocol requiring the endpoint device to transmit quantum information, routing or switching data received from a quantum transmission over a QKD link from an endpoint via a quantum receiver assigned to the endpoint. For example, quantum transmissions are typically used when implementing one of the QKD protocols between two or more endpoint devices, where each may be assigned a quantum transmitter and/or a quantum receiver of the QKD linking apparatus for use over the corresponding QKD link. The QKD control process may further direct the quantum communication component to route or switch received quantum transmissions from an endpoint device of the two or more endpoint devices for processing and/or further transmission and the like in accordance with the QKD protocol and the like.

Figure 1J:
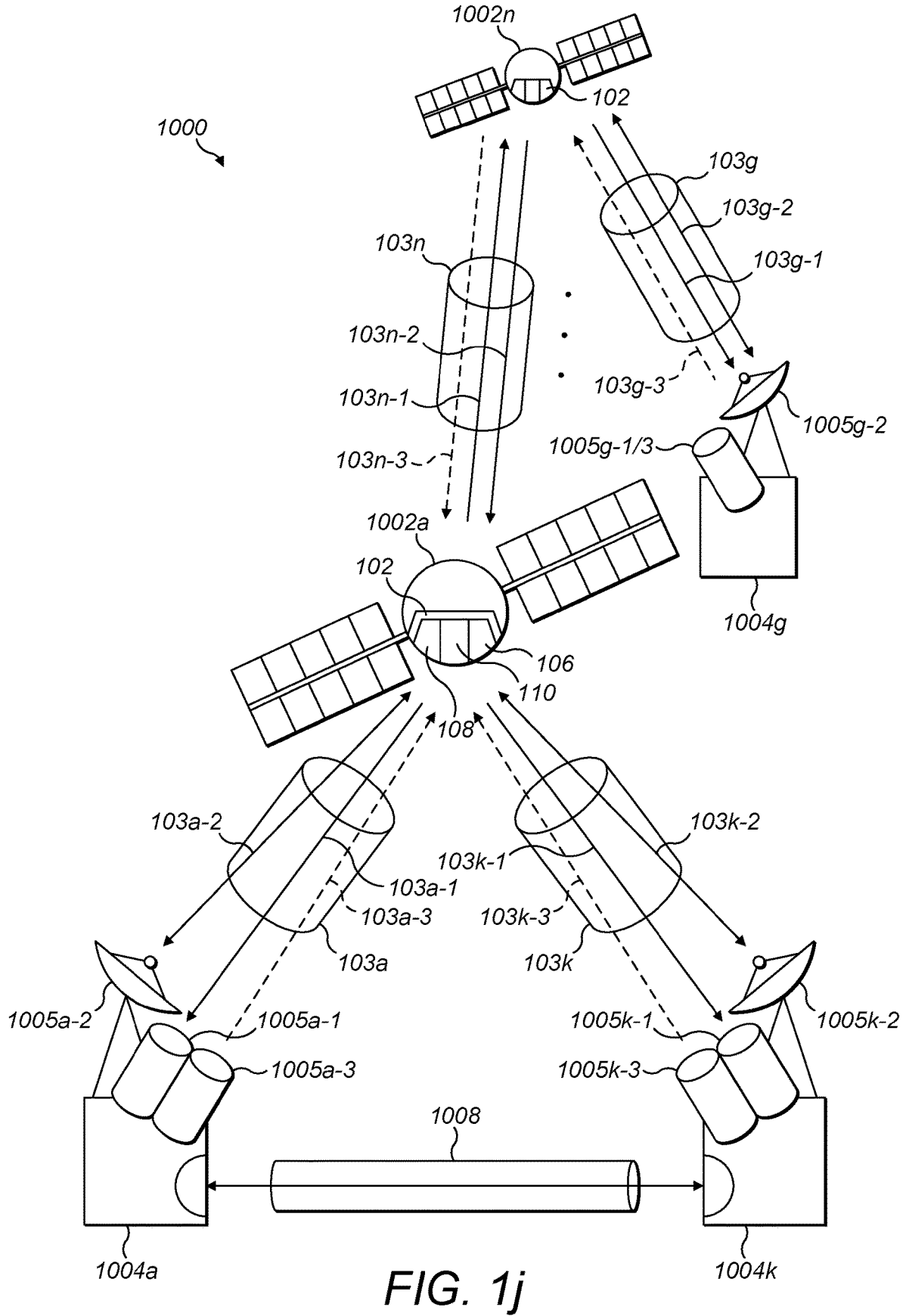
FIG. 1j is a flow diagram illustrating another example QKD switching system according to some embodiments of the invention.

FIG. 1j is a schematic diagram illustrating an example satellite QKD switching system 1000 based on the QKD switching systems 100, 120, 130, 140, 150, 160 and/or 165 and/or QCC 170 as described with reference to FIGS. 1a to 1i. The satellite QKD switching system 1000 may further modify the QKD switching systems 100, 120, 130, 140, 150, 160, 165 and/or QCC 170 as described with reference to FIGS. 1a-1i in which the quantum channels of the QKD links are, without limitation, for example optical free-space channels. For simplicity, the reference numerals used in FIGS. 1a-1i may be reused by way of example only for similar or the same components in relation to FIG. 1g. The QKD switching system 1000 may perform the same or similar functionality as the QKD switching systems 100, 120, 130, 140, 150, 160, 165 and/or QCC 170 as described with reference to FIGS. 1a to 1i but where the QKD linking apparatus 102 is located or implemented within a satellite 1002a of the satellite QKD system 1000. In this example, the QKD linking apparatus 102 includes the controller 110, the QCC 106 and CRTX 108 as described with reference to FIGS. 1a to 1i when modified for implementation in the satellite QKD system 1000.

In this example, the satellite QKD system 1000 includes a plurality of satellites 1002a to 1002n and the plurality of endpoint devices 1004a to 1004k (or ground receiving stations). Endpoint device 1004a includes an optical telescope 1005a-1 configured for receiving quantum transmissions over optical free-space channel from satellite 1002a. As an option, the endpoint device 1004a may also include an optical laser 1005a-3 that is configured for transmitting quantum transmissions over optical free-space channel to the satellite 1002a. Similarly, endpoint devices 1004g and 1004k may also include an optical telescopes 1005g-1 and 1005k-1 configured for receiving quantum transmissions over optical free-space channel from satellite 1002n and 1002a, respectively. As an option, these endpoint devices 1004g and 1004k may also include an optical laser 1005g-3 and 1005k-3 that is configured for transmitting quantum transmissions over optical free-space channel to the satellite 1002g or 1002a, respectively. Each of the satellites 1002a-1002n may include componentry, apparatus and/or functionality for implementing an QKD linking apparatus 102 as described with reference to FIGS. 1a-1i and/or FIGS. 2 to 6b, combinations thereof, modifications thereto, and/or as described herein. Furthermore, each of the endpoint devices 1004a-1004k may include componentry, apparatus, and/or functionality for implementing the functionality associated with the endpoint devices 104a-104k and corresponding QKD links 103a-103k for use in performing a QKD protocol as described with reference to FIGS. 1a-1i and/or FIGS. 2 to 6b with one or more QKD linking apparatus 102 implemented on corresponding one or more of the satellites 1002a-1002n and/or as the application demands.

Each of the endpoint devices 1004a-1004k are connected via corresponding QKD links 103a-103k to the QCC 106 and CTRC 108 of a QKD linking apparatus 102 of one of the satellites 1002a-1002n. For example, endpoint devices 1004a and 1004k are connected via corresponding QKD links 103a and 103k with the QCC 106 and CTRC 108 of the QKD linking apparatus 102 implemented on satellite 1002a. Endpoint device 1004g is connected via corresponding QKD link 103g with the QCC 106 and CTRC 108 of the QKD linking apparatus 102 implemented on satellite 1002g.

The QKD linking apparatus 102 of satellite 1002a includes a controller 110, a QCC 106 and a CTRC 108. In particular, in this example, the QCC 106 includes at least a plurality of quantum transmitter(s) (Q-TX(s)) and/or a plurality of quantum receiver(s) (Q-RX(s)), whereas the CTRC 108 includes at least a plurality of classical transceiver(s) (CTRX(s)). The Q-TX(s)/Q-RX(s) of the QCC 106 of satellite 1002a may be, without limitation, for example a satellite optical transceiver, satellite optical telescope transmitter/receiver, optical quantum transceiver, and/or any other quantum transceiver as the application demands. The Q-TX of QCC 106 of the satellite optical transceiver may include the functionality of, by way of example only but not limited to, satellite optical telescope transmitter, lasers, beacon lasers, downlink lasers, downlink beacon lasers, weak coherent pulse sources, and/or corresponding optical laser transmitting components and the like. The Q-RX of QCC 106 of the satellite optical transceiver may include the functionality of, by way of example only but not limited to, satellite optical telescope receiver, optical receiver telescope, laser receivers, beacon laser receivers, uplink laser receiver, uplink beacon laser receiver, weak coherent pulse receiver, corresponding optical laser transmitting/receiving components; and/or any other optical receiver configured for receiving quantum information transmitted over, without limitation, for example optical free-space quantum channels by a Q-TX of an endpoint device 1004a-1004k and the like.

Furthermore, endpoint device 1004a includes a quantum receiver (Q-RX) 1005-1 and/or a quantum transmitter (Q-TX) 1005-3, and a classical transceiver (CC) 1005a-2. A QKD link 103a may be assigned by the controller 110 to endpoint device 1004a. Similarly, the Q-TX 1005a-3/Q-RX 1005-1 of the endpoint device 1004a may be, without limitation, for example a satellite optical transceiver, satellite optical telescope transmitter/receiver, optical quantum transceiver, and/or any other quantum transceiver as the application demands. The Q-TX 1005a-3 of the endpoint device 1004a may include the functionality of, by way of example only but not limited to, an optical telescope transmitter, lasers, beacon lasers, uplink lasers, uplink beacon lasers, weak coherent pulse sources, and/or corresponding optical laser transmitting components and the like. The Q-RX 1005a-1 of the endpoint device 1004a may include the functionality of, by way of example only but not limited to, an optical telescope receiver, any other optical receiver configured for receiving quantum information transmitted over, without limitation, for example optical free-space quantum channels by a Q-TX of a satellite 1002a and the like.

The controller 110 assigns or allocates one of the Q-TX(s) of the plurality of Q-TX(s) of the QCC 106 for use in quantum transmissions over a quantum channel (Q-channel) 103a-1 (e.g. an optical free-space channel) of the QKD link 103a. The controller 110 also assigns or allocates one of the CTRX(s) of the plurality of CTRX(s) for use in classical transmissions over a classical channel (C-channel) 103a-2 (e.g. satellite wireless communications channel) of the QKD link 103a. The endpoint device 1004a includes a quantum receiver (Q-RX) 1005-1 and a classical transceiver (CC) 1005a-2 for coupling to the Q-channel and the C-channel of the QKD link 103a assigned to the endpoint device 1004a. In this example, the Q-RX 1005-1 of the endpoint device 1004a is, without limitation, for example an optical telescope configured for receiving quantum transmissions over an optical free-space channel from the assigned Q-TX of the QCC 106 of the satellite 1002a. The endpoint device 1004a may be an optical ground receiver (OGR). The optical telescope 1005-1 of the endpoint device 1004a may be configured for use in receiving quantum information over an optical free-space channel from quantum transmissions transmitted by the assigned Q-TX of QCC 106 of QKD linking apparatus 102 of satellite 1002a. These quantum transmissions are transmitted by a Q-TX assigned to the QKD link 103a of endpoint 1004a. In this example, the QKD link 103a is illustrated to include a uni-directional quantum channel 103a-1 (Q-channel) and a bi-directional classical channel (C-channel) 103a-2 in which the QKD link 103a is assigned by the controller 110 to endpoint device 104a. The QKD link 103a, which is assigned by the controller 110 to the endpoint device 104a, once established includes a uni-directional optical free-space quantum channel 103a-1 (Q-channel) for transmitting, during performance of a QKD protocol or for any other reason, quantum information from a Q-TX of the QCC 106 over the Q-channel 103a-1 to the endpoint device 104a. The quantum transmission is received by the optical telescope Q-RX 1005a-1 of the endpoint device 1004a. The QKD link 103a also includes a bi-directional satellite wireless classical channel 103a-2 for transmission of classical information between a CTRX of the CTRC component 108 that is assigned to the endpoint device 104a and the CC 1005a-2 of the endpoint device 104a. Thus the QKD link 103a may be used by the QKD linking apparatus 102 and endpoint device 104a for performing a QKD protocol that requires satellite 1005a to transmit quantum information to the endpoint device 1004a and the like and/or for secure communications and the like.

Alternatively or additionally, the endpoint device 1004a may include a Q-TX 1005-3, which may be an optical laser device configured for transmitting quantum information over an quantum channel 103a-3 (e.g. optical free-space channel) to satellite 1002a, where these quantum transmissions are received by a Q-RX (e.g. optical telescope) of the QCC 106 of QKD linking apparatus 102 of satellite 1002a assigned to the QKD link 103a of endpoint device 1004a. Thus, the QKD link 103a, which is assigned by the controller 110 to the endpoint device 104a, once established may include a uni-directional optical free-space quantum channel 103a-3 (Q-channel) for transmitting, during performance of a QKD protocol or for any other reason, quantum information from an optical laser Q-TX 1005a-3 of the endpoint device 1004a over the Q-channel 103a-3 to the satellite 1002a. The quantum transmission is received by the optical telescope Q-RX of the QCC 106 of satellite 1002a that is assigned the endpoint device 1004a. The QKD link 103a may still include the bi-directional satellite wireless classical channel 103a-2 for transmission of classical information between a CTRX of the CTRC component 108 that is assigned to the endpoint device 104a and the CC 1005a-2 of the endpoint device 104a. Thus the QKD link 103a may be used by the QKD linking apparatus 102 and endpoint device 104a for performing a QKD protocol that requires the endpoint device 1004a to transmit quantum information to the satellite 1002a and the like and/or for secure communications and the like.

Alternatively or additionally, the QKD link 103a may be assigned by the controller 110 of satellite 1002a to the endpoint device 1004a, where the controller 110 assigns or allocates one of the Q-TX(s) of the plurality of Q-TX(s) of QCC 106 and one of the Q-RX(s) of the plurality of Q-RX(s) of the QCC 106 for use in transmitting and receiving quantum transmissions, respectively, to and/or from the endpoint device 1004a over an optical free-space quantum channel (Q-channel) 103a-1 and 103a-3 of the QKD link 103a with satellite 1002a. The controller 110 also assigns or allocates one of the CTRX(s) of the plurality of CTRX(s) of CTRC 108 for use in classical transmissions over a classical channel (C-channel) 103a-2 of the QKD link 103a between the QKD linking apparatus 102 of the satellite 1002a and the endpoint device 1004a. As described, the endpoint device 1004a may include a quantum transmitter (Q-TX) 1005a-3 (e.g. optical laser), a quantum receiver (Q-RX) 105a-1 (e.g. optical telescope) and a classical transceiver (CC) 1005a-2 (e.g. satellite wireless communications transceiver etc.) for coupling to the Q-channels 103a-3, 103a-1, and the C-channel 103a-2, respectively, of the QKD link 103a assigned to the endpoint device 104a to those of the satellite 1002a. In this example, the QKD link 103a is illustrated to include a bi-directional quantum channel, which may be made up of two uni directional optical free-space quantum channels 103a-1 and 103a-3 (Q-channel) and a bi-directional classical channel 103a-2 (C-channel) (e.g. satellite wireless communications channel) in which the QKD link 103a is assigned by the controller 110 to the endpoint device 1004a. Thus, the QKD link 103a, which is assigned by the controller 110 of the QKD linking apparatus 102 of the satellite 1002a to the endpoint device 104a, once established includes a bi-directional quantum channel 103a-1 and/or 103a-3 (Q-channel(s)) for transmitting and/or receiving, during performance of a QKD protocol or for any other reason, quantum information from the Q-TX/Q-RX of the QCC 106 or Q-RX/Q-TX 1005a-1/1005a-3 the endpoint device 1004a over the Q-channels 103a-1/103a-3 of the QKD link 103a. The QKD link 103a also includes a bi-directional classical channel 103a-2 for transmission of classical information between a CTRX of the CTRC component 108 of QKD linking apparatus 108 of satellite 1002a that is assigned to the endpoint device 1004a and the CC 1005a-2 of the endpoint device 1004a. Thus the QKD link 103a may be used by the QKD linking apparatus 102 of satellite 1002a and endpoint device 1004a for performing a QKD protocol may require the endpoint device 1004a to either: a) receive quantum information from satellite 1002a; b) transmit quantum information to satellite 1002a; or c) both receive and transmit quantum information to satellite 1002a and the like during key exchange with other endpoint devices 1004k or 1004g and/or for secure communications therebetween and the like.

Similarly, the QKD linking apparatus 102 of satellite 1002a may assign a QKD link 103k to endpoint device 1004a, in which the QKD link 103k may include a uni-directional quantum channel 103k-1 (e.g. optical free-space quantum channel) from satellite 1002a to endpoint device 1004k, and/or a uni-directional quantum channel 103k-3 (e.g. optical free-space quantum channel) from endpoint device 1004k to satellite 1002a, and a bi-directional classical channel 103k-2 (C-channel) (e.g. satellite wireless communications channel). Thus, the controller 110 of the QKD linking apparatus 102 of satellite 1002a may perform a QKD protocol that uses the QKD links 103a and 103k assigned to endpoint devices 1004a and 1004k to securely exchange a shared key therebetween and the like and thereafter provide secure communication over the bi-directional C-channels 103a-2 and 103k-2. Alternatively or additionally, as an option the endpoint devices 1004a and 1004k may establish a different or additional bi-directional classical channel 1008 that bypasses satellite 1002a.

In a similar fashion as for endpoint devices 1004a or 1004k, the QKD linking apparatus 102 of satellite 1002n may assign a QKD link 103g to endpoint device 1004g, in which the QKD link 103g may include a uni-directional quantum channel 103g-1 (e.g. optical free-space quantum channel) from satellite 1002n to endpoint device 1004g, and/or a uni-directional quantum channel 103g-3 (e.g. optical free-space quantum channel) from endpoint device

1004g to satellite 1002n, and a bi-directional classical channel 103g-2 (C-channel) (e.g. satellite wireless communications channel). Thus, the controller 110 of the QKD linking apparatus 102 of satellite 1002n may perform a QKD protocol that uses the QKD link 103g and any additional QKD link assigned to at least another endpoint device (not shown) by controller 110 of QKD linking apparatus 102 of satellite 1002n for securely exchanging a shared key therebetween and the like and thereafter provide secure communication over the bi-directional C-channels 103g-2 therebetween. Alternatively or additionally, as an option the endpoint devices 1004g and the other endpoint device may establish a different or additional bi-directional classical channel that bypasses satellite 1002n for secure communications and the like using the shared key.

The bidirectional classical channel 1008 and/or additional bi-directional classical channel that bypasses the satellites 1002a-1002n that may be established between endpoint devices 1004a-1004k may include, by way of example only but not limited to, wireless and/or wired communications channels; fibre optic communications channels (e.g. optical fibre, dark fibre and the like); corresponding wireless and/or radio/mobile telecommunications communications channels; wired and/or telecommunications communications channels; optical communication channels and the like; and/or any other suitable classical or non-quantum communication channel for communicating with each other as the application demands.

Furthermore, each satellite 1002a-1002n may be connected to each other via additional one or more QKD link(s) 103n, which may then form a mesh satellite network of a plurality of satellites 1002a to 1002n connected together via one or more additional QKD links 103n and the like. For example, referring to FIG. 1j, satellite 1002a is illustrated as being connected to satellite 1002n via QKD link 103n, in which one or more QKD protocols could be performed by the QKD linking apparatus 102 of satellites 1003a and 1003n and configured to perform a key exchange between endpoint device 1004a and/or 1004k with endpoint device 1004g using the QKD links 103a and/or 103k and 103g assigned by the controllers 110 of QKD linking apparatus 102 of satellites 1002a and/or 1002n to the corresponding endpoint devices 1004a and/or 1004k and 1004g, respectively. Thereafter, the bi-directional classical channels 103a-2, 103k-2 and 103g-2 of each QKD link 103a, 103k and 103g, respectively, may be used to provide secure communications to the endpoint devices 1004a, 1004k, and 1004g using the shared keys and the like. Alternatively or additionally, as an option the endpoint devices 1004a, 1004k, 1004g and/or any other endpoint device may establish a different or additional bi-directional classical channel that bypasses satellites 1002a-1002n for secure communications therebetween and the like using the shared keys exchanged therebetween during performance of the one or more QKD protocols and the like.

Thus, the satellite QKD system 1000 may be configured to and/or operate to implement one or more QKD protocols for exchanging a shared key between two or more endpoint devices 1004a-1004k using QKD linking apparatus 102 of satellites 1002a-1002n based on the functionality as described in FIGS. 1a-1i and/or FIGS. 2-6b and/or combinations thereof, modifications thereto, and/or as herein described.

Figure 2:
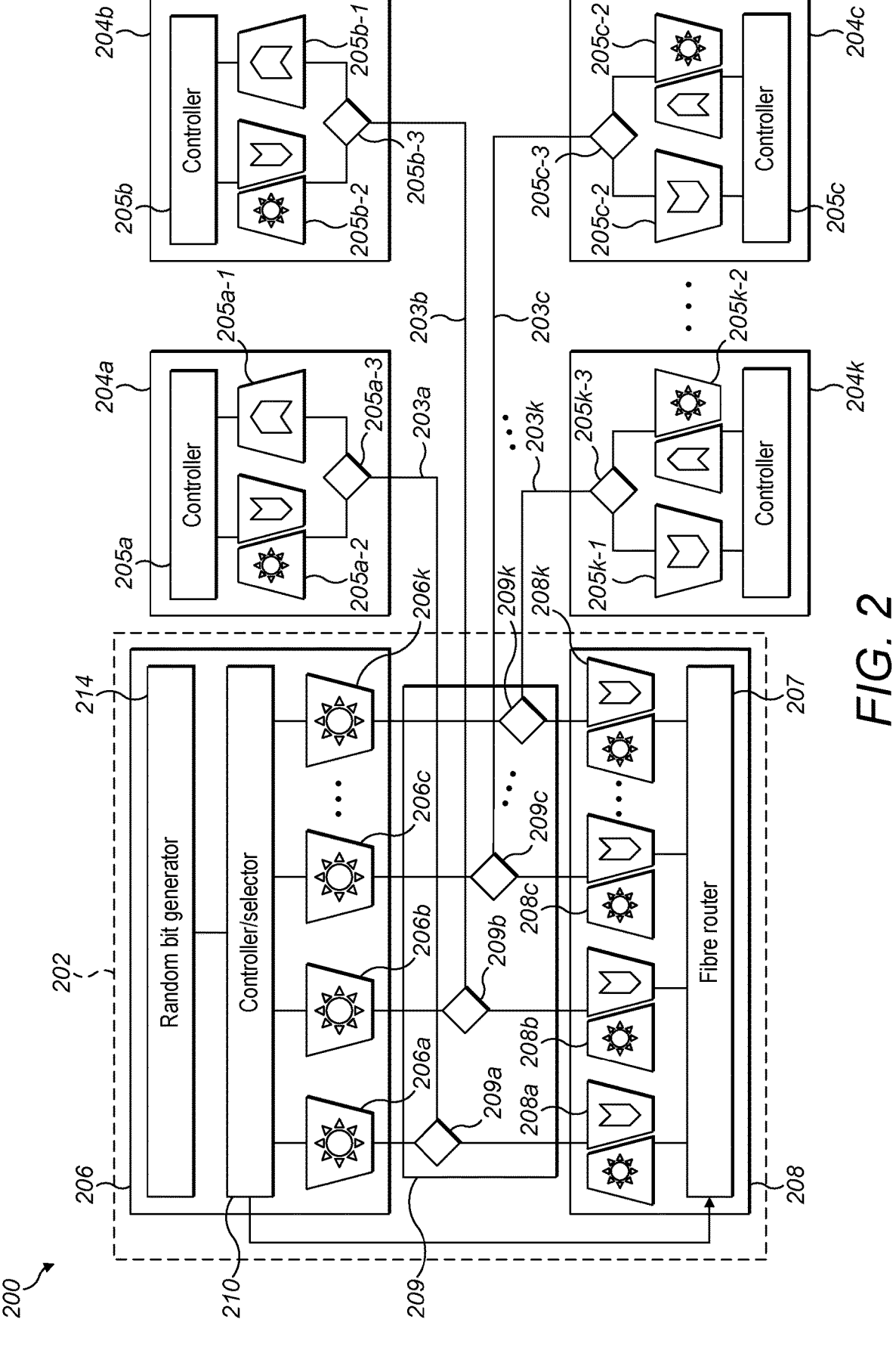
FIG. 2 is a schematic diagram illustrating another example QKD switching system according to some embodiments of the invention.

FIG. 2 is a schematic diagram illustrating another example QKD switching system 200 based on the QKD switching systems 100, 120, 130, 140, 150, 160, 165 and/or 180 and/or QCC 170 as described with reference to FIGS. 1a to 1*i*. QKD switching systems 100, 120, 130, 140, 150, 160, 165 and/or 180 and/or QCC 170 as described with reference to FIGS. 1*a* to 1*i* may be further modified based on the further features of the QKD switching system 200. The QKD switching system 200 is based on a hub-and-spoke model to that connects the QKD linking apparatus 202 controlled by a central linking party to multiple endpoint devices 204*a*-204*k* controlled by multiple parties through multiple QKD links 203*a*-203*k* (e.g. optical fibre links). Each of the QKD links 203*a*-203*k* include a quantum optical communications channel (Q-channel) that is shared with a conventional/classical optical communications channel (C-channel). The QKD linking apparatus 202 of the central linking party includes a quantum communication component (QCC) 206 and a classical transceiver router component (CTRC) 208 that are connected to one or more QKD links 103*a*-103*k* via QKD link coupling arrangement 210 as described with reference to FIGS. 1*a* to 1 *e*.

The QCC 206 includes a random bit generator 209 and a plurality of quantum transmitters 206*a*-1 to 206*k*-1 (e.g. optical fibre quantum transmitters) that are communicatively connected to a controller/selector 212. Each of the quantum transmitters 206*a*-1 to 206*k*-1 are assigned to a different endpoint device from the plurality of endpoint devices 204*a*-204*k*. The CTRC 208 includes a plurality of classical transceivers 208*a*-208*k* (e.g. optical fibre transceivers) and a router 207 (e.g. optical fibre router), which is also connected to the controller/selector 212. Each of the plurality of classical transceivers 208*a*-208*k* are assigned to a different endpoint device from the plurality of endpoint devices 204*a*-204*k*. The controller 212 stores a mapping of the quantum transmitter 206*a*-1 from the plurality of quantum transmitters 206*a*-1 to 206*k*-1 and the classical transceiver 208*a* from the plurality of classical transceivers 208*a*-208*k* that is assigned to each endpoint device 204*a* from the plurality of endpoint devices 204*a*-204*k*. Each endpoint point device 203*a* from the plurality of endpoint devices 204*a*-204*k* is provided or assigned a QKD link from the plurality of QKD links 203*a*-203*k*.

As described with reference to FIGS. 1*a* to 1*e*, each QKD link includes at least a unidirectional quantum channel (Q-channel) and at least a bidirectional classical channel (C-channel). A QKD link coupling arrangement 209 is configured to couple the Q-channel and C-channel(s) of each QKD link 203*a* assigned to an endpoint device 204*a* to the quantum transmitter 206*a*-1 and classical transceiver 208*a* assigned to the endpoint device. The Q-channel and C-channel of each QKD link 203*a* of each endpoint device 204*a* are also coupled to the corresponding quantum receiver and classical transceiver, respectively, of said each endpoint device 203*a*. It is noted that, in this example, each of the QKD links 203*a*-203*k* include a quantum optical communications channel that is shared with a conventional/classical optical communications channel(s) over an optical fibre. In this example, as described with reference to FIG. 1*b*, each of the QKD links 203*a*-203*k* uses at least one optical fibre in which the QKD link coupling arrangement 209 includes optical combiner/splitter devices 209*a*-209*k* (or optical multiplexors/demultiplexors) for coupling each of the quantum transmitters 206*a*-1 to 206*k*-1 and each of the classical transceivers 208*a*-208*d* to a corresponding QKD link 203*a*-203*k*. Each optical combiner/splitter device 209*a* is configured to couple the quantum transmitter 206*a*-1 and classical transceiver 208*a* assigned to an endpoint device 204*a* to one end of an optical fibre of the QKD link 203*a* of that endpoint device 204*a*, where the other end of the optical fibre of the QKD link 203*a* of the endpoint device 204*a* is coupled to an optical combiner/splitter device 205*a*-3 of the endpoint device, which is coupled to the quantum receiver 205*a*-2 and classical transceiver 205*a*-1 of the endpoint device 204*a*.

Thus, the quantum transmitter 206*a*-1 assigned to the endpoint device 204*a* is coupled to the Q-channel of the optical fibre of the QKD link 203*a* via optical combiner/splitter device 209*a*. Similarly, the classical transceiver 208*a* assigned to the endpoint device 024*a* is coupled via optical combiner/splitter device 209*a* to the C-channel of the optical fibre of the QKD link 203*a*. The optical combiner/splitter devices 205*a*-3 to 205*k*-3 of each of the endpoint devices 204*a*-204*k* are controlled by each endpoint device 204*a* for directing the quantum transmissions from the Q-channel of the QKD link 203*a* assigned to the endpoint device 204*a* to the corresponding quantum receiver 205*a*-1 (e.g. optical fibre quantum receivers) of the endpoint device 204*a*. As well, the optical combiner/splitter devices 205*a*-3 to 205*k*-3 of each of the endpoint devices 204*a*-204*k* are controlled by each endpoint device 204*a* for directing the classical transmissions over the QKD link 203*a* assigned to each endpoint device to/from the corresponding classical transceiver 205*a*-2 (e.g. conventional optical fibre transmitters and receivers) of said each endpoint device. Many details of how keys are allocated, communications protocols, etc. have been omitted as they are standard prior art for quantum key distribution and satellite QKD. Nevertheless, the QKD switching system 200 with QKD linking apparatus 202 and endpoint devices 204*a*-204*k* connected by QKD links 203*a*-203*k* to the QKD linking apparatus 202 may be operated based on the operation of the controller 110 and/or 212, and/or QKD switching process as described with reference to FIGS. 1*a* to 1 *e* and/or as herein described.

In essence, the QCC 206 and CTRC 208 are controlled by the controller/selector 212 to perform QKD protocol operations such as, without limitation, for example generating one or more keys (or random quantum bits) using random bit generator 204; selecting the quantum transmitter 206*a*-1 assigned to one of the endpoint devices 204*a*-204*k* and directing a key generated for one of the endpoint devices 204*a*-1 to 204*k*-1 during a QKD operation to be transmitted by the selected quantum transmitter 206*a*-1 over the Q-channel of the QKD link of said one of the endpoint devices 204*a*-1 to 204*k*-1; selecting one or more of the conventional transceivers 208*a*-208*k* assigned to one or more endpoints to transmit and/or exchange of intermediate key information and/or classical information using the classical channel(s) of the corresponding QKD links 203*a*-203*k* of those one or more endpoints when required by the QKD protocol; after quantum key exchange/QKD key exchange and the like on completion of the QKD protocol with other endpoint devices 204*b*-204*k*, routing the classical transmissions on the classical channels of the QKD links 203*a*-203*k* of said endpoint devices 204*a*-204*k* for performing secure communications therebetween, where the classical channels are secured using the exchanged keys and the like. The QKD protocols may include, without limitation, for example the BB84 protocol family including the BB84 protocol and/or derivatives of the BB84 protocol such as a modified version of BB84 protocol as described in GB Patent Application No. 1916311.2 entitled "Quantum Key Distribution Protocol" filed on 8 Nov. 2019 and incorporated herein by reference, and/or any type of QKD protocol may be used to exchange and/or transmit the quantum encoded keys and to link the pairs of keys with the endpoint devices 204*a*-204*k*. These quantum transmissions and/or classical transmissions may take place simultaneously or sequentially.

For example, the QKD linking apparatus 202 may be configured by the central linking party to perform a first QKD protocol based on matching pairs of QKD keys, then the QKD linking apparatus 202 uses the QKD key for one endpoint device 204a of a party to encrypt the key for a second endpoint device 204b of a second party, and send that encrypted key to the second endpoint device 204b of the second party, who will in turn decrypt it to obtain a copy of the first party's key. This can result in a shared key. This process may be based on the process used for satellite QKD for matching pairs of keys, however, for terrestrial QKD there is a permanent connection to the endpoint devices 204a-204k of each of the parties, which can permit simultaneous transmissions to take place, and also not require keys to be stored for lengthy periods by the QKD linking apparatus 202 of the central linking party. The QKD linking apparatus 202 may delete the keys immediately after pairing, which further eliminates the risk of key extraction through physical access to the hardware of the QKD linking apparatus 202.

In the preferred implementation, a modified version of the BB84 protocol in which the QKD linking apparatus 202 acts as the sender device of the BB84 protocol, with two or more of the endpoint devices 204a-204k of the parties acting as receiver devices of the BB84 protocol but in which the BB84 protocol is modified in such a way that the QKD linking apparatus (acting as sender device/intermediary device) does not have enough information to derive the resulting shared QKD key exchanged between the corresponding endpoint devices 204a-204k (e.g. receiver devices). Such a modified version of the BB84 protocol may be used to generate/transmit the quantum encoded keys and to link the pairs of keys in such a manner that the QKD linking apparatus 202 of the central linking party will not have any knowledge of the final agreed keys, thereby reducing the level of trust required by the QKD linking apparatus 202 and/or the central linking party by the endpoint devices 204a-204k and their controlling parties.

In practice it will be necessary to demonstrate some segregation of information within the QKD linking apparatus 202 between the quantum key generation & matching, and the conventional communications of the QKD linking apparatus 202. Otherwise it would be possible in theory to correlate the original full key with the conventional communications and derive the key values. Conventional segmentation of sub-systems of the QKD linking apparatus with physical protection of the core elements processing the quantum key, and use of firewalls/monitors should give sufficient assurance against such compromise.

The QKD linking apparatus 202 of the central linking party may be configured to perform its operations sequentially such that there is no need for all hardware components to be replicated. For example, the random generator 214 may be, without limitation, for example a single QKD RNG and each of the quantum transmitters 206a-1 to 206k-1 may be implemented using a faint pulse source (FPS) unit. Developments in faint pulse source design will eventually lead to small and inexpensive mass-produced devices, generating the photons in an integrated package with, without limitation, for example four matched laser diodes, each of which may form one of the quantum transmitters 206a-1 to 206k-1. Such packages could be connected to a single RNG 214 and fast electronics through an electronic switch/selector 210, thus reducing the cost and size of the QKD linking apparatus 202 hardware. This approach may be illustrated in FIG. 2 in which the Random Bit Generator 214 (and other fast electronics) is linked to a controller and electronic selector 212. The controller and selector 212 are configured to select which optical quantum transmitter 206a-1 to 206k-1 to use, coupling the electronic drive signals from the controller 212. The QKD linking arrangement 209 includes optical combiner/splitter devices 209a-209k, where each optical combiner/splitter device 209a is are connected to a quantum transmitter 206a-1 assigned to an endpoint device 204a and a corresponding classical transceiver 208a assigned to the endpoint device 204a and so couples the quantum transmitter 206a-1 (e.g. optical fibre quantum transmitter) and the classical transceiver 208a (e.g. conventional optical fibre transmitters and receivers) to the Q-channel and C-channel(s), respectively, of at least one optical fibre of the QKD link 203a of the endpoint device 204a. The optical combiner/splitters 205a-3 to 205k-3 of each of the endpoint devices 204a-204k are controlled for directing the quantum transmissions over the QKD links 203a-203k to the corresponding quantum receivers 205a-1 to 205k-1 (e.g. optical fibre quantum receivers) and/or the classical transmissions over the QKD links 203a-203k to the corresponding classical transceivers 205a-2 to 205k-2 (e.g. conventional optical fibre transmitters and receivers). Many details of how keys are allocated, communications protocols, etc. have been omitted as they are standard prior art for quantum key distribution and satellite QKD. Nevertheless, the QKD switching system 200 with QKD linking apparatus 202 and endpoint devices 204a-204k connected by QKD links 203a-203k may be operated as described with reference to FIGS. 1a to 1e and/or as herein described.

Although the QCC component 206 of FIG. 2 has been described as including a plurality of quantum transmitters or Q-TX(s) 206a-1 to 206k-1 for enabling quantum transmission over a quantum channel of one or more QKD links 203a-203k of said endpoint devices 204a-204k, the QCC component 206 may be further modified to include one or more quantum receivers (Q-RX(s)) in which one or more of the QKD links 203a-203k may each be configured to include a unidirectional or bidirectional quantum channel (e.g. an optical fibre) that couples with said one or more Q-RX(s) of the QKD linking apparatus 202 for receiving quantum transmissions from the corresponding endpoint to the QKD linking apparatus 202, which may be required depending on the QKD protocol being implemented therebetween. As previously described, this will enable additional QKD protocols requiring an endpoint to transmit quantum information to the QKD linking apparatus 206 to be implemented by the QKD linking apparatus 206 and corresponding endpoint(s), where each endpoint may include a Q-TX for transmitting quantum information over a quantum channel of the corresponding QKD link to the QKD linking apparatus 202 during operation of said additional QKD protocol and the like, and/or as the application demands.

Figure 3A:
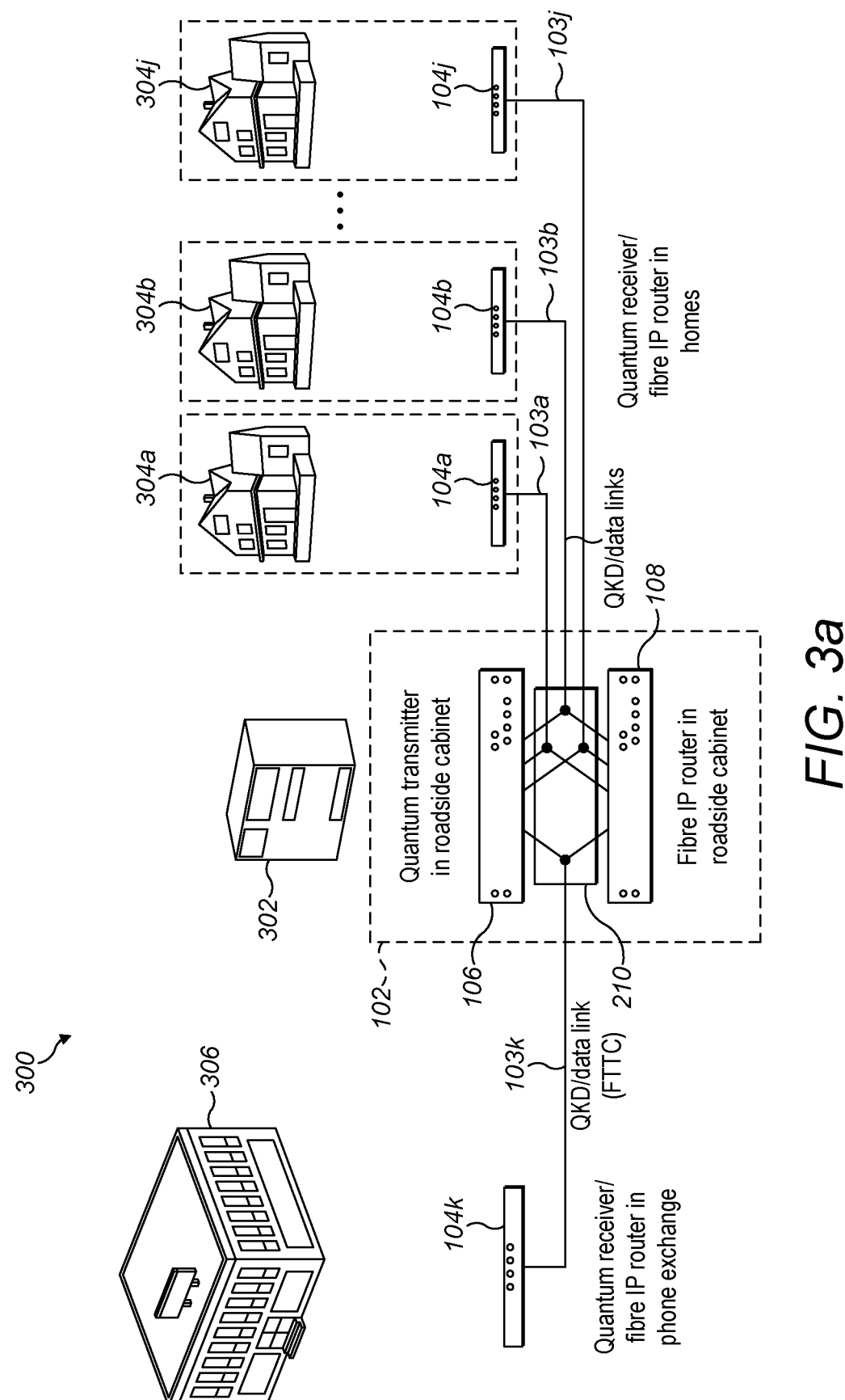
FIG. 3a is a schematic diagram illustrating an example QKD switching system with link apparatus in a roadside cabinet according to some embodiments of the invention.

FIG. 3a is a schematic diagram illustrating an example QKD switching system 300 with a QKD linking apparatus 102 located within a roadside cabinet 302. The QKD linking apparatus 102 may be based on the QKD linking apparatus 102 or 202 as described with reference to FIGS. 1a to 2, modifications thereto, combinations thereof, and/or as herein described and/or as the application demands. For simplicity, the reference numerals used in FIGS. 1a-1e or 2 may be reused by way of example only for similar or the same components in relation to FIG. 3a. This is one of many methods of deploying the QKD linking apparatus 102 and/or QKD switching system 300, where individual houses or offices 304a-304j or exchange 306 are linked to the roadside cabinet 302 via QKD links 103a-103k using endpoint devices 104a-104k, in which traffic from endpoint devices 104*a*-104*j* are then back-hauled over QKD link 103*k* to the exchange/switching centre 306 with endpoint 104*k*. In this example, there may be a point-to-point optical path through the fibre, from the roadside cabinet 302 to the endpoint devices 104*a*-104*j* controlled by the various parties (e.g. home owners, office workers and the like) of homes/offices 304*a*-304*j* and to the exchange 306. The roadside cabinet 302 includes the QCC 106 (e.g. quantum transmitters 106*a*-1 to 106*k*-1) and CTCR 108 (e.g. conventional fibre router and optical fibre transceivers 108*a*-108*k*).

The QKD switching system 300 may further modify the QKD switching systems 100, 120, 130, 160, 200 and/or QCC 140 as described with reference to FIGS. 1*a* to 2, modifications thereto, combinations thereof, and/or as herein described. For simplicity, the reference numerals used in FIGS. 1*a* to 2 may be reused byway of example only for similar or the same components in relation to FIG. 3*a*. The QKD switching system 300 may include and/or perform the same or similar functionality as the QKD switching systems 100, 120, 130, 160, 200 and/or QCC 140 as described with reference to FIGS. 1*a* to 2 in which the QKD linking apparatus 102 is located within a public space such as a roadside cabinet 302. In this example, the QKD linking apparatus 102 includes QCC 106, CTCR 108 and QKD link coupling arrangement 210 as described with reference to any of FIGS. 1*a* to 2, modifications thereof, combinations thereto and/or as herein described. The QKD linking apparatus 102 is configured to provide quantum-safe or secure communications over the QKD links 103*a*-103*k* with endpoint devices 104*a*-104*k* at homes/offices 304*a*-304*k* based on QKD protocols and the like. In this example, the QKD switching system 300 includes a plurality of homes/offices 304*a*-304*j* in which each of the homes/offices 304*a*-304*j* has a corresponding one of the endpoint devices 104*a*-104*j* that may function as described with reference to FIGS. 1*a* to 2. Each of the homes/offices 304*a*-304*j* includes at least one of the endpoint devices 104*a*-104*j*, each of which are coupled to the QKD link coupling arrangement 210 of the QKD linking apparatus 102 via corresponding QKD links 103*a*-103*j* (e.g. optical fibre links). Each endpoint device 104*a*-104*j* of a home/office 304*a*-304*j* may include a quantum receiver and a fibre IP router that is coupled to the corresponding QKD links 103*a*-103*j*. The communication medium of each of the QKD links 103*a*-103*j* between QKD linking apparatus 102 of the roadside cabinet 302 and to the homes/offices 304*a*-304*j* may be at least one optical fibre. In addition, in this example, the QKD switching system 300 includes a backhaul over QKD link 103*k* to the exchange 306 with an endpoint device 104*k* that is configured according to endpoint devices as described with reference to FIGS. 1*a* to 2. The endpoint device 104*k* of the exchange 306 may include a quantum receiver and fibre IP router. The exchange 306 is coupled from the endpoint device 104*k* to the QKD link coupling arrangement 210 in the QKD linking apparatus 102 located in the roadside cabinet 302 via a QKD link 103*k* (e.g. QKD/data link over fibre to the cabinet (FTTC)). Thus, quantum-secure or safe communications may be implemented between the exchange 306, homes/offices 304*a*-304*j* and roadside cabinet 302 using the QKD switching apparatus 102 and appropriate QKD protocols for exchanging QKD keys, group keys and the like between the endpoint devices 104*a*-104*k* of the exchange 306 and homes/offices 304*a*-304*j* and the like, which may form part of a QKD network and thus may enable quantum-safe or secure communications therebetween.

Other deployments may include, without limitation, for example: 1) having the communication medium of each of the QKD links 103*a*-103*k* being separate optical fibres for quantum communications and conventional communication to each endpoint device 104*a*-104*k*. Although this might increase the cost of using more optical fibre, such an implementation minimises or avoids the requirement for additional optical combiner/splitter units and the like; 2) a combined quantum and conventional hub, with built-in optical combiner/splitter units, which may be more convenient for connections, but makes it more difficult to verify the security separation of individual components; and/or 3) multiple back-haul QKD links may be provided, where the exchange 306 is not treated specially from other end-point devices 104*a*-104*k*, though may be providing greater bandwidth for conventional communications.

Figure 3B:
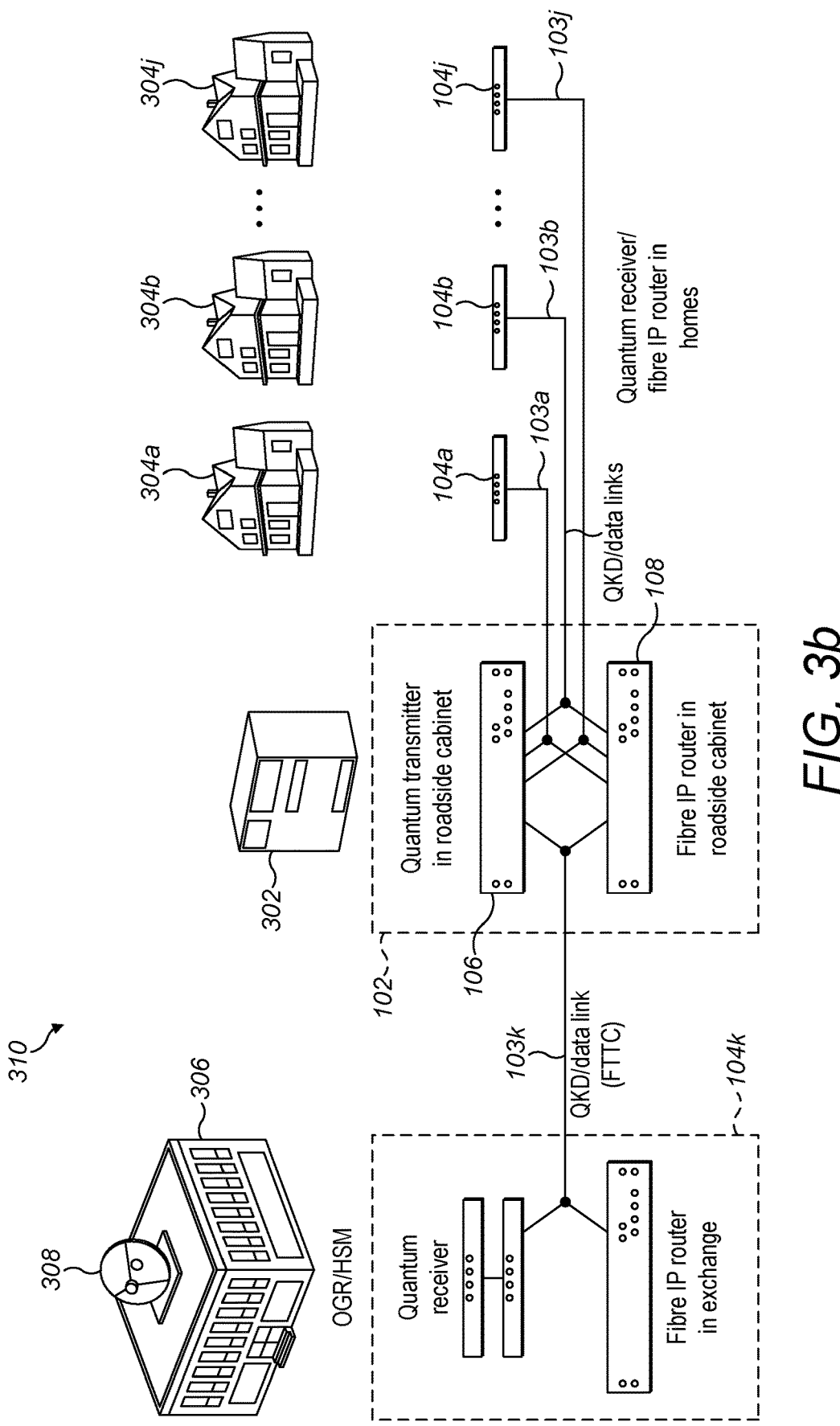
FIG. 3*b* is a schematic diagram illustrating another example QKD switching system with link apparatus in a roadside cabinet according to some embodiments of the invention.

FIG. 3*b* is a schematic diagram illustrating another example QKD switching system 310 with QKD linking apparatus 102 in a roadside cabinet 302. This configuration is similar to that of FIG. 3*a*, but includes a link to a QKD optical ground receiver (OGR) terminal 308 in or near the exchange 306 with the endpoint device 104*k*.

Figure 3C:
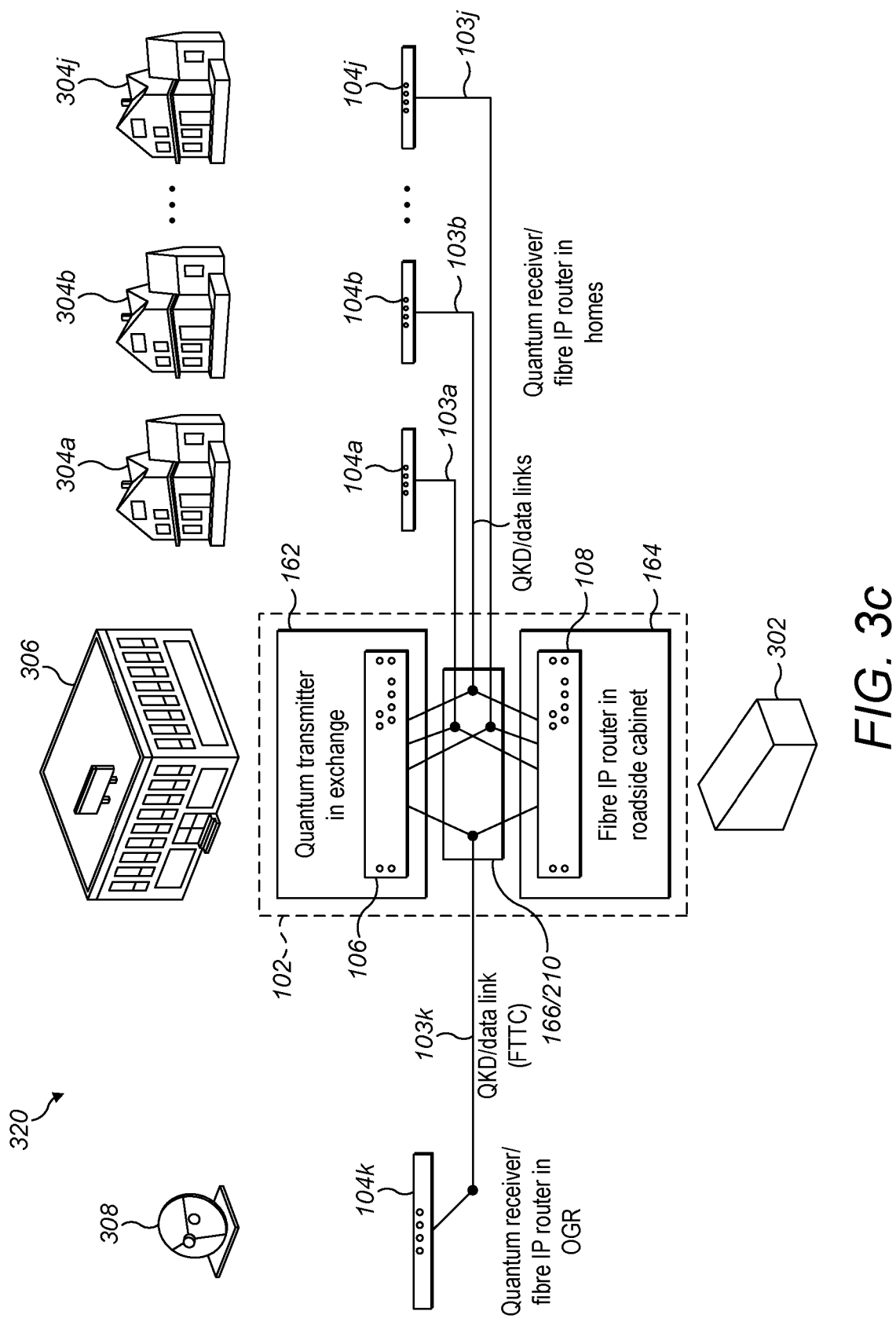
FIG. 3*c* is a schematic diagram illustrating a further example QKD switching system with the functionality of link apparatus split between an exchange and a roadside cabinet according to some embodiments of the invention.

FIG. 3*c* is a schematic diagram illustrating a further example QKD switching system 320 with the functionality of QKD link apparatus 102 split between roadside cabinet 302 and an exchange 306. The QKD switching system 320 may further modify the QKD switching systems 100, 120, 130, 160, 200, 300, 310 and/or QCC 140 as described with reference to FIGS. 1*a* to 3*b*, modifications thereto, combinations thereof, and/or as herein described. For simplicity, the reference numerals used in FIGS. 1*a* to 3*b* may be reused by way of example only for similar or the same components in relation to FIG. 3*c*. The QKD switching system 320 may perform the same or similar functionality as the QKD switching systems 100, 120, 130, 160, 200, 300, 310 and/or QCC 140 as described with reference to FIGS. 1*a* to 3*b* but where the QKD linking apparatus 102 is split between the exchange 306 and the roadside cabinet 302. In this example, the QKD linking apparatus 102 is split into a first QKD component 162 that operates within the exchange 306 and a second QKD component 164 that operates within the roadside cabinet 302 a similar manner as described with reference to FIG. 1*e*. The first QKD component 162 of the QKD linking apparatus 102 that is within the exchange 306 includes a QCC 106 as described with reference to FIGS. 1*a* to 3*b*. The second QKD component 164 of the QKD linking apparatus 102 that is within the roadside cabinet 302 includes a CTCR 108 and/or a QKD link coupling arrangement 210 or 166 as described with reference to FIG. 1*a* to 3*c*. The QKD linking apparatus 102 is configured to, via the first and second QKD components 162 and 164 and QKD link coupling arrangement 210/166, to provide quantum-safe or secure communications over the QKD links 103*a*-103*k* with endpoint devices 104*a*-104*k* based on QKD protocols and the like. In this example, the QKD switching system 320 includes a plurality of homes 304*a*, 304*b* to 304*j* in which each of the homes 304*a*-304*j* has a corresponding one of the endpoint devices 104*a*-104*j* that may function as described with reference to FIGS. 1*a* to 3*b*. Each of the homes 304*a*-304*j* includes at least one of the endpoint device 104*a*-104*j*, each of which are coupled to the QKD link coupling arrangement 210/166 of the second QKD component 164 (and/or first QKD component 162) of QKD linking apparatus 102 via corresponding QKD links 103*a*-103*j* (e.g. optical fibre links). Each endpoint device 104*a*-104*j* of a home 304*a*-304*j* may include a quantum receiver and a fibre IP router that is coupled to the corresponding QKD links 103*a*-103*j*. The communication medium of each of the QKD links 103*a*-103*j* may be at least one optical fibre.

In addition, in this example, the QKD switching system 320 includes an OGR 308 with an endpoint device 104k that is configured according to endpoint devices as described with reference to FIGS. 1a to 3b. The endpoint device 104k of the OGR 308 may include a quantum receiver and fibre IP router. The OGR 308 is coupled from the endpoint device 104k to the QKD link coupling arrangement 166/210 in the second QKD component 164 of QKD linking apparatus 102 located in the roadside cabinet 302 via a QKD link 103k (e.g. QKD/data link over fibre to the cabinet (FTTC)). Thus, quantum-secure or safe communications may be implemented between the OGR 308, exchange 306, homes 304a-304j and roadside cabinet 302 using the QKD switching apparatus 102 and appropriate QKD protocols for exchanging QKD keys, group keys and the like between the endpoint devices of the OGR 308 and homes 304a-304j and the like, which may form part of a QKD network and thus may enable quantum-safe or secure communications therebetween.

Although the QCC component 106 of any of FIGS. 3a to 3c may have been described as including a plurality of quantum transmitters or Q-TX(s) for enabling quantum transmission over a quantum channel of one or more QKD links 103a-103k of said endpoint devices 104a-104k, the QCC component 106 of any of FIGS. 3a to 3c may be further modified to include one or more quantum receivers (Q-RX(s)) in which one or more of the QKD links 103a-103k may each be configured to include a unidirectional or bidirectional quantum channel (e.g. an optical fibre) that couples with said one or more Q-RX(s) of the QCC component 106 of the QKD linking apparatus 102 for receiving quantum transmissions from the corresponding endpoint to the QKD linking apparatus 102, which may be required depending on the QKD protocol being implemented therebetween. As previously described, this will enable additional QKD protocols requiring an endpoint to transmit quantum information to the QCC component 106 of the QKD linking apparatus 102 to be implemented by the QKD linking apparatus 102 and corresponding endpoint(s), where each endpoint may include a Q-TX for transmitting quantum information over a quantum channel of the corresponding QKD link to the QKD linking apparatus 102 during operation of said additional QKD protocol and the like, and/or as the application demands.

Figure 4A:
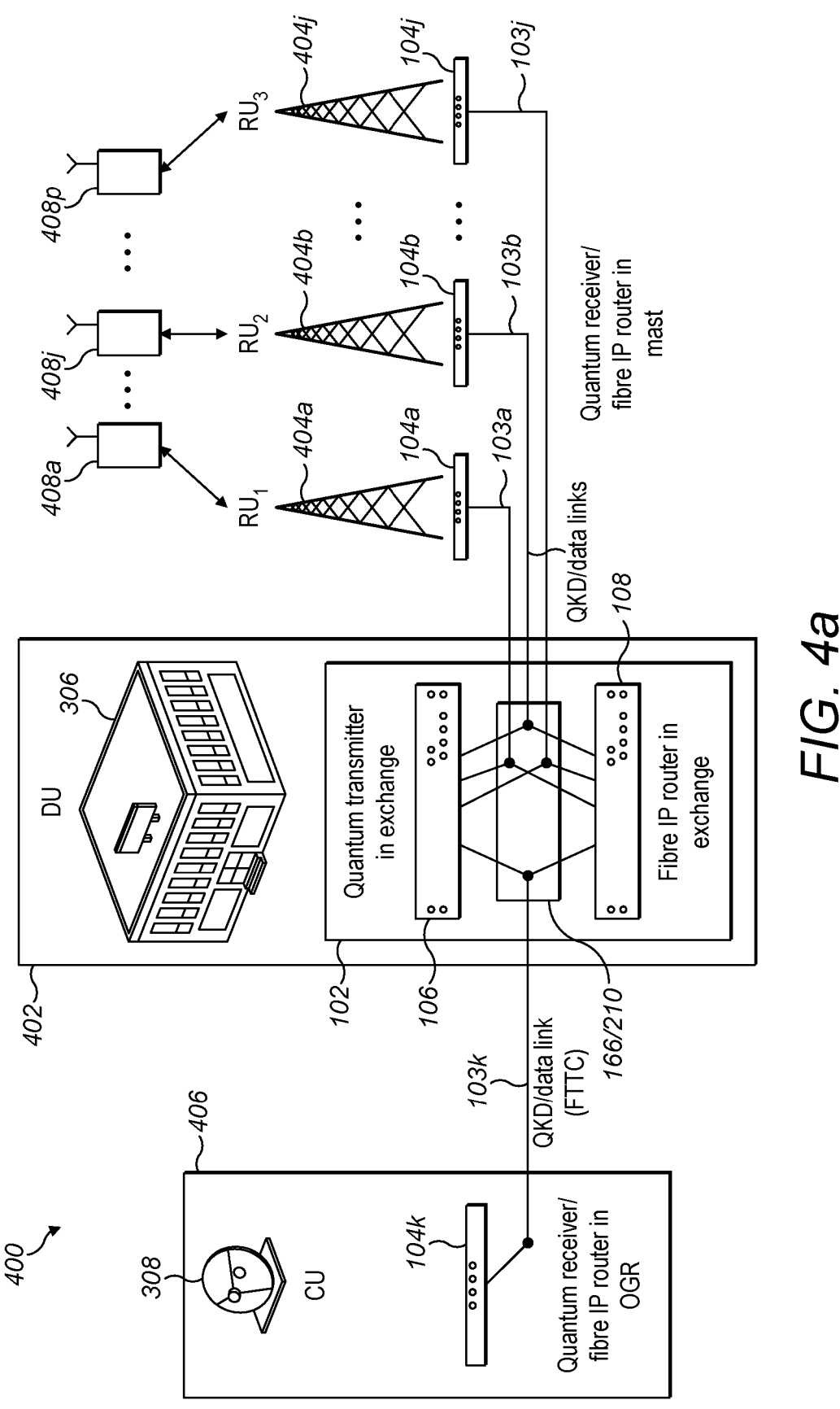
FIG. 4*a* is a schematic diagram illustrating an example 5G QKD switching system with endpoints being in 5G radio masts according to some embodiments of the invention.

FIG. 4a is a schematic diagram illustrating an example a 5G QKD switching system 400 for use with a 5G radio access network (RAN) system with endpoint devices 104a-104j being located in corresponding 5G radio masts 404a-404j. Although the radio network in FIG. 4a is described as a 5G radio network, this is by way of example only and the invention is not so limited, it is to be appreciated by the skilled person that the QKD switching system 400 of FIG. 4a may be further modified or configured for use with any type of radio/telecommunication network based on, without limitation, for example second-generation (2G and/or 2.5G), third-generation (3G), fourth-generation (4G), fifth-generation (5G), sixth generation (6G) and/or beyond radio network/telecommunication standards and/or other equivalent radio network/telecommunication standard and the like; combinations thereof; modifications thereto; and/or as herein described. The QKD switching system 400 may further modify the QKD switching systems 100, 120, 130, 160, 200, 300, 310, 320 and/or QCC 140 as described with reference to FIGS. 1a to 3c, modifications thereto, combinations thereof, and/or as herein described. For simplicity, the reference numerals used in FIGS. 1a to 3c may be reused by way of example only for similar or the same components in relation to FIG. 4a. The 5G QKD switching system 400 may be modified to perform the same or similar functionality as the QKD switching systems 100, 120, 130, 160, 200, 300, 310, 320 as described with reference to FIGS. 1a to 3c but where the QKD linking apparatus 102 is located within the distributed unit (DU) 402 of the 5G RAN system. In this example, the 5G QKD switching system 400 includes a distributed unit (DU) 402, a plurality of radio masts or radio units (RUs) 404a-404j and a centralized unit (CU) 406. The radio masts or RUs 404a-404j (e.g. RU1, RU2, and/or RUk) are configured to service a plurality of mobile units 408a-408p. The DU 402 includes an exchange 306 with a QKD linking apparatus 102, the QKD linking apparatus including a QCC 106, CTCR 108 and a QKD link coupling arrangement 166/210 as described with reference to FIGS. 1a to 3c. The QKD linking apparatus 102 is located in the exchange 306 and provides quantum-safe or secure communications based on QKD protocols for the CU 406 and RUs 404a-404j. Each of the RUs 404a-404j include at least one of the endpoint devices 104a-104j, each of which are coupled via the QKD link coupling arrangement 166/210 to the QKD linking apparatus 102 with corresponding QKD links 103a-103j (e.g. optical fibre links). Each endpoint device 104a-104j of an RU 404a-404j may include a quantum receiver and a fibre IP router that is coupled to the QKD link 103a-103j. The communication medium of each of the QKD links 103a-103j may be at least one optical fibre. The CU 406 includes an OGR 308 and an endpoint device 104k configured according to endpoint devices as described with reference to FIGS. 1a to 3c. The endpoint device 104k of the OGR 308 may include a quantum receiver and fibre IP router. The CU 406 is coupled via the endpoint device 104k of the OGR 306 to the QKD linking apparatus 102 of the DU 402 via a QKD link 103k (e.g. QKD/data link over fibre to the cabinet (FTTC)) to the QKD link coupling arrangement 166/210 of the QKD linking apparatus 102, which is located in an exchange 306 of the DU 402. Thus, quantum-secure or safe communications may be implemented in the CU, DU and RUs of a 5G RAN system using the QKD linking apparatus 102 and appropriate QKD protocols for exchanging QKD keys, group keys and the like between the nodes, entities, network nodes/entities, components of the CU, DU and RUs, which may form part of a QKD network and thus may enable quantum-safe or secure communications therebetween. Thus, the QKD switching system 100 may be used to enhance the security functions of a core communications network such as, without limitation, for example a 5G RAN system.

Although the QCC component 106 of FIG. 4a may have been described as including a plurality of quantum transmitters or Q-TX(s) for enabling quantum transmission over a quantum channel of one or more QKD links 103a-103k of said endpoint devices 104a-104k, the QCC component 106 of FIG. 4a may be further modified to include one or more quantum receivers (Q-RX(s)) in which one or more of the QKD links 103a-103k may each be configured to include a unidirectional or bidirectional quantum channel (e.g. an optical fibre) that couples with said one or more Q-RX(s) of the QCC component 106 of the QKD linking apparatus 102 for receiving quantum transmissions from the corresponding endpoint to the QKD linking apparatus 102, which may be required depending on the QKD protocol being implemented therebetween. As previously described, this will enable additional QKD protocols requiring an endpoint to transmit quantum information to the QCC component 106 of the QKD linking apparatus 102 to be implemented by the QKD linking apparatus 102 and corresponding endpoint(s), where each endpoint may include a Q-TX for transmitting quantum information over a quantum channel of the corresponding QKD link to the QKD linking apparatus 102 during operation of said additional QKD protocol and the like, and/or as the application demands.

Although the radio network in FIG. 4a is described as a 5G radio network, this is by way of example only and the invention is not so limited, it is to be appreciated by the skilled person that the QKD switching system 400 of FIG. 4a may be further modified or configured for use with any type of radio/telecommunication network based on, without limitation, for example second-generation (2G and/or 2.5G), third-generation (3G), fourth-generation (4G), fifth-generation (5G), sixth generation (6G) and/or beyond radio network/telecommunication standards and/or other equivalent radio network/telecommunication standard and the like; combinations thereof; modifications thereto; and/or as herein described.

Figure 4B:
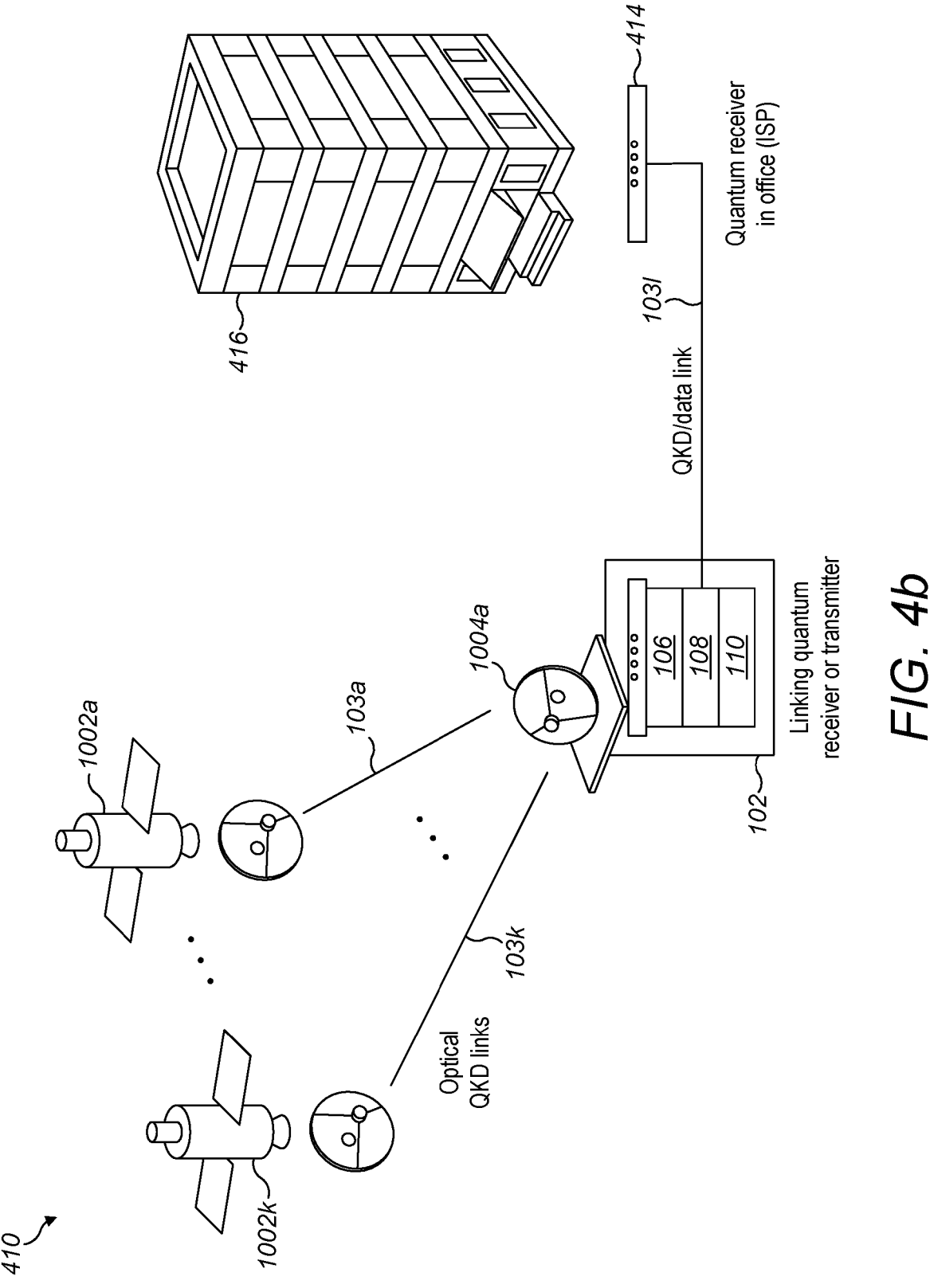
FIG. 4*b* is a schematic diagram illustrating an example satellite QKD switching system with some of the endpoints being satellites and the like according to some embodiments of the invention.

FIG. 4b is a schematic diagram illustrating an example a satellite QKD switching system 410 in which the QKD linking apparatus 102 is located in an satellite ground station or optical ground receiver (OGR) endpoint device 1004a. The QKD switching system 410 may further modify the QKD switching systems 100, 120, 130, 160, 1000, 200, 300, 310, 320, 400 and/or QCC 140 as described with reference to FIGS. 1a to 4a, modifications thereto, combinations thereof, and/or as herein described. For simplicity, the reference numerals used in FIGS. 1a to 4a may be reused by way of example only for similar or the same components in relation to FIG. 4b. In particular, the reference numerals of the QKD satellite system 1000 used in FIG. 1j may be reused by way of example only for similar or the same components in relation to FIG. 4b. In this example, rather than having QKD linking apparatus 102 being implemented within satellites 1002a-1002k as described with reference to FIG. 1j, the QKD linking apparatus 102 is located in the ground station endpoint device 1004a with satellites or endpoint devices 1002a-1002k and 414 connected to the ground station endpoint device 1004a via QKD links 103a-103k and 103l, respectively. The satellite endpoint devices 1002a-1002k are satellites and endpoint device 414 is an endpoint device with at least a quantum receiver located in an office building 416. The satellite QKD switching system 410 may perform the same or similar functionality as the QKD switching systems 100, 120, 130, 160, 1000, 200, 300, 310, 320, and 400 as described with reference to FIGS. 1a to 4a but where the QKD linking apparatus 102 is located within the ground station endpoint device 1004a.

FIG. 4b illustrates the an endpoint device 1004a (e.g. an OGR) having a QKD linking apparatus 102 and being used as a linking station to share keys between a number of satellite endpoints 1002a-1002k and an endpoint device 414 of an office 416. Depending on the type of QKD protocols performed by the controller 110 of the endpoint device 1004a, the endpoint device 1004a may have varying levels of trusted from a trusted node should the BB84 QKD protocol be performed to a less trusted node or untrusted node should one or more of the QKD protocols described with reference to FIGS. 5b to 5d and/or as herein described are performed for exchanging shared key(s) between one or more of the endpoint satellites 1002a-1002k and/or endpoint device 414 of office 416, where the QKD linking apparatus 102 and thus the OGR 1004a does not have having knowledge of the final shared keys between the endpoint satellites 1002a-1002k and/or endpoint device 414. By having a QKD linking apparatus 102 located in the endpoint OGR 1004a, the QKD linking apparatus 102 may perform one or more QKD protocols to allow keys to be shared between the satellite endpoints 1002a-1002k.

The ground station of OGR endpoint device 1004a includes the QKD linking apparatus 102, in which the QKD linking apparatus 102 including a QCC 106, CTRC 108 and controller 110 as described with reference to FIGS. 1a to 4a. The QKD linking apparatus 102 is located in the OGR endpoint 1004a and provides quantum-safe or secure communications based on QKD protocols for the satellite endpoints 1002a-1002k and endpoint 414 of office 416. Each of the satellite endpoints 1002a-1002k and/or endpoint device 414 of office 416 are assigned and coupled via the QKD links 103a-103k and 103l to QKD linking apparatus 102 of the ground station or OGR endpoint device 1004a. The QKD links 103a-103k that connect the satellites 1002a-1002k to endpoint device 1004a may include optical free-space channels (or other suitable quantum channel) for the Q-channels of the QKD links 103a-103k, and satellite wireless communications (or any other suitable classical channel) channels for the C-channels of the corresponding QKD links 103a-103k. The QKD link 103l connecting the endpoint 414 of office 406 to the OGR endpoint 1004a may include optical fibre channels for the Q-channel(s) and C-channels of the QKD link 103l assigned to endpoint 414. Each of the satellite endpoint devices 1002a-1002k and endpoint device 414 may include a suitable quantum receiver and/or quantum transmitter depending on the types of QKD protocols that are intended to be implemented with the satellite endpoint devices 1002a-1002k and/or endpoint device 414 and the QKD linking apparatus 102 of OGR endpoint 1004a over QKD links 103a-103k and/or 103l. Thus, quantum-secure or safe communications may be implemented in the satellite endpoint devices 1002a-1002k and endpoint device 414 of office 416 using the QKD linking apparatus 102, QKD links 103a-103k and 103l and appropriate QKD protocols for exchanging QKD keys, group keys and the like between the endpoint device 1004a and the satellite endpoints 1002a-1002k and endpoint device 414 of office 416, which may form part of a QKD network and thus may enable quantum-safe or secure communications therebetween.

Figure 4C:
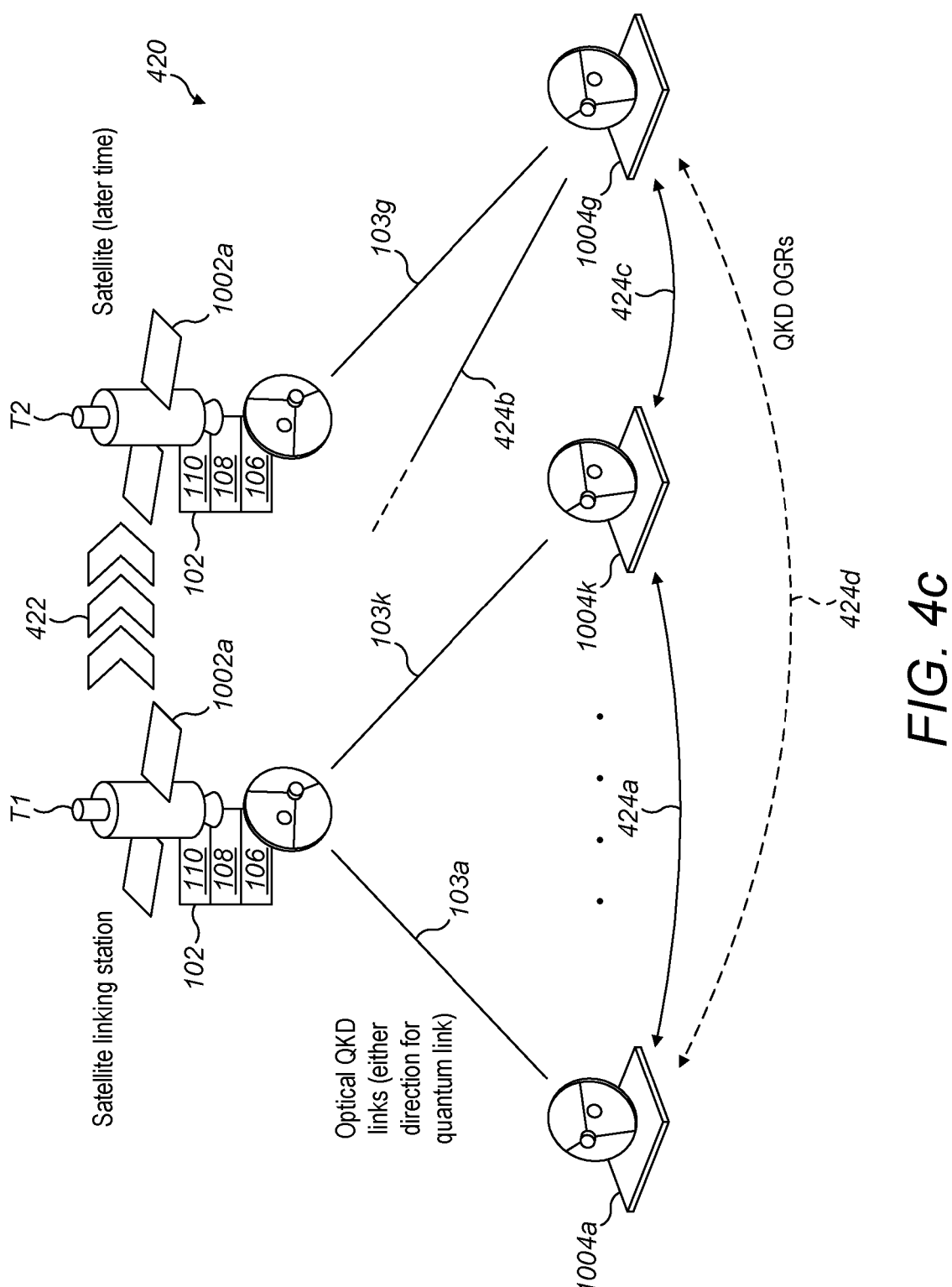
FIG. 4*c* is a schematic diagram illustrating an example satellite QKD switching system with endpoints being optical ground receiver stations and the like according to some embodiments of the invention.

FIG. 4c is a schematic diagram illustrating an example a satellite QKD switching system 420 in which the QKD linking apparatus 102 is located in a satellite 1002a, where the satellite 1002a tracks an orbital path 422 that passes over a plurality of endpoint devices 1004a-1004k and 1004g. The QKD switching system 420 may further modify the QKD switching systems 100, 120, 130, 160, 1000, 200, 300, 310, 320, 400. 410 and/or QCC 140 as described with reference to FIGS. 1a to 4b, modifications thereto, combinations thereof, and/or as herein described. For simplicity, the reference numerals used in FIGS. 1a to 4b may be reused by way of example only for similar or the same components in relation to FIG. 4c. In particular, the reference numerals of the QKD satellite system 1000 used in FIG. 1j may be reused by way of example only for similar or the same components in relation to FIG. 4c. In this example, the QKD linking apparatus 102 is implemented in satellites 1002a as described with reference to FIG. 1j with endpoint devices 1004a-1004k and 1004g connected to the satellite 1002a via QKD links 103a-103k and 103g, respectively. The satellite endpoint devices 1002a-1002k are satellites and endpoint device 404 is an endpoint device with at least a quantum receiver located in an office building 406. The satellite QKD switching system 410 may perform the same or similar functionality as the QKD switching systems 100, 120, 130, 160, 1000, 200, 300, 310, 320, and 400 as described with reference to FIGS. 1a to 4a but where the QKD linking apparatus 102 is located within the ground station endpoint device 1004a.

FIG. 4c illustrates the same satellite 1002a following or tracking an orbital path 422 and being used as a QKD linking apparatus 102/station between multiple endpoint devices 1004a and 1004k. The endpoint devices 1004a and 1004k may be optical ground receiver stations. At time point T1, the satellite 1002a may be able to transmit to and/or receive from both endpoint devices 1004a and 1004k at about the same time via the QKD links 103a and 103k assigned thereto. During this time T1, the satellite 1002a may use the QKD linking apparatus 102 to perform one or more QKD protocols with endpoint devices 1004a and 1004k via the QKD links 103a and 103k assigned thereto for exchanging one or more shared keys therebetween, and thereafter the endpoint devices 1004a and 1004k may perform secure communications therebetween using said exchanged shared keys. Furthermore, as the satellite 1002a tracks further along its orbital path 422 it may disconnect from the endpoint devices 1004a and 1004k at a later point in time T2 (e.g. the satellite 1002a may have tracked out of range or over the horizon of the endpoint devices 1004a and 1004k) and so the QKD linking apparatus 102 of the satellite 1002a may be used at time T2 to connect with another endpoint device 1004g that is in range via its assigned QKD link 103g by controller 110 of the QKD linking apparatus 102 of satellite 1002a, whereby the controller 110 may operate to perform a QKD protocol for exchanging shared key(s) with the endpoint device 1004g (which may also be an OGR) and/or other endpoint devices (other OGRs) connected via corresponding QKD links with satellite 1002a, and/or performing a QKD protocol for exchanging shared key(s) between endpoint device 1004g and endpoint devices 1004a and/or 1004k. In the latter case, it may take one or more orbits of the satellite 1002a to perform a full key exchange between endpoint device 1004g and endpoint devices 1004a and/or 1004k, because one or more of these endpoint devices is out of range of the satellite 1002a.

The satellite 1002a includes the QKD linking apparatus 102, in which the QKD linking apparatus 102 including a QCC 106, CTRC 108 and controller 110 as described with reference to FIGS. 1a to 4b. The QKD linking apparatus 102 is located in the satellite 1002a and provides quantum-safe or secure communications based on QKD protocols for the endpoints 1004a-1004k and endpoint device 1004g. Each of the endpoints 1004a-1004k and/or endpoint device 1004g are assigned and coupled via the QKD links 103a-103k and 103g to QKD linking apparatus 102 of the satellite 1002a. The QKD links 103a-103k and 103l that connect the endpoints 1004a-1004k and 1004g to satellite 1002a include optical free-space channels (or other suitable quantum channel) for the Q-channels of the QKD links 103a-103k and 103g, and satellite wireless communications (or any other suitable classical channel) channels for the C-channels of the corresponding QKD links 103a-103k and 103g. Each of the endpoint devices 1004a-1004k and endpoint device 1004g may include a suitable quantum receiver and/or quantum transmitter depending on the types of QKD protocols that are intended to be implemented with the endpoint devices 1004a-1004k and/or endpoint device 1004g and the QKD linking apparatus 102 of satellite 1002a over QKD links 103a-103k and/or 103g. Thus, quantum-secure or safe communications may be implemented in the endpoint devices 1004a-1004k and endpoint device 1004g using the QKD linking apparatus 102, QKD links 103a-103k and 103g and appropriate QKD protocols for exchanging QKD keys, group keys and the like between the endpoint devices 1004a, 1004k, and/or 1004g, which may form part of a QKD network and thus may enable quantum-safe or secure communications therebetween.

In this example, the satellite 1002a of the QKD switching system 420 tracks an orbital path 422 that passes over a plurality of endpoint devices 1004a-1004k and 1004g. At a first point in time (e.g. time T1), the satellite 1002a may be passing over endpoint devices 1004a and 1004k and be connected simultaneously to these endpoint devices 1004a and 1004k via QKD links 103a and 103k assigned thereto by the controller 110 of the QKD linking apparatus 102 of satellite 1002a. While both endpoint devices 1004a and 1004k are connected to the satellite 1002a via the corresponding QKD links 103a and 103k, the controller 110 of the QKD linking apparatus satellite 1002a may be configured to perform a QKD protocol for exchanging a shared key (or if time permits a plurality of shared keys) between the endpoint devices 1004a and 1004k using the QKD links 103a and 103k assigned thereto.20 Thereafter, the endpoint devices 1004a and 1004k may communicate via classical channels of the QKD links 103a and 103k via satellite 1002a. However, if the satellite 1002a has already passed over and is out of range of the endpoint devices 1004a and 1004k and so cannot relay secure communications therebetween using the exchanged shared key(s), the endpoint devices 1004a and 1004k may establish a separate communication channel 424 that bypasses satellite 1002a for performing secure communications thereon using the shared key(s) and the like. The separate communication channel 424 may be any wireless or wired communication channel that can be established between the endpoint devices 1004a and 1004k for performing secure communications therebetween using the shared key(s) and the like.

As the satellite 1002a of the QKD switching system 420 continues tracks its orbital path 422 it may pass over endpoint device 1004g at a second point in time (e.g. time T2). The satellite 1002a may be passing over endpoint device 1004g and other endpoint devices (not shown) and be connected simultaneously to these endpoint devices via QKD links 103g and the like that are assigned thereto by the controller 110 of the QKD linking apparatus 102 of satellite 1002a. While these endpoint devices 1004g and the other endpoint devices are connected to the satellite 1002a via their corresponding QKD links, the controller 110 of the QKD linking apparatus 102 of satellite 1002a may be configured to perform a QKD protocol for exchanging a shared key (or if time permits a plurality of shared keys) between the endpoint devices 1004g and the other endpoint devices using the QKD links assigned thereto. Thereafter, the endpoint devices including endpoint device 1004g may communicate via classical channels of their QKD links via satellite 1002a using the exchanged shared keys. However, if the satellite 1002a has already passed over and is out of range of the endpoint devices including endpoint device 1004g, and so cannot relay secure communications therebetween using the exchanged shared key(s), the endpoint devices and endpoint device 1004g may establish a separate communication channel 424b that bypasses satellite 1002a for performing secure communications thereon using the shared key(s) and the like. The separate communication channel 424b may be any wireless or wired communication channel that can be established between the endpoint devices and endpoint device 1004g for performing secure communications therebetween using the shared key(s) and the like.

In another example, the QKD linking apparatus 102 of the satellite 1002a may perform a QKD protocol for exchanging shared keys between endpoint devices 1004a, 1004k and 1004g (and/or other endpoint devices), in which the controller 110 of the satellite 1002a may start the initial key exchange between endpoint devices 1004a and 1004k at time point T1 using the QKD links 103a and 103k assigned to each of the endpoint devices 1004a and 1004k. Thus, the satellite 1002a may perform as much of the QKD protocol as possible with endpoint devices 1004a and 1004k before passing out of range of endpoint devices 1004a and 1004k and into range of endpoint device 1004g. As the satellite 1002a of the QKD switching system 420 continues along its orbital path 422 it will then pass over endpoint device 1004g at the second point in time (e.g. time T2), where the controller 110 of the satellite 1002a is configured to continue to perform those steps of the QKD protocol that it can with endpoint device 1004g for performing a key exchange of one or more shared keys between endpoint devices 1004a, 1004k and 1004g. Thus, depending on the steps of the QKD protocol being performed, the satellite 1002a may require one or more orbits to complete the QKD protocol and securely ensure one or more shared keys are exchanged between endpoint devices 1004a, 1004k and 1004g. Once completed, the endpoint devices 1004a, 1004k and 1004g may use the satellite 1002a to relay the secure communications therebetween via the QKD linking apparatus 102 using their corresponding QKD links. Alternatively or additionally, each of the endpoint devices 1004a, 1004k and 1004g may establish one or more communication links/channels 424a, 424c, 424d that bypass satellite 1002a for performing the secure communications therebetween using the exchanged shared keys. The separate communication links/channel 424a, 424c, 424d may be any wireless or wired communication channel that can be established between the endpoint devices and endpoint device 1004g for performing secure communications therebetween using the shared key(s) and the like.

Moreover, as described in FIG. 1j, the satellite 1002a may be part of a satellite network with a plurality of satellites including satellite 1002a in orbit, where each satellite 1002a follows their own orbital path 422. The plurality of satellites may use the QKD linking apparatus 102 thereon to establish one or more QKD links therebetween to form a satellite mesh network. Thus, the satellite mesh network provides the advantage of extending the distance in which endpoint devices 1004a, 1004k and 1004g may keep in touch or communicate with satellite 1002a as it follows its orbital path 422. That is, the mesh network allows the satellites to pass communications between endpoint devices 1004a, 1004k and 1004g through satellite 1002a during performance of the QKD protocol for exchanging a shared key therebetween. The endpoint devices 1004a, 1004k and 1004g may use the satellite mesh network for performing secure communications therebetween over classical satellite links using the shared keys exchanged therebetween. Thus, even though satellite 1002a may pass out of range of endpoint devices 1004a and 1004k at time T2 and into range of endpoint device 1004g whilst performing a QKD protocol for exchanging shared keys therebetween, the satellite 1002a may use one or more other QKD protocols to establish secure QKD links between the satellites in the mesh satellite network to ensure the QKD protocol data passed between the satellite 1002a and endpoint devices 1004a, 1004k and 1004g is secure. The satellites in the mesh network may act as passthrough links that send the QKD protocol data in encrypted form to the controller 110 of satellite 1002a, which ensure that the controller 110 of QKD linking apparatus 102 of satellite 1002a may perform the QKD protocol with all endpoint devices 1004a, 1004k and 1004g regardless of whether satellite 1002a has passed out of range of one or more of the endpoint devices 1004a, 1004k and 1004g. Thereafter, once the QKD protocol has been performed and each of the endpoint devices 1004a, 1004k and 1004g have exchanged one or more shared keys, each of the endpoint devices 1004a, 1004k and 1004g may perform secure communications with each other over satellite links of the satellite mesh network using the shared key(s). Alternatively or additionally, each of the endpoint devices 1004a, 1004k and 1004g may establish one or more communication links/channels 424a, 424c, 424d that bypass satellite 1002a and/or the satellite mesh network for performing the secure communications therebetween using the exchanged shared keys. The separate communication links/channel 424a, 424c, 424d may be any wireless or wired communication channel that can be established between the endpoint devices 1004a, 1004k and endpoint device 1004g for performing secure communications therebetween using the shared key(s) and the like.

Although the satellite 1002a and its QKD linking apparatus 102 is described as performing a QKD protocol between endpoint devices 1004a, 1004k, and 1004g for exchanging a shared key between the endpoint devices 1004a, 1004k and 1004g, this is by way of example only and the invention is not so limited, it is to be appreciated by the skilled person that the satellite 1002a and its QKD linking apparatus 102 may perform key exchange between two or more endpoint devices and/or between two or more endpoint devices that are geographically separated but that may be geographical located in locations that are passed over by the orbital path 422 of satellite 1002a or at least the orbital paths of at least one or more other satellites in a satellite mesh network that satellite 1002a is a part of, modifications thereto, combinations thereof, as herein described and/or as the application demands.

As described above with reference to FIGS. 1a to 4c and/or as described herein, the QKD linking apparatus 102 or 202 of QKD systems 100, 120, 130, 140, 150, 160, 165, 170, 180, 200, 300, 310, 320, 400, 410, 420 of FIGS. 1a to 4c may be used, depending on the configuration of each of the QKD links of each of the endpoint devices that communicatively couple the endpoint devices to the QKD linking apparatus, with any suitable type of key exchange or QKD protocol for securely exchanging a key (or QKD key) between the endpoint device(s) and/or the QKD linking apparatus using the quantum channel(s) and corresponding classical/non-quantum communication channels of the corresponding QKD links. In the following, the reference numerals of FIGS. 1a to 4c may be used for similar or the same features and/or components. As described above, each endpoint device 104a/204a has a QKD link 103a/203a that couples the endpoint device 104a/204a to each other endpoint device 104b/204b via the QKD linking apparatus 102/202. Thus, for example, two or more endpoint device(s) 104a-104k/204a-204k/1004a-1004k may perform a QKD protocol or key exchange protocol that uses the corresponding quantum channels and classical communication channels provided by the QKD links 103a-103k/203a-203k connecting the endpoint devices 104a-104k/204a-204k/1004a-1004k to the QKD linking apparatus 102/202. Thus, the QKD linking apparatus 102/202 may act as an intermediary device for enabling a QKD protocol for key exchange to be performed for one or more endpoint devices 104a-104k/204a-204k/1004a-1004k. Any suitable or secure QKD protocol for key establishment may thus be implemented to ensure at least two endpoint devices 104a-104k/204a-204k/ 1004a-1004k securely share or establish/negotiate the same cryptographic key. There may be a plurality of QKD protocol(s) that may be used by the QKD linking apparatus 102/202 and endpoint devices 104a-104k/204a-204k/1004a-1004k that make use of the corresponding QKD links, the QKD protocols may be based on, without limitation, for example a QKD protocol from the Bennett and Brassard 1984 (BB84) family of QKD protocols; the BB84 protocol; a modified BB84 protocol as herein described; modified versions of the BB84 protocol configured to ensure the QKD linking apparatus is unable to derive the resulting exchanged QKD keys between the endpoint devices; the Bennet 1992 (B92) QKD protocol; the Six-State Protocol (SSP) QKD protocol; the Scarani Acin Ribordy Gisin 2004 (SARG04) QKD protocol; the Doherty Parrilo Spedalieri 2002 (DPS02) QKD protocol; the differential phase shift (DPS) QKD protocol; the Eckert 1991 (E91) QKD protocol; the coherent one-way (COW) QKD protocol; the Khan Murphy Beige 2009 (KMB09) QKD protocol; the Esteban Serna 2009 (S09) QKD protocol; the Serna 2013 (S13) QKD protocol; the A Abushgra K Elleithy 2015 (AK15) QKD protocol; any one or more other entanglement based QKD protocols; any one or more future QKD protocols; any other QKD protocol capable of making use of a quantum channel and non-quantum channel of each of the QKD links 103a-103k/203a-203k; any other quantum key exchange protocol used to establish and/or exchange a shared key between at least two or more endpoint devices 104a-104k/204a-204k/1004a-1004k and/or at least one endpoint device 104a/204a and a third party, an intermediary or cloud service and the like; any QKD protocol in which the exchanged key may be based on quantum key distributed keys and/or may be a quantum-safe or quantum secure key due to the QKD protocol being a quantum-secure key establishment protocol establishes a QKD shared key between the endpoint devices 104a-104k/ 204a-204k/1004a-1004k and the like; combinations thereof, modifications thereto and the like and/or as the application demands.

In addition to using the BB84 QKD protocol, FIGS. 5a to 5d further describe using the QKD linking apparatus 102 a of FIG. 1a with the BB84 QKD protocol and also several modifications of the BB84 QKD protocol, which may be used by the QKD linking apparatus 102/202 and endpoint devices 104a-104k/204a-204k/1004a-1004k via the corresponding QKD links 103a-103k assigned to each of the endpoint devices 104a-104k/204a-204k/1004a-1004k to achieve an even higher level of privacy/secrecy in which the intermediary device (e.g. QKD linking apparatus 102/202) is unable to derive the shared key or key (e.g. final key or agreed key) exchanged between the corresponding endpoint devices 104a-104k/204a-204k/1004a-1004k at the end of the QKD protocol. In the following, at least two or more of the endpoint devices 104a-104k/204a-204k/1004a-1004k make use of the QKD links 103a-103k assigned thereto by the QKD linking apparatus 102/202, which acts as the intermediary device/sender in the QKD key exchange protocol, to establish and/or exchange a shared key or key therebetween, and/or with at least one endpoint device 104a/204a/1004a and/or a third party, an intermediary or cloud service and the like. For simplicity, the reference numerals of FIGS. 1a to 1i are re-used for similar or the same components/features for illustrating the QKD protocol(s)/process(es) of FIGS. 5a to 5d. Although QKD linking apparatus 102 of QKD switching system 100 of FIGS. 1a to 1i are described in relation to the QKD protocol(s)/process(es) of FIGS. 5a to 5d, this is byway of example only and the invention is not so limited, it is to be appreciated by the skilled person that the QKD protocols may be implemented and/or used by any of the QKD linking apparatus, endpoint device(s), QKD links and/or QKD switching systems as described with reference to FIGS. 1a to 6b, modifications thereof, combinations thereto, as herein described and/or as the application demands.

Figure 5A:
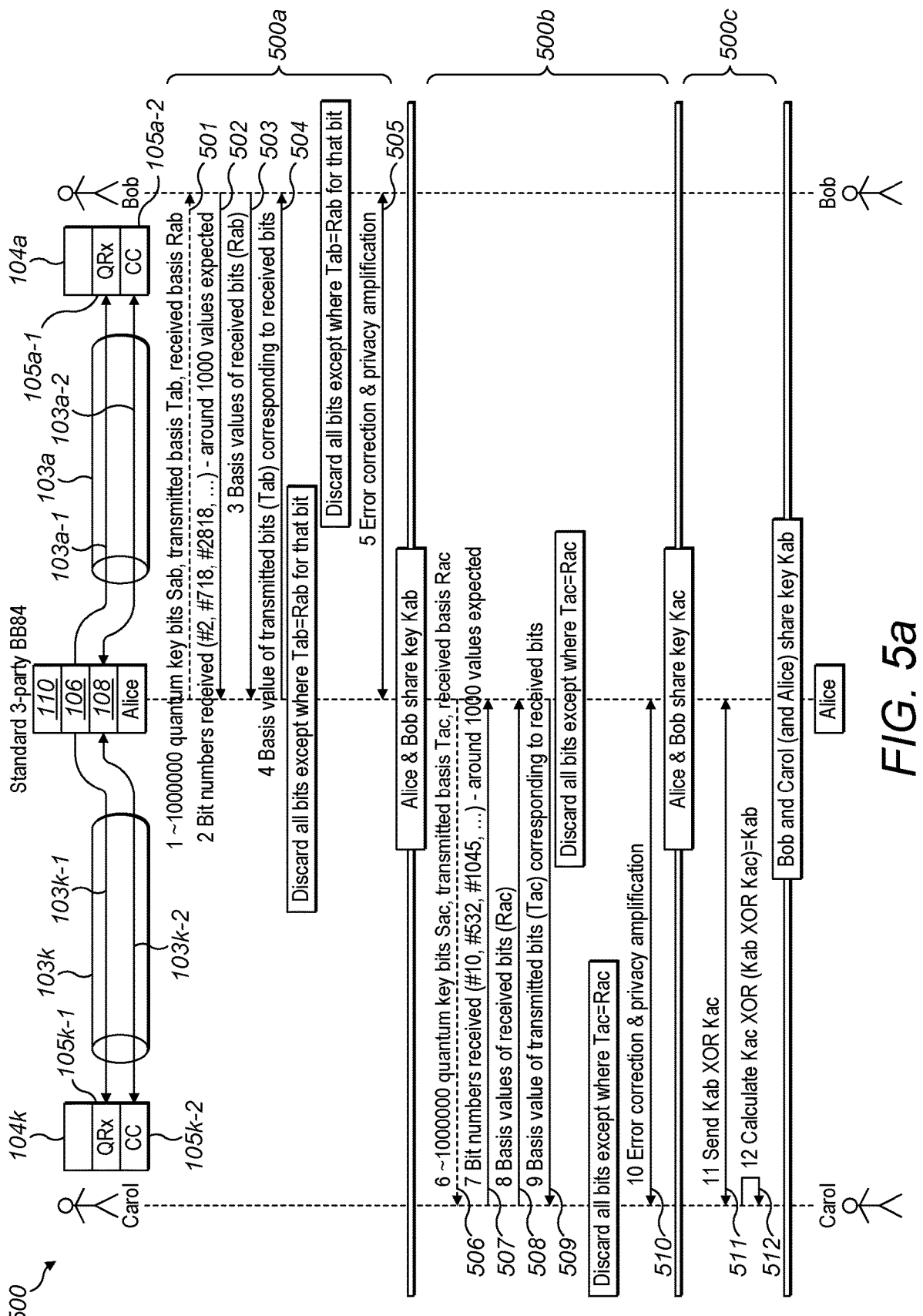
FIG. 5*a* is a flow diagram illustrating an example QKD protocol for use with QKD linking apparatus of QKD switching system of any of FIGS. 1*a* to 4*c* according to some embodiments of the invention.

FIG. 5a is a flow diagram illustrating an example BB84 QKD protocol/process 500 for use with a QKD linking apparatus 102 of QKD switching system 100 of FIG. 1a and/or any other QKD linking apparatus or QKD switching system of any of FIGS. 1a to 4, modifications thereto, combinations thereof, and/or as herein described and/or as the application demands. For simplicity, the reference numerals of FIGS. 1a to 1i are re-used for similar or the same components/features for illustrating the BB84 QKD protocol/process 500 of FIG. 5a. In this example, the QKD linking apparatus 102 (e.g. Alice) includes a controller 110, quantum communications component (QCC) 106 and a CTRC component 108 in which first and second QKD links 103a and 103k have been assigned to first and second endpoint devices 104a and 104k, respectively (e.g. Bob and Carol, respectively). In this example, the QCC 106 includes at least a plurality of quantum transmitter(s) 106a-1 to 106k-1, the first endpoint device (e.g. Bob) includes a quantum receiver (Q-RX) 105a-1 and a classical transceiver (CC) 105a-2, and the second endpoint device (e.g. Carol) includes a quantum receiver (Q-RX) 105k-1 and a classical transceiver (CC) 105k-2, which are used to form the corresponding QKD links 103a-103k therebetween. The first QKD link 103a, which is assigned to the first endpoint device 104a, includes a first uni-directional quantum channel 103a-1 for transmitting, during the QKD protocol 500, quantum information from a quantum transmitter (Q-TX) 106a-1 of the QCC 106 to the first endpoint device 104a for reception by the Q-RX 105a-1 of the first endpoint device 104a, and a bi-directional classical channel 103a-2 for transmission of classical information between a first CTRX 108a of the CTRC component 108 that is assigned to the first endpoint device 104a and the CC 105a-2 of the first endpoint device 104a. The second QKD link 103k, which is assigned to the second endpoint device 104k, includes a first uni-directional quantum channel 103k-1 for transmitting, during the QKD protocol 500, quantum information from a quantum transmitter (Q-TX) 106k-1 of the QCC 106 to the second endpoint device 104k for reception by the Q-RX 105k-1 of the second endpoint device 104k, and a bi-directional classical channel 103k-2 for transmission of classical information between a second CTRX 108k of the CTRC component 108 that is assigned to the second endpoint device 104k and the CC 105k-2 of the second endpoint device 104k.

In the BB84 QKD protocol/process 500, the sender device (also referred to as an intermediary device or Alice) is the QKD linking apparatus 102 (which may be a terrestrial fibre optic device) that is communicatively coupled by first and second QKD links 103a and 103k to the first and second endpoint devices 104a and 104k (e.g. Bob and Carol, respectively), respectively. The BB84 QKD protocol is a well-known QKD protocol using, without limitation, for example photon polarisation bases to transmit the information that may be used to exchange a shared key (or a key) between a first and second endpoint device 104a-104k via an intermediary device 102 such as the QKD linking apparatus 102. The BB84 QKD protocol may use a set of bases including at least two pairs of conjugate photon polarisation bases (e.g. a set of bases including, without limitation, for example a rectilinear photon basis (e.g. vertical (0°) and horizontal (90°) polarisations) and diagonal photon basis (e.g. 450 and 1350 polarisations) or the circular basis of left- and right-handedness etc.) In the BB84 QKD protocol, QKD is performed between a sender device i.e. the QKD linking apparatus 102 (e.g. often referred to as Alice) and the first endpoint device 104a (e.g. often referred to as Bob) and a second endpoint device 104k (e.g. often referred to as Carol). The BB84 protocol is a QKD key exchange protocol that can make use of the quantum communication channel 103a-1 of the QKD link 103a between the first device 104a and the QKD linking apparatus 102 (e.g. sender), and another quantum communication channel 103k-1 of the QKD link 103k between the second endpoint device 104k and the QKD linking apparatus 102 in which the first endpoint device 104a and second endpoint device 104k exchange and share the same cryptographic key.

The QKD linking apparatus or sender device 102 and first endpoint device 104a are connected by the quantum communication channel 103a-1 of the QKD link 103a therebetween, which allows quantum information (e.g. quantum states) to be transmitted from a Q-TX 106a-1 of the QCC 106 of the sender device 102 to the Q-RX 105a-1 of the first endpoint device 104a. As well, the sender device 102 and second endpoint device 104k are connected by another quantum communication channel 103k-1 of QKD link 103k therebetween which allows quantum information (e.g. quantum states) to be transmitted from the Q-TX 106k-1 of the QCC 106 of the sender device 102 to the Q-RX 105k-1 of the second endpoint device 104k. Each quantum channel may be, without limitation, for example, an optical fibre or optical free space. Furthermore, the sender device 102 and first endpoint device 104a (and sender device 102 and second endpoint device 104k) also communicate via the CTRX 108 over non-quantum channels or classical channels 103a-2 or 103k-2 of their corresponding QKD links 103a or 103k, respectively. The non-quantum channels 103a-2 or 103k-2 may be, without limitation, for example a fibre optic channel, telecommunications channel, radio channel, broadcast radio or the internet and/or any other wireless or wired communications channel and the like. As well, when negotiating the key the first and second endpoint devices 104a and 104k may communicate over the non-quantum channel or classical channel 103a-2 or 103k-2 via their respective QKD links 103a and 103k, respectively, or, as an option over any other classical communication channel therebetween, for exchanging the final shared cryptographic key between the first and second endpoint devices 104a-104k. The BB84 protocol requires that the sender device or QKD linking apparatus 102 (e.g. a third party or intermediary) be used to perform the key exchange/establishment between the first and second endpoint devices 104a and 104k to be a trusted device. This is because the BB84 protocol requires that the intermediary device knows the entire basis used by the first and second devices 104a and 104k for receiving their respective quantum transmissions.

Referring to FIG. 5a, in the QKD protocol/process 500 of a 3-party BB84 protocol, the sender device (also referred to as an intermediary device or Alice) is the QKD linking apparatus 102 (e.g. which may be a terrestrial fibre optic device) that is communicatively coupled by first and second QKD links 103a and 103k to the first and second endpoint devices 104a and 104k (e.g. Bob and Carol, respectively). The QKD protocol/process 500 may include the following BB84 subprocess(es) 500a, 500b and 500c. In the first BB84 subprocess 500a, the QKD linking apparatus

102 (e.g. Alice) and the first endpoint device 104a (e.g. Bob) share a first key (e.g. key Kab). In the second BB84 subprocess 500b, the QKD linking apparatus 102 (e.g. Alice) and the second endpoint device 104k (e.g. Carol) share a second key (e.g. key Kac). In the third BB84 subprocess 500c the first and second endpoints 104a and 104k (e.g. Bob and Carol), and the QKD linking apparatus 102 (e.g. Alice) share key Kab. Thus, the BB84 QKD protocol/process 500 includes the following steps from the first BB84 subprocess 500a, second BB84 subprocess 500b and third BB84 subprocess 500c.

The first BB84 subprocess 500a of the BB84 QKD protocol/process 500 includes the following steps of: In step 501, the QKD linking apparatus 102, as sender, sends a first QKD key, denoted Sab (e.g. 1000000 quantum key bits/ symbols, Sab), via Q-TX 106a-1 over the first quantum channel 103a-1 of the first QKD link 103a to the first endpoint device 104a using a first transmitted basis set, Tab. The first endpoint device 104a receives the quantum transmission of the first QKD key via Q-RX 105a-1 using a first receiving basis set, Rab. For example, the QKD linking apparatus 102 may include a controller 110 that controls the use of a random bit generator 142 to generate the first QKD key, in which the controller 110 controls the QCC 106 to route/switch the first QKD key (generated random bit stream) to the Q-TX 106a-1 of the QCC 106 assigned to the first endpoint device 104a for transmitting the first QKD key to the first endpoint device 104a over the first QKD link 103a including the first quantum channel 103a-1 (e.g. optical channel/fibre).

In step 502, the first endpoint device 104a transmits over the classical channel 103a-2 to the QKD linking apparatus 102 an indication of the symbols/bits of the first QKD key (e.g. bit numbers received (#2, #718, #2818, . . . )—around, without limitation, for example 1000 values expected) that were validly received by the Q-RX 105a-1 of the first endpoint device. In step 503, the first endpoint device 104a also transmits over the classical channel 103a-2 to the QKD linking apparatus 102 the basis values of the received symbols/bits of the first QKD key, denoted Rab. That is, Rab includes the basis values used by the Q-RX 105a-1 of the first endpoint device 104a to receive the first QKD key via the quantum channel 103a-1. In step 504, the QKD linking apparatus 102 sends over the classical channel 103a-2 of the QKD link 103a the basis values of the transmitted symbols/ bits, denoted Tab, that correspond to the received indications of the validly received bits. For example, the controller 110 of the QKD linking apparatus 102 also switches/routes the transmitted basis, Tab, used to send the first QKD key as a classical transmission via a CTRX 108a of the CTRC component 108 that is assigned to the first endpoint device 104a for transmission of the transmitted basis, Tab, over a first classical channel 103a-2 of the first QKD link 103a of the endpoint device 104a. Thus, both the QKD linking apparatus 102 and the endpoint device 104a have Tab and Rab and knowledge of the validly received symbols/bits of the first QKD key received by the first endpoint device 104a. Both the QKD linking apparatus 102 and the first endpoint device determine a first shared key, Kab, by discarding all symbols/bits of the first QKD key except those where Tab(i)=Rab(i) for that validly received i-th symbol/bit of the first QKD key. In step 505, the first endpoint device 104a and the QKD linking apparatus 102 may perform error correction and privacy amplification on the retained symbols/bits of step 504, in which the resulting set of symbols/ bits becomes the first shared key, Kab, between the first endpoint device 104a and the QKD linking apparatus 102.

The first BB84 subprocess 500a is repeated but instead with the second endpoint device 104k and QKD linking apparatus 102 for a second QKD key in a second BB84 subprocess 500b of the BB84 QKD protocol/process 500. The second BB84 subprocess 500b of the BB84 QKD protocol/process 500 includes the following steps of: In step 506, the QKD linking apparatus 102, as sender, sends a second QKD key, denoted Sac (e.g. 1000000 quantum key bits/symbols, Sac), via Q-TX 106k-1 over the second quantum channel 103k-1 of the second QKD link 103k to the second endpoint device 104k using a second transmitted basis set, Tac. The second endpoint device 104k receives the quantum transmission of the second QKD key via Q-RX 105k-1 using second receiving basis set, Rac. For example, the QKD linking apparatus 102 may include a controller 110 that controls the use of a random bit generator 142 to generate the second QKD key, in which the controller 110 controls the QCC 106 to route/switch the second QKD key (generated random bit stream) to the Q-TX 106k-1 of the QCC 106 assigned to the second endpoint device 104k for transmitting the second QKD key to the second endpoint device 104k over the second QKD link 103k including the second quantum channel 103k-1 (e.g. optical channel/fibre). In step 507, the second endpoint device 104k transmits over the classical channel 103k-2 to the QKD linking apparatus 102 an indication of the symbols/bits of the second QKD key (e.g. bit numbers received (#10, #532, #1045, . . . )—around 1000 values expected) that were validly received by the Q-RX 105k-1 of the second endpoint device 104k. In step 508, the second endpoint device 104k also transmits over the classical channel 103k-2 to the QKD linking apparatus 102 the basis values of the received symbols/bits of the first QKD key, denoted Rac. That is, Rac includes the basis values used by the Q-RX 105k-1 of the second endpoint device 104k to receive the second QKD key via the quantum channel 103k-1. In step 509, the QKD linking apparatus 102 sends over the classical channel 103k-2 of the QKD link 103k the basis values of the transmitted symbols/bits, denoted Tac, that correspond to the received indications of the validly received bits. For example, the controller 110 of the QKD linking apparatus 102 also switches/routes the transmitted basis, Tac, used to send the first QKD key as a classical transmission via a CTRX 108k of the CTRC component 108 that is assigned to the first endpoint device 104k for transmission of the transmitted basis, Tac, over a second classical channel 103k-2 of the second QKD link 103k of the endpoint device 104k. Thus, both the QKD linking apparatus 102 and the second endpoint device 104k have Tac and Rac and knowledge of the validly received symbols/bits of the second QKD key received by the first endpoint device 104k. From this they can derive a second shared key, Kac, where both the QKD linking apparatus 102 and the second endpoint device 104k each determine a second shared key, Kac, by discarding all symbols/bits of the second QKD key except those where Tac(j)==Rac(j) for that validly received j-th symbol/bit of the second QKD key. In step 510, the second endpoint device 104k and the QKD linking apparatus 102 may perform error correction and privacy amplification on the retained symbols/bits of step 509, in which the resulting set of symbols/bits becomes the second shared key, Kac, between the second endpoint device 104k and the QKD linking apparatus 102.

The third BB84 subprocess 500c of the BB84 QKD protocol/process 500 includes the following steps of: In step 511, the QKD linking apparatus 102 sends the first shared key, Kab, encrypted with the second shared key, Kac, over the classical channel 103k-2 of the second QKD link 103k of the second endpoint device 104k. For example, the QKD linking apparatus 102 combines the first shared key, Kab, with the second shared key, Kac, using an XOR-type operation (e.g. if quantum bits are used, then the QKD linking apparatus 102 may send Kab XOR Kac to the second endpoint device 104k). In step 512, the second endpoint device 104k receives the encrypted first shared key (e.g. Kab XOR Kac) and decrypts the encrypted first shared key with the second shared key, Kac, already determined by the second endpoint device 104k. For example, the second endpoint device 104k calculates the first shared key, Kab, based on Kac XOR (Kab XOR Kac)=Kab. Thus, the first shared key, Kab, is shared between the first endpoint device 104a, the second endpoint device 104k and the QKD linking apparatus 102. Thus, the first and second endpoint devices 104a and 104k may perform, without limitation, for example secure communications and the like using the first shared key, Kab, exchanged using the BB84 QKD protocol 500. In this example, the QKD linking apparatus 102 has to be a trusted third party or a trusted party and trusted by both the first and second endpoint devices 104a and 104k because it knows the shared key, Kab.

In another example, a modified version of the BB84 protocol 500 is described in GB Patent Application No. 1916311.2 entitled "Quantum Key Distribution Protocol" filed on 8 Nov. 2019 and incorporated herein by reference, and/or any type of QKD protocol may be used by the sender device or QKD linking apparatus 102 and/or corresponding endpoint devices 104a, 104k to exchange and/or transmit the quantum encoded keys and share a quantum-secure cryptography key between at least a pair of endpoint devices 104a, 104k. The modified version of the BB84 protocol may be configured or implemented such that the sender device or QKD linking apparatus 102 (e.g. third party device/intermediary) and the like does not have knowledge of the final agreed quantum-secure key between the first and second endpoint devices 104a, 104k. This means that the level of trust required by the sender device or QKD linking apparatus 102 may be reduced or untrusted but where the shared key between first and second endpoint devices 104a, 104k is only known to the first and second endpoint devices 104a, 104k. This may be useful for when the QKD linking apparatus or sender device 102 is operated or used in a public setting such as, for example, in a roadside cabinet or other public telecommunication site.

In the modified version of the BB84 protocol, the sender device or QKD linking apparatus 102 (which may be a terrestrial fibre optic device) may use a random bit generator 142/214 to generate a first QKD key, where a controller 112/160/electronic switch 147 may be used to route/switch the first QKD key (generated random bit stream) to the quantum transmitter (Q-TX) 106a-1 assigned to the first endpoint device 104a for transmitting the first QKD key to the first endpoint device 104a over the first QKD link 103a including a first quantum channel (e.g. optical channel/fibre). In addition, the sender device/QKD linking apparatus 102 also switches/routes the transmitted basis used to send the first QKD key to a CTRX 108a of the CTRC component 108 that is assigned to the first endpoint device 104a for transmission of the transmitted basis over a first classical channel of the first QKD link 103a of the endpoint device 104a. The first endpoint device 104a does not reveal the received basis that is used by the first endpoint device 104a to receive the QKD key over the first quantum channel of the QKD link 103a of the first endpoint device 104a. That is, the first endpoint device 104a withholds from the QKD linking apparatus 102 the received basis that is used by the first endpoint device 104*a* to receive the QKD key over the first quantum channel of the QKD link 103*a* of the first endpoint device 104*a*. This means the sender device or QKD linking apparatus 102 only knows approximately 50% of the bits of the first QKD key received by the first endpoint device.

This process is repeated with the second endpoint device 104*k* and sender device/the QKD linking apparatus 102 for a second QKD key. That is, the sender device/the QKD linking apparatus 102 may use the random bit generator 142/214 to generate a second QKD key, where a controller 112/160/electronic switch 147 may be used to route/switch the second QKD key (generated random bit stream) to the quantum transmitter (Q-TX) 106*b*-1 assigned to the second endpoint device 104*k* for transmitting the second QKD key to the second endpoint device 104*k* over the second QKD link 103*k* including a second quantum channel (e.g. optical channel/fibre). In addition, the sender device/QKD linking apparatus 102 also switches/routes the transmitted basis used to send the second QKD key to a CTRX 108*k* of the CTRC component 108 that is assigned to the second endpoint device 104*b* for transmission of the transmitted basis over a second classical channel of the second QKD link 103*k* of the endpoint device 104*k*. The second endpoint device 104*k* does not reveal the received basis that is used by the second endpoint device 104*k* to receive the second QKD key over the second quantum channel of the second QKD link 103*k* of the second endpoint device 104*k*. That is, the second endpoint device 104*k* withholds from the QKD linking apparatus 102 the received basis that is used by the second endpoint device 104*k* to receive the QKD key over the second quantum channel of the QKD link 103*k* of the second endpoint device 104*a*. This means the sender device 102 only knows approximately 50% of the received bits of the second QKD key too.

The sender device or QKD linking apparatus 102 then XORs the first and second QKD keys together and sends the XOR'ed keys to the second endpoint device 104*k* over the second classical channel of the second QKD link 103*k* or even to both parties over the classical channels of their QKD links 103*a*/103*k*. The first and second endpoint devices 104*a* and 104*k* may communicate over the first classical channel and second classical channels of their QKD links 103*a* and 103*k*, respectively, via the QKD linking apparatus 102 to discover the correctly-measured bases, generating a new raw key of about 25% of the original bits transmitted, where they then perform error correction and the like to generate a final shared key, which becomes a precursor key negotiated between the first and second endpoint devices 104*a* and 104*k*. As an option, the first and second endpoint devices 104*a* and 104*k* may encrypt or secure the communications using previous shared key(s) over the first classical channel and second classical channels of their QKD links 103*a* and 103*k*, respectively, via the QKD linking apparatus 102, where the shared key(s) are only known to the first and second endpoint devices 104*a* and 104*k*, and unknown to the QKD linking apparatus 102.

Alternatively or additionally, rather than the sender device 102 simply XORing the first and second QKD keys, each of the first and second endpoint devices 104*a* and 104*k* may be configured to send only an indication (e.g. bit positions) of what they consider to be the correctly received symbols of the first and second QKD keys, respectively, over the classical channels of their respective first and second QKD links 103*a* and 103*k* to the sender device 102. The sender device 102 then sends over the classical channels of the respective first and second QKD links 103*a* and 103*k* the actual basis used for transmitting only the correctly received symbols to each corresponding first and second endpoint device 104*a* and 104*k*. The sender device or QKD linking apparatus 102 then XORs the first and second QKD keys and only sends the correctly received symbols of the XOR'd first and second QKD keys to the second endpoint device 104*k* over the classical channel of the second QKD link 103*k*. The first and second endpoint devices 104*a* and 104*k* communicate via the QKD linking apparatus 102 over their corresponding classical communication channels of the first and second QKD links 103*a* and 103*k* to discover the correctly-measured bases, generating a new raw key of about 25% of the original bits transmitted, where they then perform error correction and the like to generate a final shared key, which becomes a precursor key negotiated between the first and second endpoint devices 104*a* and 104*k*. As an option, the first and second endpoint devices 104*a* and 104*k* may encrypt or secure the communications using previous shared key(s) over the first classical channel and second classical channels of their QKD links 103*a* and 103*k*, respectively, via the QKD linking apparatus 102, where the shared key(s) are only known to the first and second endpoint devices 104*a* and 104*k*, and unknown to the QKD linking apparatus 102.

As another example, the above example QKD protocol that modifies the BB84 protocol may be for when each symbol represents $2^n$ binary bits, for n>=1. When each symbol represents a binary bit for n=1, the steps of this example QKD protocol may be based on the following: the sender device 102 is configured to transmit a first secret bit string (e.g. QKD key) over a first quantum channel of the first QKD link 103*a* to the first endpoint device 104*a*, each bit of the first secret bit string modulated by a basis state randomly selected from a set of bases; the sender device 102 also transmits a first basis set over a first classical communication channel of the first QKD link 103*a* to the first endpoint device 104*a*, the first basis set comprising data representative of the randomly selected bases used to modulate each bit of the first secret bit string; the sender device 102 may also transmit a second secret bit string (e.g. second QKD key) over a second quantum channel of the second QKD link 103*k* to the second endpoint device 104*k*, each bit of the second secret bit string modulated by a basis state randomly selected from the set of bases; the sender device 102 also transmits a second basis set over a second classical communication channel of the second QKD link 103*k* to the second endpoint device 104*k*, the second basis set comprising data representative of the randomly selected bases used to modulate each bit of the second secret bit string. The sender device 102 then generates a third bit string based on combining the first and second secret bit strings (e.g. XOR-ing the first and second secret bit strings), and transmits the third bit string to the second endpoint device 104*k* via the second communication channel of the second QKD link 103*k* of the second endpoint device 104*k*.

The first endpoint device 104*a* and second endpoint device 104*k* perform a quantum key exchange to establish a shared key based on: the first endpoint device 104*a* using the received first basis set to determine a first received set of secret bits comprising bits of the first secret bit string transmitted over the first quantum channel of the first QKD link 103*a* that were successfully received by the first endpoint device 104*a*; the second endpoint device 104*k* uses the received second basis set to determine a second received set of secret bits comprising bits of the second secret bit string transmitted over the second quantum channel of the second QKD link 103*k* of the second endpoint device 104*k* that were successfully received by the second endpoint device 104*k*; the second endpoint device 104*k* generates a fourth set of bits based on combining the second received set of secret bits with the received third bit string (e.g. XORing the second received set of secret bits with the received third bit string), where one or more bits of the fourth set of bits correspond to one or more bits of the first bit string; the first endpoint device 104*a* and second endpoint device 104*k* perform bit sifting operations and the like over either the first and second classical communication channels of the first and second QKD links 104*a* and 104*k* and/or over a third classical communication channel therebetween based on the first received set of secret bits at the first endpoint device 104*a* and the fourth set of bits at the second endpoint device 104*k* for generating a common set of sifted bits for forming a shared cryptographic key at the first and second endpoint devices 104*a* and 104*k*. The first and second endpoint devices 104*a* and 104*b* may use encryption and/or authentication for their communications therebetween over the third communication channel.

The modified version of the BB84 QKD protocol minimises interactions between the sender device 102 and the first and second endpoint devices 104*a* and 104*k*, which means the sender device 102 receives nearly no information associated with what secret symbols the first and second endpoint devices 104*a* and 104*k* validly received, which means this may result in a higher level of security than those QKD protocols such as BB84 that share information with the sender device 102. This is because the first and second endpoint devices 104*a* and 104*k* withhold the basis values used by the first and second endpoint devices 104*a* and 104*k* when receiving the first and second secret bit strings transmitted by the QKD linking apparatus/sender device 102 over the first and second quantum channels of the first and second QKD links 103*a* and 103*k*, respectively. However, this trade-off is typically at the expense of reliability and/or a reduction in the number of viable symbols that may be used for generating the common set of sifted symbols and subsequent formation of the cryptographic key using the common set of sifted symbols. The reliability and/or viable symbols successfully and validly received of the QKD protocol may be further improved whilst being provably secure and not impacting the security of the QKD protocol by having the first and second endpoint devices 104*a* and 104*k* share a "small amount" of information associated with the successfully received symbols at the first and second endpoint devices 104*a* and 104*k* (e.g. successfully received symbol positions) with the sender device 102.

Figure 5B:
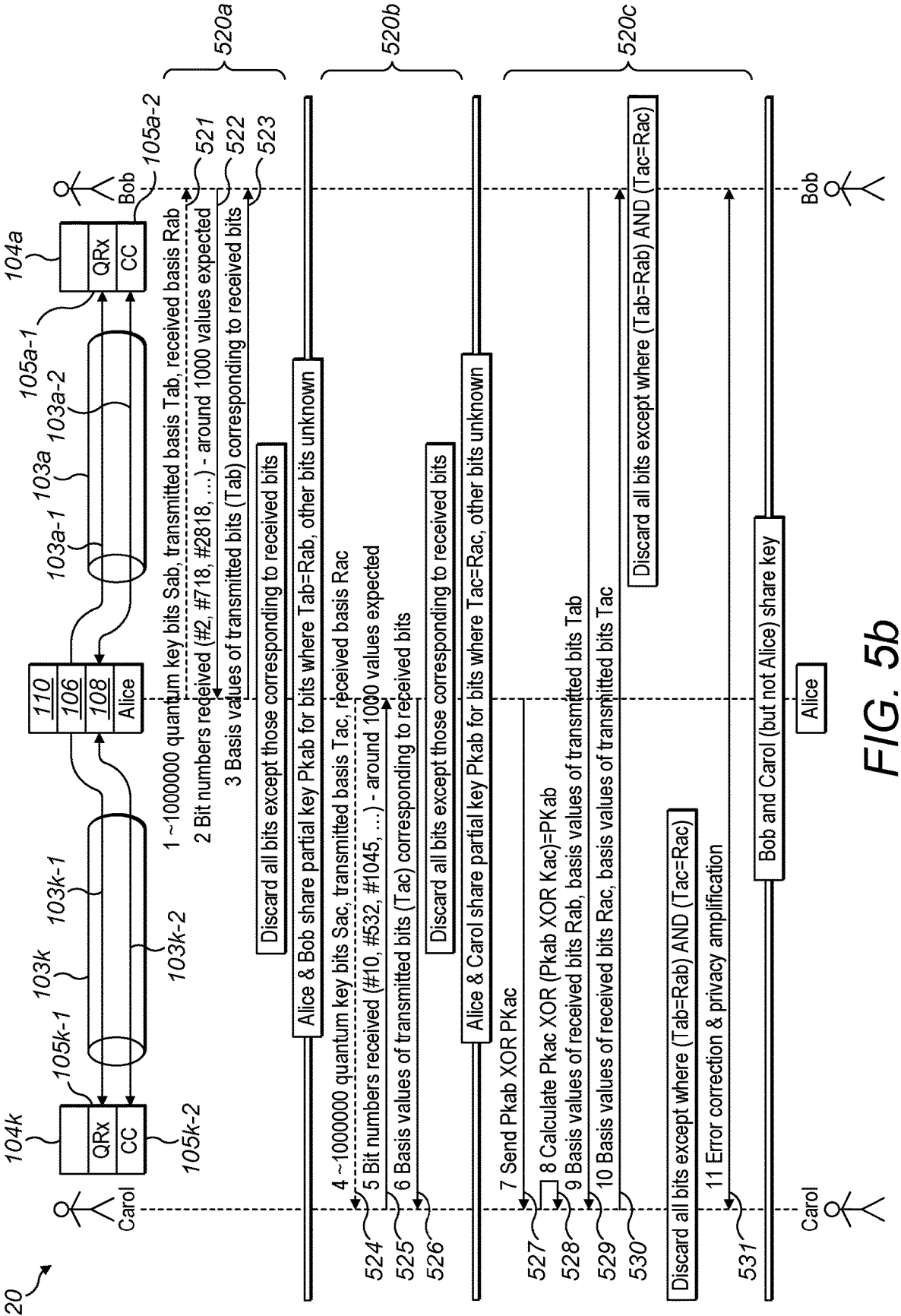
FIG. 5*b* is a flow diagram illustrating another example QKD protocol for use with QKD linking apparatus of QKD switching system of any of FIGS. 1*a* to 4*c* according to some embodiments of the invention.

As described herein, the modified version of the BB84 protocol modified the steps of the BB84 QKD protocol 500 such that the sender device or QKD linking apparatus 102 (e.g. third party device/intermediary) and the like does not have full knowledge of the final agreed/shared quantum-secure key between the first and second endpoint devices 104*a* and 104*k*. This means that the level of trust required by the sender device or QKD linking apparatus 102 may be reduced or untrusted but where the final shared key between first and second endpoint devices 104*a* and 104*k* is only known to the first and second endpoint devices 104*a* and 104*k*. This may be useful for when the QKD linking apparatus or sender device 102 is operated or used in a public setting such as, for example, in a roadside cabinet or other public telecommunication site. FIGS. 5*b* to 5*c* describe further QKD protocols 520, 540 and 560 that include further modifications to the BB84 QKD protocol 500 and/or the modified version of the BB84 QKD protocol mentioned above for achieving the above-mentioned property, i.e. that the QKD linking apparatus 102 can operate at a reduced trust level or untrusted level and the like without compromising the security of the final shared key or agreed key between the first and second endpoint devices 104*a* and 104*k*.

In another example, a modified version of the BB84 protocol 500 of FIG. 5*a* is described in FIG. 5*b*, where the sender or QKD linking apparatus 102 may be an untrusted third party and is not able to derive the shared key between the first and second endpoint devices 104*a* and 104*k*. In the example QKD protocol 520 of FIG. 5*b*, the BB84 protocol 500 is further modified based on the sender device or QKD linking apparatus 102 and/or corresponding endpoint devices 104*a*-104*b* exchanging and/or transmitting the quantum encoded keys and sharing a quantum-secure cryptography key between at least the pair of endpoint devices 104*a*-104*b*, where the sender device or QKD linking apparatus 102 may be an untrusted device. For example, the modified version of the BB84 protocol 500 may modify or remove the steps of the BB84 QKD protocol relating to the received basis such that the sender device or QKD linking apparatus 102 (e.g. third party device/intermediary) and the like does not have knowledge of the final agreed/shared quantum-secure key between the first and second endpoint devices 104*a* and 104*k*. This means that the level of trust required by the sender device or QKD linking apparatus 102 may be reduced or untrusted but where the final shared key between first and second endpoint devices 104*a* and 104*k* is only known to the first and second endpoint devices 104*a* and 104*k*. This may be useful for when the QKD linking apparatus or sender device 102 is operated or used in a public setting such as, for example, in a roadside cabinet or other public telecommunication site. FIGS. 5*b* to 5*c* describe further example QKD protocols 520, 540 and 560 that include further modifications over the BB84 QKD protocol 500 of FIG. 5*a* for achieving the above-mentioned property, i.e. that the QKD linking apparatus 102 can operate at a reduced trust level or untrusted level and the like without compromising the security of the final shared key or agreed key between the first and second endpoint devices 104*a* and 104*k*.

FIG. 5*b* is a flow diagram illustrating an example QKD protocol/process 520 for use with a QKD linking apparatus 102 of QKD switching system 100 of FIG. 1*a* and/or any other QKD linking apparatus or QKD switching system of any of FIGS. 1*a* to 4, modifications thereto, combinations thereof, and/or as herein described and/or as the application demands. For simplicity, the reference numerals of FIGS. 1*a* to 1*i* are re-used for similar or the same components/features for illustrating the QKD protocol/process 520 of FIG. 5*b*. In this example, the QKD linking apparatus 102 (e.g. Alice) includes a controller 110, quantum communications component (QCC) 106 and a CTRC component 108 in which first and second QKD links 103*a* and 103*k* have been assigned to first and second endpoint devices 104*a* and 104*k*, respectively (e.g. Bob and Carol, respectively). In this example, the QCC 106 includes at least a plurality of quantum transmitter(s) 106*a*-1 to 106*k*-1, the first endpoint device 104*b* (e.g. Bob) includes a quantum receiver (Q-RX) 105*a*-1 and a classical transceiver (CC) 105*a*-2, and the second endpoint device 104*k* (e.g. Carol) includes a quantum receiver (Q-RX) 105*k*-1 and a classical transceiver (CC) 105*k*-2, which are used to form the corresponding QKD links 103*a*-103*k* therebetween. The first QKD link 103*a*, which is assigned to the first endpoint device 104*a*, includes a first uni-directional quantum channel 103*a*-1 for transmitting, during performance of the QKD protocol 520, quantum information from a quantum transmitter (Q-TX) 106*a*-1 of the QCC 106 to the first endpoint device 104*a* for reception by the Q-RX 105*a*-1 of the first endpoint device 104*a*, and a bi-directional classical channel 103a-2 for transmission of classical information between a first CTRX 108a of the CTRC component 108 that is assigned to the first endpoint device 104a and the CC 105a-2 of the first endpoint device 104a. The second QKD link 103k, which is assigned to the second endpoint device 104k, includes a first uni-directional quantum channel 103k-1 for transmitting, during the QKD protocol 520, quantum information from a quantum transmitter (Q-TX) 106k-1 of the QCC 106 to the second endpoint device 104k for reception by the Q-RX 105k-1 of the second endpoint device 104k, and a bi-directional classical channel 103k-2 for transmission of classical information between a second CTRX 108k of the CTRC component 108 that is assigned to the second endpoint device 104k and the CC 105k-2 of the second endpoint device 104k.

The QKD protocol/process 520 is a modified version of the BB84 protocol 500, where the sender device (also referred to as an intermediary device or Alice) is the QKD linking apparatus 102 (which may be a terrestrial fibre optic device) that is communicatively coupled by first and second QKD links 103a and 103k to the first and second endpoint devices 104a and 104k (e.g. Bob and Carol, respectively), respectively. The QKD protocol/process 520 may include the following QKD subprocess(es) 520a, 520b and 520c. In the first QKD subprocess 520a, the QKD linking apparatus 102 (e.g. Alice) and the first endpoint device 104a (e.g. Bob) share a first intermediate set of symbols, also known as a first partial key (e.g. partial key PKab). In the second QKD subprocess 520b, the QKD linking apparatus 102 (e.g. Alice) and the second endpoint device 104k (e.g. Carol) share a second intermediate set of symbols, also known as a second partial key (e.g. partial key PKac). In the third QKD subprocess 520c the first and second endpoints 104a and 104k (e.g. Bob and Carol), but not the QKD linking apparatus 102 (e.g. Alice) agree upon and share a final key. The first and second endpoints 104a and 104k may use encrypted or secure communications therebetween when agreeing upon the shared final key. Thus, this QKD protocol/process 520 includes the following steps from the first QKD subprocess 520a, second QKD subprocess 520b and third QKD subprocess 520c.

The first QKD subprocess 520a of the QKD protocol/process 520 includes the following steps of: In step 521, the QKD linking apparatus 102, as sender, sends a first QKD key, denoted Sab (e.g. 1000000 quantum key bits/symbols, Sab), via Q-TX 106a-1 over the first quantum channel 103a-1 of the first QKD link 103a to the first endpoint device 104a in which the Q-TX 106a-1 uses a first transmitted basis set, Tab, for sending the first QKD key. The first endpoint device 104a receives the quantum transmission of the first QKD key via Q-RX 105a-1 using a first receiving basis set, Rab. For example, the QKD linking apparatus 102 may include a controller 110 that controls the use of a random bit generator 142 to generate the first QKD key, in which the controller 110 controls the QCC 106 to route/switch the first QKD key (generated random bit stream) to the Q-TX 106a-1 of the QCC 106 assigned to the first endpoint device 104a for transmitting the first QKD key to the first endpoint device 104a over the first QKD link 103a including the first quantum channel 103a-1 (e.g. optical channel/fibre).

In step 522, the first endpoint device 104a transmits over the classical channel 103a-2 of the QKD link 103a to the QKD linking apparatus 102 an indication of the symbols/bits of the first QKD key (e.g. bit numbers received (#2, #718, #2818, . . . )—around 1000 values expected) that were validly received by the Q-RX 105a-1 of the first endpoint device 104a. In step 523, the QKD linking apparatus 102 sends over the classical channel 103a-2 of the QKD link 103a the basis values of the transmitted symbols/bits, denoted Tab, that correspond to the received indications of the validly received bits. For example, the controller 110 of the QKD linking apparatus 102 also switches/routes the transmitted basis, Tab, used to send the first QKD key as a classical transmission via a CTRX 108a of the CTRC component 108 that is assigned to the first endpoint device 104a for transmission of the transmitted basis, Tab, over a first classical channel 103a-2 of the first QKD link 103a of the endpoint device 104a. The first endpoint device 104a does not reveal the received basis, denoted Rab, that is used by the Q-RX 104a-2 of the first endpoint device 104a to receive the first QKD key over the first quantum channel 103a-1 of the QKD link 103a of the first endpoint device 104a. That is, the first endpoint device 104a withholds from the QKD linking apparatus 102 the received basis, denoted Rab, that is used by the Q-RX 104a-2 of the first endpoint device 104a to receive the first QKD key over the first quantum channel 103a-1 of the QKD link 103a of the first endpoint device 104a. This means, at this point, the QKD linking apparatus 102 only knows approximately 50% of the symbols/bits of the first QKD key received by the first endpoint device 104a.

Thus, only the endpoint device 104a has knowledge of: a) the transmitted basis, Tab, used by the Q-TX 106a-1 for transmitting the first QKD key; b) the basis values used by the Q-RX 105a-1 of the first endpoint device 104a for receiving the symbols/bits of the first QKD key, which is denoted Rab; and c) the validly received symbols/bits of the first QKD key received by the first endpoint device 104a as indicated by the indication. The QKD linking apparatus 102 only has knowledge of: a) the transmitted basis, Tab, used by the Q-TX 106a-1 for transmitting the first QKD key; and b) an indication of the validly received symbols/bits of the first QKD key that were received by the first endpoint device 104a. The first endpoint device may therefore determine a first intermediate set of symbols associated with the first endpoint device 104a (e.g. first partial key of the first endpoint device, PKab1) by discarding all symbols/bits of the first QKD key except those where Tab(i)==Rab(i) for that validly received i-th symbol/bit of the first QKD key. The QKD linking apparatus 102 also determines a first intermediate set of symbols associated with the QKD linking apparatus 102 (e.g. first partial key of the QKD linking apparatus, PKab2) by discarding all symbols/bits of the first QKD key that were not validly received by the first endpoint device 104a and retains only those bits/symbols of the first QKD key for those Tab(i) for each i-th validly received symbol/bit of the first QKD key by the first endpoint device 104a, which is derivable from the received indication in step 522. Thus, the QKD linking apparatus 102 may only be able to derive or guess correctly approximately 50% of the first intermediate set of symbols associated with the first endpoint device 104a (e.g. first partial key PKab1) using the second intermediate set of symbols associated with the QKD linking apparatus 102 (e.g. first partial key PKab2).

The first QKD subprocess 520a is repeated but instead with the second endpoint device 104k and QKD linking apparatus 102 for a second QKD key in a second QKD subprocess 520b of the QKD protocol/process 520. That is, the QKD linking apparatus (e.g. sender device) 102 may use the random bit generator 142 to generate a second QKD key, where the controller 110 controls the QCC 106 to switch and/or route the second QKD key (generated random bit stream) to the quantum transmitter (Q-TX) 106k-1 assigned to the second endpoint device 104*k* for transmitting the second QKD key to the second endpoint device 104*k* over the second QKD link 103*k* including second quantum channel 103*k*-1 (e.g. optical channel/fibre). In addition, the sender device/QKD linking apparatus 102 also switches/routes the transmitted basis used to send the second QKD key to a CTRX 108*b* of the CTRC component 108 that is assigned to the second endpoint device 104*k* for transmission of the transmitted basis over a second classical channel of the second QKD link 103*k* of the second endpoint device 104*k*. The second endpoint device 104*k* does not reveal the received basis that is used by the second endpoint device 104*b* to receive the second QKD key over the second quantum channel of the second QKD link 103*k* of the second endpoint device 104*b*, the received second QKD key may be referred to as a second partial key or second set of intermediate symbols. This means the sender device 102 only knows approximately 50% of the received bits of the second QKD key too.

For example, the second QKD subprocess 520*b* of the QKD protocol/process 520 includes the following steps of: In step 524, the QKD linking apparatus 102, as sender, sends a second QKD key, denoted Sac (e.g. 1000000 quantum key bits/symbols, Sac), via Q-TX 106*k*-1 over the second quantum channel 103*k*-1 of the second QKD link 103*k* to the second endpoint device 104*k* using a second transmitted basis set, Tac. The second endpoint device 104*k* receives the quantum transmission of the second QKD key via Q-RX 105*k*-1 using second receiving basis set, Rac. For example, the QKD linking apparatus 102 may include a controller 110 that controls the use of a random bit generator 142 to generate the second QKD key, in which the controller 110 controls the QCC 106 to route/switch the second QKD key (generated random bit stream) to the Q-TX 106*k*-1 of the QCC 106 assigned to the second endpoint device 104*k* for transmitting the second QKD key to the second endpoint device 104*k* over the second QKD link 103*k* including the second quantum channel 103*k*-1 (e.g. optical channel/fibre).

In step 525, the second endpoint device 104*k* transmits over the classical channel 103*k*-2 to the QKD linking apparatus 102 an indication of the symbols/bits of the second QKD key (e.g. bit numbers received (#10, #532, #1045, . . . )—around 1000 values expected) that were validly received by the Q-RX 105*k*-1 of the second endpoint device 104*k*. In step 526, the QKD linking apparatus 102 sends over the classical channel 103*k*-2 of the QKD link 103*k* the basis values of the transmitted symbols/bits, denoted Tac, that correspond to the received indications of the validly received bits. For example, the controller 110 of the QKD linking apparatus 102 also switches/routes the transmitted basis, Tac, used to send the second QKD key as a classical transmission via a CTRX 108*k* of the CTRC component 108 that is assigned to the second endpoint device 104*k* for transmission of the transmitted basis, Tac, over a first classical channel 103*k*-2 of the second QKD link 103*k* of the endpoint device 104*k*. The second endpoint device 104*k* does not reveal the received basis, denoted Rac, that is used by the Q-RX 105*k*-1 of the second endpoint device 104*k* to receive the second QKD key over the second quantum channel 103*k*-1 of the QKD link 103*k* of the second endpoint device 104*k*. That is, second endpoint device 104*k* withholds from the QKD linking apparatus 102 the received basis, denoted Rac, that is used by the Q-RX 105*k*-1 of the second endpoint device 104*k* to receive the second QKD key over the second quantum channel 103*k*-1 of the QKD link 103*k* of the second endpoint device 104*k*. This means, at this point, the QKD linking apparatus 102 only knows approximately 50% of the symbols/bits of the second QKD key received by the second endpoint device 104*k*.

Thus, only the second endpoint device 104*k* has knowledge of: a) the transmitted basis, Tac, used by the Q-TX 106*k*-1 for transmitting the second QKD key; b) the basis values used by the Q-RX 105*k*-1 of the second endpoint device 104*k* for receiving the symbols/bits of the second QKD key, which is denoted Rac; and c) the validly received symbols/bits of the second QKD key received by the second endpoint device 104*k* as indicated by the indication. The QKD linking apparatus 102 only has knowledge of: a) the transmitted basis, Tac, used by the Q-TX 106*k*-1 for transmitting the second QKD key; and b) an indication of the validly received symbols/bits of the second QKD key that were received by the second endpoint device 104*k*. The second endpoint device 104*k* determines a second intermediate set of symbols associated with the second endpoint device 104*k* (e.g. second partial key of the second endpoint device, PKac1) by discarding all symbols/bits of the second QKD key except those where Tac(i)==Rac(i) for that validly received i-th symbol/bit of the second QKD key. The QKD linking apparatus 102 determines a second intermediate set of symbols associated with the QKD linking apparatus 102 (e.g. second partial key of the QKD linking apparatus PKac2) by discarding all symbols/bits of the second QKD key that were not validly received by the second endpoint device 104*k* and retains only those bits/symbols of the second QKD key for those Tac(i) for each i-th validly received symbol/bit of the second QKD key by the second endpoint device 104*k*, which is derivable from the received indication in step 525. Thus, the QKD linking apparatus 102 may only be able to derive or guess correctly approximately 50% of the second set of intermediate symbols associated with the second endpoint device 104*k* (e.g. second partial key PKac1) using the second set of intermediate symbols associated with the QKD linking apparatus 102 (e.g. second partial key PKac2).

The sender device or QKD linking apparatus 102 then XORs the first and second QKD keys together and sends the XOR'ed keys to the second endpoint device 104*a* over the second classical channel of the second QKD link 103*k* or even to both parties over the classical channels of their QKD links 103*a*/103*k*. The first and second endpoint devices 104*a* and 104*k* communicate over the first classical channel and second classical channels of their QKD links 103*a* and 103*k* using encrypted communications, respectively, via the QKD linking apparatus 102 to discover the correctly-measured bases, generating a new raw key of about 25% of the original bits transmitted, where they then perform error correction and the like to generate a final shared key, which becomes a precursor key negotiated between the first and second endpoint devices 104*a* and 104*k*.

Alternatively or additionally, rather than the sender device 102 simply XORing the first and second QKD keys, each of the first and second endpoint devices 104*a* and 104*k* may be configured to send only an indication (e.g. bit positions) of what they consider to be the correctly received symbols of the first and second QKD keys, respectively, over the classical channels of their respective first and second QKD links 103*a* and 103*k* to the sender device 102. The sender device 102 then sends over the classical channels of the respective first and second QKD links 103*a* and 103*k* the actual basis used for transmitting only the correctly received symbols to each corresponding first and second endpoint device 104*a* and 104*k*. The sender device or QKD linking apparatus 102 then XORs the first and second QKD keys and only sends the correctly received symbols of the XOR'd first and second QKD keys to the second endpoint device 104k using encrypted communications over the classical channel of the second QKD link 103k. The first and second endpoint devices 104a and 104k securely communicate via the QKD linking apparatus 102 over their corresponding classical communication channels of the first and second QKD links 103a and 103k to discover the correctly-measured bases, generating a new raw key of about 25% of the original bits transmitted, where they then perform error correction and the like to generate a final shared key, which becomes a precursor key negotiated between the first and second endpoint devices 104a and 104k.

From the first QKD subprocess 520a, the QKD linking apparatus 102 and the first endpoint device 104a have determined their corresponding first intermediate sets of symbols (e.g. first partial key PKab1 and first partial key PKab2). Similarly, from the second QKD subprocess 520b, the QKD linking apparatus 102 and the second endpoint device 104k have determined their corresponding second intermediate sets of symbols (e.g. first partial key PKac1 and second partial key PKac2). Although as described above, the first and second QKD subprocess(es) 520a and 520b are performed sequentially one after the other, this is by way of example only and the invention is not so limited, it is to be appreciated by the skilled person that the first and second QKD subprocess(es) 520a and 520b may be performed concurrently, simultaneously, in a different order and/or at different times and/or where one or more of the steps of each of the QKD subprocess(es) 520a and 520b may be even be interleaved with one or more steps of each of the other QKD subprocess(es) 520b and 520a, respectively, and the like; combinations thereof, modifications thereto, as herein described and/or as the application demands.

In any event, once the first and second QKD subprocess(es) 520a and 520b have completed, the third QKD subprocess 520c of the QKD protocol/process 520 is performed based on the following steps of: In step 527, the QKD linking apparatus 102 encrypts the first intermediate set of symbols associated with the QKD linking apparatus 102 (e.g. first partial key PKab2) by encrypting the first intermediate set of symbols associated with the QKD linking apparatus 102 (e.g. first partial key, PKab2) with the second intermediate set of symbols associated with the QKD linking apparatus 102 (e.g. second partial key PKac2). This may be performed using an XOR-type operation or using the second intermediate set of symbols associated with the QKD linking apparatus 102 as a one-time-pad on the first intermediate set of symbols associated with the QKD linking apparatus 102. Once encrypted, the encrypted first intermediate set of symbols associated with the QKD linking apparatus 102 (e.g. encrypted first partial key) is sent in its encrypted form over the classical channel 103k-2 of the second QKD link 103k of the second endpoint device 104k. For example, when encrypting the first intermediate set of symbols associated with the QKD linking apparatus 102 (e.g. first partial key PKab2), the QKD linking apparatus 102 may combine the first intermediate set of symbols associated with the QKD linking apparatus 102 (e.g. first partial key PKab2) with the second intermediate set of symbols associated with the QKD linking apparatus 102 (e.g. second partial key PKac2) using an XOR-type operation or a OTP operation and the like (e.g. if quantum bits are used, then the QKD linking apparatus 102 may send PKab2 XOR PKac2 to the second endpoint device 104k).

In step 528, the second endpoint device 104k receives the encrypted first intermediate set of symbols associated with the QKD linking apparatus 102 (e.g. PKab2 XOR PKac2) and decrypts the encrypted first intermediate set of symbols associated with the QKD linking apparatus 102 using the second intermediate set of symbols associated with the second endpoint device 104k (e.g. second partial key PKac1). The second endpoint device 104k is actually able to determine the second intermediate set of symbols associated with the QKD linking apparatus 102 (e.g. second partial key PKac2) that is determined and used by the QKD linking apparatus 102 because the second endpoint device 104k has knowledge of: a) the transmitted basis, Tac, used by the Q-TX 106k-1 for transmitting the second QKD key; b) the basis values used by the Q-RX 105k-1 of the second endpoint device 104k for receiving the symbols/bits of the second QKD key, which is denoted Rac; and c) the validly received symbols/bits of the second QKD key received by the second endpoint device 104k as indicated by the indication. From this knowledge, the second endpoint device 104k can derive the second intermediate set of symbols associated with the QKD linking apparatus 102 (e.g. second partial key PKac2) that was used to encrypt the first intermediate set of symbols associated with the QKD linking apparatus 102 (e.g. first partial key PKab2). For example, the second endpoint device 104k calculates the first intermediate set of symbols associated with the QKD linking apparatus 102 (e.g. first partial key PKab2) based on PKac2 XOR (PKab2 XOR PKac2)=PKab2. Thus, the first intermediate set of symbols associated with the QKD linking apparatus 102 (e.g. first partial key PKab2) has effectively been shared between the first endpoint device 104a, the second endpoint device 104k and the QKD linking apparatus 102. However, at this point in the third QKD process 520c, both the QKD linking apparatus and the second endpoint device 104k do not know all of the values of the first intermediate set of symbols associated with the first endpoint device 104a (e.g. first partial key PKab1), which was determined by the first endpoint device 104a using the basis values, Rab. However, this is because the first endpoint device 104a has withheld the basis values, Rab, used by the Q-RX 105a-1 of the first endpoint device 104a for receiving the symbols/bits of the first QKD key that result in the first intermediate set of symbols associated with the first endpoint device 104a. Thus, the QKD linking apparatus 102 and second endpoint device 104k may only be able to derive or guess correctly approximately 50% of the symbols of the first intermediate set of symbols associated with the first endpoint device 104a (e.g. first partial key PKab1) using the first intermediate set of symbols associated with the QKD linking apparatus 102 (e.g. first partial key PKab2).

In step 529, the first and second endpoint devices 104a and 104k may perform secure or encrypted communications therebetween in which the first endpoint device 104a sends to the second endpoint device 104k basis values including data representative of the basis values of the received bits, Rab, and the basis values of the transmitted bits, Tab. For example, the first endpoint device 104a may send these basis values (e.g. Rab and Tab) addressed to the second endpoint device 104k via the QKD link apparatus 102 over the classical communications channel 103a-2 of the QKD link 103a of the first endpoint device 104a. The CTRX 108a of the CTRC component 108 of the QKD linking apparatus 102 may receive these basis values, where the CTRC component 108 simply routes and forwards these received basis values to the CTRX 108k associated with the QKD link 103k of the second endpoint device 104k for transmission over the classical communications channel 103k-2 of the QKD link 103k of the second endpoint device 104k. The encrypted communications may be such that the QKD linking apparatus 102 is unable to decrypt the communications data transmitted therebetween. For example, the first and second endpoint devices 104a and 104k may perform secure or encrypted communications with each other using a previous shared key and the like such that the QKD linking apparatus 102 is unable to decrypt or derive the data representative of the basis values of the received bits, Rab that were withheld from the QKD linking apparatus 102. Thus, only the second endpoint device 104k receives the basis values of the received bits, Rab. The second endpoint device 1054k also receives the basis values of the transmitted bits, Tab, for use in determining a shared key between the first and second endpoint devices 104a and 104k. As an alternative option, the first endpoint device 104a may bypass the QKD linking apparatus 102 and instead send these basis values (e.g. Rab and/or Tab) to the second endpoint device 104k over another or different classical communication channel than that included in any of the QKD links 103a and 103k, where the basis values include data representative of the basis values of the received bits, Rab, and the basis values of the transmitted bits, Tab. The another or different classical communication channel may be any other classical wireless or wired communication channel enabling the first and second endpoint devices 104a and 104k to communicate independently of the QKD linking apparatus 102. Furthermore, the first and second endpoint devices 104a and 104k may perform encrypted communications or secure communications based on a previously agreed/shared key over the another or different classical communication channel, which further minimises any eavesdroppers from determining the received basis, Rab, withheld from the QKD linking apparatus by the first endpoint device 104a.

In step 530, the second and first endpoint devices 104k and 104a may perform secure or encrypted communications therebetween in which the second endpoint device 104k sends to the first endpoint device 104a basis values including data representative of the basis values of the received bits, Rac, and the basis values of the transmitted bits, Tac. For example, the second endpoint device 104k may send these basis values (e.g. Rac and Tac) addressed to the first endpoint device 104a via the QKD link apparatus 102 over the classical communications channel 103k-2 of the QKD link 103k of the second endpoint device 104k. The CTRX 108k of the CTRC component 108 of the QKD linking apparatus 102 may receive these basis values, where the CTRC component 108 simply routes and forwards these received basis values to the CTRX 108a associated with the QKD link 103a of the first endpoint device 104a for transmission over the classical communications channel 103a-2 of the QKD link 103a of the first endpoint device 104a. The first and second endpoint devices 104a and 104k may perform secure or encrypted communications with each other using a previous shared key and the like such that the QKD linking apparatus 102 is unable to decrypt or derive the data representative of the basis values of the received bits, Rab that were withheld from the QKD linking apparatus 102. Thus, only the first endpoint device 104a receives the basis values of the received bits, Rac, and the basis values of the transmitted bits, Tac, for use in determining the shared key between the first and second endpoint devices 104a and 104k. As an alternative option, the second endpoint device 104k may also bypass the QKD linking apparatus 102 and instead send these basis values (e.g. Rab and Tab) to the first endpoint device 104a over another or different classical communication channel than that included in any of the QKD links 103a and 103k, where the basis values include data representative of the basis values of the received bits, Rac, and the basis values of the transmitted bits, Tac. The another or different classical communication channel may be any other classical wireless or wired communication channel (e.g. PSTN or mobile communication channel) enabling the first and second endpoint devices 104a and 104k to communicate independently of the QKD linking apparatus 102. Furthermore, the first and second endpoint devices 104a and 104k may perform encrypted communications or secure communications based on a previously agreed/shared key over the another or different classical communication channel, which further minimises any eavesdroppers from determining the received basis, Rac, withheld from the QKD linking apparatus by the second endpoint device 104a.

At this stage of the third QKD subprocess 520c, the first endpoint device 104a and the second endpoint device 104k have the following information: a) the basis values Tab and Rab; and b) the basis values Tac and Rac. Furthermore, the second endpoint device 104k has the following information: a) the second partial key, PKab2, associated with the first endpoint device 104a; and b) the second partial key, PKac2, associated with the second endpoint device 104k. Thus, using this information along with error correction and privacy amplification, the first and second endpoint devices 104a and 104k may determine a final shared key. That is, the first endpoint device 104a determines a first shared key, KS1, by discarding all symbols/bits of the first QKD key (i.e. first intermediate set of symbols associated with the first device (e.g. first partial key PKab1)) except those symbols/bits of the first QKD key where (Tab(i)==Rab(i) AND Tac(i)==Rac(i)) for that validly received i-th symbol/bit of the first QKD key (or first intermediate set of symbols associated with the first device (e.g. first partial key PKab1)), which is derivable from the received indication in step 522. Similarly, the second endpoint device 104k determines a second shared key, KS2, by discarding all symbols/bits of the first intermediate set of symbols associated with the QKD linking apparatus 102 (e.g. first partial key PKab2) except those symbols/bits of the first intermediate set of symbols associated with the QKD linking apparatus 102 (e.g. first partial key PKab2) where (Tab(i)==Rab(i) AND Tac(i)==Rac(i)) for that validly i-th received symbol/bit of the second QKD key (i.e. second intermediate set of symbols associated with the second device) by the second endpoint device 104k, which is derivable from the received indication in step 525.

Thus, the first and second endpoint devices 104a and 104k may use encrypted communications to determine a first and second shared key, KS1 and KS2, respectively. In step 531, the first and second endpoint devices 104a and 104k perform using a classical communication channel (e.g. classical communication channels 103a-2 and 103k-2 of QKD links 103a and 103k, and/or other classical communication channels) error correction and privacy amplification on the first and second shared keys KS1 and KS2, respectively, to agree upon and/or form a final shared key KFbc. Thus, the first endpoint device 104a and second endpoint device 104b (e.g. Bob and Carol, respectively), but not the QKD linking apparatus 102 (e.g. Alice) have shared a final shared key, KFbc. Thus, the first and second endpoint devices 104a and 104k may use the final shared key, KFbc, in secure communications therebetween and/or any other useful cryptographic operation and the like.

In another example, a modified version of the BB84 protocol 500 of FIG. 5a is described in FIG. 5c, where the sender or QKD linking apparatus 102 may be an untrusted third party and is not able to derive the shared key between the first and second endpoint devices 104a and 104k. In the example QKD protocol 540 of FIG. 5b, the BB84 protocol 500 is further modified based on the sender device or QKD linking apparatus 102 and/or corresponding endpoint devices 104a and 104k exchanging and/or transmitting the quantum encoded keys and sharing a quantum-secure cryptography key between at least the pair of endpoint devices 104a and 104k, where the sender device or QKD linking apparatus 102 may be an untrusted device. This can be achieved by the first and second endpoint devices 104a and 104k withholding information such as, without limitation, for example the received basis used to receive the first and second QKD keys and/or withholding the transmitted basis used to transmit the first and/or second QKD keys and the like such that the sender device or QKD linking apparatus 102 (e.g. third party device/intermediary) does not have knowledge of the final agreed/shared quantum-secure key between the first and second endpoint devices 104a and 104k. This means that the level of trust required by the sender device or QKD linking apparatus 102 may be reduced or untrusted but where the final shared key between first and second endpoint devices 104a and 104k is only known to the first and second endpoint devices 104a and 104k. This may be useful for when the QKD linking apparatus or sender device 102 is operated or used in a public setting such as, for example, in a roadside cabinet or other public telecommunication site. FIG. 5c describes another example QKD protocol 540 that includes further modifications to the BB84 QKD protocols 500 or QKD protocol 520 of FIG. 5a or 5b for achieving the above-mentioned property, i.e. that the QKD linking apparatus 102 can operate at a reduced trust level or untrusted level and the like without compromising the security of the final shared key or agreed key between the first and second endpoint devices 104a and 104k.

Referring to FIG. 5c, FIG. 5c is a flow diagram illustrating a further example QKD protocol 540 for use with QKD linking apparatus 102 of QKD switching system 100 of FIG. 1a and/or any QKD linking apparatus or QKD switching system of any of FIGS. 1a to 4, modifications thereto, combinations thereof, and/or as herein described and/or as the application demands. For simplicity, the reference numerals of FIGS. 1a to 1i are re-used for similar or the same components/features for illustrating the QKD protocol/process 540 of FIG. 5c. In this example, the QKD linking apparatus 102 (e.g. Alice) includes a controller 110, quantum communications component (QCC) 106 and a CTRC component 108 in which first and second QKD links 103a and 103k have been assigned to first and second endpoint devices 104a and 104k, respectively (e.g. Bob and Carol, respectively). In this example, the QCC 106 includes at least a plurality of quantum transmitter(s) 106a-1 to 106k-1 and at least a plurality of quantum receiver(s) 106a-2 to 106k-2, the first endpoint device 104b (e.g. Bob) includes a quantum transmitter (Q-TX) 105a-3 and a classical transceiver (CC) 105a-2, and the second endpoint device 104k (e.g. Carol) includes a quantum transmitter (Q-TX) 105k-3 and a classical transceiver (CC) 105k-2, which are used to form the corresponding QKD links 103a-103k therebetween. The first QKD link 103a, which is assigned to the first endpoint device 104a, includes a first uni-directional quantum channel 103a-1 for transmitting, during performance of the QKD protocol 540, quantum information from a quantum transmitter (Q-TX) 105a-3 of the first endpoint device 104a to the QCC 106 for reception by a Q-RX 106a-2 of the QCC 106, and a bi-directional classical channel 103a-2 for transmission of classical information between a first CTRX 108a of the CTRC component 108 that is assigned to the first endpoint device 104a and the CC 105a-2 of the first endpoint device 104a. The second QKD link 103k, which is assigned to the second endpoint device 104k, includes a first uni-directional quantum channel 103k-1 for transmitting, during the QKD protocol 540, quantum information from a quantum transmitter (Q-TX) 105k-3 of the second endpoint device 104k to the QCC 106 for reception by the Q-RX 106k-2 of the QCC 106, and a bi-directional classical channel 103k-2 for transmission of classical information between a second CTRX 108k of the CTRC component 108 that is assigned to the second endpoint device 104k and the CC 105k-2 of the second endpoint device 104k.

The QKD protocol/process 540 is a modified version of the BB84 protocol 500 and QKD protocol 520, where the QKD linking apparatus 102 (which may be a terrestrial fibre optic device) is communicatively coupled by first and second QKD links 103a and 103k to the first and second endpoint devices 104a and 104k (e.g. Bob and Carol, respectively), respectively. The QKD protocol/process 540 may include the following QKD subprocess(es) 540a, 540b and 540c. In the first QKD subprocess 540a, the first endpoint device 104a (e.g. Bob) and the QKD linking apparatus 102 (e.g. Alice) share a first intermediate set of symbols, also known as a first partial key (e.g. first partial key PKab). In the second QKD subprocess 540b, the second endpoint device 104k (e.g. Carol) and the QKD linking apparatus 102 (e.g. Alice) share a second intermediate set of symbols, also known as a second partial key (e.g. second partial key PKac). In the third QKD subprocess 540c the first and second endpoints 104a and 104k (e.g. Bob and Carol), but not the QKD linking apparatus 102 (e.g. Alice) agree upon and share a final key. The first and second endpoints 104a and 104k may use encrypted or secure communications therebetween when agreeing upon the shared final key. Thus, this QKD protocol/process 540 includes the following steps from the first QKD subprocess 540a, second QKD subprocess 540b and third QKD subprocess 540c.

The first QKD subprocess 540a of the QKD protocol/process 520 includes the following steps of: In step 541, the first endpoint device 104a sends a first QKD key, denoted Sab (e.g. 1000000 quantum key bits/symbols, Sab), via Q-TX 105a-3 over the first quantum channel 103a-1 of the first QKD link 103a to the QKD linking apparatus 102 in which the Q-TX 105a-3 uses a first transmitted basis set, Tab, for sending the first QKD key. The QKD linking apparatus 102 receives the quantum transmission of the first QKD key via Q-RX 106a-2 using a first receiving basis set, Rab. For example, the first endpoint device 104a may include a controller (not shown) that controls the use of a random bit generator (not shown) at the first endpoint device 104a to generate the first QKD key, in which the controller controls the Q-TX 105a-3 to transmit the first QKD key (generated random bit stream) to the Q-RX 106a-2 of the QCC 106 assigned to the first endpoint device 104a using the first quantum channel 103a-1 (e.g. optical channel/fibre) of the QKD link 103a assigned to the first endpoint device 104a. Alternatively or additionally, or as an option, the first endpoint device 104a may have securely received (e.g. in a quantum-safe manner) one or more QKD keys for use in performing QKD protocol 540 for transmitting a QKD key (e.g. the first QKD key) to the QKD linking apparatus 102 in step 541.

In step 542, the QKD linking apparatus 102 transmits over the classical channel 103a-2 of the QKD link 103a to the first endpoint device 104a an indication of the symbols/bits of the first QKD key (e.g. bit numbers received (#2, #718, #2818, . . . )—around 1000 values expected) that were validly received by the Q-RX 106*a*-1 of QKD linking apparatus 102. In step 543, the QKD linking apparatus 102 sends over the classical channel 103*a*-2 of the QKD link 103*a* the basis values of the received symbols/bits, denoted Rab, that correspond to the received indications of the validly received bits. For example, the controller 110 of the QKD linking apparatus 102 also switches/routes the received basis, Rab, used to receive the first QKD key as a classical transmission via a CTRX 108*a* of the CTRC component 108 that is assigned to the first endpoint device 104*a* for transmission of the received basis, Rab, over a first classical channel 103*a*-2 of the first QKD link 103*a* of the first endpoint device 104*a*. The first endpoint device 104*a* does not reveal the transmitted basis, denoted Tab, that is used by the Q-TX 104*a*-3 of the first endpoint device 104*a* to transmit the first QKD key to the QKD linking apparatus 102 over the first quantum channel 103*a*-1 of the QKD link 103*a* of the first endpoint device 104*a*. That is, the first endpoint device 104*a* withholds from the QKD linking apparatus 102 the transmitted basis, denoted Tab, that is used by the Q-TX 104*a*-3 of the first endpoint device 104*a* to transmit the first QKD key over the first quantum channel 103*a*-1 of the QKD link 103*a* to the QKD linking apparatus 102. This means, at this point, the QKD linking apparatus 102 still only knows approximately 50% of the symbols/bits of the first QKD key transmitted by the first endpoint device 104*a*. This is because the QKD linking apparatus 102 does not know the transmitted basis and so has to randomly generate and guess the receiving basis, Rab, for receiving the quantum transmissions of the first QKD key from the Q-TX 105*a*-3 of the first endpoint device 104*a*.

Thus, only the first endpoint device 104*a* has knowledge of: a) the transmitted basis, Tab, used by the Q-TX 105*a*-3 for transmitting the first QKD key; b) the basis values used by the Q-RX 106*a*-2 of the QKD linking apparatus 102 for receiving the symbols/bits of the first QKD key, which is denoted Rab; and c) the validly received symbols/bits of the first QKD key received by the QKD linking apparatus 102 as indicated by the indication in step 542. The QKD linking apparatus 102 only has knowledge of: a) the received basis, Rab, used by the Q-RX 106*a*-2 for receiving the first QKD key; and b) an indication of the validly received symbols/bits of the first QKD key that were received by the QKD linking apparatus 102. The first endpoint device 104*a* may therefore determine a first intermediate set of symbols associated with the first endpoint device 104*a* (e.g. first partial key PKab1) by discarding all symbols/bits of the first QKD key except those where Tab(i)==Rab(i) for those validly received i-th symbols/bits of the received first QKD key by the QKD linking apparatus 102. The QKD linking apparatus 102 also determines a first intermediate set of symbols associated with the QKD linking apparatus 102 (e.g. first partial key PKab2) by discarding all symbols/bits of the first QKD key that were not validly received by the QKD linking apparatus 102 and retains only those bits/symbols of the first QKD key for those Rab(i) for each i-th validly received symbol/bit of the first QKD key by the QKD linking apparatus 102, which is derivable from the indication in step 542. Thus, the QKD linking apparatus 102 may only be able to derive or guess correctly approximately 50% of the first intermediate set of symbols associated with the first endpoint device 104*a* (e.g. first partial key PKab1) using the intermediate set of symbols associated with the QKD linking apparatus 102 (first partial key PKab2).

The first QKD subprocess 540*a* of QKD protocol/process 540 is repeated but instead with the second endpoint device 104*k* and QKD linking apparatus 102 for a second QKD key in a second QKD subprocess 540*b* of the QKD protocol/process 540. That is, the second endpoint device 104*k* may also use a random bit generator (not shown) to generate a second QKD key, where a controller (not shown) at the second endpoint device 104*k* controls the Q-TX 105*k*-3 to transmit the second QKD key (generated random bit stream) to the quantum receiver (Q-RX) 106*k*-2 of the QCC 106 that is assigned to the second endpoint device 104*k* for receiving the second QKD key from the second endpoint device 104*k* over the second quantum channel 103*k*-1 (e.g. optical channel/fibre) of the second QKD link 103*k*. In addition, the sender device/QKD linking apparatus 102 also switches/routes the received basis used to receive the second QKD key by the Q-RX 106*a*-2 of the QCC 106 to a CTRX 108*b* of the CTRC component 108 that is assigned to the second endpoint device 104*k* for transmission of the received basis over a second classical channel of the second QKD link 103*k* assigned to the second endpoint device 104*k*. The second endpoint device 104*k* does not reveal the transmitted basis that is used by the second endpoint device 104*k* to transmit the second QKD key to the QKD linking apparatus 102 over the second quantum channel of the second QKD link 103*k* assigned to the second endpoint device 104*k*, thus the received second QKD key may be referred to as a second partial key. This means the QKD linking apparatus 102 only knows approximately 50% of the received bits of the second QKD key too.

For example, the second QKD subprocess 540*b* of the QKD protocol/process 540 includes the following steps of: In step 544, the second endpoint device 104*k* sends a second QKD key, denoted Sac (e.g. 1000000 quantum key bits/symbols, Sac), via Q-TX 105*k*-3 over the second quantum channel 103*k*-1 of the second QKD link 103*k* assigned to the second endpoint device 104*k* using a second transmitted basis set, Tac. The QKD linking apparatus 102 receives the quantum transmission of the second QKD key via Q-RX 106*k*-2 using a second receiving basis set, Rac. For example, the second endpoint device 104*k* may include a controller (now shown) that controls the use of a random bit generator (not shown) to generate the second QKD key, in which the controller of the second endpoint device 104*k* controls the Q-TX 105*k*-3 to transmit the second QKD key (generated random bit stream) to the Q-RX 106*k*-2 of the QCC 106 that is assigned to the second endpoint device 104*k* for receiving the second QKD key from the second endpoint device 104*k* over the second quantum channel 103*k*-1 (e.g. optical channel/fibre) of the second QKD link 103*k*. Alternatively or additionally, or as an option, the second endpoint device 104*k* may have securely received (e.g. in a quantum-safe manner) one or more QKD keys for use in performing QKD protocol 540 for transmitting a QKD key (e.g. the second QKD key) to the QKD linking apparatus 102 in step 544.

In step 545, the QKD linking apparatus 102 transmits over the classical channel 103*k*-2 of the QKD link 103*k* to the second endpoint device 104*k* an indication of the symbols/bits of the second QKD key (e.g. bit numbers received (#10, #532, #1045, . . . )—around 1000 values expected) that were validly received by the Q-RX 106*k*-2 of the QCC 106 of QKD linking apparatus 102. In step 546, the QKD linking apparatus 102 sends over the classical channel 103*k*-2 of the QKD link 103*k* the basis values of the received symbols/bits, denoted Rac, that correspond to the received indications of the validly received bits. For example, the controller 110 of the QKD linking apparatus 102 also switches/routes the received basis, Rac, used by the Q-RX 106*k*-2 to receive the second QKD key as a classical transmission via a CTRX 108*k* of the CTRC component 108 assigned to the second endpoint device $104k$. Thus, the QKD linking apparatus $102$ transmits data representative of the received basis, Rac, over the classical channel $103k$-$2$ of the second QKD link $103k$ to the second endpoint device $104k$. The second endpoint device $104k$ does not reveal the transmitted basis, denoted Tac, that is used by the Q-TX $105k$-$3$ of the second endpoint device $104k$ to transmit the second QKD key over the second quantum channel $103k$-$1$ of the QKD link $103k$ to the QKD linking apparatus $102$. That is, second endpoint device $104k$ withholds from the QKD linking apparatus $102$ the transmitted basis, denoted Tac, that is used by the Q-TX $105k$-$3$ of the second endpoint device $104k$ to transmit the second QKD key over the second quantum channel $103k$-$1$ of the QKD link $103k$ of the second endpoint device $104k$. This means, at this point, the QKD linking apparatus $102$ only knows approximately 50% of the symbols/bits of the second QKD key transmitted by the second endpoint device $104k$. This is because the QKD linking apparatus $102$ does not know the transmitted basis and so has to randomly generate and guess the receiving basis, Rac, for receiving the quantum transmissions of the second QKD key from the Q-TX $105k$-$3$ of the second endpoint device $104k$.

Thus, only the second endpoint device $104k$ has knowledge of: a) the transmitted basis, Tac, used by the Q-TX $105k$-$3$ for transmitting the second QKD key to the QKD linking apparatus $102$; b) the basis values used by the Q-RX $106k$-$2$ of the QCC $106$ of the QKD linking apparatus $102$ for receiving the symbols/bits of the second QKD key, which is denoted Rac; and c) the validly received symbols/bits of the second QKD key received by the QKD linking apparatus $102$ as indicated by the indication in step $545$. The QKD linking apparatus $102$ only has knowledge of: a) the received basis, Rac, used by the Q-RX $106k$-$2$ of the QCC $106$ of QKD linking apparatus $102$ for receiving the second QKD key; and b) an indication of the validly received symbols/bits of the second QKD key that were received by the QKD linking apparatus $102$. The second endpoint device $104k$ determines a second intermediate set of symbols associated with the second endpoint device $104k$ (e.g. second partial key PKac1) by discarding all symbols/bits of the second QKD key except those where Tac(i)==Rac(i) for that validly received i-th symbol/bit of the second QKD key by the QKD linking apparatus $102$. The QKD linking apparatus $102$ determines a second intermediate set of symbols associated with the QKD linking apparatus $102$ (e.g. second partial key PKac2) by discarding all symbols/bits of the second QKD key that were not validly received by the second endpoint device $104k$ and retains only those bits/symbols of the second QKD key for those Rac(i) for each i-th validly received symbol/bit of the second QKD key by the QKD linking apparatus $102$, which is derivable from the received indication in step $545$. Thus, the QKD linking apparatus $102$ may only be able to derive or guess correctly approximately 50% of the first intermediate set of symbols associated with the second endpoint device $104k$ (e.g. second partial key PKac1) using the second intermediate set of symbols associated with the QKD linking apparatus $102$ (e.g. second partial key PKac2).

Thus, once the first intermediate set of symbols associated with the QKD linking apparatus and the second intermediate set of symbols associated with the QKD linking apparatus (e.g. first partial key PKab2 and second partial key PKac2) are determined by the QKD linking apparatus $102$, the QKD linking apparatus $102$ then XORs these first and second intermediate sets of symbols (e.g. first and second partial keys PKab2 and PKac2) together and sends the resulting XOR'ed symbols (or keys) to the second endpoint device $104k$ over the second classical channel of the second QKD link $103k$ or even to both parties over the classical channels of their QKD links $103a$/$103k$. The first and second endpoint devices $104a$ and $104k$ communicate using encrypted communications (e.g. using a previously shared key or agreed key that is unknown to the QKD linking apparatus $102$) over the first classical channel and second classical channels of their QKD links $103a$ and $103k$, respectively, via the QKD linking apparatus $102$ to discover the correctly-measured bases, generating a new raw key of about 25% of the original bits transmitted, where they then perform error correction, bit sifting and/or privacy amplification and the like to generate and agree upon a final shared key, which becomes a precursor key negotiated between the first and second endpoint devices $104a$ and $104k$. The first and second endpoint devices may use the final shared key, which is unknown to the QKD linking apparatus $102$ because the transmitting bases, Tab and Tac, were withheld from the QKD linking apparatus $102$, in secure communications therebetween and/or as the application demands.

From the first QKD subprocess $540a$, the first endpoint device $104a$ and QKD linking apparatus $102$ have determined their corresponding first intermediate sets of symbols (e.g. first partial key PKab1 and first partial key PKab2). Similarly, from the second QKD subprocess $540b$, the second endpoint device $104k$ and the QKD linking apparatus $102$ have determined their corresponding second intermediate sets of symbols (e.g. second partial key PKac1 and second partial key PKac2). Although as described above, the first and second QKD subprocess(es) $540a$ and $540b$ are performed sequentially one after the other, this is by way of example only and the invention is not so limited, it is to be appreciated by the skilled person that the first and second QKD subprocess(es) $540a$ and $540b$ may be performed concurrently, simultaneously, in a different order and/or at different times and/or where one or more of the steps of each of the QKD subprocess(es) $540a$ and $540b$ may be even be interleaved with one or more steps of each of the other QKD subprocess(es) $540b$ and $540a$, respectively, and the like; combinations thereof, modifications thereto, as herein described and/or as the application demands.

In any event, once the first and second QKD subprocess(es) $540a$ and $540b$ have completed, the third QKD subprocess $540c$ of the QKD protocol/process $540$ is performed based on the following steps of: In step $547$, the QKD linking apparatus $102$ encrypts the first intermediate set of symbols associated with the QKD linking apparatus $102$ (e.g. first partial key PKab2) by encrypting it with the second intermediate set of symbols associated with the QKD linking apparatus $102$ (e.g. second partial key PKac2). For example, an XOR-type of operation may be used to combine the first intermediate set of symbols associated with the QKD linking apparatus $102$ and the second Intermediate set of symbols associated with the QKD linking apparatus $102$ to form the encrypted first intermediate set of symbols associated with the QKD linking apparatus $102$ (e.g. first partial key PKab2 XOR second partial key PKac2). Once encrypted, the encrypted first intermediate set of symbols associated with the QKD linking apparatus $102$ is sent in its encrypted form over the classical channel $103k$-$2$ of the second QKD link $103k$ of the second endpoint device $104k$. For example, when encrypting the first intermediate set of symbols associated with the QKD linking apparatus (e.g. second partial key PKab2), the QKD linking apparatus $102$ may combine the first intermediate set of symbols associated with the QKD linking apparatus (e.g. first partial key PKab2) with the second intermediate set of symbols associated with the QKD linking apparatus 102 (e.g. second partial key PKac2) using an XOR-type operation or a OTP operation and the like (e.g. if quantum bits are used, then the QKD linking apparatus 102 may send PKab2 XOR PKac2 to the second endpoint device 104$k$).

In step 548, the second endpoint device 104$k$ receives the encrypted first intermediate set of symbols associated with the QKD linking apparatus (e.g. encrypted first partial key=PKab2 XOR PKac2) and decrypts the encrypted first intermediate set of symbols associated with the QKD linking apparatus using the second intermediate set of symbols associated with the QKD linking apparatus 102 (e.g. second partial key PKac2). The second endpoint device 104$k$ is able to determine the second intermediate set of symbols associated with the QKD linking apparatus 102 (e.g. second partial key PKac2) that was determined and used by the QKD linking apparatus 102 because the second endpoint device 104$k$ has knowledge of: a) the transmitted basis, Tac, used by the Q-TX 105$k$-3 of the second endpoint device 104$k$ for transmitting the second QKD key to the QKD linking apparatus 102; b) the basis values used by the Q-RX 106$k$-2 of the QKD linking apparatus 102 for receiving the symbols/bits of the second QKD key, which is denoted Rac; and c) the validly received symbols/bits of the second QKD key received by the QKD linking apparatus 102 as indicated by the indication in step 545. From this knowledge, the second endpoint device 104$k$ can derive the second intermediate set of symbols associated with the QKD linking apparatus 102 (e.g. second partial key PKac2) that was used to encrypt the first intermediate set of symbols associated with the QKD linking apparatus 102 (e.g. first partial key PKab2). For example, the second endpoint device 104$k$ calculates the first intermediate set of symbols associated with the QKD linking apparatus 102 (e.g. first partial key PKab2) based on PKac2 XOR (PKab2 XOR PKac2)= PKab2. Thus, the first intermediate set of symbols associated with the QKD linking apparatus 102 (e.g. first partial key PKab2) has effectively been shared between the first endpoint device 104$a$, the second endpoint device 104$k$ and the QKD linking apparatus 102. However, at this point in the third QKD process 540$c$, both the QKD linking apparatus 102 and the second endpoint device 104$k$ do not know all of the values of the first intermediate set of symbols associated with the first endpoint device 104$a$ (e.g. first partial key PKab1), which was determined by the first endpoint device 104$a$ using the basis values, Rab. However, this is because the first endpoint device 104$a$ has withheld the basis values, Tab, used by the Q-TX 105$a$-3 of the first endpoint device 104$a$ for transmitting the symbols/bits of the first QKD key that result in the first intermediate set of symbols associated with the first endpoint device 104$a$ (e.g. first partial key PKab1). Thus, the QKD linking apparatus 102 and second endpoint device 104$k$ may only be able to derive or guess correctly approximately 50% of the intermediate set of symbols associated with the first endpoint device 104$a$ (e.g. first partial key PKab1) using the first intermediate set of symbols associated with the QKD linking apparatus 102 (e.g. first partial key PKab2).

In step 549, the first and second endpoint devices 104$a$ and 104$k$ may perform secure or encrypted communications therebetween in which the first endpoint device 104$a$ sends to the second endpoint device 104$k$ basis values including data representative of the basis values of the transmitted bits, Tab, used by Q-TX 105$a$-3 for transmitting the first QKD key. For example, the first endpoint device 104$a$ may send these basis values (e.g. Tab) addressed to the second endpoint device 104$k$ via the QKD link apparatus 102 over the classical communications channel 103$a$-2 of the QKD link 103$a$ of the first endpoint device 104$a$. The CTRX 108$a$ of the CTRC component 108 of the QKD linking apparatus 102 may receive these basis values, where the CTRC component 108 simply routes and forwards these received basis values to the CTRX 108$k$ associated with the QKD link 103$k$ of the second endpoint device 104$k$ for transmission over the classical communications channel 103$k$-2 of the QKD link 103$k$ of the second endpoint device 104$k$. The encrypted communications may be such that the QKD linking apparatus 102 is unable to decrypt the communications data transmitted therebetween. For example, the first and second endpoint devices 104$a$ and 104$k$ may perform secure or encrypted communications with each other using a previously shared key or agreed key/channel and the like such that the QKD linking apparatus 102 is unable to decrypt or derive the data representative of the basis values of the transmitted bits, Tab that were withheld from the QKD linking apparatus 102. Thus, only the second endpoint device 104$k$ receives the basis values of the transmitted bits, Tab, of the first QKD key. The second endpoint device 104$k$ also receives the basis values of the received bits, Rab, for use in determining a shared key between the first and second endpoint devices 104$a$ and 104$k$. As an alternative option, the first endpoint device 104$a$ may bypass the QKD linking apparatus 102 and instead send these basis values (e.g. Tab and/or Rab) of the transmitted bits, Tab, of the first QKD key to the second endpoint device 104$k$ over another or different classical communication channel than that included in any of the QKD links 103$a$ and 103$k$, where the basis values include data representative of the basis values of the transmitted bits, Tab. The another or different classical communication channel may be any other classical wireless or wired communication channel (e.g. PSTN, another telecommunications provider, mobile communications, and the like) enabling the first and second endpoint devices 104$a$ and 104$k$ to communicate independently of the QKD linking apparatus 102. Furthermore, the first and second endpoint devices 104$a$ and 104$k$ may perform encrypted communications or secure communications based on a previously agreed/shared key over the another or different classical communication channel, which further minimises any eavesdroppers from determining the transmitted basis, Tab, withheld from the QKD linking apparatus by the first endpoint device 104$a$.

In step 550, the second and first endpoint devices 104$k$ and 104$a$ may perform secure or encrypted communications therebetween in which the second endpoint device 104$k$ sends to the first endpoint device 104$a$ basis values including data representative of the basis values of the transmitted bits, Tac, used by Q-TX 105$k$-3 for transmitting the second QKD key. For example, the second endpoint device 104$k$ may send these basis values (e.g. Tac) addressed to the first endpoint device 104$a$ via the QKD link apparatus 102 over the classical communications channel 103$k$-2 of the QKD link 103$k$ of the second endpoint device 104$k$. The CTRX 108$k$ of the CTRC component 108 of the QKD linking apparatus 102 may receive these basis values, where the CTRC component 108 simply routes and forwards these received basis values to the CTRX 108$a$ associated with the QKD link 103$a$ of the first endpoint device 104$a$ for transmission over the classical communications channel 103$a$-2 of the QKD link 103$a$ of the first endpoint device 104$a$. The encrypted communications may be such that the QKD linking apparatus 102 is unable to decrypt the communications data transmitted therebetween. The first and second endpoint devices 104$a$ and 104$k$ may perform secure or encrypted communications with each other using a previous shared key and the like such that the QKD linking apparatus 102 is unable to decrypt or derive the data representative of the basis values of the transmitted bits, Tac that were withheld from the QKD linking apparatus 102. Thus, the first endpoint device 104a receives the basis values of the transmitted bits, Tac, used to transmit the second QKD key for use in determining the shared key between the first and second endpoint devices 104a and 104k. As an alternative option, the second endpoint device 104k may also bypass the QKD linking apparatus 102 and instead send these basis values (Tac and/or Rac) to the first endpoint device 104a over another or different classical communication channel than that included in any of the QKD links 103a and 103k, where the basis values include data representative of the basis values of the transmitted bits, Tac. The another or different classical communication channel may be any other classical wireless or wired communication channel (e.g. PSTN, another telecommunications provider, or mobile communication channel, and the like) enabling the first and second endpoint devices 104a and 104k to communicate independently of the QKD linking apparatus 102.

At this stage of the third QKD subprocess 540c, the first endpoint device 104a and the second endpoint device 104k have the following information: a) the basis values Tab and Rab; and b) the basis values Tac and Rac. Furthermore, the second endpoint device 104k has the following information: a) the second partial key, PKab2, associated with the first endpoint device 104a; and b) the second partial key, PKac2, associated with the second endpoint device 104k. Thus, using this information along with error correction and privacy amplification, the first and second endpoint devices 104a and 104k may determine a final shared key. For example, the first endpoint device 104a determines a first shared key, KS1, by discarding all symbols/bits of the first QKD key except those symbols/bits of the first QKD key where (Tab(i)==Rab(i) AND Tac(i)==Rac(i)) for those validly received i-th symbols/bits of the first QKD key by the QKD linking apparatus 102, which is derivable from the received indication in step 542. Similarly, the second endpoint device 104k determines a second shared key, KS2, by discarding all symbols/bits of the first intermediate set of symbols associated with the QKD linking apparatus 102 (e.g. first partial key PKab2) except those symbols/bits of the first intermediate set of symbols associated with the QKD linking apparatus 102 (e.g. first partial key PKab2) where (Tab(i)==Rab(i) AND Tac(i)==Rac(i)) for that validly i-th received symbol/bit of the second QKD key by the QKD linking apparatus 102, which is derivable from the received indication in step 545.

Thus, the first and second endpoint devices 104a and 104k may use encrypted communications to determine a first and second shared key, KS1 and KS2, respectively. In step 551, the first and second endpoint devices 104a and 104k perform using a classical communication channel (e.g. classical communication channels 103a-2 and 103k-2 of QKD links 103a and 103k, and/or other classical communication channels) error correction, bit sifting and/or privacy amplification on the first and second shared keys KS1 and KS2, respectively, to agree upon and/or form a final shared key KFbc. Thus, the first endpoint device 104a and second endpoint device 104k (e.g. Bob and Carol, respectively), but not the QKD linking apparatus 102 (e.g. Alice) have shared a final shared key, KFbc. Thus, the first and second endpoint devices 104a and 104k may use the final shared key, KFbc, in secure communications therebetween and/or any other useful cryptographic operation and the like.

Figure 5D:
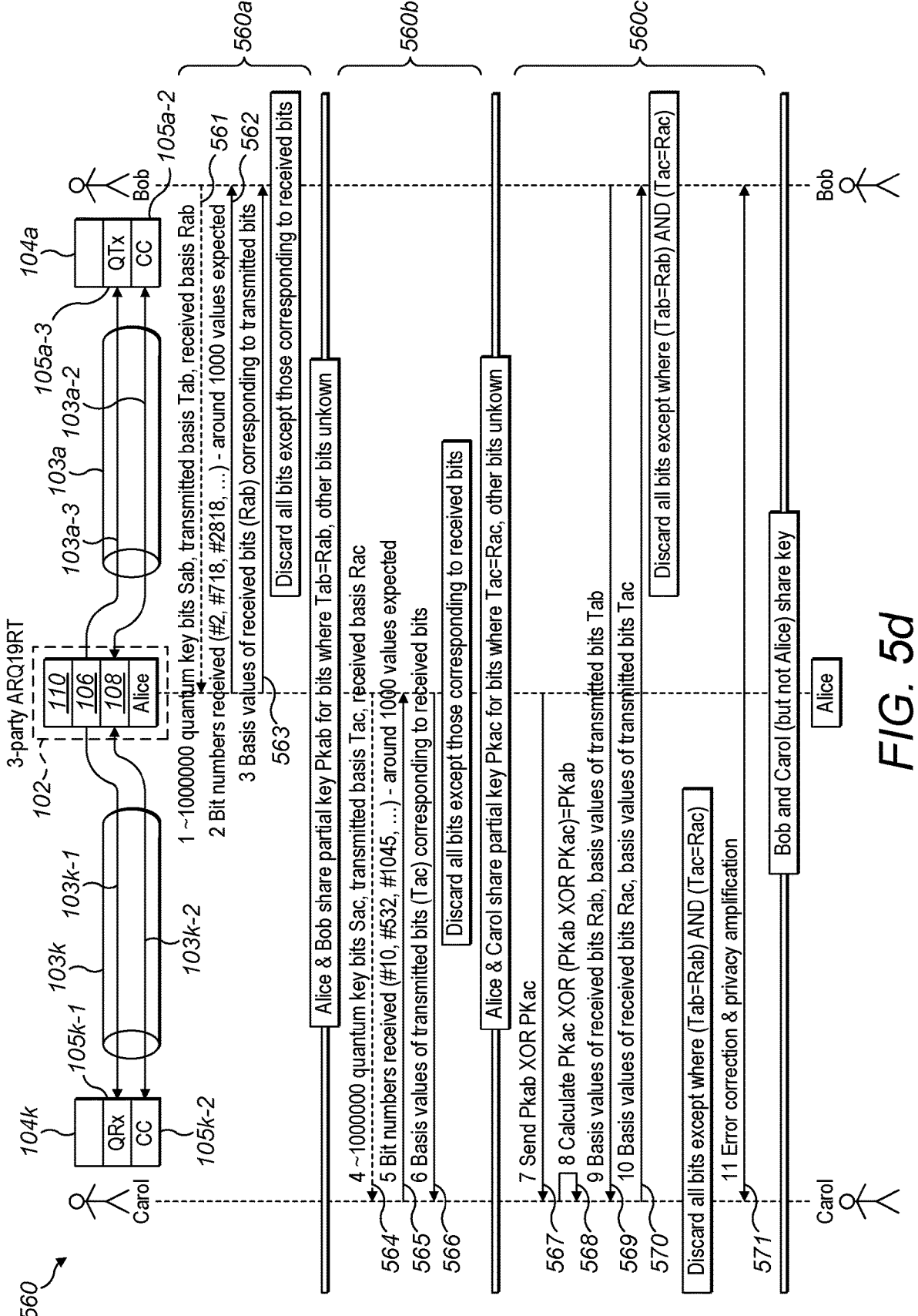
FIG. 5*d* is a flow diagram illustrating yet a further example QKD protocol for use with QKD linking apparatus of QKD switching system of any of FIGS. 1*a* to 4*c* according to some embodiments of the invention.

In a further example, another modified version of the BB84 protocol 500 of FIG. 5a is described in FIG. 5d, where the sender or QKD linking apparatus 102 may be an untrusted third party and is not able to derive the shared key between the first and second endpoint devices 104a and 104k. In the example QKD protocol 560 of FIG. 5d, the BB84 protocol 500 is further modified based on the sender device or QKD linking apparatus 102 and/or corresponding endpoint devices 104a and 104k exchanging and/or transmitting the quantum encoded keys and sharing a quantum-secure cryptography key between at least the pair of endpoint devices 104a and 104k, where the sender device or QKD linking apparatus 102 may be an untrusted device. This can be achieved by the first and second endpoint devices 104a and 104k withholding information such as, without limitation, for example the received basis used to receive the first and second QKD keys and/or withholding the transmitted basis used to transmit the first and/or second QKD keys and the like such that the sender device or QKD linking apparatus 102 (e.g. third party device/intermediary) does not have knowledge of, and so is unable to derive the final agreed/shared quantum-secure key between the first and second endpoint devices 104a and 104k. This means that the level of trust required by the sender device or QKD linking apparatus 102 may be reduced or untrusted but where the final shared key between first and second endpoint devices 104a and 104k is only known to the first and second endpoint devices 104a and 104k. This may be useful for when the QKD linking apparatus or sender device 102 is operated or used in a public setting such as, for example, in a roadside cabinet or other public telecommunication site. FIG. 5d describes another example QKD protocol 560 that includes further modifications to the BB84 QKD protocols 500, QKD protocol 520, or QKD protocol 540 as described with reference to FIGS. 5a to 5c for achieving the above-mentioned property, i.e. that the QKD linking apparatus 102 can operate at a reduced trust level or untrusted level and the like without compromising the security of the final shared key or agreed key between the first and second endpoint devices 104a and 104k.

Referring to FIG. 5d, FIG. 5d is a flow diagram illustrating yet a further example QKD protocol 560 for use with QKD linking apparatus 102 of QKD switching system 100 of FIG. 1a and/or any QKD linking apparatus or QKD switching system of any of FIGS. 1a to 4, modifications thereto, combinations thereof, and/or as herein described and/or as the application demands. For simplicity, the reference numerals of FIGS. 1a to 1i are re-used for similar or the same components/features for illustrating the QKD protocol/process 560 of FIG. 5d. In this example, the QKD linking apparatus 102 (e.g. Alice) includes a controller 110, quantum communications component (QCC) 106 and a CTRC component 108 in which first and second QKD links 103a and 103k have been assigned to first and second endpoint devices 104a and 104k, respectively (e.g. Bob and Carol, respectively). In this example, the QCC 106 includes at least a plurality of quantum transmitter(s) 106a-1 to 106k-1 and at least a plurality of quantum receiver(s) 106a-2 to 106k-2, the first endpoint device 104b (e.g. Bob) includes a quantum transmitter (Q-TX) 105a-3 and a classical transceiver (CC) 105a-2, and the second endpoint device 104k (e.g. Carol) includes a quantum receiver (Q-RX) 105k-1 and a classical transceiver (CC) 105k-2, which are used to form the corresponding QKD links 103a-103k therebetween. The first QKD link 103a, which is assigned to the first endpoint device 104a, includes a first uni-directional quantum channel 103a-1 for transmitting, during performance of the QKD protocol 560, quantum information from a quantum transmitter (Q-TX) 105*a*-3 of the first endpoint device 104*a* to the QCC 106 for reception by a Q-RX 106*a*-2 of the QCC 106 that is assigned to the QKD link 103*a* of the first endpoint device 104*a*, and a bi-directional classical channel 103*a*-2 for transmission of classical information between a first CTRX 108*a* of the CTRC component 108 that is assigned to the first endpoint device 104*a* and the CC 105*a*-2 of the first endpoint device 104*a*. The second QKD link 103*k*, which is assigned to the second endpoint device 104*k*, includes a first uni-directional quantum channel 103*k*-1 for transmitting, during the QKD protocol 540, quantum information from a quantum transmitter (Q-TX) 106*k*-1 of the QCC 106 of QKD linking apparatus 102 to the second endpoint device 104*k* for reception by the Q-RX 105*k*-1 of the second endpoint device 104*k*, and a bi-directional classical channel 103*k*-2 for transmission of classical information between a second CTRX 108*k* of the CTRC component 108 that is assigned to the second endpoint device 104*k* and the CC 105*k*-2 of the second endpoint device 104*k*.

The QKD protocol/process 560 is a modified version of the BB84 protocol 500, QKD protocol 520, and QKD protocol 540, where the QKD linking apparatus 102 (which may be a terrestrial fibre optic device) is communicatively coupled by first and second QKD links 103*a* and 103*k* to the first and second endpoint devices 104*a* and 104*k* (e.g. Bob and Carol, respectively), respectively. The QKD protocol/process 560 may include the following QKD subprocess(es) 560*a*, 560*b* and 560*c*. In the first QKD subprocess 560*a*, the first endpoint device 104*a* (e.g. Bob) and the QKD linking apparatus 102 (e.g. Alice) share a first intermediate set of symbols, also known as a first partial key (e.g. first partial key PKab). In the second QKD subprocess 560*b*, the second endpoint device 104*k* (e.g. Carol) and the QKD linking apparatus 102 (e.g. Alice) share a second intermediate set of symbols, also known as a second partial key (e.g. second partial key PKac). In the third QKD subprocess 560*c* the first and second endpoints 104*a* and 104*k* (e.g. Bob and Carol), but not the QKD linking apparatus 102 (e.g. Alice) agree upon and share a final key. The first and second endpoints 104*a* and 104*k* may use encrypted or secure communications therebetween when agreeing upon the shared final key. Thus, this QKD protocol/process 560 includes the following steps from the first QKD subprocess 560*a*, second QKD subprocess 560*b* and third QKD subprocess 560*c*.

The first QKD subprocess 560*a* of the QKD protocol/process 560 includes the following steps of: In step 561, the first endpoint device 104*a* sends a first QKD key, denoted Sab (e.g. 1000000 quantum key bits/symbols, Sab), via Q-TX 105*a*-3 over the first quantum channel 103*a*-1 of the first QKD link 103*a* to the QKD linking apparatus 102 in which the Q-TX 105*a*-3 uses a first transmitted basis set, Tab, for sending the first QKD key. The QKD linking apparatus 102 receives the quantum transmission of the first QKD key via Q-RX 106*a*-2 using a first receiving basis set, Rab. For example, the first endpoint device 104*a* may include a controller (not shown) that controls the use of a random bit generator (not shown) at the first endpoint device 104*a* to generate the first QKD key, in which the controller controls the Q-TX 105*a*-3 to transmit the first QKD key (generated random bit stream) to the Q-RX 106*a*-2 of the QCC 106 assigned to the first endpoint device 104*a* using the first quantum channel 103*a*-1 (e.g. optical channel/fibre) of the QKD link 103*a* assigned to the first endpoint device 104*a*. Alternatively or additionally, or as an option, the first endpoint device 104*a* may have securely received (e.g. in a quantum-safe manner) one or more QKD keys for use in performing QKD protocol 560 for transmitting a QKD key (e.g. the first QKD key) to the QKD linking apparatus 102 in step 561.

In step 562, the QKD linking apparatus 102 transmits over the classical channel 103*a*-2 of the QKD link 103*a* to the first endpoint device 104*a* an indication of the symbols/bits of the first QKD key (e.g. bit numbers received (#2, #718, #2818, . . . )—around 1000 values expected) that were validly received by the Q-RX 106*a*-1 of QKD linking apparatus 102. In step 563, the QKD linking apparatus 102 sends over the classical channel 103*a*-2 of the QKD link 103*a* the basis values of the received symbols/bits, denoted Rab, that correspond to the received indications of the validly received bits. For example, the controller 110 of the QKD linking apparatus 102 also switches/routes the received basis, Rab, used to receive the first QKD key as a classical transmission via a CTRX 108*a* of the CTRC component 108 that is assigned to the first endpoint device 104*a* for transmission of the received basis, Rab, over a first classical channel 103*a*-2 of the first QKD link 103*a* of the first endpoint device 104*a*. The first endpoint device 104*a* does not reveal the transmitted basis, denoted Tab, that is used by the Q-TX 104*a*-3 of the first endpoint device 104*a* to transmit the first QKD key to the QKD linking apparatus 102 over the first quantum channel 103*a*-1 of the QKD link 103*a* of the first endpoint device 104*a*, the received first QKD key may be referred to as a first partial key. That is, the first endpoint device 104*a* withholds from the QKD linking apparatus 102 the transmitted basis, denoted Tab, that is used by the Q-TX 104*a*-3 of the first endpoint device 104*a* to transmit the first QKD key over the first quantum channel 103*a*-1 of the QKD link 103*a* to the QKD linking apparatus 102. This means, at this point, the QKD linking apparatus 102 still only knows approximately 50% of the symbols/bits of the first QKD key transmitted by the first endpoint device 104*a*. This is because the QKD linking apparatus 102 does not know the transmitted basis and so has to randomly generate and guess the receiving basis, Rab, for receiving the quantum transmissions of the first QKD key from the Q-TX 105*a*-3 of the first endpoint device 104*a*.

Thus, only the first endpoint device 104*a* has knowledge of: a) the transmitted basis, Tab, used by the Q-TX 105*a*-3 for transmitting the first QKD key; b) the basis values used by the Q-RX 106*a*-2 of the QKD linking apparatus 102 for receiving the symbols/bits of the first QKD key, which is denoted Rab; and c) the validly received symbols/bits of the first QKD key received by the QKD linking apparatus 102 as indicated by the indication in step 562. The QKD linking apparatus 102 only has knowledge of: a) the received basis, Rab, used by the Q-RX 106*a*-2 for receiving the first QKD key; and b) an indication of the validly received symbols/bits of the first QKD key that were received by the QKD linking apparatus 102. The first endpoint device 104*a* may therefore determine a first intermediate set of symbols associated with the first endpoint device 104*a* (e.g. first partial key PKab1) by discarding all symbols/bits of the first QKD key except those where Tab(i)==Rab(i) for those validly received i-th symbols/bits of the first QKD key by the QKD linking apparatus 102. The QKD linking apparatus 102 may also determine a first intermediate set of symbols associated with the QKD linking apparatus 102 (e.g. a first partial key PKab2) by discarding all symbols/bits of the first QKD key that were not validly received by the QKD linking apparatus 102 and retains only those bits/symbols of the received first QKD key for those Rab(i) for each i-th validly received symbol/bit of the first QKD key by the QKD linking apparatus 102, which is derivable from the indication in step 562. Thus, the QKD linking apparatus 102 may only be able to derive or guess correctly approximately 50% of the first intermediate set of symbols associated with the first endpoint device 104*a* (e.g. first partial key PKab1) using the first intermediate set of symbols associated with the QKD linking apparatus 102 (e.g. first partial key PKab2).

The first QKD subprocess 560*a* of QKD protocol/process 560 is repeated but instead with the second endpoint device 104*k* and QKD linking apparatus 102 for a second QKD key in a second QKD subprocess 560*b* of the QKD protocol/process 560. That is, the QKD linking apparatus (e.g. sender device) 102 may use the random bit generator 142 to generate a second QKD key, where the controller 110 controls the QCC 106 to switch and/or route the second QKD key (generated random bit stream) to the quantum transmitter (Q-TX) 106*k* assigned to the second endpoint device 104*k* for transmitting the second QKD key to the second endpoint device 104*k* over the second QKD link 103*k* including second quantum channel 103*k*-1 (e.g. optical channel/fibre). In addition, the sender device/QKD linking apparatus 102 also switches/routes the transmitted basis used to send the second QKD key to a CTRX 108*b* of the CTRC component 108 that is assigned to the second endpoint device 104*k* for transmission of the transmitted basis over a second classical channel of the second QKD link 103*b* of the second endpoint device 104*k*. The second endpoint device 104*k* does not reveal the received basis that is used by the second endpoint device 104*k* to receive the second QKD key over the second quantum channel of the second QKD link 103*k* of the second endpoint device 104*k*, the received second QKD key may be referred to as a second partial key. That is, the second endpoint device 104*k* withholds from the QKD linking apparatus 102 the received basis, denoted Rab, that is used by the Q-RX 105*k*-1 of the second endpoint device 104*k* to receive the second QKD key over the second quantum channel 103*k*-1 of the QKD link 103*k*. This means the sender device/QKD linking apparatus 102 only knows approximately 50% of the received bits of the second QKD key too (i.e. the second partial key).

For example, the second QKD subprocess 560*b* of the QKD protocol/process 560 includes the following steps of: In step 564, the QKD linking apparatus 102, as sender, sends a second QKD key, denoted Sac (e.g. 1000000 quantum key bits/symbols, Sac), via Q-TX 106*k*-1 over the second quantum channel 103*k*-1 of the second QKD link 103*k* to the second endpoint device 104*k* using a second transmitted basis set, Tac. The second endpoint device 104*k* receives the quantum transmission of the second QKD key via Q-RX 105*k*-1 using second receiving basis set, Rac. For example, the QKD linking apparatus 102 may include a controller 110 that controls the use of a random bit generator 142 to generate the second QKD key, in which the controller 110 controls the QCC 106 to route/switch the second QKD key (generated random bit stream) to the Q-TX 106*k*-1 of the QCC 106 assigned to the second endpoint device 104*k* for transmitting the second QKD key to the second endpoint device 104*k* over the second QKD link 103*k* including second quantum channel 103*k*-1 (e.g. optical channel/fibre).

In step 565, the second endpoint device 104*k* transmits over the classical channel 103*k*-2 to the QKD linking apparatus 102 an indication of the symbols/bits of the second QKD key (e.g. bit numbers received (#10, #532, #1045, . . . )—around 1000 values expected) that were validly received by the Q-RX 105*k*-1 of the second endpoint device 104*k*. In step 566, the QKD linking apparatus 102 sends over the classical channel 103*k*-2 of the QKD link 103*k* the basis values of the transmitted symbols/bits, denoted Tac, that correspond to the received indications of the validly received bits. For example, the controller 110 of the QKD linking apparatus 102 also switches/routes the transmitted basis, Tac, used to send the second QKD key as a classical transmission via a CTRX 108*k* of the CTRC component 108 that is assigned to the second endpoint device 104*k* for transmission of the transmitted basis, Tac, over a first classical channel 103*k*-2 of the second QKD link 103*k* of the endpoint device 104*k*. The second endpoint device 104*k* does not reveal the received basis, denoted Rac, that is used by the Q-RX 105*k*-1 of the second endpoint device 104*k* to receive the second QKD key over the second quantum channel 103*k*-1 of the QKD link 103*k* of the second endpoint device 104*k*. That is, second endpoint device 104*k* withholds from the QKD linking apparatus 102 the received basis, denoted Rac, that is used by the Q-RX 105*k*-1 of the second endpoint device 104*k* to receive the second QKD key over the second quantum channel 103*k*-1 of the QKD link 103*k* from the QKD linking apparatus 102. This means, at this point, the QKD linking apparatus 102 only knows approximately 50% of the symbols/bits of the second QKD key received by the second endpoint device 104*k* (or second partial key).

Thus, only the second endpoint device 104*k* has knowledge of: a) the transmitted basis, Tac, used by the Q-TX 106*k*-1 for transmitting the second QKD key; b) the basis values used by the Q-RX 105*k*-1 of the second endpoint device 104*k* for receiving the symbols/bits of the second QKD key, which is denoted Rac; and c) the validly received symbols/bits of the second QKD key received by the second endpoint device 104*k* as indicated by the indication of step 565. The QKD linking apparatus 102 only has knowledge of: a) the transmitted basis, Tac, used by the Q-TX 106*k*-1 for transmitting the second QKD key; and b) an indication of the validly received symbols/bits of the second QKD key that were received by the second endpoint device 104*k*. The second endpoint device 104*k* determines a second intermediate set of symbols associated with the second endpoint device 104*k* (e.g. second partial key PKac1) by discarding all symbols/bits of the second QKD key except those where Tac(i)==Rac(i) for that validly received i-th symbol/bit of the second QKD key by the second endpoint device 104*k*. The QKD linking apparatus 102 determines a second intermediate set of symbols associated with the QKD linking apparatus 102 (e.g. second partial key PKac2) by discarding all symbols/bits of the second QKD key that were not validly received by the second endpoint device 104*k* and retains only those bits/symbols of the second QKD key for those Tac(i) for each i-th validly received symbol/bit of the second QKD key by the second endpoint device 104*k*, which is derivable from the received indication in step 565. Thus, the QKD linking apparatus 102 may only be able to derive or guess correctly approximately 50% of the second intermediate set of symbols associated with the second endpoint device 104*k* (e.g. first partial key PKac1) using the second intermediate set of symbols associated with the QKD linking apparatus 102 (e.g. second partial key PKac2). This is because the QKD linking apparatus 102 does not know the receiving basis, Rac, used by the second endpoint device 104*k* for receiving the quantum transmissions of the second QKD key from the Q-TX 106*a*-1 of the QKD linking apparatus 102.

Thus, once the first intermediate set of symbols associated with the QKD linking apparatus and the second intermediate set of symbols associated with the QKD linking apparatus (e.g. first partial key PKab2 and second partial key PKac2) are determined by the QKD linking apparatus 102, the sender device or QKD linking apparatus 102 then XORs these first and second intermediate sets of symbols (e.g. first and second partial keys PKab1 and PKab2) together and sends these XOR'ed symbols/keys to the second endpoint device 104*k* over the second classical channel of the second QKD link 103*k* or even to both parties over the classical channels of their QKD links 103*a*/103*k*. The first and second endpoint devices 104*a* and 104*k* communicate, typically using encrypted communications, over the first classical channel and second classical channels of their QKD links 103*a* and 103*k*, respectively, via the QKD linking apparatus 102 to discover the correctly-measured bases, generating a new raw key of about 25% of the original bits transmitted, where they then perform error correction, bit sifting and/or privacy amplification and the like to generate a final shared key, which becomes a precursor key negotiated between the first and second endpoint devices 104*a* and 104*k*. The first and second endpoint devices may use the final shared key, which is unknown to the QKD linking apparatus 102 because the transmitting/receiving bases, Tab and Rac, were withheld from the QKD linking apparatus 102, in secure communications therebetween and/or as the application demands.

Referring back to FIG. 5*d*, from the first QKD subprocess 560*a*, the first endpoint device 104*a* and the QKD linking apparatus 102 have determined their corresponding first intermediate sets of symbols (e.g. first partial key PKab1 and second partial key PKab2). Similarly, from the second QKD subprocess 560*b*, the second endpoint device 104*k* and the QKD linking apparatus 102 have determined their corresponding second intermediate sets of symbols (e.g. second partial key PKac1 and second partial key PKac2). Although as described above, the first and second QKD subprocess(es) 560*a* and 560*b* are performed sequentially one after the other, this is byway of example only and the invention is not so limited, it is to be appreciated by the skilled person that the first and second QKD subprocess(es) 560*a* and 560*b* may be performed concurrently, simultaneously, in a different order and/or at different times and/or where one or more of the steps of each of the QKD subprocess(es) 560*a* and 560*b* may be even be interleaved with one or more steps of each of the other QKD subprocess(es) 560*b* and 560*a*, respectively, and the like; combinations thereof, modifications thereto, as herein described and/or as the application demands.

In any event, once the first and second QKD subprocess(es) 560*a* and 560*b* have completed, the third QKD subprocess 560*c* of the QKD protocol/process 560 is performed based on the following steps of: In step 567, the QKD linking apparatus 102 encrypts the first intermediate set of symbols associated with the QKD linking apparatus 102 (e.g. first partial key PKab2) for sending to the second endpoint device 104*k*. This is performed by encrypting the first intermediate set of symbols associated with the QKD linking apparatus 102 (e.g. first partial key PKab2) with the second intermediate set of symbols associated with the QKD linking apparatus (e.g. second partial key PKac2) that was determined by the QKD linking apparatus 102. Once encrypted, the encrypted first intermediate set of symbols associated with the QKD linking apparatus 102 (e.g. encrypted first partial key) is sent in its encrypted form over the classical channel 103*k*-2 of the second QKD link 103*k* to the second endpoint device 104*k*. For example, when encrypting the first intermediate set of symbols associated with the QKD linking apparatus 102 (e.g. first partial key PKab2), the QKD linking apparatus 102 may combine the first intermediate set of symbols associated with the QKD linking apparatus 102 (e.g. first partial key PKab2) with the second intermediate set of symbols associated with the QKD linking apparatus 102 (e.g. second partial key PKac2) using, without limitation, for example an XOR-type operation or OTP operation and the like (e.g. if quantum bits are used, then the QKD linking apparatus 102 may send the encrypted first partial key based on PKab2 XOR PKac2 to the second endpoint device 104*k*).

In step 568, the second endpoint device 104*k* receives the encrypted first intermediate set of symbols associated with the QKD linking apparatus 102 (e.g. PKab2 XOR PKac2) and decrypts the encrypted first intermediate set of symbols associated with the QKD linking apparatus 102 using the second intermediate set of symbols associated with the QKD linking apparatus 102 (e.g. second partial key PKac2). The second endpoint device 104*k* is able to determine the second intermediate set of symbols associated with the QKD linking apparatus 102 (e.g. second partial key, PKac2) because the second endpoint device 104*k* has knowledge of: a) the transmitted basis, Tac, used by the Q-TX 106*k*-1 of the QCC 106 of the QKD linking apparatus 102 for transmitting the second QKD key to the second endpoint device 104*k*; b) the basis values used by the Q-RX 105*k*-1 of the second endpoint device 104*k* for receiving the symbols/bits of the second QKD key, which is denoted Rac; and c) the validly received symbols/bits of the second QKD key transmitted by the QKD linking apparatus 102 as indicated by the indication in step 565. From this knowledge, the second endpoint device 104*k* can derive the second intermediate set of symbols associated with the QKD linking apparatus 102 (e.g. second partial key PKac2) that was used to encrypt the first intermediate set of symbols associated with the QKD linking apparatus 102 (e.g. first partial key PKab2). For example, the second endpoint device 104*k* calculates the first intermediate set of symbols associated with the QKD linking apparatus 102 (e.g. first partial key PKab2), based on PKac2 XOR (PKab2 XOR PKac2)=PKab2, which is the first intermediate set of symbols associated with the QKD linking apparatus 102. Thus, the first intermediate set of symbols associated with the QKD linking apparatus 102 (e.g. first partial key PKab2) has effectively been shared between the first endpoint device 104*a*, the second endpoint device 104*k* and the QKD linking apparatus 102. However, at this point in the third QKD process 560*c*, both the QKD linking apparatus 102 and the second endpoint device 104*k* do not know the first intermediate set of symbols associated with the first endpoint device 104*a* (e.g. the first partial key PKab1) because the first endpoint device 104*a* has withheld the basis values, Tab, used by the Q-TX 105*a*-3 of the first endpoint device 104*a* for transmitting the symbols/bits of the first QKD key to the QKD linking apparatus 102. Thus, the QKD linking apparatus 102 and second endpoint device 104*k* may only be able to derive or guess correctly approximately 50% of the first intermediate set of symbols associated with the first endpoint device 104*a* (e.g. first partial key PKab1) using the first intermediate set of symbols associated with the QKD linking apparatus 102 (e.g. first partial key PKab2).

In step 569, the first and second endpoint devices 104*a* and 104*k* may perform secure or encrypted communications therebetween in which the first endpoint device 104*a* sends to the second endpoint device 104*k* basis values including data representative of the basis values of the transmitted bits, Tab, used by Q-TX 105*a*-3 for transmitting the first QKD key. The first endpoint device 104*a* also sends to the second endpoint device 104*k* receiving basis values including data representative of the basis values, Rab, used by Q-RX 106k-2 of the QCC 106 of QKD linking apparatus 102 for receiving the first QKD key transmitted as a quantum transmission from the first endpoint device 104a to the QKD linking apparatus 102 in step 561, where the basis values, Rab, were received by the first endpoint device 104a in step 563. For example, the first endpoint device 104a may send these basis values (e.g. Tab and Rab) addressed to the second endpoint device 104k via the QKD link apparatus 102 over the classical communications channel 103a-2 of the QKD link 103a of the first endpoint device 104a. The CTRX 108a of the CTRC component 108 of the QKD linking apparatus 102 may receive these basis values (e.g. Tab and Rab), where the CTRC component 108 simply routes and forwards these received basis values to the CTRX 108k associated with the QKD link 103k of the second endpoint device 104k for transmission over the classical communications channel 103k-2 of the QKD link 103k of the second endpoint device 104k. The encrypted communications may be such that the QKD linking apparatus 102 is unable to decrypt the communications data transmitted therebetween. For example, the first and second endpoint devices 104a and 104k may perform secure or encrypted communications with each other using a previously shared key or agreed key/channel and the like such that the QKD linking apparatus 102 is unable to decrypt or derive the data representative of the basis values of the transmitted bits, Tab that were withheld from the QKD linking apparatus 102. Thus, only the second endpoint device 104k receives the basis values of the transmitted bits, Tab, of the first QKD key. The second endpoint device 104k also receives the basis values for receiving the transmitted bits of the first QKD key, Rab, for use in determining a shared key between the first and second endpoint devices 104a and 104k. As an alternative option, the first endpoint device 104a may bypass the QKD linking apparatus 102 and instead send these basis values of the transmitted bits, Tab, of the first QKD key and the basis values for receiving the transmitted bits of the first QKD key, Rab, to the second endpoint device 104k over another or different classical communication channel than that included in any of the QKD links 103a and 103k, where the basis values include data representative of the basis values of the transmitted bits, Tab, and the basis values for receiving these transmitted bits, Rab. The another or different classical communication channel may be any other classical wireless or wired communication channel (e.g. PSTN, another telecommunications provider, mobile communications, and the like) enabling the first and second endpoint devices 104a and 104k to communicate independently of the QKD linking apparatus 102. Furthermore, the first and second endpoint devices 104a and 104k may perform encrypted communications or secure communications based on a previously agreed/shared key over the another or different classical communication channel, which further minimises any eavesdroppers from determining the transmitted basis, Tab, withheld from the QKD linking apparatus by the first endpoint device 104a.

In step 570, the second and first endpoint devices 104k and 104a may perform secure or encrypted communications therebetween in which the second endpoint device 104k sends to the first endpoint device 104a basis values including data representative of the basis values of the transmitted bits, Tac, used by Q-TX 106k-1 for transmitting the second QKD key that it has received from the QKD linking apparatus 102. The second endpoint device 104k also sends to the first endpoint device 104a receiving basis values including data representative of the basis values, Rac, used by Q-RX 105k-1 for receiving the second QKD key transmitted as a quantum transmission from the QKD linking apparatus 102. For example, the second endpoint device 104k may send these basis values (e.g. Tac and Rac) addressed to the first endpoint device 104a via the QKD link apparatus 102 over the classical communications channel 103k-2 of the QKD link 103k of the second endpoint device 104k. The CTRX 108k of the CTRC component 108 of the QKD linking apparatus 102 may receive these basis values (e.g. Tac and Rac), where the CTRC component 108 simply routes and forwards these received basis values to the CTRX 108a associated with the QKD link 103a of the first endpoint device 104a for transmission over the classical communications channel 103a-2 of the QKD link 103a of the first endpoint device 104a. The encrypted communications may be such that the QKD linking apparatus 102 is unable to decrypt the communications data transmitted therebetween. The first and second endpoint devices 104a and 104k may perform secure or encrypted communications with each other using a previous shared key and the like such that the QKD linking apparatus 102 is unable to decrypt or derive the data representative of the basis values of the received bits, Rac, that were withheld from the QKD linking apparatus 102. Thus, only the first endpoint device 104a receives the basis values for receiving the transmitted bits of the second QKD key, Rac. The first endpoint device 104a also receives data representative of the basis values for the transmitted bits, Tac, used to transmit the second QKD key. These can be used in determining the shared key between the first and second endpoint devices 104a and 104k. As an alternative option, the second endpoint device 104k may also bypass the QKD linking apparatus 102 and instead send these basis values (e.g. Tac and Rac) to the first endpoint device 104a over another or different classical communication channel than that included in any of the QKD links 103a and 103k, where the basis values include data representative of the basis values of the transmitted bits, Tac, and the basis values for receiving the transmitted bits, Rac. The another or different classical communication channel may be any other classical wireless or wired communication channel (e.g. PSTN, another telecommunications provider, or mobile communication channel, and the like) enabling the first and second endpoint devices 104a and 104k to communicate independently of the QKD linking apparatus 102. Furthermore, the first and second endpoint devices 104a and 104k may perform encrypted communications or secure communications based on a previously agreed/shared key over the another or different classical communication channel, which further minimises any eavesdroppers from determining the received basis, Rac, withheld from the QKD linking apparatus by the second endpoint device 104k.

At this stage of the third QKD subprocess 540c, the first endpoint device 104a and the second endpoint device 104k have the following information: a) the basis values Tab and Rab; and b) the basis values Tac and Rac. Furthermore, the second endpoint device 104k has the following information: a) the second partial key, PKab2, associated with the first endpoint device 104a; and b) the second partial key, PKac2, associated with the second endpoint device 104k. Of course, the first endpoint device 104a has the first QKD key and also the first partial key, PKab1, associated with the first endpoint device 104a. Thus, using this information along with error correction and privacy amplification, the first and second endpoint devices 104a and 104k may determine a final shared key. For example, the first endpoint device 104a determines a first shared key, KS1, by discarding all symbols/bits of the first QKD key except those symbols/bits of the first QKD key where (Tab(i)==Rab(i) AND Tac(i)==Rac (i)) for those validly received i-th symbol/bit of the first QKD key by the QKD linking apparatus 102, which is derivable from the received indication in step 562. Similarly, the second endpoint device 104k determines a second shared key, KS2, by discarding all symbols/bits of the first intermediate set of symbols associated with the QKD linking apparatus 102 (e.g. first partial key PKab2) except those symbols/bits of the first intermediate set of symbols associated with the QKD linking apparatus 102 (e.g. first partial key PKab2) where (Tab(i)==Rab(i) AND Tac(i)==Rac(i)) for those validly i-th received symbol/bit of the second QKD key by the second endpoint device 104k, which is derivable from the received indication in step 565.

Thus, the first and second endpoint devices 104a and 104k determine a first and second shared key, KS1 and KS2, respectively. In step 571, the first and second endpoint devices 104a and 104k perform using a classical communication channel (e.g. classical communication channels 103a-2 and 103k-2 of QKD links 103a and 103k, and/or other classical communication channels) error correction, bit sifting and/or privacy amplification on the first and second shared keys KS1 and KS2, respectively, to agree upon and/or form a final shared key KFbc. Thus, the first endpoint device 104a and second endpoint device 104k (e.g. Bob and Carol, respectively), but not the QKD linking apparatus 102 (e.g. Alice) have shared a final shared key, KFbc. Thus, the first and second endpoint devices 104a and 104k may use the final shared key, KFbc, in secure communications therebetween and/or any other useful cryptographic operation and the like.

As described above with reference to FIGS. 1a to 5d and/or as described herein, the QKD linking apparatus 102 or 202 of QKD systems 100, 120, 130, 140, 150, 160, 165, 170, 180, 200, 300, 310, 320, 400, 410, and 420 of FIGS. 1a to 5d may be used, depending on the configuration of each of the QKD links of each of the endpoint devices that communicatively couple the endpoint devices to the QKD linking apparatus, with any suitable type of key exchange or QKD protocol for securely exchanging a key (or QKD key) between the endpoint device(s) and/or the QKD linking apparatus using the quantum channel(s) and corresponding classical/non-quantum communication channels of the corresponding QKD links. As described above, each endpoint device 104a/204a has a QKD link 103a/203a that couples the endpoint device 104a/204a to each other endpoint device 104b/204b via the QKD linking apparatus 102/202. Thus, for example, two or more endpoint device(s) 104a-104k/204a-204k may perform a QKD protocol or key exchange protocol that uses the corresponding quantum channels and classical communication channels provided by the QKD links 103a-103k/203a-203k connecting the endpoint devices 104a-104k/204a-204k to the QKD linking apparatus 102/202. Thus, the QKD linking apparatus 102/202 may act as an intermediary device for enabling a QKD protocol for key exchange to be performed for one or more endpoint devices 104a-104k/204a-204k. Any suitable or secure QKD protocol for key establishment may thus be implemented to ensure at least two endpoint devices 104a-104k/204a-204k securely share or establish/negotiate the same cryptographic key. There may be a plurality of QKD protocol(s) that may be used by the QKD linking apparatus 102/202 and endpoint devices 104a-104k/204a-204k that make use of the corresponding QKD links, the QKD protocols may be based on, without limitation, for example a QKD protocol from the Bennett and Brassard 1984 (BB84) family of QKD protocols; the BB84 protocol; a modified BB84 protocol as herein described; modified versions of the BB84 protocol configured to ensure the QKD linking apparatus is unable to derive the resulting exchanged QKD keys between the endpoint devices; the Bennet 1992 (B92) QKD protocol; the Six-State Protocol (SSP) QKD protocol; the Scarani Acin Ribordy Gisin 2004 (SARG04) QKD protocol; the Doherty Parrilo Spedalieri 2002 (DPS02) QKD protocol; the differential phase shift (DPS) QKD protocol; the Eckert 1991 (E91) QKD protocol; the coherent one-way (COW) QKD protocol; the Khan Murphy Beige 2009 (KMB09) QKD protocol; the Esteban Serna 2009 (S09) QKD protocol; the Serna 2013 (S13) QKD protocol; the A Abushgra K Elleithy 2015 (AK15) QKD protocol; any one or more other entanglement based QKD protocols; any one or more future QKD protocols; any other QKD protocol capable of making use of a quantum channel and non-quantum channel of each of the QKD links 103a-103k/203a-203k; any other quantum key exchange protocol used to establish and/or exchange a shared key between at least two or more endpoint devices 104a-104k/204a-204k and/or at least one endpoint device 104a/204a and a third party, an intermediary or cloud service and the like; any QKD protocol in which the exchanged key may be based on quantum key distributed keys and/or may be a quantum-safe or quantum secure key due to the QKD protocol being a quantum-secure key establishment protocol establishes a QKD shared key between the endpoint devices 104a-104k/204a-204k and the like; combinations thereof, modifications thereto and the like and/or as the application demands.

Although the QKD linking apparatus of communication mediums such as optical fibre are described herein for terrestrial based systems according to the invention, this is by way of example only and the invention is not so limited, it is to be appreciated by the skilled person that any type of communications medium that is suitable for performing quantum and/or non-quantum communications may be used such as, without limitation, for example in an aircraft, spaceborne, or satellite based system according to the invention the communications medium of a QKD link that is used may be configured based on using a free-space optical channel for the quantum channel and an aircraft radio, spaceborne based wireless communications, or satellite microwave communications channel (or any other wavelength satellite communications channel) for the non-quantum communications channel and the like; combinations thereof; modifications thereto; as herein described and/or as the application demands.

As described above with reference to FIGS. 1a to 5d and/or as described herein, the QKD linking apparatus 102 or 202 of QKD systems 100, 120, 130, 140, 150, 160, 165, 170, 180, 200, 300, 310, 320, 400, 410, and 420 of FIGS. 1a to 5d may be used, depending on the configuration of each of the QKD links of each of the endpoint devices that communicatively couple the endpoint devices to the QKD linking apparatus, with any suitable type of key exchange or QKD protocol for securely exchanging a key (or QKD key) between the endpoint device(s) and/or the QKD linking apparatus using the quantum channel(s) and corresponding classical/non-quantum communication channels of the corresponding QKD links. Furthermore the controller 110 of the QKD linking apparatus 102 or 202 of QKD systems 100, 120, 130, 140, 150, 160, 165, 170, 180, 200, 300, 310, 320, 400, 410, and 420 of FIGS. 1a to 5d with reference to FIGS. 1a to 5d and/or as described herein may be further configured to use a QKD protocol to generate keys and perform key management such that each of the endpoint devices 104a-104k/202a-202k, 1004a-1004k, 1002a-1002k may receive a buffer of unpaired keys for use in agreeing a shared key with one or more other endpoint devices and/or for use in secure communications with one or more corresponding endpoint devices.

For two-station/party type QKD protocols such as BB84, it's only necessary to hold a store/buffer at each endpoint device of the agreed/shared key bits/symbols. There is no actual requirement to split the bits/symbols into key structures at this stage, just for the endpoint devices to store and hold these agreed/shared key bits/symbols in, without limitation, for example a first-in first-out (FIFO) queue/list. They might be split into keys so they could be requested in a random access approach (e.g. "select key 45").

Furthermore, should the QKD protocol be based on the QKD protocols 520, 540, 560 as described with reference to FIGS. 5*b* to 5*d* in which intermediate sets of symbols (e.g. partial keys) are determined (e.g. see subprocesses 520*a*, 520*b*, 540*a*, 540*b*, 560*a*, 560*b* of FIGS. 5*b*, 5*c* and 5*d*) from transmitted random quantum bits/symbols, by the QKD linking apparatus 102 and endpoint devices 104*a* or 104*k* using basis values and/or bit numbers/indications of the validly received/transmitted quantum bits and the like. Where the intermediate sets of symbols (e.g. partial keys) are determined from identifying those validly received transmitted random bits/symbols using basis values of the quantum receiver that receives the transmitted random quantum bits/symbols. This key information may be buffered and stored for later use.

Thus, with a buffer of keys, key pairs and/or intermediate sets of symbols and associated basis values of the validly received bits/symbols (e.g. partial keys), the endpoints 104*a*-104*k* may perform keypairing and/or final key agreement/exchange at a later time. In this case, the QKD linking apparatus 102 (e.g. satellite, exchange or linking party) may also maintain a store of all the buffered keys/intermediate sets of symbols (e.g. partial keys) in the pools for each endpoint device. Thus, with each endpoint device and the QKD linking apparatus 102 having a buffer of key pairs and/or intermediate sets of symbols as associated basis values and the like that are exchanged during, without limitation, for example subprocesses 520*a*, 520*b*, 540*a*, 540*b*, 560*a*, 560*b* of FIGS. 5*b*, 5*c* and 5*d*, when at least two endpoint devices wish to exchange a shared key, the QKD linking apparatus 102 and said at least two endpoint devices only need to select the correct set of key pairs/intermediate sets of symbols and basis values and the like, and perform, without limitation, for example subprocesses 520*c*, 540*c*, and 560*c* and the like, in which the QKD linking apparatus XORs the correct set of intermediate keys together and sends over a conventional/classical channel to one of the endpoint devices 104*k*. The resulting XOR of the key pairing values/intermediate sets of symbols are not confidential, because the resulting XOR is effectively a OTP operation, so they may be transmitted by conventional channel through untrusted relay nodes (such as other satellites/OGRs/and the like).

In addition, in satellite QKD and/or switched QKD systems with QKD linking apparatus 102 both may perform routing in which there are multiple end nodes and keys may be shared amongst them through the QKD linking apparatus 102 (e.g. central linking party/device and/or satellite). The QKD linking apparatus 102 (or central node) may be configured to link keys together into key pairs (or more) in relation to one or more pairs (or more) of endpoint devices. The requirements for linking keys might be pre-determined by a central authority before raw bits/symbols are transmitted. Alternatively the bits/symbols may be stored for allocation later. For example, in a satellite QKD system 1000 or 410, 420 and the like, the raw keys (e.g. randomly generated and/or stored quantum symbols/bits) may be sent from the QKD linking apparatus 102 of the satellite (or linking party) to the endpoint devices (e.g. end nodes or endpoint nodes). These can be stored in a first-in first-out manner in each of the endpoint devices or end nodes, but the QKD linking apparatus 102 of the satellite will need to configure a separate FIFO buffer for each endpoint device and/or OGR/end node. Once the agreed randomly generated or stored bits/symbols have been accumulated, then an bit/symbol allocation algorithm may assign them to be matched with other pre-allocated keys/intermediate sets of symbols and the like, or the allocation algorithm can request they be deferred to a future date. In fact, the deferred keys can be just part of the same FIFO buffer.

In a satellite QKD system with one or more QKD linking apparatus 102, it is advantageous to have the keys/bits/symbols pre-allocated for the a pair of endpoint devices (or a second OGR in a pair), so that immediately after raw keys/bits/symbols are transferred, as many bits/symbols as required can be paired and the XOR values computed from the satellite's buffers. After a successful XOR transmission of the paired bits/symbols, the corresponding buffer values of these paired bits/symbols can be deleted in the satellite and/or endpoint devices or the QKD linking apparatus of the satellite and freed, with any remaining bits/symbols that are not XOR'd/transmitted remaining in the buffer associated with each pair of endpoint devices. The buffers can be added to by subsequent satellite overpasses, up to the maximum bits required. If they are allocated later, the satellite or central linking party computes the XOR values. Preferably, the satellite or central linking party (e.g. QKD linking apparatus) would send directly to one or the other of the two parties/endpoint devices concerned, but it could send that XOR value of the resulting XOR of the pair of allocated symbols/bits to any other node to be relayed to the required end nodes. Given this data is an XOR message is not secret; but does need to be authenticated by the end nodes. This provides a more dynamic way of assigning keys and/or sharing keys with endpoint devices.

With QKD protocols based on the QKD protocols 520, 540, 560 as described with reference to FIGS. 5*b* to 5*d*, the QKD linking apparatus 102 of the satellite or central linking party functions as described above, but it does not know which bits/symbols (e.g. intermediate sets of symbols) are valid in the endpoint device, because the endpoint device withholds basis values only known to the endpoint device in relation to the bits/symbols (e.g. intermediate sets of symbols). The endpoint device has to effectively store all the received bits, plus an array of "validity" bits/symbols or an indication of which bits/symbols are valid to say whether the transmitted and received basis values match. As described in subprocesses 520*c*, 540*c*, 560*c*, a matching process is performed such that those bits/symbols of the intermediate set of symbols associated with a first endpoint device are discarded when the <received basis value>XOR<transmitted basis value>='1', which results when the bases do not match, but are retained when <received basis value>XOR<transmitted basis value>='0', which results when the bases do match. So these basis values would need to be stored, so those 'invalid' secret bits/symbols can be ignored when keys are paired. Additional key information or values may also be required to be stored when using QKD protocols such as, without limitation, for example sample bits or decoy bits, which will allow the final error correction stages to be implemented between endpoint devices/nodes and the like when sharing the final key.

Figure 6A:
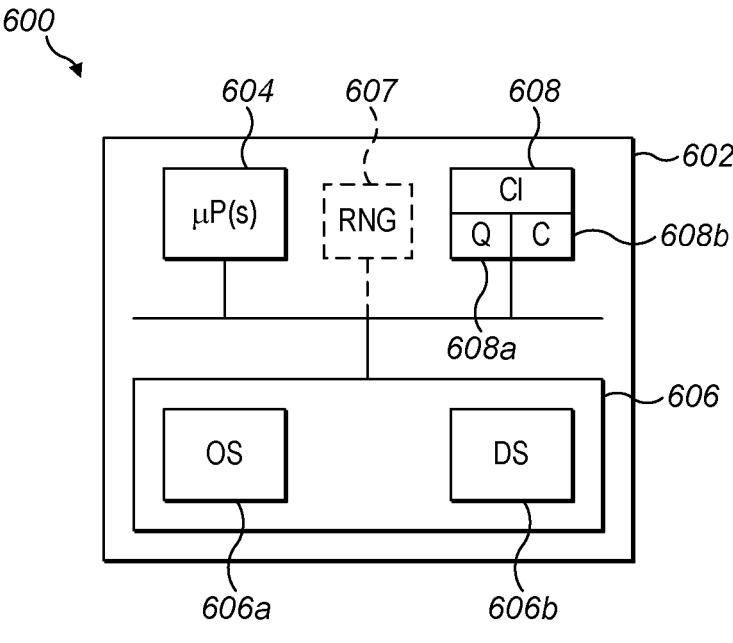
FIG. 6*a* is a schematic diagram illustrating an example computing system, device or apparatus according to some embodiments of the invention.

FIG. 6a is a schematic diagram of an example computing system 600 for use in implementing and/or performing a QKD control/switching process(es), endpoint device control/switching process(es), and/or QKD switching system(s)/QCC(s)/CTRC(s) according to aspects of the invention as herein described with reference to FIGS. 1a to 5d. Computing system 600 may be used to implement one or more aspects of the systems, apparatus, methods, process(es), device(s) and/or use cases as described with reference to FIGS. 1a-5d, combinations thereof, modifications thereto, as herein described and/or as the application demands. Computing system 600 includes a computing device or apparatus 602 that includes one or more processor unit(s) 604, memory unit 606 and a communication interface 608. The computing device or apparatus may also include, without limitation, for example, a first conventional or classical communication interface 608a and/or at least one or more second quantum communication interface 608b, and/or a random symbol/number generator 607 and the like. For example, the first conventional communication interface 608a may be adapted for communicating over classical communications networks and/or satellite networks and the at least one second quantum communication interface 608b may be adapted for communicating over quantum communication channels (e.g. using optical channels or other types of quantum channels). These may be used for performing QKD protocols, group key sharing, post-quantum cryptography, key exchange, and/or QKD process(es) and the like as herein described. The one or more processor unit(s) 604 are connected to the memory unit 606, the communication interface 608 (e.g. the first communication interface 608a and the second quantum communication interface 608b), and/or the random symbol/number generator 607. The communications interface 608 may connect the computing device or apparatus 602 with one or more other computing devices and/or apparatus (e.g. intermediary device, first and/or second device(s) or other n-th devices/stations) (not shown). The memory unit 606 may store one or more program instructions, code or components such as, by way of example only but not limited to, an operating system 606a for operating computing device 602, and a data store 606b for storing computer program instructions, executable code, code and/or components associated with implementing the functionality and/or one or more function(s) or functionality associated with one or more QKD switching process(es), endpoint device switching process(es), and/or QKD switching system, QKD protocol exchange mechanisms/systems and/or process(es), QKD protocol(s) and the like that may be configured for performing one or more of the process(es)/apparatus according to the invention, system(s)/platforms, combinations thereof, modifications there to, and/or as described herein with reference to at least any one of figure(s) 1a to 5d and/or as the application demands.

Figure 6B:
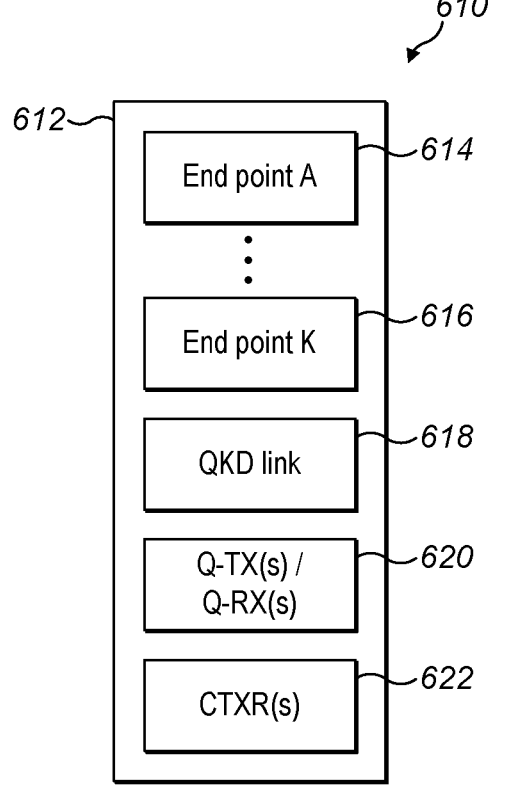
FIG. 6*b* is a schematic diagram illustrating an example system according to some embodiments of the invention.

FIG. 6b is a schematic diagram illustrating an example QKD system or network 610 including a QKD switching system 612 configured for performing a QKD protocol with at least two endpoint devices 614-616 via an QKD linking device or apparatus 618 (e.g. roadside cabinet). The QKD switching system 612 may also include a quantum communications component (QCC) 620 including a plurality of quantum transmitter (Q-TX(s)) component(s) and/or a plurality of quantum receiver (Q-RX(x)) components, a plurality of classical transceiver (CTXR(s)) components 622, where the QKD switching system 612 operates to connect, for each endpoint device during performance of a QKD protocol (e.g. a QKD protocol based on a QKD protocol from any of FIGS. 5a to 5d, any other suitable QKD protocol and/or BB84 family of QKD protocols, combinations thereof, modifications thereto, as herein described and/or as the application demands), a selected Q-TX and/or Q-RX assigned to an endpoint device with one or more of the Q-channel(s) of a QKD link assigned to the endpoint device, and/or operates to connect a selected CTRX assigned to the endpoint device with one or more C-channel(s) of the QKD link assigned to the endpoint device, during and/or after two or more of the endpoint devices performs a QKD protocol for exchanging/transmitting QKD keys, group keys and the like and/or as the application demands. The QCC component 620, CTRX components 622 may be controlled by the QKD linking apparatus/component 618 for managing the QKD links and connecting the endpoint devices 614 to 616 to a QKD network and the like and/or as the application demands. As an option, the QKD switching system 612 may further modified to include a plurality of quantum receiver components and/or quantum receivers in the QCC component 620, where one or more of the endpoint devices 614-616 may further modified to include a quantum transmitter for transmitting quantum transmissions to the quantum receivers of the QCC component 620 as the QKD protocol(s)/application demands. Each of the devices in the group of devices 614-616 and the QKD linking apparatus 618 perform corresponding/steps and/or reciprocal steps for performing a QKD protocol for exchanging keys, group keys, sharing a group key and/or any other type of exchange using a QKD protocol and the like using corresponding QKD links as described with reference to FIGS. 1a to 5d. The QKD system 610 may be configured for performing at least one or more process(es)/method(s) according to the invention, system(s), platform(s), combinations thereof, modifications thereto, and/or as described herein with reference to at least any one of FIGS. 1a to 6a and/or as the application demands.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication byway of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A quantum key distributed, QKD, linking apparatus for use with at least two endpoint devices for linking said endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links;

a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum communication component and the classical transceiver component, the controller configured to:

route or switch data received in a quantum transmission from an endpoint via a quantum receiver assigned to the endpoint over a quantum channel of the QKD link of the endpoint;

route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required;

wherein the quantum communication component further comprising a plurality of quantum transmitters, each quantum transmitter configured for transmitting quantum transmissions over a quantum channel of one of the QKD links, wherein one or more of the QKD links has a dedicated quantum transmitter from the quantum communication component and a dedicated classical transceiver from the classical transceiver component for use over the quantum channel and classical channel of the QKD link, wherein the controller is further configured to route or switch data generated for quantum transmission to an endpoint device by the quantum transmitter over the quantum channel of the QKD link of the endpoint device assigned to the quantum transmitter;

wherein the QKD linking apparatus further comprises a random number generator, wherein the controller performs a QKD protocol between a first endpoint device and a second endpoint device, the controller further configured to:

route or switch a first set of random bits or keys output from the random number generator for quantum transmission to the first endpoint device over a quantum channel of the QKD link of the first endpoint device via a quantum transmitter assigned to the first endpoint device, wherein the first endpoint device uses a first quantum receiving basis for receiving the quantum transmission of the first set of random bits or keys;

route or switch an indication of the first set of random bits or keys validly received by the first endpoint device received over the classical channel of the QKD link of the first endpoint device by a classical transceiver assigned to the first endpoint device;

route or switch data representative of the first quantum transmission basis used for transmitting the first set of random bits or keys over a classical channel of the QKD link of the first endpoint device via the classical transceiver assigned to the first endpoint device;

determine a first intermediate set of symbols associated with the QKD linking apparatus based on discarding those first set of random bits or keys that do not correspond to the received indication of the first set of random bits or keys validly received by the first endpoint device;

route or switch a second set of random bits or keys output from the random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys;

route or switch an indication of the second set of random bits or keys validly received by the second endpoint device received from the second endpoint device over the classical channel of the QKD link of the second endpoint via a classical transceiver assigned to the second endpoint device;

route or switch data representative of the second quantum transmission basis used for transmitting the second set of random bits or keys for classical transmission over a classical channel of the QKD link of the second endpoint device via the classical transceiver assigned to the second endpoint device;

determine a second set of intermediate symbols associated with the QKD linking apparatus based on discarding those second set of random bits or keys that do not correspond to the received indication of the second set of random bits or keys validly received by the second endpoint device;

generate an encrypted first intermediate set of symbols using the second intermediate set of symbols;

route or switch the encrypted first intermediate set of symbols over the classical channel of the QKD link of the second endpoint via the classical transceiver assigned to the second endpoint device, wherein the second endpoint device decrypts the first intermediate set of symbols associated with the QKD linking apparatus based on deriving the second intermediate set of symbols associated with the QKD linking apparatus from the received second quantum transmission basis and the second quantum receiving basis;

route or switch data representative of the first quantum transmission basis and the first quantum receiving basis received from the first endpoint device for classical transmission over a classical channel of the QKD link of the second endpoint device via the classical transceiver assigned to the second endpoint device;

route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first quantum transmission basis equals the first receiving basis and the second quantum transmission basis equals the second receiving basis, and the second endpoint device determines a second shared key based on discarding all bits from the decrypted first intermediate set of symbols associated with the QKD linking apparatus except those bits where the first quantum transmission basis equals the first receiving basis and the second quantum transmission basis equals the second receiving basis;

route or switch data representative of error correction and/or privacy amplification in relation to the first and second shared keys over the classical channels of the QKD links of the first and second endpoint devices, wherein the first and second devices determine a final shared key based on the first and second shared keys.

2. A quantum key distributed, QKD, linking apparatus for use with at least two endpoint devices for linking said endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links;

a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum communication component and the classical transceiver component, the controller configured to:

route or switch data received in a quantum transmission from an endpoint via a quantum receiver assigned to the endpoint over a quantum channel of the QKD link of the endpoint;

route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required;

wherein the QKD linking apparatus further comprises a random number generator, wherein the controller performs a QKD protocol between a first endpoint device and a second endpoint device, the controller further configured to:

route or switch a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys;

route or switch an indication of the first set of random bits or keys validly received by the quantum receiver to the first endpoint device over the classical channel of the QKD link of the first endpoint device by a classical transceiver assigned to the first endpoint device;

route or switch data representative of the first quantum receiving basis used for receiving the first set of random bits or keys to the first endpoint device over a classical channel of the QKD link of the first endpoint device via the classical transceiver assigned to the first endpoint device;

determine a first intermediate set of symbols associated with the QKD linking apparatus based on discarding those first set of random bits or keys that were not validly received by the quantum receiver assigned to the first endpoint device;

route or switch a second set of random bits or keys received by a quantum receiver assigned to the second endpoint device from quantum transmissions from the second endpoint device over a quantum channel of the QKD link of the second endpoint device, wherein the quantum receiver uses a second quantum receiving basis for receiving the quantum transmission of the second set of random bits or keys and the second endpoint device uses a second quantum transmission basis for transmitting the quantum transmission of the second set of random bits or keys;

route or switch an indication of the second set of random bits or keys validly received by the quantum receiver to the second endpoint device over the classical channel of the QKD link of the second endpoint device by a classical transceiver assigned to the second endpoint device;

route or switch data representative of the second quantum receiving basis used for receiving the second set of random bits or keys to the second endpoint device over a classical channel of the QKD link of the second endpoint device via the classical transceiver assigned to the second endpoint device;

determine a second intermediate set of symbols associated with the QKD linking apparatus based on discarding those second set of random bits or keys that were not validly received by the quantum receiver assigned to the second endpoint device;

generate an encrypted first intermediate set of symbols using the second intermediate set of symbols;

route or switch the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis;

route or switch data representative of the first quantum transmission basis and the first quantum receiving basis received from the first endpoint device for classical transmission over a classical channel of the QKD link of the second endpoint device via the classical transceiver assigned to the second endpoint device;

route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis;

route or switch data representative of error correction and/or privacy amplification in relation to the first and second shared keys over the classical channels of the QKD links of the first and second endpoint devices, wherein the first and second devices determine a final shared key based on the first and second shared keys.

3. A quantum key distributed, QKD, linking apparatus for use with at least two endpoint devices for linking said endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links;

a classical transceiver component comprising a plurality of classical transceivers, each classical transceiver configured for transmitting classical data over a classical channel of one of the QKD links and configured for receiving classical data over the classical channel of said one of the QKD links; and a controller connected to the quantum communication component and the classical transceiver component, the controller configured to:

route or switch data received in a quantum transmission from an endpoint via a quantum receiver assigned to the endpoint over a quantum channel of the QKD link of the endpoint;

route or switch classical data for classical transmission to an endpoint via a classical transceiver assigned to the endpoint over a classical channel of the QKD link of the endpoint; and route or switch classical data received by a classical transceiver over the classical channel of the QKD link of an endpoint as required;

wherein the QKD linking apparatus further comprises a random number generator, wherein the controller performs a QKD protocol between a first endpoint device and a second endpoint device, the controller further configured to:

route or switch a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys;

route or switch an indication of the first set of random bits or keys validly received by the quantum receiver to the first endpoint device over the classical channel of the QKD link of the first endpoint device by a classical transceiver assigned to the first endpoint device;

route or switch data representative of the first quantum receiving basis used for receiving the first set of random bits or keys to the first endpoint device over a classical channel of the QKD link of the first endpoint device via the classical transceiver assigned to the first endpoint device;

determine a first intermediate set of symbols associated with the QKD linking apparatus based on discarding those first set of random bits or keys that were not validly received by the quantum receiver assigned to the first endpoint device;

route or switch a second set of random bits or keys output from a random number generator for quantum transmission to the second endpoint device over a quantum channel of the QKD link of the second endpoint device via a quantum transmitter assigned to the second endpoint device, wherein the second endpoint device uses a second quantum receiving basis for receiving the quantum transmission of the second set of random bits or keys;

route or switch an indication of the second set of random bits or keys validly received by the second endpoint device received from the second endpoint device over the classical channel of the QKD link of the second endpoint via a classical transceiver assigned to the second endpoint device;

route or switch data representative of the second quantum transmission basis used for transmitting the second set of random bits or keys for classical transmission over a classical channel of the QKD link of the second endpoint device via the classical transceiver assigned to the second endpoint device;

determine a second intermediate set of symbols associated with the QKD linking apparatus based on discarding those second set of random bits or keys that do not correspond to the received indication of the second set of random bits or keys validly received by the second endpoint device;

generate an encrypted first intermediate set of symbols using the second intermediate set of symbols;

route or switch the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis;

route or switch data representative of the first quantum transmission basis and the first quantum receiving basis received from the first endpoint device for classical transmission over a classical channel of the QKD link of the second endpoint device via the classical transceiver assigned to the second endpoint device;

route or switch data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second quantum transmission basis equals the second receiving basis, and the second endpoint device determines a second shared key based on discarding all bits from the decrypted first intermediate set of symbols except those bits where the first transmission basis equals the first receiving basis and the second quantum transmission basis equals the second receiving basis;

route or switch data representative of error correction and/or privacy amplification in relation to the first and second shared keys over the classical channels of the QKD links of the first and second endpoint devices, wherein the first and second devices determine a final shared key based on the first and second shared keys.

4. A computer-implemented method for controlling a quantum key distributed, QKD, linking apparatus for use in linking at least two endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links; and a classical transceiver component comprising a plurality of classical transceivers, each classical transceiver configured for transmitting classical data over a classical channel of one of the QKD links and configured for receiving classical data over the classical channel of said one of the QKD links; and wherein the method comprises:

routing or switching data generated for quantum transmission from an endpoint via a quantum receiver assigned to the endpoint over a quantum channel of the QKD link of the endpoint;

routing or switching classical data for classical transmission to an endpoint via a classical transceiver assigned to the endpoint over a classical channel of the QKD link of the endpoint;

routing or switching classical data received by a classical transceiver over the classical channel of the QKD link of an endpoint as required; and performing a QKD protocol between a first endpoint device and a second endpoint device, the method further comprising:

routing or switching a first set of random bits or keys output from a random number generator for quantum transmission to the first endpoint device over a quantum channel of the QKD link of the first endpoint device via a quantum receiver assigned to the first endpoint device, wherein the first endpoint device uses a first quantum receiving basis for receiving the quantum transmission of the first set of random bits or keys;

routing or switching an indication of the first set of random bits or keys validly received by the first endpoint device received over the classical channel of the QKD link of the first endpoint device by a classical transceiver assigned to the first endpoint device;

routing or switching data representative of the first quantum transmission basis used for transmitting the first set of random bits or keys over a classical channel of the QKD link of the first endpoint device via the classical transceiver assigned to the first endpoint device;

determining a first intermediate set of symbols associated with the QKD linking apparatus based on discarding those first set of random bits or keys that do not correspond to the received indication of the first set of random bits or keys validly received by the first endpoint device;

routing or switching a second set of random bits or keys output from the random number generator for quantum transmission to the second endpoint device over a quantum channel of the QKD link of the second endpoint device via a quantum receiver assigned to the second endpoint device, wherein the second endpoint device uses a second quantum receiving basis for receiving the quantum transmission of the second set of random bits or keys;

routing or switching an indication of the second set of random bits or keys validly received by the second endpoint device received from the second endpoint device over the classical channel of the QKD link of the second endpoint via a classical transceiver assigned to the second endpoint device;

routing or switching data representative of the second quantum transmission basis used for transmitting the second set of random bits or keys for classical transmission over a classical channel of the QKD link of the second endpoint device via the classical transceiver assigned to the second endpoint device;

determining a second intermediate set of symbols associated with the QKD linking apparatus based on discarding those second set of random bits or keys that do not correspond to the received indication of the second set of random bits or keys validly received by the second endpoint device;

generating an encrypted first intermediate set of symbols using the second intermediate set of symbols;

routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis;

routing or switching data representative of the first quantum transmission basis and the first quantum receiving basis received from the first endpoint device for classical transmission over a classical channel of the QKD link of the second endpoint device via the classical transceiver assigned to the second endpoint device;

routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first quantum transmission basis equals the first receiving basis and the second quantum transmission basis equals the second receiving basis, and the second endpoint device determines a second shared key based on discarding all bits from the decrypted first intermediate set of symbols except those bits where the first quantum transmission basis equals the first receiving basis and the second quantum transmission basis equals the second receiving basis;

routing or switching data representative of error correction and/or privacy amplification in relation to the first and second shared keys over the classical channels of the QKD links of the first and second endpoint devices, wherein the first and second devices determine a final shared key based on the first and second shared keys.

5. A computer-implemented method for controlling a quantum key distributed, QKD, linking apparatus for use in linking at least two endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links; and a classical transceiver component comprising a plurality of classical transceivers, each classical transceiver configured for transmitting classical data over a classical channel of one of the QKD links and configured for receiving classical data over the classical channel of said one of the QKD links; and wherein the method comprises:

routing or switching data generated for quantum transmission from an endpoint via a quantum receiver assigned to the endpoint over a quantum channel of the QKD link of the endpoint;

routing or switching classical data for classical transmission to an endpoint via a classical transceiver assigned to the endpoint over a classical channel of the QKD link of the endpoint;

routing or switching classical data received by a classical transceiver over the classical channel of the QKD link of an endpoint as required; and performing a QKD protocol between a first endpoint device and a second endpoint device, the method further comprising:

routing or switching a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys;

routing or switching an indication of the first set of random bits or keys validly received by the quantum receiver to the first endpoint device over the classical channel of the QKD link of the first endpoint device by a classical transceiver assigned to the first endpoint device;

routing or switching data representative of the first quantum receiving basis used for receiving the first set of random bits or keys to the first endpoint device over a classical channel of the QKD link of the first endpoint device via the classical transceiver assigned to the first endpoint device;

determining a first intermediate set of symbols associated with the QKD linking apparatus based on discarding those first set of random bits or keys that were not validly received by the quantum receiver assigned to the first endpoint device;

routing or switching a second set of random bits or keys received by a quantum receiver assigned to the second endpoint device from quantum transmissions from the second endpoint device over a quantum channel of the QKD link of the second endpoint device, wherein the quantum receiver uses a second quantum receiving basis for receiving the quantum transmission of the second set of random bits or keys and the second endpoint device uses a second quantum transmission basis for transmitting the quantum transmission of the second set of random bits or keys;

routing or switching an indication of the second set of random bits or keys validly received by the quantum receiver to the second endpoint device over the classical channel of the QKD link of the second endpoint device by a classical transceiver assigned to the second endpoint device;

routing or switching data representative of the second quantum receiving basis used for receiving the second set of random bits or keys to the second endpoint device over a classical channel of the QKD link of the second endpoint device via the classical transceiver assigned to the second endpoint device;

determining a second intermediate set of symbols associated with the QKD linking apparatus based on discarding those second set of random bits or keys that were not validly received by the quantum receiver assigned to the second endpoint device;

generating an encrypted first intermediate set of symbols using the second intermediate set of symbols;

routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis;

routing or switching data representative of the first quantum transmission basis and the first quantum receiving basis received from the first endpoint device for classical transmission over a classical channel of the QKD link of the second endpoint device via the classical transceiver assigned to the second endpoint device;

routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first transmission basis equals the first receiving basis and the second transmission basis equals the second receiving basis, and the second endpoint device determines a second shared key based on discarding all bits from the decrypted first intermediate set of symbols except those bits where the first transmission basis equals the first receiving basis and the second transmission basis equals the second receiving basis;

routing or switching representative of error correction and/or privacy amplification in relation to the first and second shared keys over the classical channels of the QKD links of the first and second endpoint devices, wherein the first and second devices determine a final shared key based on the first and second shared keys.

6. A computer-implemented method for controlling a quantum key distributed, QKD, linking apparatus for use in linking at least two endpoint devices in a QKD network, the QKD linking apparatus comprising:

a plurality of QKD links, each QKD link having a communication medium comprising a quantum channel and a classical channel, wherein each endpoint is assigned a QKD link connecting said each endpoint to the QKD linking apparatus;

a quantum communication component comprising a plurality of quantum receivers, each quantum receiver configured for receiving quantum transmissions over a quantum channel of a different one of the QKD links; and a classical transceiver component comprising a plurality of classical transceivers, each classical transceiver configured for transmitting classical data over a classical channel of one of the QKD links and configured for receiving classical data over the classical channel of said one of the QKD links; and wherein the method comprises:

routing or switching data generated for quantum transmission from an endpoint via a quantum receiver assigned to the endpoint over a quantum channel of the QKD link of the endpoint;

routing or switching classical data for classical transmission to an endpoint via a classical transceiver assigned to the endpoint over a classical channel of the QKD link of the endpoint;

routing or switching classical data received by a classical transceiver over the classical channel of the QKD link of an endpoint as required; and performing a QKD protocol between a first endpoint device and a second endpoint device, the method further comprising:

routing or switching a first set of random bits or keys received by a quantum receiver assigned to the first endpoint device from quantum transmissions from the first endpoint device over a quantum channel of the QKD link of the first endpoint device, wherein the quantum receiver uses a first quantum receiving basis for receiving the quantum transmission of the first set of random bits or keys and the first endpoint device uses a first quantum transmission basis for transmitting the quantum transmission of the first set of random bits or keys;

routing or switching an indication of the first set of random bits or keys validly received by the quantum receiver to the first endpoint device over the classical channel of the QKD link of the first endpoint device by a classical transceiver assigned to the first endpoint device;

routing or switching data representative of the first quantum receiving basis used for receiving the first set of random bits or keys to the first endpoint device over a classical channel of the QKD link of the first endpoint device via the classical transceiver assigned to the first endpoint device;

determining a first intermediate set of symbols associated with the QKD linking apparatus based on discarding those first set of random bits or keys that were not validly received by the quantum receiver assigned to the first endpoint device;

routing or switching a second set of random bits or keys output from a random number generator for quantum transmission to the second endpoint device over a quantum channel of the QKD link of the second endpoint device via a quantum receiver assigned to the second endpoint device, wherein the second endpoint device uses a second quantum receiving basis for receiving the quantum transmission of the second set of random bits or keys;

routing or switching an indication of the second set of random bits or keys validly received by the second endpoint device received from the second endpoint device over the classical channel of the QKD link of the second endpoint via a classical transceiver assigned to the second endpoint device;

routing or switching data representative of the second quantum transmission basis used for transmitting the second set of random bits or keys for classical transmission over a classical channel of the QKD link of the second endpoint device via the classical transceiver assigned to the second endpoint device;

determining a second intermediate set of symbols associated with the QKD linking apparatus based on discarding those second set of random bits or keys that do not correspond to the received indication of the second set of random bits or keys validly received by the second endpoint device;

generating an encrypted first intermediate set of symbols using the second intermediate set of symbols;

routing or switching the encrypted first intermediate set of symbols over the classical channel of the QKD link of the second endpoint via the classical transceiver assigned to the second endpoint device, wherein the second endpoint device decrypts the encrypted first intermediate set of symbols based on deriving the second intermediate set of symbols associated with the QKD linking apparatus from the received second quantum transmission basis and the second quantum receiving basis;

routing or switching data representative of the first quantum transmission basis and the first quantum receiving basis received from the first endpoint device for classical transmission over a classical channel of the QKD link of the second endpoint device via the classical transceiver assigned to the second endpoint device;

routing or switching data representative of the second quantum transmission basis and the second quantum receiving basis received from the second endpoint device for classical transmission over a classical channel of the QKD link of the first endpoint device via the classical transceiver assigned to the first endpoint device, wherein the first endpoint device determines a first shared key based on discarding all bits from the received first set of random bits except those bits where the first quantum transmission basis equals the first receiving basis and the second quantum transmission basis equals the second receiving basis, and the second endpoint device determines a second shared key based on discarding all bits from the decrypted first intermediate set of symbols except those bits where the first quantum transmission basis equals the first receiving basis and the second quantum transmission basis equals the second receiving basis;

routing or switching data representative of error correction and/or privacy amplification in relation to the first and second shared keys over the classical channels of the QKD links of the first and second endpoint devices, wherein the first and second devices determine a final shared key based on the first and second shared keys.

7. The QKD linking apparatus as claimed in claim 1, wherein each QKD link has a dedicated quantum receiver from the quantum communication component and a dedicated classical transceiver from the classical transceiver component for use over the quantum channel and classical channel of the QKD link.

8. The QKD linking apparatus as claimed in claim 1, wherein the communication medium of each of the QKD links comprises at least one optical fiber.

9. The QKD linking apparatus as claimed in claim 1, wherein the communication medium of at least one of the QKD links has a single optical fiber that is shared by the quantum and classical channels of said at least one QKD link.

10. The QKD linking apparatus as claimed in claim 1, wherein the QKD linking apparatus is an untrusted node and the QKD protocols performed by said QKD linking apparatus and said at least two endpoint devices are configured to ensure the QKD linking apparatus cannot derive the resulting QKD keys or keys exchanged output from the QKD protocols and used for securing communications between the at least two endpoint devices.

11. The computer implemented method as claimed in claim 4, further comprising:

assigning an available quantum receiver to an endpoint device for use over the QKD link of the endpoint device; and when implementing one of the QKD protocols between two or more endpoint devices each with an assigned quantum receiver, directing the quantum communication component to route or switch quantum transmissions for an endpoint device of the two or more endpoint devices to the quantum receiver assigned to said endpoint device for receiving said quantum transmissions over the quantum channel of the QKD link of the endpoint device.

12. The computer-implemented method as claimed in claim 4, further comprising:

assigning an available classical transceiver to an endpoint device for use over the QKD link of the endpoint device;

when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

13. The computer-implemented method as claimed in claim 4, further comprising, when one of the QKD protocols are being performed between the QKD linking apparatus and at least two of the endpoint devices is complete, for the at least two endpoint devices, directing the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the at least two endpoint devices.

14. The QKD linking apparatus as claimed in claim 1, the QKD linking apparatus further comprising a controller component configured for controlling the classical transmission and routing component for implementing one or more QKD protocols between the QKD linking apparatus and two or more of the endpoint devices, wherein the controller component is configured to:

assign an available classical transceiver to an endpoint device for use over the QKD link of the endpoint device;

when implementing one of the QKD protocols between two or more endpoint devices each with an assigned classical transceiver, direct the classical transmission and routing component to route or switch classical data for an endpoint device of the two or more endpoint devices to the classical transceiver assigned to said endpoint device to the classical channel of the QKD link of the endpoint device.

15. The QKD linking apparatus as claimed in claim 1, wherein when one of the QKD protocols being performed between the QKD linking apparatus and at least two of the endpoint devices is complete, the controller is further configured to direct the classical transmission and routing component to route or switch secure communications between the classical transceivers assigned to each of the endpoint devices over the corresponding classical channels of the QKD links of said endpoint devices, said communications being secured based on the keys exchanged using the QKD protocol between the at least two endpoint devices.

16. The QKD linking apparatus as claimed in claim 1, further comprising a radio access network comprising a centralized unit and a plurality of radio masts/radio units configured to service a plurality of mobile units, said centralized unit and each radio mast/radio unit associated with an endpoint device and corresponding QKD link, said QKD link connected between said endpoint device and said quantum communication component and said classical transmission and routing component, wherein the QKD linking apparatus is located in a distributed unit of the radio access network.

17. The computer-implemented method as claimed in claim 5, further comprising:

assigning an available quantum receiver to an endpoint device for use over the QKD link of the endpoint device; and when implementing one of the QKD protocols between two or more endpoint devices each with an assigned quantum receiver, directing the quantum communication component to route or switch quantum transmissions for an endpoint device of the two or more endpoint devices to the quantum receiver assigned to said endpoint device for receiving said quantum transmissions over the quantum channel of the QKD link of the endpoint device.

18. The computer-implemented method as claimed in claim 5, further comprising:

assigning an available classical transceiver to an endpoint device for use over the QKD link of the endpoint device;

when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

19. The computer-implemented method as claimed in claim 6, further comprising:

assigning an available quantum receiver to an endpoint device for use over the QKD link of the endpoint device; and when implementing one of the QKD protocols between two or more endpoint devices each with an assigned quantum receiver, directing the quantum communication component to route or switch quantum transmissions for an endpoint device of the two or more endpoint devices to the quantum receiver assigned to said endpoint device for receiving said quantum transmissions over the quantum channel of the QKD link of the endpoint device.

20. The computer-implemented method as claimed in claim 6, further comprising:

assigning an available classical transceiver to an endpoint device for use over the QKD link of the endpoint device;

when implementing one of the QKD protocols between two or more endpoint devices each with an assigned classical transceiver, directing the classical transmission and routing component to route or switch classical data for an endpoint device of the two or more endpoint devices to the classical transceiver assigned to said endpoint device to the classical channel of the QKD link of the endpoint device.

\* \* \* \* \*